(12) United States Patent
Kamisako et al.

(10) Patent No.: US 7,966,842 B2
(45) Date of Patent: Jun. 28, 2011

(54) REFRIGERATOR, AND ELECTRIC DEVICE

(75) Inventors: Toyoshi Kamisako, Osaka (JP); Yoshihiro Ueda, Nara (JP); Kazuya Nakanishi, Shiga (JP); Tadashi Adachi, Shiga (JP); Kazuyuki Hamada, Osaka (JP); Kiyotaka Tabira, Shiga (JP); Yasuyuki Okamoto, Shiga (JP); Kenichi Okabe, Shiga (JP); Masashi Yuasa, Shiga (JP); Kenichi Kakita, Shiga (JP); Kiyoshi Mori, Shiga (JP); Tosiaki Mamemoto, Shiga (JP); Katsunori Horii, Shiga (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/604,213

(22) Filed: Oct. 22, 2009

(65) Prior Publication Data

US 2010/0077791 A1 Apr. 1, 2010

Related U.S. Application Data

(63) Continuation of application No. PCT/JP2008/001083, filed on Apr. 25, 2008.

(30) Foreign Application Priority Data

| Apr. 26, 2007 | (JP) | 2007-116941 |
|---|---|---|
| Apr. 26, 2007 | (JP) | 2007-116946 |
| Apr. 26, 2007 | (JP) | 2007-116948 |
| Nov. 6, 2007 | (JP) | 2007-288376 |
| Nov. 14, 2007 | (JP) | 2007-295444 |
| Nov. 14, 2007 | (JP) | 2007-295451 |
| Jan. 31, 2008 | (JP) | 2008-020493 |
| Jan. 31, 2008 | (JP) | 2008-020494 |
| Mar. 31, 2008 | (JP) | 2008-091152 |
| Mar. 31, 2008 | (JP) | 2008-091153 |
| Mar. 31, 2008 | (JP) | 2008-091154 |

(51) Int. Cl.
*F25D 17/02* (2006.01)

(52) U.S. Cl. .......................... 62/373; 62/440

(58) Field of Classification Search .................. 62/373, 62/375, 441, 407, 275, 314, 304, 419, 440; 165/64, 59
See application file for complete search history.

(56) References Cited

U.S. PATENT DOCUMENTS 4,272,969 A * 6/1981 Schwitzgebel ................. 62/419

(Continued)

FOREIGN PATENT DOCUMENTS

EP 1733797 A1 12/2006

(Continued)

OTHER PUBLICATIONS

International Search Report for International Application No. PCT/JP2008/001083, dated Jul. 22, 2008, 4 pages.

*Primary Examiner* — Mohammad Ali

(74) *Attorney, Agent, or Firm* — Brinks Hofer Gilson & Lione

(57) ABSTRACT

The refrigerator includes a vegetable compartment (107) thermally insulated by a rear partition (111), and a mist generation department (139) for atomizing a mist into the vegetable compartment (107), and the mist generation department (139) includes a atomizing electrode (135) for atomizing the mist into the vegetable compartment (107), a voltage applicator (133) for applying a voltage to the atomizing electrode (135), and a cooling pin (134) coupled to the atomizing electrode (135), in which the atomizing electrode (135) is cooled to a temperature lower than the dew point by a outlet air-duct for freezer compartment (141), and the moisture in the air is cooled to condense dew on the atomizing electrode (135), and is atomized as a mist into the vegetable compartment (107), and dew can be condensed from moisture onto the atomizing electrode (135) stably and in a simple configuration, and the freshness of the food is enhanced while the reliability of the refrigerator is enhanced.

10 Claims, 46 Drawing Sheets

U.S. PATENT DOCUMENTS

| | | | | |
|---|---|---|---|---|
| 4,731,204 A * | 3/1988 | Noma et al. | | 261/30 |
| 4,860,555 A * | 8/1989 | Bishop et al. | | 62/376 |
| RE33,067 E * | 9/1989 | Corrigan | | 62/231 |
| 5,007,242 A * | 4/1991 | Nakayama | | 62/3.2 |
| 5,309,868 A * | 5/1994 | Tomiyama | | 119/203 |
| 5,354,515 A * | 10/1994 | Ushimaru | | 261/72.1 |
| 5,417,080 A * | 5/1995 | Bishop | | 62/376 |
| 5,499,493 A * | 3/1996 | Rosset | | 56/13.3 |
| 5,587,089 A * | 12/1996 | Vogel et al. | | 210/764 |
| 5,873,641 A * | 2/1999 | Spinelli | | 312/114 |
| 6,293,121 B1 * | 9/2001 | Labrador | | 62/304 |
| 6,560,974 B2 * | 5/2003 | Kroll et al. | | 62/78 |
| 6,637,235 B2 * | 10/2003 | Sakamoto et al. | | 62/443 |
| 6,871,507 B1 * | 3/2005 | Goldsmith | | 62/183 |
| 7,484,388 B2 * | 2/2009 | Crisp, III | | 68/12.01 |
| 7,669,838 B2 * | 3/2010 | North | | 261/140.1 |
| 2002/0145086 A1 * | 10/2002 | Alvarado et al. | | 248/95 |
| 2003/0010056 A1 * | 1/2003 | Sakamoto et al. | | 62/441 |
| 2004/0121660 A1 * | 6/2004 | Armstrong et al. | | 439/894 |
| 2005/0234590 A1 * | 10/2005 | Sato et al. | | 700/231 |

FOREIGN PATENT DOCUMENTS

| | | |
|---|---|---|
| JP | 06-257933 A | 9/1994 |
| JP | 07-135945 A | 5/1995 |
| JP | 2000-220949 A | 8/2000 |
| JP | 2004-125179 A | 4/2004 |
| JP | 2006-000826 A | 1/2006 |
| JP | 2006-038444 A | 2/2006 |
| JP | 2006-150334 A | 6/2006 |
| JP | 2006-204968 A | 8/2006 |
| JP | 2007-046891 A | 2/2007 |
| JP | 2007-054808 A | 3/2007 |
| WO | WO 2006/009190 A1 | 1/2006 |

* cited by examiner

REFRIGERATOR, AND ELECTRIC DEVICE

RELATED APPLICATIONS

This application is a continuation of PCT/JP2008/001083, filed on Apr. 25, 2008, which claims priority to Japanese Application Nos. JP2007-116941 filed on Apr. 26, 2007, JP2007-116946 filed on Apr. 26, 2007, JP2007-116948 field on Apr. 26, 2007, JP2007-288376 filed on Nov. 6, 2007, JP2007-295444 filed on Nov. 14, 2007, JP2007-295451 filed on Nov. 14, 2007, JP2008-020493 filed on Jan. 31, 2008, JP2008-020494 filed on Jan. 31, 2008, JP2008-091152 filed on Mar. 31, 2008, JP2008-091153 filed on Mar. 31, 2008, and JP2008-091154 filed on Mar. 31, 2008. The entire contents of these applications are incorporated herein by reference.

TECHNICAL FIELD

The present invention relates to refrigerators which employ a mist maker in a storage compartment that stores vegetables, and it also relates to electric appliances using the same mist maker.

BACKGROUND ART

Vegetables lose their freshness due to temperature, humidity, environmental gasses, microbes, and light. The vegetable is alive, so that it breathes and transpires on its surface. To maintain the freshness, it is necessary to control the breath and the transpiration. Numbers of vegetables, except the ones that fall in disorder due to a low temperature, can be controlled the breath by a low temperature and can be prevented from the transpiration by a high humidity. In recent years, a home-use refrigerator has employed a closed vegetable crisper for keeping the vegetable fresh. The vegetable stored in this crisper can be cooled at an appropriate temperature, and yet a high humidity is kept in the crisper in order to prevent the vegetable from transpiring. Some of these high-humidity keeping devices use a mist atomizer.

A conventional refrigerator having this kind of mist atomizer produces mist with an ultrasonic mist device for humidifying the inside of a vegetable compartment when the inside of the compartment stays at a low humidity, thereby preventing the vegetable from transpiring. This is disclosed in, e.g. Patent Document 1.

FIG. 51 shows a refrigerator having a conventional ultrasonic mist device disclosed in Patent Document 1. FIG. 52 shows a perspective view enlarging an essential part of the ultrasonic mist device. As shown in FIG. 51, vegetable compartment 21 is placed at a lower part of main housing 26 of refrigerator 20, and its open front can be closed by door 22 of a drawer, which a user can slide-out. Partition board 2 separates vegetable compartment 21 from a refrigerator compartment (not shown) placed over compartment 21.

Door 22 of the drawer equipped with hanger 23 fixed to the inside of door 22, and vegetable crisper 1 which accommodates foods, e.g. vegetables, is mounted to this hanger 23. The upper opening of vegetable crisper 1 can be sealed with lid 3. Defrosting chamber 4 is placed inside vegetable crisper 1, and chamber 4 is equipped with ultrasonic mist device 5.

As shown in FIG. 52, ultrasonic mist device 5 includes mist atomizing port 6, water storage tank 7, humidity sensor 8, and hose receptacle 9. Tank 7 is connected to defrosted water hose 10 via receptacle 9, and hose 10 includes purifying filter 11 which purifies the defrosting water.

The operation of the foregoing refrigerator is described hereinafter. A heat exchanging evaporator (not shown) cools the air, which then flows along the outer face of vegetable crisper 1 and lid 3, thereby cooling crisper 1 and the foods accommodated inside thereof. The defrosted water produced by a evaporator during the operation flows through defrosted water hose 10, where the water is purified by purifying filter 11, and is supplied to water storage tank 7 of ultrasonic mist device 5.

Then when humidity sensor 8 senses that the humidity in the storage compartment is not higher than 90%, mist maker 5 starts humidifying, so that the humidity can be adjusted at an appropriate level for the vegetables stored in vegetable crisper 1 to be kept fresh.

When humidity sensor 8 senses that the humidity in the storage compartment is higher than 90%, mist maker 5 stops excessive humidifying. Mist maker 5 thus can quickly humidify the inside of vegetable crisper 1 and keep the inside always at a high humidity, which then allows controlling the transpiration of the vegetables, thereby keeping the vegetables fresh.

Another refrigerator equipped with an ozone-water mist maker is also known in the market; this refrigerator is disclosed in, e.g. Patent Document 2, and includes an ozone generator, an exhaust port, a water supply path directly connected to a water pipe, and an ozone water supply path, which connects to the vegetable compartment. The ozone generator connects to a water supplier directly connected to the water pipe, and the exhaust port connects to the ozone water supply path. An ultrasonic element is placed in the vegetable crisper. The ozone generated in the ozone generator contacts with water, and is turned into ozone-water which works as processing water. The ozone water is supplied to the vegetable compartment, where the water is turned into mist by the ultrasonic oscillator, and the mist is atomized in the compartment.

Although it is not shown in the drawings, a refrigerator is known as employing a negative-ion generator, a centrifugal force and Coriolis force generator, and a gas-liquid separator combined together for maintaining the freshness of vegetables. This refrigerator is disclosed in, e.g. Patent Document 3.

The centrifugal force and Coriolis force generator carries out an ion-dissociation process, a drop-activation process, and a gas-molecule ionization process, thereby generating adduct negative ions of water molecules in the air. The gas-liquid separator separates the air containing the negative ions from the drops, thereby supplying the air to storage room 8, which is then kept at a temperature lower than an ordinary temperature and at a humidity over 80%, and the air therein contains over 1,000 negative ions/cc for storing foods.

Storage room 8 filled with this highly humid air allows cleaning up the inside of room 8 and maintaining the inside of room 8 germfree, so that the foods can be kept fresh thanks to a germ-removing function and a deodorizing function of the negative ions contained in the air. These functions have an anabatic advantage for animals and plants.

However, the foregoing conventional structure vibrates the water or ozone water with the ultrasonic oscillator, thereby making mist. The misted water particles or misted ozone water particles cannot become fine particles, so that the mist cannot be atomized uniformly in storage room 8. The mist thus attaches to the surface of the food at a low ratio. If an atomizing amount is increased or the atomizing is lasted for a long time in order to increase the attachment ratio, the vegetable is spoiled by the water, or dew is formed in storage room 8.

The conventional structure discussed above supplies water to the mist maker by using the defrosted water stored in the tank or the running water, so that the structure needs the hose for the defrosted water, the purifying filter, or the water supply path directly connected to the water pipe. This structure is thus obliged to be complicated.

The mechanism that ionizes the drops in the storage room becomes bulky, so that it does not fit for the home-use refrigerator. A simple ionization will give the drops so poor oxidizing force that a little advantage can be expected.

An atomizing of the mist in the refrigerator compartment, which is roughly sealed and is kept at a low temperature, needs some care in order to carry out a uniform and stable mist atomizing for avoiding such problems as excessive dew formation due to excessive atomizing amount or an inconvenience due to the mist atomizing in a drought status. However, the conventional structures discussed above cannot adjust the amount of mist produced although the mist is atomized in order to keep the storage room at a high humidity. It is thus possible that an excessive mist atomizing will form puddles in the room, or spoil the vegetables stored in the room with the water.

Patent Document 1: Unexamined Japanese Patent Publication No. H06-257933
Patent Document 2: Unexamined Japanese Patent Publication No. 2000-220949
Patent Document 3: Unexamined Japanese Patent Publication No. H07-135945

DISCLOSURE OF INVENTION

The present invention addressed the problems discussed above, and aims to provide a refrigerator including a storage compartment defined such that the compartment is insulated from heat, and a mist generation department for atomizing mist in the storage compartment. The mist generation department is formed of a tip of the department mist, a voltage applicator for applying a voltage to the tip, and a heat conducting pin coupled to the tip. An evaporator cools the tip of the department mist down to not higher than the dew point, thereby condensing the water in the air into dew, which is then atomized as mist in the storage compartment.

This structure allows cooling the heat conducting pin, thereby cooling indirectly an atomizing electrode without cooling directly the tip of the department mist. The heat conducting pin has a greater heat capacity than the tip of the department mist, so that a direct effect of a temperature change in the evaporator to the tip of the department mist can be eased. The tip of the department mist is thus cooled, so that a change in load of the tip can be suppressed. As a result, the mist can be atomized in a steady amount.

The present invention thus condenses the excessive water vapor in the storage compartment, where fruit and vegetables are stored, into dew, and applies a voltage to the dewed water, thereby generating fine mist that tends to attach to the food surface. This fine mist is atomized in the storage compartment for the fruit and vegetables to be kept fresh.

The present invention does not need a complicated structure including a defrosted water hose which supplies the water to be used for atomizing mist, a purifying filter, or a water-supply path directly connected to the water pipe. The present invention efficiently uses a cooling source produced in a freezing cycle of the refrigerator, thereby supplying fine mist to the storage compartment with a simple construction.

The present invention allows forming dew without fail and with ease at the tip of the department mist by using excessive water vapor in the storage compartment, so that the tip of the department mist can make fine mist on the order of nanometer. This fine mist is atomized over the fruit and vegetables, and the fine mist attaches uniformly to the surface thereof, so that the fruit and vegetables can be kept fresh for a longer time.

Figure 1:
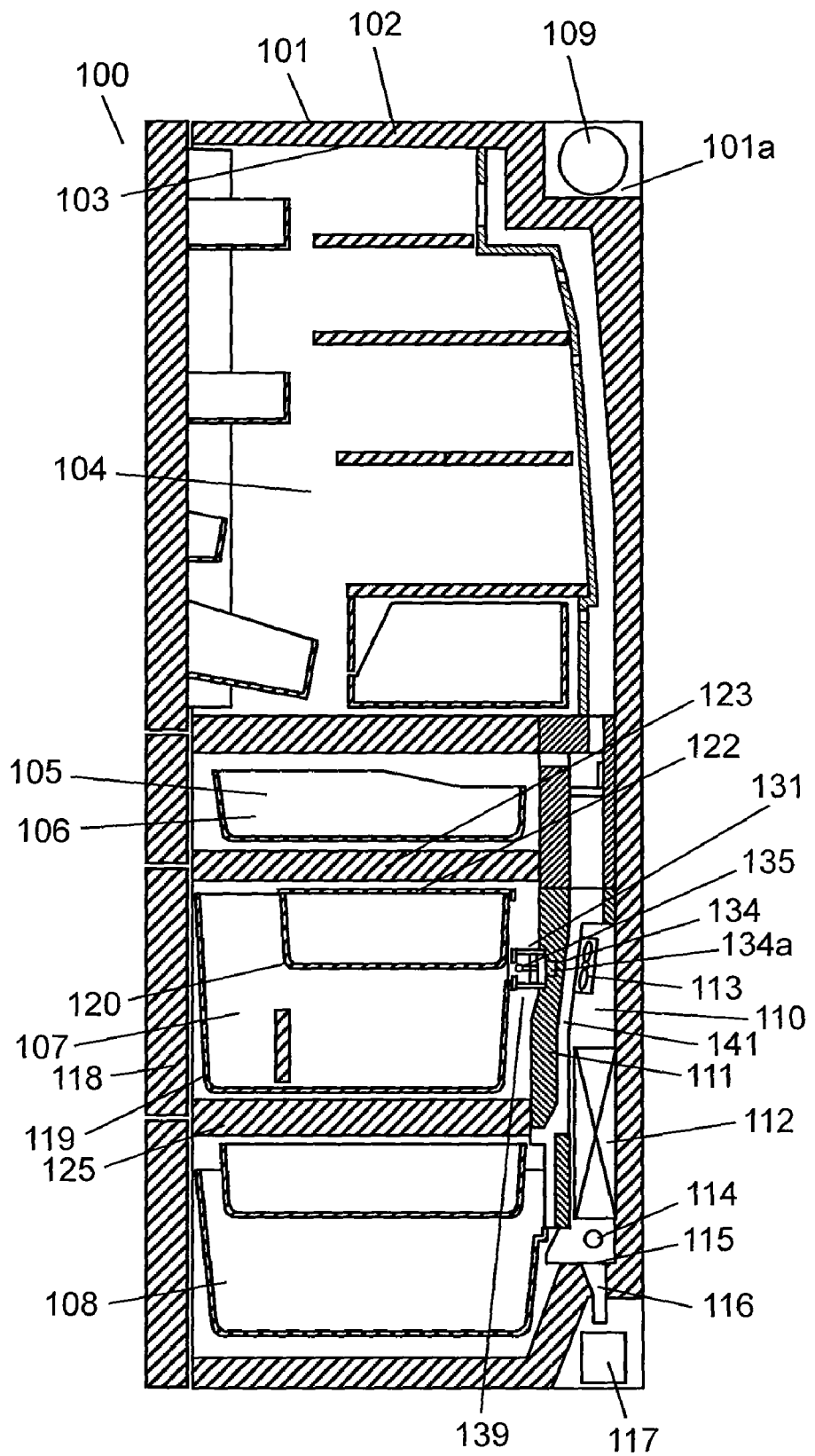
FIG. 1 shows a sectional view of a refrigerator in accordance with a first embodiment of the present invention, where the refrigerator is cut vertically and parted to right and left.

DESCRIPTION OF REFERENCE MARKS 100 refrigerator
101 thermally insulated cabinet 102 shell
103 inner wall
104 refrigerator compartment
105 switchable temperature compartment
106 icemaker
107 vegetable compartment
108 freezer compartment
109 compressor
110 cooling compartment
111 rear-end partition
110a recess
111c through-section
112 evaporator
113 cooling fan
114 radiant heater
115 drain pan
116 drain tube
117 evaporation tray
118 door
119 lower basket
120 upper basket
122 lid
123 first partition
124 outlet for vegetable compartment
125 second partition
126 inlet for vegetable compartment
131 electrostatic atomizing device
132, 209 atomizing port
133 voltage applier
134, 205, 501 heat conducting pin
134a, 191 protrusion
135 atomizing electrode
136 opposite electrode
137 outlet wall
138 humidity supplying port
139, 211 mist generation department
140 inlet air-duct for storage compartment
141 outlet air-duct for freezer compartment
146 controller
151 surface of rear partition
152 heat insulator
154, 178 heater
155 recess on heat insulator
156 low temperature air duct
158 heat conducting pin heater
161, 401 partition board
162 protrusion
165 through section
166 heat conducting pin cover
167 opening
171 heat insulator
172 partition on freezer side
173 partition on vegetable compartment side
174 partition
176 mist discharging port
177 mist air-duct
181 inlet air-duct for vegetable compartment
182 outlet air-duct for vegetable compartment
183 mist sucking port
192 atomizing port
193 humidity supplying port
194 tape (cool air shutout member)
196 void
197a, 197b, 197c, 197d void burying member
200 ultrasonic mist device
201 horn-shaped section
202 electrode
202a fixing part on mist-making electrode side
203 piezoelectric element
204 electrode
207 outlet wall
208 horn-shaped ultrasonic oscillator
222 Peltier module
222a heat conduction part on air-duct side
222b heat exchanging part
251 partition
252 outlet air-duct for vegetable compartment
253 inlet air-duct for vegetable compartment
254 vent hole
255 cooling air-duct for mist device
301 temperature changing chamber
302 damper
303 lower temperature side evaporator
304 higher temperature side evaporator
305 first partition
306 second partition
307 condenser
308 three-way valve
309 capillary on lower temperature side
310 capillary on higher temperature side
311 cooling air-duct on temperature changing chamber
312 cooling air-duct on freezer compartment
313 rear-end partition of temperature changing chamber
314 rear-end partition of freezer compartment
321 partition board
322 fan for refrigerator compartment
323 partition in refrigerator compartment
324 air-duct in refrigerator compartment
325 discharge port from temperature changing chamber
326 sucking port to temperature changing chamber
502 tip of the department mist
503 water collector
504-508 channel
509 waterway
510 pump
512 water
602a front sucking port
602b top sucking port
604 front panel
605 pre-filter
606 heat exchanger
608 indoor fan
610 blowout port

PREFERRED EMBODIMENTS FOR CARRYING OUT THE INVENTION

Preferred embodiments of the present invention are described specifically below while referring to the accompanying drawings. It must be noted, however, that the present invention is not limited by these preferred embodiments alone.

Preferred Embodiment 1

Figure 2:
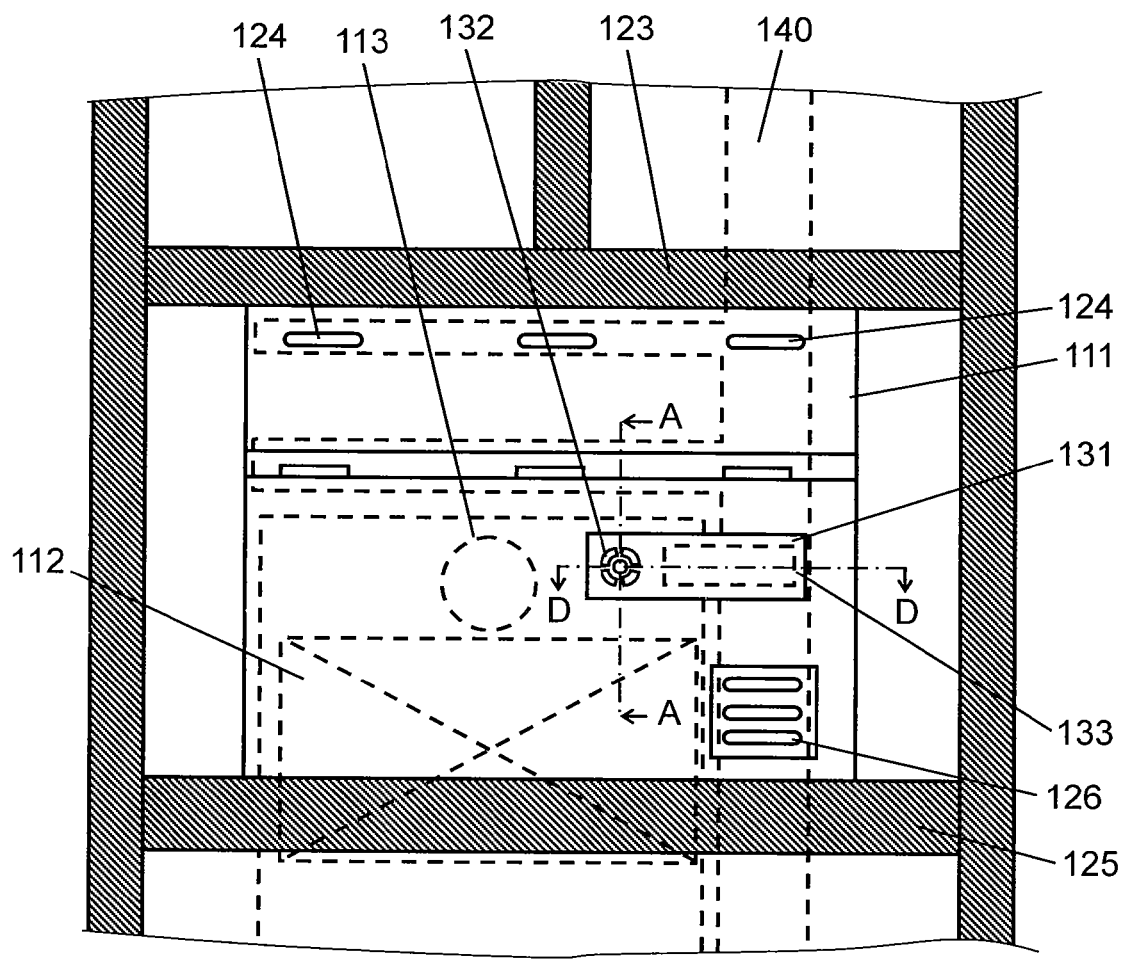
FIG. 2 shows a front view illustrating an essential part of a rear-end face of a vegetable compartment of the refrigerator in accordance with the first embodiment.
Figure 3:
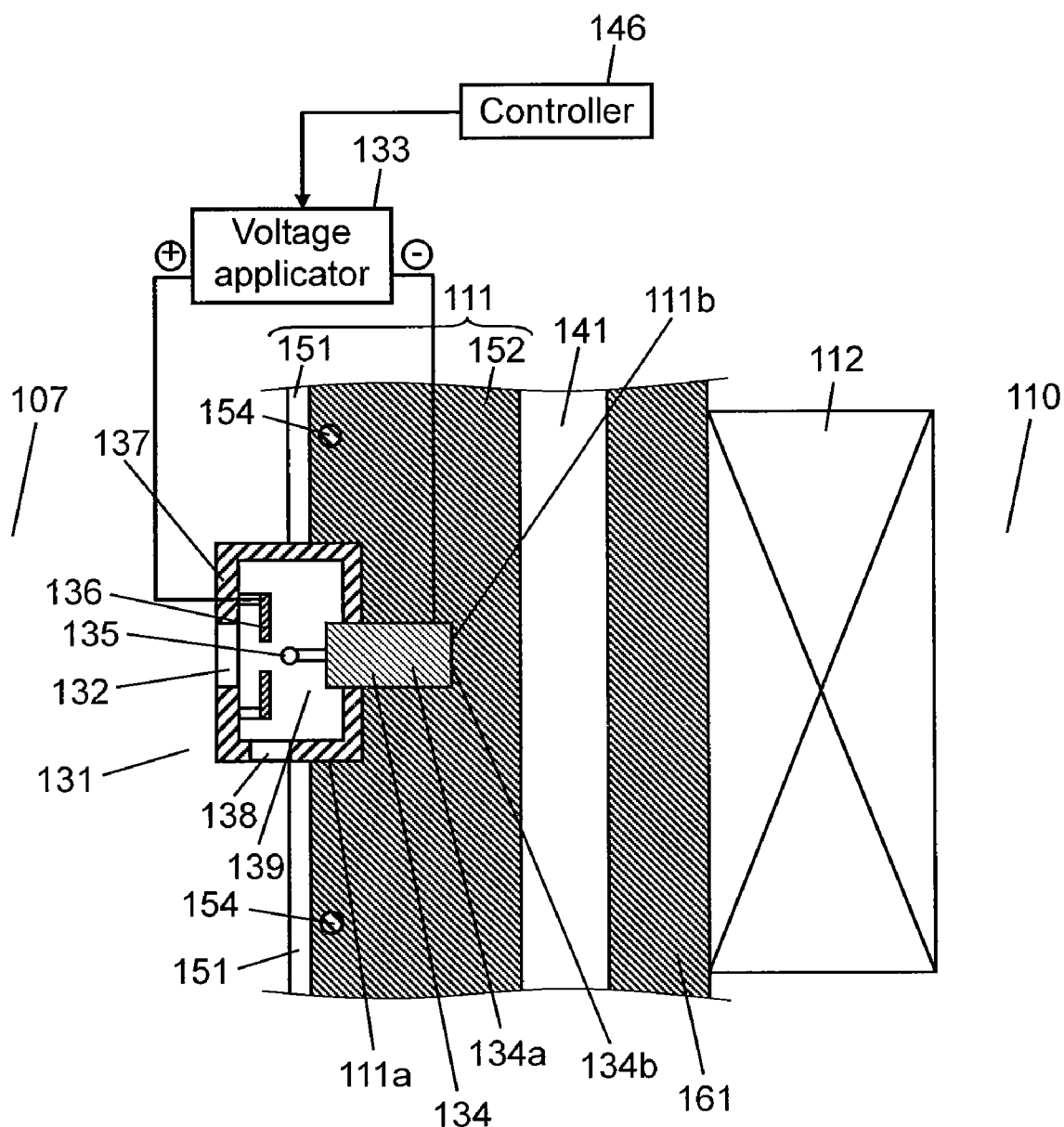
FIG. 3 shows a sectional view cut along line A-A in FIG. 2, and the sectional view illustrates an electrostatic atomizing device and its periphery provided to the vegetable compartment of the refrigerator in accordance with the first embodiment.

FIG. 1 is a longitudinal sectional view showing a section where a refrigerator in preferred embodiment 1 of the present invention is cut and parted into right and left sections. FIG. 2 is a front view of essential parts of a rear end face of a vegetable compartment of the refrigerator in preferred embodiment 1 of the present invention. FIG. 3 is a sectional view of a peripheral part of an electrostatic atomizing device provided in the vegetable compartment of the refrigerator in preferred embodiment 1 of the present invention, as seen from an arrow direction of a cut section along line A-A in FIG. 2.

In the drawings, thermally insulated cabinet 101, which is a refrigerator main body of refrigerator 100, includes outer case 102 mainly composed of steel plate, inner case 103 formed of a resin such as ABS, and a foamed thermally insulating material such as rigid foamed urethane foamed and filled in a space between outer case 102 and inner case 103. The inside of refrigerator 100 is insulated from the surrounding, and is thermally insulated and divided into a plurality of storage compartments by partitions. In the highest part of refrigerator 100, refrigerator compartment 104 is arranged as a first storage compartment, and in the lower part of refrigerator compartment 104, switchable temperature compartment 105 as a fourth storage compartment and icemaker 106 as a fifth storage compartment are disposed side by side, in the lower part of switchable temperature compartment 105 and icemaker 106, vegetable compartment 107 is disposed as a second storage compartment, and in the lowest part, freezer compartment 108 is disposed as a third storage compartment.

Refrigerator compartment 104 is always controlled at a lower limit of 1° C. to 5° C. so as not to be frozen for cold storage, and vegetable compartment 107 is controlled same as in refrigerator compartment 104, or a slightly higher temperature setting of 2° C. to 7° C. Freezer compartment 108 is set in a freezing temperature zone, always at −22° C. to −15° C. for frozen storage, or at a lower temperature of −30° C. to −25° C. for enhancing the frozen storage state.

Switchable temperature compartment 105 can be changed over in various preset temperature zones from cold storage temperature zone to frozen storage temperature zone, in addition to the refrigerator zone of 1° C. to 5° C., the vegetable zone of 2° C. to 7° C., the freezer zone of −22° C. to −15° C. Switchable temperature compartment 105 is a storage compartment having an independent door disposed along with icemaker 106, often provided with a drawer type door.

In this preferred embodiment, switchable temperature compartment 105 is a storage compartment including the temperature zones from cold storage to frozen storage, but may be used as a specialized storage compartment only in intermediate temperature zones between the refrigerator and the freezer, by limiting the cold storage to refrigerator compartment 104 and vegetable compartment 107 only, and the frozen storage to freezer compartment 108 only. Or it may be also used as a storage compartment fixed in a specific temperature zone.

Icemaker 106 makes ice in an automatic ice making machine (not shown) provided in the upper part of the compartment from the water sent from a water tank (not shown) in refrigerator compartment 104, and stores the ice in an ice container (not shown) disposed in the lower part of the compartment.

The ceiling part of thermally insulated cabinet 101 has a recessed section like stairs toward the rear side of the refrigerator, and machine room 101a is formed in the stair-like recess, and machine room 101a accommodates compressor 109, dryer (not shown) for removing moisture, and other high pressure component parts of the freezing cycle. That is, machine room 101a having compressor 109 is disposed by invading into a rear region of the highest part in refrigerator compartment 104.

In other words, in the dead space hardly accessible, machine room 101a having compressor 109 is disposed in the rear region in the storage compartment of the highest part of thermally insulated cabinet 101. As a result, the space of the machine room provided lowest part of thermally insulated cabinet 101 accessible by the user in a conventional refrigerator can be effectively used converted to a storage compartment space, and the storage efficiency and the convenience of use can be notably improved.

In the preferred embodiment, matters about essential parts of the present invention mentioned below may be applied to a conventional refrigerator of general type in which a machine room is provided in the rear region of the storage compartment in the lowest part of thermally insulated cabinet 101 and compressor 109 is disposed therein.

At the back side of vegetable compartment 107 and freezer compartment 108, cooling compartment 110 for generating cold air is provided to be partitioned from outlet air-duct 141 for freezer compartment. Between vegetable compartment 107, freezer compartment 108, and cooling compartment 110, outlet air-duct 141 for freezer compartment for sending cold air to the thermally insulated compartments, and rear partition 111 for thermally partitioning from the storage compartments are disposed. Or, as shown in FIG. 3, partition board 161 is provided for isolating outlet air-duct 141 for freezer compartment and cooling compartment 110. Evaporator 112 is disposed in cooling compartment 110, and the upper space of evaporator 112 includes cooling fan 113 for sending the cold air cooled by evaporator 112 to refrigerator compartment 104, switchable temperature compartment 105, icemaker 106, vegetable compartment 107, and freezer compartment 108 by forced convection system.

The lower space of evaporator 112 includes radiant heater 114 made of glass tubes for removing frost and ice depositing on evaporator 112 and its peripheral parts in the cooling mode. Further in the lower part, drain pan 115 is provided for receiving the water from the defrosting mode, together with drain tube 116 penetrating from the deepest part to outside of the refrigerator, and evaporation tray 117 is provided outside of the refrigerator, at its downstream side.

Vegetable compartment 107 includes lower basket 119 mounted on a frame attached to door 118 of vegetable compartment 107, and upper basket 120 mounted on lower basket 119.

In the closed state of door 118, mainly, lid 122 for nearly closing upper basket 120 is held in first partition 123 and inner case 103 in the upper part of the vegetable compartment. In the closed state of door 118, lid 122 tightly contacts with the right and left sides and the inner side of the upper surface of upper basket 120, and the front side of the upper surface is contacting almost tightly. The boundary area of right, left and lower sides of the back side of upper basket 120 and lower basket 119 is narrowed the gap so as not to allow escape of humidity in the food storage area as far as not interfering the move of upper basket 120.

Between lid 122 and first partition 123, as shown in FIG. 2, there is a passage for cold air discharged from outlet 124 for vegetable compartment disposed in rear partition 111. A space is also provided between lower basket 119 and second partition 125, and a cold air passage is composed. The lower part of rear partition 111 at the back side of vegetable compartment 107 is provided with inlet 126 for vegetable compartment returning the cold air into evaporator 112 after heat exchange by cooling in vegetable compartment 107.

In the preferred embodiment, matters about essential parts of the present invention mentioned below may be applied to a conventional refrigerator of general type to be opened and closed by rails provided in the frame attached to the door and the inner wall. Meanwhile, lid 122, outlet 124 for vegetable compartment, inlet 126 for vegetable compartment, and the air passage construction may be optimized by the mode of the storage container.

Rear partition 111 is composed, as shown in FIG. 3, of surface of rear-end partition 151 composed of ABS or other resin, and heat insulator 152 composed of foamed styrol or the like for thermally insulating the storage compartments by isolating outlet air-duct 141 for freezer compartment and cooling compartment 110. Herein, recess 111*a* is formed in part of the wall surface of the inside of the storage compartment of rear partition 111 so as to be lower in temperature than other parts, and electrostatic atomizing device 131 is disposed therein.

Electrostatic atomizing device 131 is mainly composed of mist generation department 139 and outlet wall 137, and atomizing port 132 and humidity supplying port 138 are provided in a part of outlet wall 137. Mist generation department 139 is mainly composed of atomizing electrode 135 as a tip of the department mist, cooling pin 134 made of heat conduction material such as aluminum, stainless steel, or brass, and voltage applicator 133 for applying a voltage to atomizing electrode 135.

Atomizing electrode 135 is fixed nearly in the center at one end of cooling pin 134, and is electrically connected to one end of a wiring from voltage applicator 133.

By such configuration, cooling pin 134 is cooled, for example, by the cold air flowing in outlet air-duct 141 for freezer compartment in the cooling section, and atomizing electrode 135 is cooled at the same time.

Cooling pin 134 is a heat conduction material, which is formed in a columnar shape, measuring, for example, about 10 mm in diameter, and about 15 mm in length. As compared with atomizing electrode 135, measuring about 1 mm in diameter and about 5 mm in length, the thermal capacity is larger by 50 times or more to 1000 times or less, preferably 100 times or more to 500 times or less. Thus, the thermal capacity of cooling pin 134 is larger than the thermal capacity of atomizing electrode 135 by 50 times or more, or preferably 100 times or more. As a result, the direct effects of temperature changes in the cooling section on the atomizing electrode can be substantially lessened, and the mist can be atomized stably at smaller load fluctuations.

As the upper limit of the thermal capacity, meanwhile, the thermal capacity of cooling pin 134 is desired to be 500 times or less or preferably 1000 times or less of the thermal capacity of atomizing electrode 135. This upper limit is defined because a greater energy is needed for cooling if the thermal capacity of cooling fin 134 is too large, and cooling of cooling pin is difficult while saving energy. By controlling within the specified upper limit, if thermal fluctuation loads from the cooling unit are varied, large effects on atomizing electrode 135 can be alleviated, and atomizing electrode 135 can be cooled stably by a small energy.

Further, by controlling within the specified upper limit, the time lag required for cooling atomizing electrode 135 by way of cooling pin 134 can be settled within an appropriate range. It is therefore effective to prevent delay of cooling of atomizing electrode 135, that is, start of supply of moisture to electrostatic atomizing device 131, and atomizing electrode 135 can be cooled stably and appropriately.

The material of cooling pin 134 is preferably a heat conduction material such as aluminum or copper as mentioned above, and in order to transmit cold heat efficiently from one end to other end of cooling pin 134, the surrounding is desired to be covered with heat insulator 152.

From a long-range view, it is also necessary to maintain heat conduction of atomizing electrode 135 and cooling pin 134, and an epoxy member is poured in for preventing invasion of humidity into the connection area to suppress thermal resistance, and further atomizing electrode 135 and cooling pin 134 are fixed. Or, to lower the thermal resistance, atomizing electrode 135 may be press-fitted and fixed into cooling pin 134.

Moreover, cooling pin 134 is required to transmit cold heat within heat insulator 152 in order to insulate thermally vegetable compartment 107 as storage compartment from evaporator 112 or outlet air-duct 141 for freezer compartment, and its length is preferred to be 5 mm or more, preferably 10 mm or more. However, if the length is more than 30 mm, its effect is lowered.

Besides, since electrostatic atomizing device 131 installed in vegetable compartment 107 is exposed to an environment of high humidity, and its humidity may influence cooling pin 134, cooling pin 134 is preferably made of a metal material having corrosion-preventive and rust-preventive properties, or a material processed by alumite surface treatment or other coating.

In the preferred embodiment, the shape of cooling pin 134 is a circular column. Therefore, when fitting into recess 111*a* of heat insulator 152, if the fitting dimension is slightly tight, electrostatic atomizing device 131 can be rotated, and press-fitted and installed in place. Hence, cooling pin 134 can be installed without allowing gap. The shape of cooling pin 134 may be a box or a regular polygon. In the case of a polygon, as compared with a circular column, it is easier to position, and electrostatic atomizing device 131 can be disposed at a correct position.

Further, by mounting atomizing electrode 135 on the central axis of cooling pin 134, if rotated when fitting cooling pin 134, the distance between opposite electrode 136 and atomizing electrode 135 can be kept constantly, and a stable discharging distance can be assured.

Cooling pin 134 is fixed on outlet wall 137, and cooling pin 134 itself has protrusion 134*a* projecting from outlet wall 137. This cooling pin 134 has protrusion 134 at a reverse side of atomizing electrode 135, and protrusion 134*a* is fitted into deepest recess 111*b* deeper than recess 111*a* of rear partition 111.

Hence, at the back side of cooling pin 134, there is deepest recess 111*b* deeper than recess 111*a*. That is, the side of cooling compartment 110 of heat insulator 152 in deepest recess 11*b*, that is, the side of outlet air-duct 141 for freezer compartment is thinner in heat insulator 152 than in other parts of rear partition 111 at the back side of vegetable compartment 107. This thin heat insulator 152 is used as a heat cushioning member, and is installed so that cooling pin 134 may be cooled by the cold air of cooling compartment 110 from the back side by way of heat insulator 152.

In the preferred embodiment, as mentioned above, cooling pin 134 as heat conduction material is cooled by the cold air generated in cooling compartment 110. That is, the cooling source of freezing cycle is utilized. Since cooling pin 134 is made of a conductive metal piece, the cooling section is enough to cool for dew condensation in atomizing electrode 135, only by heat conduction from outlet air-duct 141 for freezer compartment as air passage for flow of cold air generated in evaporator 112, so that the dew condensation can be formed.

Since the cooling section can be composed in such a simple structure, mist-making of low trouble rate and high reliability is realized. In addition, since cooling pin 134 and atomizing electrode 135 can be cooled by making use of the cooling source of the freezing cycle, mist-making at low energy is realized.

At this time, since cooling pin 134 in the preferred embodiment has protrusion 134*a* at a reverse side of atomizing electrode 135, within mist generation department 139, end portion 134b at the protrusion 134a side is closest to the cooling section. Hence, cooling by cold air of the cooling section is started from the end portion 134b side remotest from atomizing electrode 135 in cooling pin 134.

At a position opposite to atomizing electrode 135, doughnut-like circular opposite electrode 136 is provided at the storage compartment (vegetable compartment 107) side, at a specific distance from the leading end of atomizing electrode 135, and atomizing port 132 formed on its extension.

Near mist generation department 139, moreover, voltage applicator 133 is composed, and the negative potential side of voltage applicator 133 for generating a high voltage is connected to atomizing electrode 135, and the positive potential side is connected to opposite electrode 136, electrically.

Near atomizing electrode 135, for atomizing mist, discharge is always occurring. Hence, at the leading end of atomizing electrode 135, there is a possibility of occurrence of abrasion. Refrigerator 100 is generally operated continuously for a long period of more than 10 years, and the surface of atomizing electrode 135 requires a tough surface treatment, and should be preferably processed by, for example, nickel plating, gold plating, or platinum plating.

Opposite electrode 136 is made of, for example, stainless steel, and its long-term reliability must be assured. In particular, to prevent sticking of foreign matter or to prevent contamination, it is preferred to treat the surface by platinum plating or the like.

Voltage applicator 133 is controlled to communicate with controller 146 of the refrigerator main body, and turns on or off the high voltage by an input signal from refrigerator 100 or electrostatic atomizing device 131.

In this preferred embodiment, voltage applicator 133 is installed in electrostatic atomizing device 131, and since the atmosphere in vegetable compartment 107 is low in temperature and high in humidity, the circuit board surface of voltage applicator 133 is coated with molding material or coating material for resisting the moisture.

However, such coating is not necessary if voltage applicator 133 is installed in a place of high temperature outside of storage compartment.

Surface of rear-end partition 151 for fixing of electrostatic atomizing device 131 is provided with heater 154 or other heating element for regulating the temperature of vegetable compartment 107 or preventing dew condensation on the surface, between surface of rear-end partition 151 and heat insulator 152.

In refrigerator 100 of the preferred embodiment having such configuration, the operations and actions are explained below.

First, the operation of the freezing cycle is explained. Depending on the temperature determined in the refrigerator, the freezing cycle is started by a signal from the control board (not shown), and the cooling operation starts. The refrigerant of high temperature and high pressure discharged by operation of compressor 109 condensed and liquefied somewhat in a condenser (not shown). Further, by way of refrigerant pipes (not shown) installed on the side face and back face of thermally insulated cabinet 101 of the refrigerator main body, and at the front opening of thermally insulated cabinet 101, the refrigerant is condensed and liquefied while preventing dew condensation in thermally insulated cabinet 101, and is sent into capillary tubes (not shown). In the capillary tubes, the refrigerant is decompressed while exchanging heat with a suction tube (not shown) into compressor 109, and becomes a liquid refrigerant at low temperature and low pressure, and is sent into evaporator 112.

Herein, the liquid refrigerant at low temperature and low pressure is exchanged in heat with the air in the storage compartments such as outlet air-duct 141 for freezer compartment conveyed by operation of cooling fan 113, and the refrigerant in evaporator 112 is evaporated into gas. At this time, cold air for cooling the storage compartments in evaporator 110 is generated. The cold air at low temperature is blown from cooling fan 113, and is distributed into refrigerator compartment 104, switchable temperature compartment 105, icemaker 106, vegetable compartment 107, and freezer compartment 108 by way of air ducts and dampers, and each temperature zone is cooled to each specific temperature. In particular, vegetable compartment 107 is adjusted within 2° C. to 7° C. by on/off operation of heater 154 or by distribution of cold air, and is generally not provided a compartment temperature detector.

Vegetable compartment 107 is cooled by the cold air after cooling refrigerator compartment 104 discharged into vegetable compartment 107 from outlet 124 for vegetable compartment provided in an intermediate position of inlet air-duct 140 for storage compartment for circulating the air into evaporator 112. The air later flows in the outer circumference of upper basket 120 and lower basket 119 to cool indirectly, and returns again into evaporator 112 from suction port 126 for vegetable compartment.

In a part of a position the environment at relatively high humidity in rear partition 111, heat insulator 152 is thinner in wall thickness than in other parts, and in particular deepest recess 111*b* is formed behind cooling pin 134, and the thickness of heat insulator is, for example, about 2 mm to 10 mm. In refrigerator 100 of this preferred embodiment, such thickness distribution is appropriate for heat cushioning member positioned between cooling pin 134 and the evaporator. As a result, recess 111*a* is formed rear partition 111, and electrostatic atomizing device 131 in a shape projecting in protrusion 134 of cooling pin 134 is inserted and fitted into deepest recess 111*b* at the remotest back side of this recess 111*a*.

Outlet air-duct 141 for freezer compartment at the back side of cooling pin 134 is a passage for flow of cold air of about −15 to −25° C. by cooling fan 113, generated by evaporator 112 by the operation of the cooling system. Further, by heat conduction from the air duct surface, cooling pin 134 is cooled, for example, to about 0 to −10° C. At this time, since cooling pin 134 is made of a heat conduction material, cold heat is transmitted easily, and atomizing electrode 135 at the tip of the department mist is cooled indirectly through cooling pin 134 to about 0 to −10° C.

Herein, the temperature of vegetable compartment 107 is about 2° C. to 7° C., and the humidity is relatively high due to transpiration from vegetables, and if atomizing electrode 135 at the tip of the department mist becomes lower than the dew point temperature, water is generated in atomizing electrode 135, including the leading end, and water drops deposit.

A negative voltage is applied to atomizing electrode 135 having water drops, and a positive voltage to opposite electrode 136, and a high voltage (for example, 4 to 10 kV) is applied between these electrodes from voltage applicator 133. At this time, a corona discharge occurs between these electrodes, and water drops at the leading end of atomizing electrode 135 are fractioned by an electrostatic energy. Moreover, since the water drops are charged electrically, a very fine mist of nano level having an invisible charge at the level of several nanometers, accompanying ozone and OH radicals are generated by Rayleigh scattering. The voltage applied between the electrodes is very high, about 4 to 10 kV, but the discharge current value at this time is several μA levels, and the input is very low, about 0.5 to 1.5 W.

More specifically, supposing atomizing electrode 135 at reference potential side (0 V) and opposite electrode 136 at high voltage side (+7 kV), the dew condensation water deposits on the leading end of atomizing electrode 135, and an air insulation layer between atomizing electrode 135 and opposite electrode 136 is destroyed, and discharge is caused by an electrostatic force. At this time, the dew condensation water is electrically charged, and fine particles are formed. Further, since opposite electrode 136 is at a positive side, the charged fine mist is attracted, and liquid drops are further pulverized. The fine mist of nano level having an invisible electric charge of several nm level containing radicals is attracted to opposite electrode 136, and its inertial force causes the fine mist to be atomized from atomizing electrode 135 toward the storage compartment (vegetable compartment 107).

If there is no water in atomizing electrode 135, the discharge distance is remote, and the air insulation layer cannot be destroyed, and discharge phenomenon does not take place. As a result, current does not flow between atomizing electrode 135 and opposite electrode 136.

Besides, atomizing electrode 135 is not cooled directly, but cooling pin 134 is cooled, so that atomizing electrode 135 can be cooled indirectly. Since cooling pin 134 has a larger thermal capacity than atomizing electrode 135, and direct effects on atomizing electrode 135 can be lessened, and atomizing electrode 135 can be cooled. Also by playing the role of cold heat reserving, sudden temperature changes of atomizing electrode 135 can be suppressed, and mist atomizing of a stable atomizing amount can be realized.

Thus, cooling pin 134 is cooled without cooling atomizing electrode 135 directly, and atomizing electrode 135 can be cooled indirectly. Since cooling pin 134 as heat conduction material has a larger thermal capacity than atomizing electrode 135, direct effects of temperature changes of the cooling section on atomizing electrode 135 can be alleviated, and atomizing electrode 135 can be cooled. Therefore, load fluctuations of atomizing electrode 135 can be suppressed, and mist atomizing of stable atomizing amount can be realized.

In this way, opposite electrode 136 is disposed at a position confronting atomizing electrode 135, and voltage applicator 133 for generating a high voltage potential difference is disposed between atomizing electrode 135 and opposite electrode 136, so that an electric field can be stably built up near atomizing electrode 135. As a result, the pulverization phenomenon and the atomizing direction are stabilized, and it is effective to enhance the precision of fine mist atomized into the storage container formed between lower basket 119 and upper basket 120. Therefore, the precision of mist generation department 139 can be enhanced, and electrostatic atomizing device 131 of a high reliability can be presented.

Further, cooling pin 134 is cooled by way of heat insulator 152 made of a heat cushioning member, atomizing electrode 135 is indirectly cooled by way of cooling pin 134, and is further cooled in a double structure by way of heat insulator 152 made of a heat cushioning member, so that atomizing electrode 135 is prevented from being cooled extremely.

That is, when the temperature of atomizing electrode 135 lowered by 1K, the water making speed at its leading end is raised by about 10%. However, if atomizing electrode 135 is cooled extremely, the dew condensation speed is aggressive. As a result, the atomizing amount increases, and the load of mist generation department 139 increases. It hence may lead to anticipation of increase of input into electrostatic mist make 131, and freezing and mist-making failure of mist generation department 139. However, since extreme cooling of atomizing electrode 135 is prevented, troubles due to load increase of mist generation department 139 can be prevented. Therefore, an appropriate atomizing amount is assured, and a stable mist atomizing is realized at low input.

For cooling of cooling pin 134, cold air generated in cooling compartment 110 is used, and cooling pin 134 is composed of a heat conductive metal piece. Therefore, the cooling section is capable of cooling as required only by the heat conduction from outlet air-duct 141 for freezer compartment as the air duct for flow of cold air generated in evaporator 112.

Since the cooling section can be formed in such simple structure, mist generation department 139 of low trouble rate and high reliability can be realized. Still more, by making use of the cooling source of the freezing cycle, cooling pin 134 and atomizing electrode 135 can be cooled, and mist atomizing is realized at low energy.

Thus, end portion 134*b* at remotest position from atomizing electrode 135 of cooling pin 134 is cooled. As a result, when cooling by the cooling section, after cooling a large thermal capacity of cooling pin 134, atomizing electrode 135 is cooled by cooling pin 134. Hence, direct effects of temperatures changes in the cooling section on atomizing electrode 135 are lessened further, and a stable mist atomizing of smaller load fluctuations can be realized.

Rear partition 111 including mist generation department 139 has recess 111*a* formed in a part of the side of vegetable compartment 107 as the storage compartment, and mist generation department 139 having protrusion 134*a* is inserted into this recess 111*a*. Accordingly, as a thermal cushioning member, heat insulator 152 composing rear partition 111 of vegetable compartment 107 can be utilized, and the thickness of heat insulator 152 can be adjusted without using any particular thermal cushioning member. Therefore, a thermal cushioning member capable of cooling atomizing electrode 135 appropriately can be provided, and the structure of mist generation department 139 can be much simplified.

Besides, by inserting mist generation department 139 having protrusion 134*a* composed of cooling pin 134 into recess 111*a*, mist generation department 139 can be securely attached to the partition wall without allowing looseness. In addition, protrusion to the side of vegetable compartment 107 as the storage compartment can be suppressed, and it is hardly accessible by the user's hand, and the safety is enhanced.

Mist generation department 139 is not extended to the outer side across rear partition 111 of vegetable compartment 107, no adverse effects are given to the sectional area of air duct of outlet air-duct 141 for freezer compartment, and drop of cooling capacity due to increase of air duct resistance can be prevented.

Recess 111*a* is formed in a part of vegetable compartment 107, and mist generation department 139 is inserted therein, and hence the storage capacity of vegetables, fruit and food is not changed. Cooling pin 134 can be cooled securely, and in other parts, an enough wall thickness for assuring heat insulation can be guaranteed. Therefore, dew condensation of outlet wall 137 can be prevented, and the reliability is enhanced.

Cooling pin 134 assures a certain level of thermal capacity, and response of heat conduction from outlet air-duct 141 for freezer compartment as cooling air duct can be lessened. As a result, cooling pin 134 can suppress temperature fluctuations of atomizing electrode 135, and functions as a cold heat reserve member. Therefore, the time for generation of dew condensation of atomizing electrode 135 is assured, and freezing can be prevented.

Moreover, when cooling pin 134 of heat conduction material is combined with heat insulator 152, cold heat can be conducted efficiently without loss. Besides, the heat resistance is suppressed at the junction of cooling pin 134 and atomizing electrode 135, and temperature fluctuations of atomizing electrode 135 and cooling pin 134 follow smoothly. At the junction, since humidity does not invade, and the thermal bond can be favorable maintained for a long period.

Vegetable compartment 107 is in the environment of high humidity, and its humidity may have an adverse effect on cooling pin 134. In such a case, since cooling pin 134 is made of a metal material having resistance to corrosion or rusting, or its surface is treated with alumite or other coating, and rusting is prevented, and increase of surface thermal resistance is suppressed, and a stable heat conduction is assured.

Further, since the surface of atomizing electrode 135 is plated with nickel, gold or platinum, abrasion due to discharge at the leading end of atomizing electrode 135 can be suppressed. As a result, the shape of the leading end of atomizing electrode 135 is maintained, and atomizing for a longer period is possible, and the shape of liquid drops at the leading end is stable.

When a fine mist is atomized from atomizing electrode 135, an ion wind is generated. At this time, from humidity supplying port 138 provided in outlet wall 137, as described below, a fresh air of high humidity flows into atomizing electrode 135 in outlet wall 137, the mist can be atomized continuously.

The fine mist generated in atomizing electrode 135 is mainly atomized into lower basket 119. However, since the mist is formed of very fine particles, it is high in diffusion, and the fine mist also reaches up to upper basket 120. The atomized fine mist has been generated by a high voltage discharge, and the mist is negatively charged. On the other hand, in vegetable compartment 107, vegetables and fruit are stored, and especially vegetables and fruit having green leaves are stored, and these vegetables and fruit are likely to transpire, or to wither due to transpiration during storage. Some of the vegetables and fruit stored in the vegetable compartment may be already withered due to transpiration when returning from shop or during storage, and are positively charged. Hence, the atomized mist is likely to gather on the surface of vegetables, and hence the keeping-fresh performance is enhanced.

The nano-level fine mist sticking to the vegetable surface contains OH radicals and traces of ozone, and is effective for killing germs, resisting germs and removing germs. Still more, vegetables are encourage to increase in nutrients such as vitamin C by removal of agricultural chemicals and anti-oxidation by oxidation and decomposition.

Herein, when there is no water in atomizing electrode 135, the discharge distance becomes longer, and the air insulation lay cannot be destroyed, and discharge phenomenon does not take place. As a result, no current flows between atomizing electrode 135 and opposite electrode 136. This phenomenon can be detected by controller 146 of refrigerator 100, so that the high pressure on/off of voltage applicable 133 can be controlled.

In this preferred embodiment, voltage applicator 133 is installed at a position of relatively low temperature and high humidity in vegetable compartment 107. Voltage applicator 133 is coated with potting material or other coating material to have moisture-proof and water-proof structure so as to protect the circuits.

If voltage applicator 133 is installed outside of the storage compartment, such treatment is not needed.

As explained herein, in this preferred embodiment, vegetable compartment 107 is a thermally insulated storage compartment, and mist generation department 139 for atomizing a mist is provided in vegetable compartment 107. Mist generation department 139 includes atomizing electrode 135 as the tip of the department mist for atomizing a mist electrically connected to voltage applicator 133 for generating a high voltage, and opposite electrode 136 disposed at a position opposite to atomizing electrode 135. Cooling pin 134 as heat conduction material is connected to atomizing electrode 135. In order to keep atomizing electrode 135 below the dew point for condensing dew from the moisture in the air, cooling pin 134 is cooled by the cooling section. As cooling pin 134 is cooled by the cooling section, atomizing electrode 135 is indirectly cooled below the dew point, and dew is condensed from the moisture in the air in atomizing electrode 135, and a mist is atomized into vegetable compartment 107.

As a result, dew can be condensed in atomizing electrode 135 easily and securely form the excessive steam in vegetable compartment 107. Still more, nano-level fine mist can be generated by corona discharge of high voltage in relation to opposite electrode 136. The atomized and atomized fine mist uniformly deposits on the surface of vegetables and fruit, and transpiration from vegetables and fruit can be suppressed, and keeping-fresh performance is enhanced. From the cell gaps and pores on the surface of vegetables and fruit, moisture permeates into cells and is supplied into withered cells, and the vegetables may be returned to a fresh state.

Moreover, since discharge occurs between atomizing electrode 135 and opposite electrode 136, an electric field is built up stably, and the atomizing direction is determined, and a fine mist can be atomized more precisely into the storage container composed between lower basket 119 and upper basket 120.

Ozone and OH radicals generated simultaneously with the mist are also useful for enhancing the effects of deodorizing, removing of harmful substances on the food surface, and preventing contamination.

The atomized mist can be directly applied to the foods in the storage container of vegetable compartment 107, and the mist can be adhered to the surface of vegetables by making use of the potential of the mist and vegetables, and the efficiency of keeping-fresh performance is enhanced.

Besides, dew is condensed from the excessive steam in vegetable compartment 107 by atomizing electrode 135, and water drops are collected, and a mist is atomized. Hence, it requires no extra components, such as defrosting hose for supplying water for mist atomizing, purifying filter, water supply route to be coupled directly to water service, or water storage tank. Any pump or water supplying part is not used, and a fine mist can be supplied into vegetable compartment 107 in a simple structure without requiring complicated mechanism.

In this way, and in such a simple structure, a fine mist can be supplied stably into vegetable compartment 107, and the risk of troubles of refrigerator 100 can be substantially lowered, and the reliability is enhanced, and the quality of refrigerator 100 is improved.

Instead of tap water, water from dew condensation is used, and it is free from minerals and impurities, and it is effective to prevent deterioration when a water retaining material is used or deterioration of water retaining material due to clogging.

Further, since mist is not atomized by ultrasonic waves by ultrasonic vibration, no consideration is necessary about resonation, noise or vibration by ultrasonic frequency oscillation.

Since water tank is not needed, there is no need for water level sensor for preventing destruction of ultrasonic element due to shortage of water required when water tank is installed, and a mist-making device can be installed in the refrigerator in a simple structure.

The portion accommodating voltage applicator 133 is buried in rear partition 111, and is cooled, and the temperature rise of the circuit board can be suppressed. As a result, temperature effects in vegetable compartment 107 can be lowered.

The preferred embodiment includes evaporator 112 for cooling storage compartments 104, 105, 106, 107, and 108, and rear partition 111 for thermally isolating cooling compartment 110 having evaporator) 12 and vegetable compartment 107. That is, by installing a partition in vegetable compartment 107, without decreasing the storage volume, the safety is enhanced because it is installed in a deeper position not accessible by the user.

In the preferred embodiment, cooling pin 134 connected to atomizing electrode 135 of electrostatic atomizing device 131 is a heat conductive metal piece. The cooling section for cooling of cooling pin 134 makes use of heat conduction from outlet air-duct 141 for freezer compartment in which cold air generated in evaporator 112 flows. Therefore, by adjusting the wall thickness of heat insulator 152 of rear partition 111 of thermal cushioning member, the temperature of cooling pin 134 and atomizing electrode 135 can be set easily. Moreover, by enclosing heat insulator 152 as thermal cushioning member, there is no leak of cold air of low temperature, and it is effective to prevent drop of reliability due to causes such as frosting or dew condensation on outlet wall 137 or the like.

In the preferred embodiment, further, rear partition 111 having mist generation department 139 is provided with recess 111a in a part of the side of vegetable compartment 107. Herein, cooling pin 134 connected to atomizing electrode 135 is inserted. Hence, the storage capacity for storing vegetables, fruit and food is not changed. In addition, cooling pin 134 can be cooled securely. Other parts than atomizing electrode 135 or cooling pin 134 of electrostatic atomizing device 131 are formed in an enough wall thickness to assure heat insulation for preventing dew condensation in outlet wall 137, and the reliability is enhanced.

In electrostatic atomizing device 131 of the preferred embodiment, since a high voltage is applied between atomizing electrode 135 and opposite electrode 136, ozone is also generated when forming a fine mist. However, by on/off operation control of electrostatic atomizing device 131, the ozone concentration in vegetable compartment 107 can be adjusted. By appropriately adjusting the ozone concentration, yellowing or deterioration of vegetables due to excessive ozone can be prevented, and the bactericidal and antibacterial action on the vegetable surface can be enhanced.

Also in the preferred embodiment, atomizing electrode 135 is set at reference potential side (0 V), and a positive potential (+7 V) is applied to opposite electrode 136, and a high voltage potential difference is caused between the two electrodes. Alternatively, a high voltage potential difference may be caused between the two electrodes by setting opposite electrode 136 at reference potential side (0 V) and applying a negative potential (−7 V) to atomizing electrode 135. In this case, opposite electrode 136 closer to vegetable compartment 107 is at the reference voltage side, and electric shock does not take place if the hand of the user of the refrigerator is brought loser to opposite electrode 136. When atomizing electrode 135 is set at a negative potential of −7 V, when the side of vegetable compartment 107 is set at the reference potential side, opposite electrode 136 may not be particularly required.

In this case, for example, a conductive storage container is provided within insulated vegetable compartment 107, and further the holding member for holding the storage container is also made of a conductive material. This conductive storage container is electrically connected to the conductive holding member, and is detachable from the conductive member, so that the holding member may be connected to the reference potential part and may be grounded (0 V).

As a result, a potential difference is always kept between mist generation department 139 and the storage container and the holding member, and a stable electric field is composed. Therefore, a mist is stably atomized from mist generation department 139. Besides, since the entire storage container is at the reference potential, it is possible to diffuse the atomized mist uniformly in the entire storage container. It is also effective to prevent charging into peripheral objects.

Thus, if opposite electrode 136 is not provided particularly, only by forming a grounded holding member in a part of the side of vegetable compartment 107, a potential difference from atomizing electrode 135 can be generated, and a mist can be atomized. Hence, in a simpler structure, a stable electric field can be composed, and the mist can be atomized more stably from mist generation department 139.

Moreover, when a holding member is disposed at the storage container side, since the entire storage container is at a reference potential, the atomized mist can be diffused into the entire storage container. It is also effective to prevent charging into peripheral objects.

In the preferred embodiment, the air duct for cooling pin 134 is outlet air-duct 141 for freezer compartment, but it is also possible to make use of the discharging air duct from icemaker 106 or inlet air-duct 140 for storage compartment. Hence, electrostatic atomizing device 131 may be installed anywhere.

In the preferred embodiment, the cooling section for cooling of cooling pin 134 is the cold air cooled by using the cooling source generated in the freezing cycle of refrigerator 100, but it is also possible to use the cold air from the cooling source of refrigerator 100, or heat conduction from the cooling pipe using the cold air. Hence, by regulating the temperature of this cooling tube, it is possible to cool the heat conduction material of cooling pin 134 at a desired temperature, and it is easier to manage the temperature when cooling atomizing electrode 135.

In the preferred embodiment, water retaining member is not installed around atomizing electrode 135 of electrostatic atomizing device 131, but a water retaining member may be installed. As a result, the dew condensation water generated near atomizing electrode 135 can be held around atomizing electrode 135, and can be appropriately supplied to atomizing electrode 135.

In the preferred embodiment, the storage compartment for atomizing a mist in mist generation department 139 is vegetable compartment 107, but other storage compartments in other temperature zones may be used such as refrigerator compartment 104 or switchable temperature compartment 105, and it is possible to develop into various applications.

Preferred Embodiment 2

A longitudinal sectional view showing a section where the refrigerator of preferred embodiment 2 of the present invention is divided and parted into right and left sections is nearly same as FIG. 1. A front view of essential parts showing the inner side of the vegetable compartment of the refrigerator in preferred embodiment 2 of the present invention is same as FIG. 2. FIG. 4 shows a sectional view cut along line A-A in FIG. 2, illustrating an electrostatic atomizing device and its periphery provided in the vegetable compartment of the refrigerator in preferred embodiment 2 of the present invention.

In the drawings, rear partition 111 is composed of surface of rear-end partition 151 made of ABS or other resin, and heat insulator 152 isolating the storage compartment from low-temperature air duct 156 or cooling compartment 110, and made of foamed styrol or the like for thermally insulating the storage chamber. In a part of the wall of the inside of the storage compartment of rear partition 111, recess 111a is formed to be lower in temperature than in other positions, and electrostatic miser maker 131 disposed on through-section 111c formed in a recess provided at the evaporator 112 side of the place of installation of cooling pin 134.

At this time, a part of cooling pin 134 made of heat conduction material penetrates through heat insulator 152, and is exposed in a part of low-temperature air duct 156. Low-temperature air duct 156 has a protrusion formed near the back side of cooling pin 134, that is, recess 155 on heat insulator is composed, and the air duct is expanded in part.

In refrigerator 100 having such configuration, the operation and actions are explained below.

In a part of the position exposed to a relatively high humidity environment in rear partition 111, heat insulator 152 is thinner in wall thickness than in other positions, and, in particular the thickness of heat insulator 152 behind cooling pin 134 is about 2 mm to 10 mm. Hence, through-section 111c is formed in rear partition 111, and electrostatic atomizing device 131 is provided in this place.

Cooling pin 134 is partly exposed in low-temperature air duct 156 at the back side. By the operation of the cooling system, cold air is generated in evaporator 112, and cold air of lower temperature than the vegetable compartment temperature flows from cooling fan 113, and cooling pin 134 is cooled to about, for example, 0 to –10° C. At this time, since cooling pin 134 is made of a heat conduction material, cold heat transmitted very quickly, and atomizing electrode 135 at the tip of the department mist is cooled to about 0 to –10° C.

As a result, the vicinity of recess 155 on heat insulator of low-temperature air duct 156 is expanded, and the air duct resistance is lowered. Hence, the air flow rate of cooling fan 113 is increased, and the cooling system efficiency is enhanced.

A high voltage (for example, 4 to 10 kV) is applied between two electrodes, that is, atomizing electrode 135 having water drops at negative voltage side, and opposite electrode 136 at positive electrode side, from voltage applicator 133. At this time, a corona discharge takes place between the two electrodes, and water drops at the leading end of atomizing electrode 135 are pulverized by an electrostatic energy. Further, since the liquid drops are electrically charged, by Rayleigh scattering, electrically charged invisible nano-level fine mist of several nm units, and ozone and OH radical are generated at the same time. The voltage applied between the electrodes is very high, about 4 to 10 kV, but the discharge current value at this time is several µA levels, and the input is very low, about 0.5 to 1.5 W.

The generated fine mist is atomized into lower basket 119, and is very fine in particle size, and is hence strong in diffusion, and the fine mist easily reaches up to upper basket 120. Since the atomized fine mist is generated by high voltage discharge, it is charged negatively.

On the other hand, vegetable compartment 107 contains green and leafy plants among vegetables and fruit, and these vegetables and fruit are likely to transpire or wither due to transpiration during storage. Some of the vegetables and fruit stored in the vegetable compartment may be already withered due to transpiration when returning from shop or during storage, and are positively charged. Hence, the atomized mist is likely to gather on the surface of vegetables, and hence the keeping-fresh performance is enhanced.

The nano-level fine mist sticking to the vegetable surface contains OH radicals and traces of ozone, and is effective for killing germs, resisting germs and removing germs, and still more, vegetables are encouraged to increase in nutrients such as vitamin C by removal of agricultural chemicals and anti-oxidation by oxidation and decomposition.

Herein, in the preferred embodiment, the back side of rear partition 111 for thermally isolating evaporator 112 and vegetable compartment 107 as a storage compartment is provided with at least one air duct (low-temperature air duct 156) for conveying cold air to the storage compartment or evaporator 112, and heat insulator 152 thermally insulated from storage chamber or other air duct to avoid thermal effects. The heat conduction material for cooling atomizing electrode 135 of atomizing electrode 139 of electrostatic atomizing device 131, and condensing dew is cooling pin 134 made of a thermally conductive metal piece connected to atomizing electrode 135. The cooling section for cooling of cooling pin 134 is cold air generated in evaporator 112. Hence, atomizing electrode 135 can be cooled securely. Besides, since any particular new cooling section is not used, the structure can be composed easily and inexpensively.

In the preferred embodiment, rear partition 111 having mist generation department 139 is provided with recess 11a in a part of the vegetable compartment 107 side. By recess 155 on heat insulator, through-section 111c communicating with recess 111a is formed in rear partition 111. Cooling pin 134 of heat conduction material is inserted in this through-section 111c, and thereby atomizing electrode 139 is formed in rear partition 111.

Cooling pin 134 is inserted in through-section 111c, and a part of cooling pin 134 penetrates through heat insulator 152, and is exposed in a part of low-temperature air duct 156. Therefore, cooling pin 134 made of a metal piece can be cooled securely. Recess 155 on heat insulator is formed in low-temperature air duct 156, and the air duct sectional area of low-temperature air duct 156 is widened. As a result, the air duct resistance is decreased or becomes equal, and decline of cooling capacity can be prevented. Also by adjusting the exposed surface area of cooling pin 134 to low-temperature air duct 156, the temperature of atomizing electrode 135 can be adjusted easily.

Preferred Embodiment 3

Figure 5:
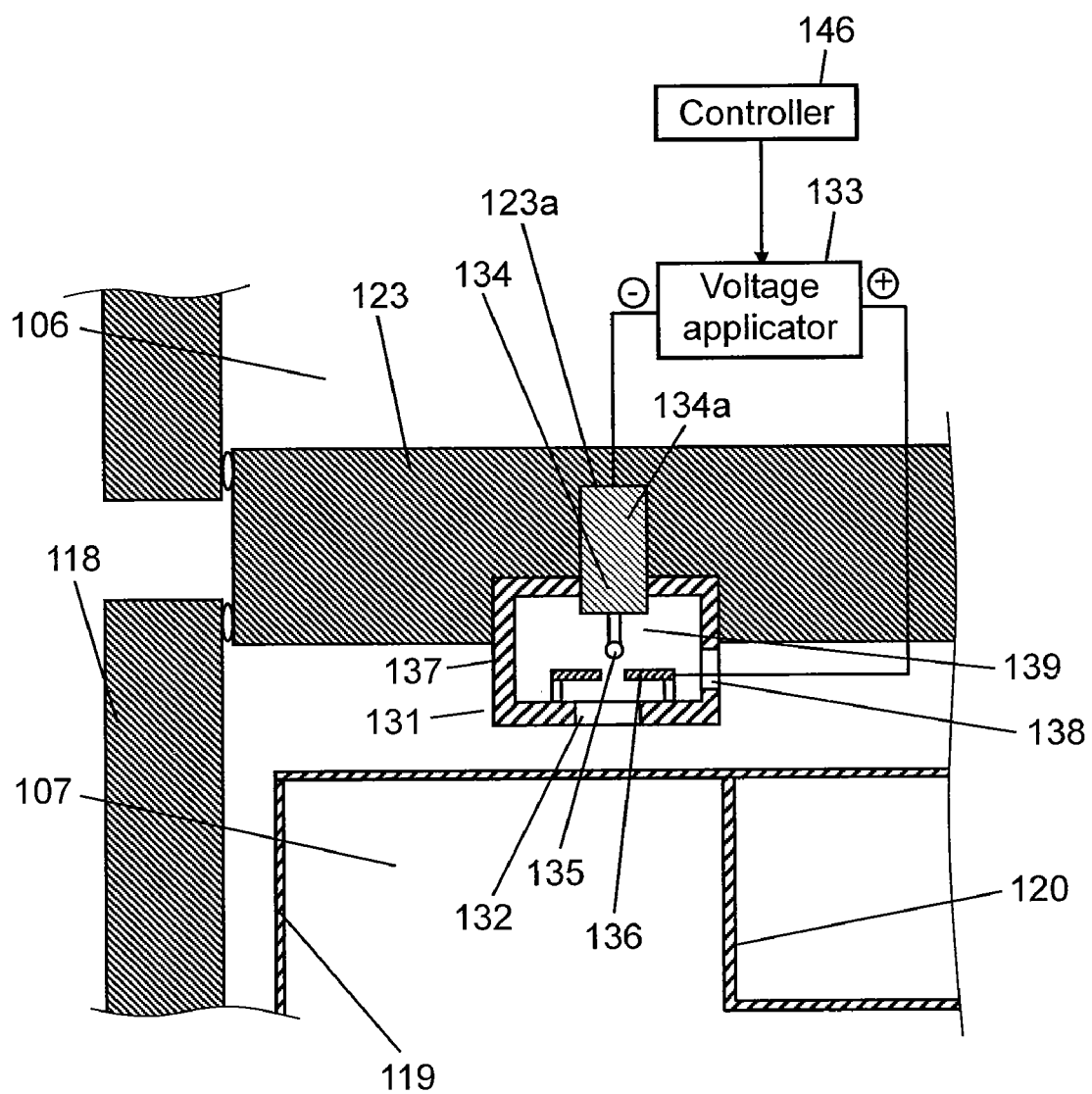
FIG. 5 shows a sectional view illustrating an essential part of a periphery of a door-side partition placed over a vegetable compartment of a refrigerator in accordance with a third embodiment of the present invention, where the periphery is cut vertically and parted to right and left.

FIG. 5 is a longitudinal sectional view of essential parts showing a section where the periphery of the door side of the partition wall of the upper part of the vegetable compartment of the refrigerator of preferred embodiment 3 of the present invention is divided and parted into right and left sections.

As shown in the drawing, electrostatic atomizing device 131 is assembled into first partition wall 123 thermally isolating the temperature zones of vegetable compartment 107 and icemaker 106. In particular, cooling pin 134 of mist generation department 139 is formed in a concave shape in the thermally insulating material for composing first partition 123.

Thermally insulated cabinet 101, that is, the refrigerator main body of refrigerator 100 of the preferred embodiment has a plurality of storage compartments. The ceiling side of vegetable compartment 107 having mist generation department 139 is provided with icemaker 106 which is a low-temperature storage compartment kept at lower temperature than vegetable compartment 107 having mist generation department 139. Mist generation department 139 is installed in first partition 123 at the ceiling side of vegetable compartment 107. First partition 123 has recess 123a at the vegetable compartment 107 side, and cooling pin 134 of heat conduction material is inserted in recess 123a.

In refrigerator 100 of the preferred embodiment having such configuration, the operation and actions are explained below.

The thickness of first partition 123 having mist generation department 139 of electrostatic atomizing device 131 is required to guarantee a sufficient cooling capacity for cooling of cooling pin 134 in which atomizing electrode 135 is fixed. Therefore, the wall thickness of the position of installation of electrostatic atomizing device 131 is formed thinner than in other parts. As a result, by heat conduction from icemaker 106 at a relatively lower temperature than vegetable compartment 107, cooling pin 134 can be cooled, and atomizing electrode 135 can be cooled. Herein, if the leading end temperature of atomizing electrode 135 is set below the dew point, the steam near atomizing electrode 135 condenses dew in atomizing electrode 135, and water drops are formed securely.

Although not shown, by installing a compartment temperature detector, a compartment humidity detector, a atomizing electrode temperature detector, or a humidity detector in the compartment, the dew point can be calculated precisely depending on the compartment environment changes according to a predetermined calculation formula.

A high voltage (for example, 7.5 kV) is applied between two electrodes, that is, atomizing electrode 135 at negative voltage side, and opposite electrode 136 at positive electrode side, from voltage applicator 133. At this time, the air insulation layer is broken between the electrodes, and a corona discharge takes place, and water on atomizing electrode 135 is atomized from the leading end of the electrode, and electrically charged invisible nano-level fine mist of less than one micrometer is generated, together with accompanying ozone and OH radical.

The generated fine mist is atomized into the vegetable compartment (lower basket 119, upper basket 120). The fine mist atomized from electrostatic atomizing device 131 is charged negatively. On the other hand, vegetable compartment 107 contains vegetables and fruit, including green and leafy plants and fruit. Some of the vegetables and fruit stored in the vegetable compartment may be already withered due to transpiration when returning from shop or during storage. These vegetables and fruit are usually positively charged, and the atomized fine mist charged negatively is likely to gather on the surface of vegetables.

When the humidity in vegetable compartment 107 is raised again, the atomized fine mist deposits simultaneously on the surface of vegetables, and transpiration from vegetables and fruit is suppressed, and the keeping-fresh performance is enhanced. The moisture permeates into the tissues from gaps among cells in the vegetables and fruit, and transpires, and water is supplied again into the withered cells, and the cells are swollen, stretched and refreshed.

The generated fine mist holds ozone and OH radicals, and they have a strong oxidation power. Accordingly, the generated fine mist can deodorize vegetable compartment 107, and sterilize and bactericide the vegetable surface, and can also oxidize, decompose, and remove agricultural chemicals, wax, and other harmful substances sticking to the vegetable surface.

At the present, the refrigerant used in the freezing cycle is mainly isobutane which is lower in global warming factor from the viewpoint of preservation of the global environment.

Isobutane is a hydrocarbon, and as compared with air, its specific gravity is about 2 times at ordinary temperature and atmospheric pressure (300K, 2.04).

If isobutane leaks from the freezing system while compressor 109 is stopped, since it is heavier than air, it leaks downward. At this time, the refrigerant may leak into the compartment by way of rear partition 111. In particular, when leaking from evaporator 112 large in the staying amount of the refrigerant, the leak amount may be large, but vegetable compartment 107 incorporating electrostatic atomizing device 131 is disposed above evaporator 112, the leaking refrigerant will not get into vegetable compartment 107.

If isobutane leaks into vegetable compartment 107 from evaporator 112, since isobutane is heavier than air, it is collected in the lower part of the storage compartment (vegetable compartment 107). Hence, since electrostatic atomizing device 131 is installed in the ceiling of the storage compartment (vegetable compartment 107), and the possibility of staying at high concentration near electrostatic atomizing device 131 is very low.

Thus, in the preferred embodiment, the refrigerator main body, that is, thermally insulated cabinet 101 has a plurality of storage compartments. The ceiling side of vegetable compartment 107, which is a storage compartment having mist generation department 139, is provided with icemaker 106 which is a low-temperature storage compartment kept at lower temperature than vegetable compartment 107, which is a storage compartment having mist generation department 139. Mist generation department 139 is provided in first partition 123 at the ceiling side of vegetable compartment 107.

If a storage compartment in freezing temperature zone such as refrigerator compartment or icemaker in provided in the upper part of vegetable compartment 107 having mist generation department 139 (that is, icemaker 106 in this preferred embodiment), mist generation department 139 is installed in first partition 123 on the ceiling for partitioning them. As a result, by the cold air from icemaker 106 in the upper part of vegetable compartment 107, cooling pin 134 made of heat conduction material in mist generation department 139 can be cooled. Hence, atomizing electrode 135 is cooled, and dew can be condensed. Therefore, any particular cooling device is not needed, and a mist generation department can be composed in a simple structure, and a mist generation department of low trouble rate and high reliability can be realized.

Refrigerator 100 of the preferred embodiment includes first partition 123 for partitioning vegetable compartment 107, and icemaker 106 which is a storage compartment of lower temperature than vegetable compartment 107 at the ceiling side of vegetable compartment 107. Electrostatic atomizing device 131 is attached to first partition 123 at the ceiling side of vegetable compartment 107.

If the freezer compartment, icemaker 106, or other storage compartment in freezing temperature zone is installed in the upper part of the storage compartment having electrostatic atomizing device 131, cooling pin 134 of heat conduction material is installed in first partition 123 on the ceiling partitioning them. As a result, dew can be condensed by cooling atomizing electrode 135 by way of cooling pin 134 by the cooling source in freezing temperature zone such as freezer compartment or icemaker 106, and any particular cooling device is not needed. Besides, since the mist can be atomized from the ceiling, it is easily diffused into the entire storage container composed of lower basket 119 and upper basket 120, and it is free from contact with part of body of the user, and the safety is enhanced.

Mist generation department 139 of the preferred embodiment is designed to generate mist by an electrostatic mist making system, and water drops are broken and pulverized by high voltage or other electric energy, and a fine mist is generated. Since the generated mist is electrically charged, and the mist is charged in opposite polarity to the desired object such as vegetables and fruit. For example, by atomizing a negatively charge mist to the positively charged vegetables and fruit, the bonding force on the vegetables and fruit, and the mist is deposited more uniformly on the vegetable surface. At the same time, as compared with the mist not charged electrically, the mist bonding rate is enhanced. The atomized fine mist is directly applied into the vegetable container, and the fine mist can be deposited on the vegetable surface by making use of the potential of the fine mist and the vegetables, and the freshness can be kept more efficiently.

Besides, the replenish water used in the preferred embodiment is not tap water supplied from outside, but is water from dew condensation. It is free from minerals and impurities, and deterioration of water due to clogging at the leading end of atomizing electrode can be prevented.

The mist in the preferred embodiment contains radicals, and the agricultural chemicals and wax sticking to the vegetable surface can be decomposed and removed by a very small amount of water, and the water is saved, and a low input is realized.

Since electronic mist maker 131 is installed above the evaporator (evaporator 112), if the freezing cycle is composed by using isobutane or propane, or if the refrigerant leaks, since the refrigerant is heavier than air, vegetable compartment 107 is not contaminated, and it is very safe.

In vegetable compartment 107, too, since mist generation department 139 is disposed above vegetable compartment 107, if the refrigerant leaks from the refrigerant piping in the refrigerator main body or the like, it stays in the lower part of vegetable compartment 107, and there is no problem.

Since no part of vegetable compartment 107 contacts directly with the refrigerant piping or the like, and the refrigerant does not leak directly from the refrigerant piping.

Preferred Embodiment 4

Figure 6:
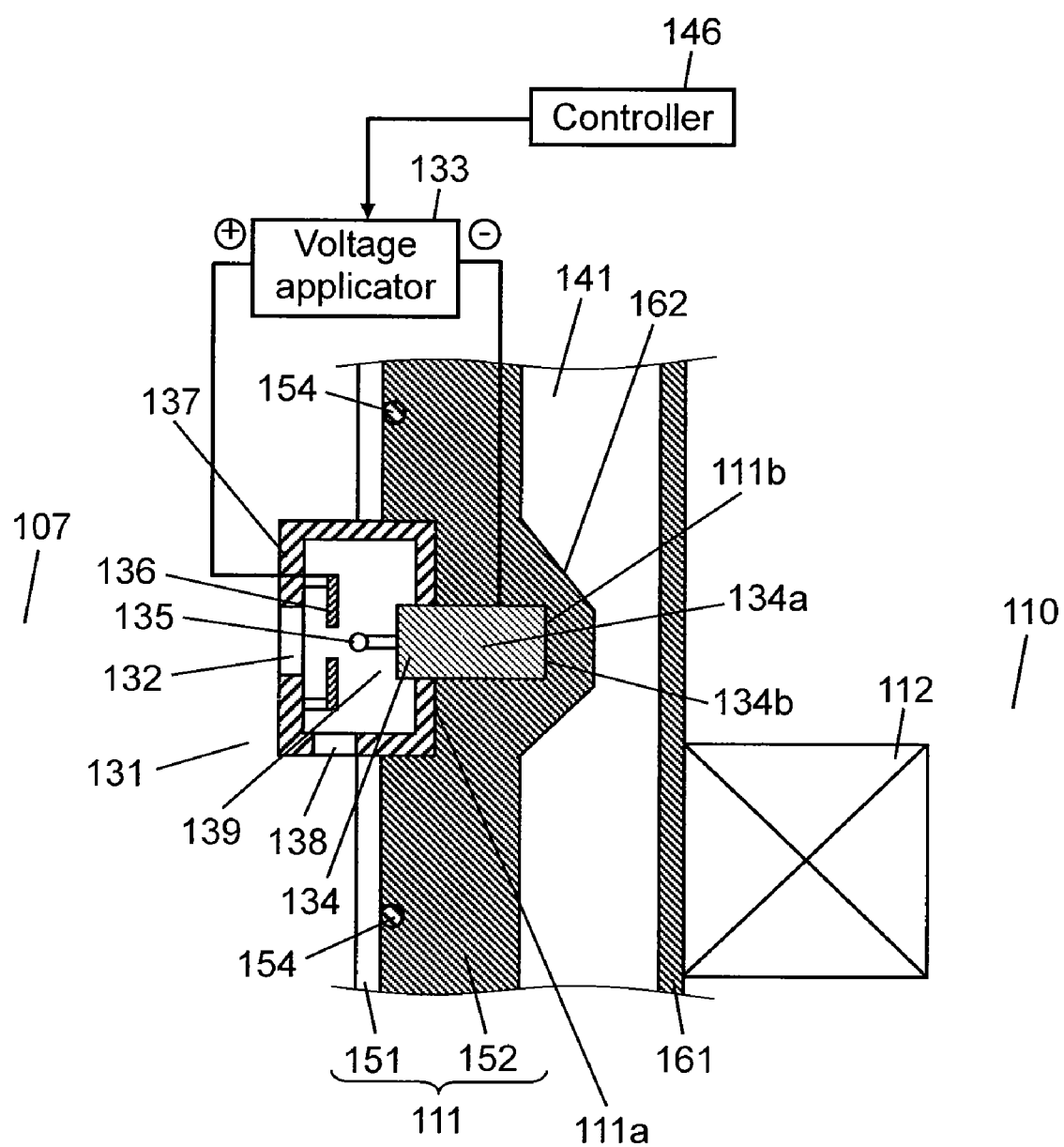
FIG. 6 shows a sectional view cut along line A-A in FIG. 2, and the sectional view illustrates an electrostatic atomizing device and its periphery provided to a vegetable compartment of a refrigerator in accordance with a fourth embodiment of the present invention.

A longitudinal sectional view showing a section where the refrigerator of preferred embodiment 4 of the present invention is divided and parted into right and left sections is nearly same as FIG. 1. A front view of essential parts showing the inner side of the vegetable compartment of the refrigerator in preferred embodiment 4 of the present invention is same as FIG. 2. FIG. 6 shows a sectional view cut along line A-A in FIG. 2 as seen from the arrow direction of the cut-section, illustrating an electrostatic atomizing device and its periphery provided in the vegetable compartment of the refrigerator in preferred embodiment 4 of the present invention.

In this preferred embodiment, only the portions different from the configuration specifically described in preferred embodiments 1 to 3 are explained, and the portions similar to the configuration specifically described in preferred embodiments 1 to 3 or applicable to the same technical concept are omitted in explanation.

In the drawing, rear partition 111 has surface of rear-end partition 151 as a partition for isolating vegetable compartment 107 as a storage compartment composed of ABS or other resin. Further, rear partition 111 has also outlet air-duct 141 for freezer compartment for passing cold air for cooling other storage compartment of freezer compartment 108 and heat insulator 152 for thermally isolating from the storage compartment. It also has partition board 161 for isolating outlet air-duct 141 for freezer compartment and cooling compartment 110. Between surface of rear-end partition 151 at the vegetable compartment 107 side and discharge air duct 141 from freezer compartment, heat insulator 152 made of foamed styrol for keeping heat insulation is formed. Between surface of rear-end partition 151 and heat insulator 152, heater 154 or other heating device is provided for regulating the temperature of vegetable compartment 107 for preventing dew condensation on the surface.

Herein, recess 111$a$ is provided in a part of the wall surface at the inside of the storage compartment of rear partition 111, electrostatic atomizing device 131 is buried in this place.

Electrostatic atomizing device 131 atomizes a mist of dew condensation water generated in atomizing electrode 135 from the moisture in the air around mist generation department 139 by cooling mist generation department 135 provided in mist generation department 139 lower than the dew point temperature by the evaporator.

A this time of dew condensation, in the preferred embodiment, the low-temperature air flowing in outlet air-duct 141 for freezer compartment is used as the evaporator, and atomizing electrode 135 is not cooled directly, but atomizing electrode 135 is cooled by way of cooling pin 134 of heat conduction material having a larger thermal capacity than atomizing electrode 135.

The back side of cooling pin 134 of heat conduction material, that is, heat insulator 152 at the cooling compartment 110 side is desired to be formed thinly in order to cooling pin 134 of heat conduction material (as explained in FIG. 3 relating to preferred embodiment 1). However, when molding from foamed styrol or the like, if an extremely thin portion is formed, the rigidity of the thin portion is lowered, and defects such as crack or hole may be formed due to lack of strength or defective molding, and the quality deterioration may occur.

In the preferred embodiment, protrusion 162 is provided in heat insulator 152 near the back side of cooling pin 134. As a result, as compared with the flat portion, the periphery of cooling pin 134 is heightened in rigidity, and the wall thickness of heat insulator 152 is increased, and the rigidity is enhanced. Moreover, by protrusion 162, cooling pin 134 can be cooled from both the lateral side and the back side.

Further, in order to suppress increase of air duct passage, the outer circumference of protrusion 162 is formed in a conical slope so as to be thinner as going toward the leading end In refrigerator 100 of the preferred embodiment having such configuration, the operation and actions are explained below.

Cooling pin 134 of heat conduction material is cooled by way of heat insulator 152 of heat cushioning material. Therefore, mist generation department 135 is cooled indirectly by way of cooling pin 134, and is also cooled indirectly in a dual structure by way of heat insulator 152 of heat cushioning material. Accordingly, mist generation department 135 is not cooled extremely. If mist generation department 135 is cooled extremely, the dew condensation amount in mist generation department 139 is increased, and the load is increased in mist-making, and the input to electrostatic atomizing device 131 increases, and mist generation department 139 may be frozen, and mist-making failure may occur. In this preferred embodiment, however, defects by such increase of load in mist generation department 139 can be prevented, and an appropriate dew condensation amount is maintained, and stable mist atomizing is realized at low cost.

Atomizing electrode 135 is cooled indirectly in a dual structure by way of cooling pin 134 of heat conduction material and heat insulator 152 of heat cushioning material, and direct effects of temperature changes of cooling section (low-temperature air flowing in outlet air-duct 141 for freezer compartment) on mist generation department 135 can be lessened. Therefore, load fluctuations of mist generation department 135 can be suppressed, and mist atomizing of a stable mist amount is realized.

Since cooling pin 134 is cooled by the cold air generated in cooling compartment 110, and cooling pin 134 is formed of a metal piece of excellent heat conduction, the cooling section can cool as required only by the heat conduction from the air duct of flow of cold air generated in evaporator 112.

At this time, cooling pin 134 in this preferred embodiment has protrusion 134*a* formed at the reverse side of mist generation department 135. Therefore, in mist generation department 139, end portion 134*b* at the protrusion 134 side is closest to the cooling section. Accordingly, cooling pin 134 is cooled from the end portion 134*b* side remotest from mist generation department 135 by the cold air from the cooling section.

Thus, in the portion exposed to vegetable compartment 107, only mist generation department 135 is cooled by heat conduction, and dew is condensed and mist is formed in mist generation department 135. Other positions are thermally insulated, and dew condensation on, for example, outlet wall 137 can be prevented.

Between electrostatic atomizing device 131 and outlet air-duct 141 for freezer compartment, there is no communicating part, and low-temperature air does not leak into the compartment. Therefore, dew condensation or other low temperature abnormality will not occur in vegetable compartment 107 and peripheral parts.

Since the cooling section is formed in a simple structure, mist generation department 139 of low trouble rate and high reliability is realized. In addition, since cooling pin 134 and atomizing electrode 135 can be cooled by making use of the cooling source of the freezing cycle, mist can be formed at low energy.

Rear partition 111 having mist generation department 139 has recess 111*a* formed in a part of the vegetable compartment side 107, and mist generation department 139 having protrusion 134*a* is inserted into this recess 111*a*. Hence, heat insulator 152 for composing rear partition 111 of vegetable compartment 107 can be used as heat cushioning material. Therefore, without requiring any particular heat cushioning material, only by adjusting the thickness of heat insulator 152, and by such heat cushioning material, atomizing electrode 135 can be properly cooled, and mist generation department 139 may be formed in a simpler structure.

In outlet air-duct 141 for freezer compartment provided at the back side of rear partition 111, protrusion 162 of a partially conical shape is formed of heat insulator 152. This protrusion 162 is formed in a small slope not resisting the cold air flow direction, and deterioration of cooling capacity is prevented. At the same time, since the heat conduction area for cooling pin 134 is increased, and the cooling efficiency of cooling pin 134 is enhanced.

Thus, in the preferred embodiment, heat insulator 152 of rear partition 111 near the back side of cooling pin 134 is provided with protrusion 162 projecting into outlet air-duct 141 for freezer compartment. Hence. as compared with the case of forming a flat lane at the cooling pin 134 side in outlet air-duct 141 for freezer compartment without forming protrusion 162 in outlet air-duct 141 for freezer compartment, the rigidity around cooling pin 134 is enhanced, and a sufficient wall thickness of heat insulator 152 is maintained, and if the rigidity is further heightened, cooling pin 134 of heat conduction material can be cooled from both the lateral side and the back side. Therefore, the surface area for heat conduction can be increased, and the rigidity around cooling pin 134 can be enhanced without lowering the cooling efficiency of cooling pin 134 of heat conduction material.

Besides, by forming the outer circumference of protrusion 162 in a conical slope becoming thinner as going toward the leading end, the cold air flows while crawling along the outer circumference of protrusion 162 having a curved surface to the cold air flowing direction, and increase of air duct resistance is suppressed. At the same time, since cooling pin 134 is cooled uniformly from the outer circumference of the peripheral wall, cooling pin 134 of heat conduction material can be cooled uniformly. Therefore, atomizing electrode 135 can be cooled efficiently by way of cooling pin 134.

Cooling pin 134 can reserve a certain extent of thermal capacity, and can relax the response of thermal conduction from in outlet air-duct 141 for freezer compartment. It is therefore possible to suppress the temperature fluctuations of atomizing electrode 135. Cooling pin 134 also has a cold heat reserve function, and the dew condensation time of atomizing electrode 135 is assured, and freezing can be prevented.

Since the mist making device is electrostatic atomizing device 131, the generated fine mist is very small in particle size, and is strong in diffusion property, reaches into the entire space of vegetable compartment 107 to be atomized. The atomized fine mist is generated by high voltage discharge, and is charged negatively. Since vegetable compartment 107 contains positively charged vegetables and fruit, the atomized mist is likely to deposit on the surface of vegetables, and the humidity on the surface of vegetables rises up, and the moisture can be permeated into the cells from the surface, so that the freshness may be enhanced.

The nano-level mist sticking to the surface of vegetables contains OH radicals and traces of ozone. It is effective for killing germs, resisting germs and removing germs, and still more, vegetables are encouraged to increase in nutrients such as vitamin C by removal of agricultural chemicals and anti-oxidation by oxidation and decomposition.

If there is no water in atomizing electrode 135, the discharge distance becomes longer, and the insulation layer of air cannot be broken, and discharge phenomenon does not take place. As a result, no current flows between atomizing electrode 135 and opposite electrode 136. This phenomenon is detected by controller 146 of refrigerator 100, and the high voltage of voltage applicator 133 can be turned on and off, so that the thermal load into the compartment is suppressed, while energy is saved.

Thus, in the preferred embodiment, conical protrusion 162 projecting into outlet air-duct 141 for freezer compartment is provided in heat insulator 152 at the back side of cooling pin 134 as protrusion 134*a* of mist generation department 139. Hence, by enhancing the rigidity of heat insulator 152, parting of heat insulator 152 may be easier. Further, by minimizing the passage resistance of outlet air-duct 141 for freezer compartment, the cooling capacity into cooling pin 134 can be maintained.

In the preferred embodiment, by securely assuring the wall thickness of heat insulator 152, there is no leak of cold air between vegetable compartment 107 and adjacent section of outlet air-duct 141 for freezer compartment, and frosting or dew condensation of outlet wall 137 can be prevented.

In the preferred embodiment, outlet air-duct 141 for freezer compartment is the air duct as cooling section for cooling of cooling pin 134, but the same role may be played by other low-temperature air passage such as discharging air duct of icemaker 106, or return air passage of freezer compartment 108. Not limited to the air passage, the cold air from storage compartment of lower temperature than vegetable compartment 107 may be used. As a result, the possible location for installing electrostatic atomizing device 131 is extended.

In the preferred embodiment, the cooling section for cooling of cooling pin 134 is the cold air cooled by using the cooling source generated in the freezing cycle of the refrigerator, but it may be also possible to use the heat conduction from the cooling tube making use of cold air or low temperature from the cooling source of the refrigerator. As a result, by adjusting the temperature of the cooling tube, cooling pin 134 may be cooled to a desired temperature, and it is easy to manage the temperature when cooling atomizing electrode 135.

In the preferred embodiment, the cooling section for cooling of cooling pin 134 is the low-temperature air, but may be realized by an auxiliary component such as Peltier element making use of Peltier effect. In this case, by supply voltage to the Peltier element, the temperature at the leading end of atomizing electrode 135 may be controlled at a very delicate temperature.

In the preferred embodiment, buffer material is not used between outlet wall 137 of electrostatic atomizing device 131 and recess 111*a* of heat insulator 152. However, to prevent invasion of humidity into cooling pin 134 or prevent loosening, it is preferred to form urethane foam or other cushioning material between outlet wall 137 of electrostatic atomizing device 131 and recess 111*a* of heat insulator 152. As a result, invasion of humidity into cooling pin 134 can be prevented, and dew condensation on heat insulator 152 can be prevented.

In the preferred embodiment, a water retaining member may be disposed around atomizing electrode 135. As a result, dew condensation water generated near atomizing electrode 135 may be maintained near atomizing electrode 135, and may be properly supplied to atomizing electrode 135. Moreover, by providing vegetable compartment 107 with water retaining member or closing mean, a high humidity may be maintained.

In the preferred embodiment, vegetable compartment 107 is used as the storage compartment for atomizing mist in mist generation department 139, but it may be replaced by storage compartment of other temperature zone such as refrigerator compartment 104 or switchable temperature compartment 105, and various applications can be extended in this case.

Preferred Embodiment 5

A longitudinal sectional view showing a section where the refrigerator of preferred embodiment 5 of the present invention is divided and parted into right and left sections is nearly same as FIG. 1. A front view of essential parts showing the inner side of the vegetable compartment of the refrigerator in preferred embodiment 5 of the present invention is same as FIG. 2. FIG. 7 shows a sectional view cut along line A-A in FIG. 2 as seen from the arrow direction of the cut-section, illustrating an electrostatic atomizing device and its periphery provided in the vegetable compartment of the refrigerator in preferred embodiment 5 of the present invention.

In this preferred embodiment, only the portions different from the configuration specifically described in preferred embodiments 1 to 4 are explained, and the portions similar to the configuration specifically described in preferred embodiments 1 to 4 or applicable to the same technical concept are omitted in explanation.

In the drawing, rear partition 111 has surface of rear-end partition 151 composed of ABS or other resin. Further, rear partition 111 has also heat insulator 152 composed of foamed styrol or the like for thermally isolating between surface of rear-end partition 151 and outlet air-duct 141 for freezer compartment. It also has partition board 161 for isolating between outlet air-duct 141 for freezer compartment and cooling compartment 110. Between surface of rear-end partition 151 at the vegetable compartment 107 side and heat insulator 152, heater 154 or other heating device is provided for regulating the temperature of vegetable compartment 107, or preventing dew condensation on the surface.

Herein, through-section 165 is provided in a part of the wall at the inside of vegetable compartment 107 of rear partition 111, and electrostatic atomizing device 131 is installed at this position.

Electrostatic atomizing device 131 atomizes a mist of dew condensation water generated in atomizing electrode 135 from the moisture in the air around mist generation department 139 by cooling mist generation department 135 provided in mist generation department 139 lower than the dew point temperature by the evaporator.

At this time of dew condensation, in the preferred embodiment, the low-temperature air flowing in outlet air-duct 141 for freezer compartment is used as the evaporator. Atomizing electrode 135 is not cooled directly, but atomizing electrode 135 is cooled by way of cooling pin 134 having a larger thermal capacity than atomizing electrode 135.

Electrostatic atomizing device 131 is mainly composed of mist generation department 139, voltage applicator 133, and outlet wall 137, and a part of outlet wall 137 includes atomizing port 132 and humidity supplying port 138. Atomizing electrode 135 is provided in mist generation department 139, and atomizing electrode 135 is connected and fixed to cooling pin 134 of heat conduction material such as aluminum or stainless steel. It is also connected electrically to one end wired from voltage applicator 133.

Cooling pin 134 of heat conduction material has a large thermal capacity, 50 times or more to 1000 times or less, preferably 100 times or more to 500 times or less, as compared with atomizing electrode 135 at the tip of the department mist. For example, aluminum or copper, or other high heat conduction material is preferred, and in order to conduct the cold heat from one end to other end of cooling pin 134 at high thermal conduction efficiency, its periphery is desired to be covered with heat insulator 152.

Thus, the thermal capacity of cooling pin 134 is more than 50 times or preferably more than 100 times of the thermal capacity of atomizing electrode 135, and direct effects of temperature changes of the cooling section on the atomizing electrode are lowered. As a result, stable mist atomizing is realized at smaller load fluctuations.

As the upper limit of the thermal capacity, the thermal capacity of cooling pin 134 is 500 times or less or 1000 times or less of the thermal capacity of atomizing electrode 135. If the thermal capacity is too large, a greater energy is needed for cooling of cooling pin 134, and cooling of cooling pin stably at low energy is difficult. By keeping within such upper limit, if thermal load fluctuations from the cooling section are changed, direct effect on the atomizing electrode can be lessened, and the atomizing electrode can be cooled stably while saving energy.

Further by controlling the thermal capacity within such upper limit, it is possible to control the time lag required for cooling of the atomizing electrode by way of cooling pin 134 within a proper range. As a result, delay in starting can be prevented when cooling the atomizing electrode, that is, when supplying water into the mist maker, and the atomizing electrode can be cooled stably and appropriately.

As in this preferred embodiment, when cooling pin 134 is provided with through-section 165, the rigidity of the heat insulating wall may be lowered when molding by foamed styrol or the like, and defects such as crack or hole may be formed due to lack of strength or defective molding.

In the preferred embodiment, protrusion 162 projecting into discharging air dust 141 from freezer compartment is provided in heat insulator 152 of rear partition 111 near through-section 165 having cooling pin 134. As a result, as compared with the flat plane of the cooling pin 134 side in outlet air-duct 141 for freezer compartment not provided with protrusion 162 in outlet air-duct 141 for freezer compartment, the rigidity is heightened in the periphery of through-section 165, and the wall thickness of heat insulator 152 is increased, and the rigidity is further enhanced. Moreover, by protrusion 162, cooling pin 134 can be cooled from both the lateral side and the back side.

Further, in order to suppress increase of air duct resistance, the outer circumference of protrusion 162 is formed in a conical slope so as to be thinner as going toward the leading end.

At this time, if cooling pin 134 is directly installed in the air duct (outlet air-duct 141 for freezer compartment), cooling becomes excessive, and the dew condensation amount in atomizing electrode 135 increases too much, or freezing may occur.

Accordingly, a hole (through-section 165) is provided in the heat insulator near the back side of cooling pin 134, and cooling pin 134 is inserted in this hole, and its periphery is surrounded by heat conducting pin cover 166 made of PS, PP or other resin material having both heat insulating property and water-proof property, so that the heat insulation is assured.

Heat conducting pin cover 166 may be also made of a rest-resistance insulation tape or the like. Although not shown in the drawing, when a buffer material is provided in through-section 165 and heat conducting pin cover 166, and the sealing property is assured, it is more effective to prevent invasion of cold air from outlet air-duct 141 for freezer compartment into the periphery of cooling pin 134.

It is more effective by shutting off cold air by adhering a tape or the like, not shown, to opening 167 of through-section 165.

In refrigerator 100 of the preferred embodiment having such configuration, the operation and actions are explained below.

Cooling pin 134 is cooled by way of heat conducting pin cover 166, and atomizing electrode 135 is cooled indirectly by way of cooling pin 134. It is also cooled indirectly in a dual structure by way of heat conducting pin cover 166 of heat cushioning material. Accordingly, atomizing electrode 135 is not cooled extremely. If atomizing electrode 135 is cooled extremely, the dew condensation amount is increased extremely, and the load to mist generation department 139 is increased, and the input to electrostatic atomizing device 131 increases, and mist generation department 139 may be frozen, and mist-making failure may occur. By cooling indirectly in a dual structure, however, defects by such increase of load in mist generation department 139 can be prevented. Therefore, an appropriate dew condensation amount is maintained, and stable mist atomizing is realized at low input.

Atomizing electrode 135 is cooled indirectly in a dual structure by way of cooling pin 134 of heat conduction material and a heat cushioning material (heat conducting pin cover 166, heat insulator 152). As a result, direct effects of temperature changes of cooling section on atomizing electrode 135 can be lessened, and load fluctuations of atomizing electrode 135 can be suppressed, and mist atomizing of a stable mist amount is realized.

Since cooling pin 134 is cooled by the cold air generated in cooling compartment 110, and cooling pin 134 is formed of a metal piece of excellent heat conduction. Hence, the cooling section can cool as required only by the heat conduction from the air duct (outlet air-duct 141 for freezer compartment) of flow of cold air generated in evaporator 112.

At this time, cooling pin 134 in this preferred embodiment has protrusion 134*a* formed at the reverse side of atomizing electrode 135. Therefore, in mist generation department 139, end portion 134*b* at the protrusion 134*a* side is closest to the cooling section, and cooling pin 134 is cooled from the end portion 134*b* side remotest from atomizing electrode 135 by the cold air from the cooling section.

Thus, in the preferred embodiment, protrusion 162 projecting into discharging air duct 141 from freeze compartment is provided in heat insulator 152 near through-section 165. Hence, if the rigidity is heightened in the periphery of through-section 165, cooling pin 134 can be cooled from both the lateral side and the back side. Therefore, the surface area for heat conduction can be increased, and the rigidity in the periphery of cooling pin 134 can be increased without lowering the cooling efficiency of cooling pin 134 of heat conduction material.

Besides, the outer circumference of protrusion 162 is formed in a conical slope becoming thinner as going toward the leading end. As a result, the cold air flows while crawling along the outer circumference of protrusion 162 having a curved surface to the cold air flowing direction, and increase of air duct resistance is suppressed, and cooling pin 134 of heat conduction material is cooled uniformly from the outer circumference of the lateral wall. Therefore, cooling pin 134 can be cooled uniformly, and atomizing electrode 135 can be cooled efficiently by way of cooling pin 134.

Through-section 165 is formed in only a part of the back side of cooling pin 134 of heat insulator 152, and thin wall portion is not provided, and the foamed styrol can be molded easily, and there is no problem of breakage in the assembling process.

In the configuration of the present preferred embodiment, the portion contacting with the cooling section (low-temperature air) at the back side of heat conducting pin cover 166 is a heat buffering material. The heat buffering state of the heat buffering material can be adjusted by varying the thickness of the portion of heat conducting pin cover 166 contacting with the cold air. Therefore, the cooling state of cooling pin 134 can be varied easily, and when applied in refrigerators of various storage capacities, for example, it is applicable by varying the thickness of heat conducting pin cover 166 depending on the cooling load.

There is no gap between heat conducting pin cover 166 and through-section 165, and the opening of through-section 165 is sealed with a tape or the like to shut off invasion of cold air from an adjacent section. Therefore, low-temperature air does not leak into the compartment, and dew condensation or low temperature abnormality will not occur in vegetable compartment 107 or peripheral parts.

Thus, when cooling by the cooling section, cooling pin 134 is cooled from the end portion 134*b* side remotest from atomizing electrode 135. Therefore, after cooling of cooling pin 134 of large thermal capacity, atomizing electrode 135 is cooled by cooling pin 134 of heat conduction material, and direct effects of temperature changes of the cooling section on atomizing electrode 135 can be further lessened, and a stable mist atomizing of smaller load fluctuations can be realized.

The generated fine mist is atomized into vegetable compartment 107, but since the particles are very small, and the diffusion is strong, and the fine mist reaches all parts of vegetable compartment 107.

Since the mist making device is electrostatic atomizing device 131, the generated fine mist is very small in particle size, and is strong in diffusion property, and reaches into the entire space of vegetable compartment 107 to be atomized. The atomized fine mist is generated by high voltage discharge, and is charged negatively. Vegetable compartment 107 contains positively charged vegetables and fruit. Therefore, the atomized mist is likely to deposit on the surface of vegetables, and the freshness may be enhanced.

The nano-level mist sticking to the surface of vegetables contains OH radicals and traces of ozone, and it is effective for killing germs, resisting germs and removing germs, and still more, vegetables are encouraged to increase in nutrients such as vitamin C by removal of agricultural chemicals and anti-oxidation by oxidation and decomposition.

In the case of using, for mist atomizing, dew condensation water by dew condensation of moisture in the air by cooling of atomizing electrode 135 as in the preferred embodiment, if there is no water in atomizing electrode 135, the discharge distance becomes longer, and the insulation layer of air cannot be broken, and discharge phenomenon does not take place. As a result, no current flows between atomizing electrode 135 and opposite electrode 136, but this phenomenon is detected by controller 146 of refrigerator 100, and the high voltage of voltage applicator 133 can be turned on and off, so that the thermal load into the compartment is suppressed, while energy is saved.

Thus, in the preferred embodiment, in the configuration of cooling pin 134 at protrusion 134*a* of mist generation department 139, through-section 165 is formed in heat insulator 152, and cooling pin 134 is inserted in this position, and heat conducting pin cover 166 is provided in the periphery. As a result, while the cooling capacity on cooling pin 134 of heat conduction material is maintained, heat insulator 152 can be molded easily.

By covering the lateral side and back side of cooling pin 134 with an integrally molded heat conducting pin cover 166, invasion of cold air from outlet air-duct 141 for freezer compartment disposed at the back side into the periphery of cooling pin 134 can be prevented effectively.

In the preferred embodiment, a buffer material may be provided in the periphery of cooling pin 134. As a result, the gap between through-section 165 and heat conducting pin cover 166 can be narrowed, and escape of cold air can be prevented.

In the preferred embodiment, opening 167 of through-section 165 is not closed with tape or other insulating material, but it may be also closed. As a result, escape of cold air can be prevented.

In the preferred embodiment, outlet air-duct 141 for freezer compartment is the air duct for cooling of cooling pin 134, but the same role may be played by other low-temperature air passage such as discharging air duct of icemaker 106, or return air passage of freezer compartment 108. As a result, the possible location for installing electrostatic atomizing device 131 is extended.

In the preferred embodiment, the cooling section for cooling of cooling pin 134 is the cold air cooled by using the cooling source generated in the freezing cycle of refrigerator 100. But it may be also possible to use the heat conduction from the cooling tube making use of cold air or low temperature from the cooling source of refrigerator 100. As a result, by adjusting the temperature of the cooling tube, cooling pin 134 of the conduction material may be cooled to a desired temperature, and it is easy to manage the temperature when cooling atomizing electrode 135 at the tip of the department mist.

In the preferred embodiment, the cooling section for cooling of cooling pin 134 may be realized by an auxiliary component such as Peltier element making use of Peltier effect. In this case, by supply voltage to the Peltier element, the temperature at the leading end of atomizing electrode 135 may be controlled at a very delicate temperature.

In the preferred embodiment, buffer material is not used between outlet wall 137 of electrostatic atomizing device 131 and recess 111*a* of heat insulator 152. However, to prevent invasion of humidity into cooling pin 134 or prevent loosening, it is possible to compose urethane foam or other cushioning material between outlet wall 137 of electrostatic atomizing device 131 and recess 111*a* of heat insulator 152. As a result, invasion of humidity into cooling pin 134 can be prevented, and dew condensation on heat insulator 152 can be prevented.

Preferred Embodiment 6

A longitudinal sectional view showing a section where the refrigerator of preferred embodiment 6 of the present invention is divided and parted into right and left sections is nearly same as FIG. 1. A front view of essential parts showing the inner side of the vegetable compartment of the refrigerator in preferred embodiment 6 of the present invention is same as FIG. 2. FIG. 8 shows a sectional view cut along line A-A in FIG. 2 as shown from the arrow direction of the cut-section, illustrating an electrostatic atomizing device and its periphery provided in the vegetable compartment of the refrigerator in preferred embodiment 6 of the present invention.

In this preferred embodiment, only the portions different from the configuration specifically described in preferred embodiments 1 to 5 are explained, and the portions similar to the configuration specifically described in preferred embodiments 1 to 5 or applicable to the same technical concept are omitted in explanation.

In the drawing, rear partition 111 is composed of surface of rear-end partition 151 composed of ABS or other resin, and heat insulator 152 composed of foamed styrol or the like for thermally isolating between surface of rear-end partition 151 and outlet air-duct 141 for freezer compartment. It also has partition board 161 for isolating between outlet air-duct 141 for freezer compartment and cooling compartment 110. Between surface of rear-end partition 151 at the vegetable compartment 107 side and heat insulator 152, heater 154 or other heating device is provided for regulating the temperature of vegetable compartment 107, or preventing dew condensation on the surface.

Herein, through-section 165 is provided in a part of the wall surface at the inside of vegetable compartment 107 of rear partition 111, and electrostatic atomizing device 131 is installed at this position.

Electrostatic atomizing device 131 is mainly composed of mist generation department 139, voltage applicator 133, and outlet wall 137, and in a part of outlet wall 137, atomizing port 132 and humidity supplying port 138 are composed.

Electrostatic atomizing device 131 atomizes a mist of dew condensation water generated in atomizing electrode 135 from the moisture in the air around mist generation department 139 by cooling atomizing electrode 135 provided in mist generation department 139 lower than the dew point temperature by the evaporator.

At this time of dew condensation, in the preferred embodiment, the low-temperature air flowing in outlet air-duct 141 for freezer compartment is used as the evaporator. Atomizing electrode 135 is not cooled directly, but atomizing electrode 135 is cooled by way of cooling pin 134 having a larger thermal capacity than atomizing electrode 135.

Atomizing electrode 135 is installed in mist generation department 139, and atomizing electrode 135 is connected and fixed to cooling pin 134 of heat conduction material such as aluminum or stainless steel. It is also connected electrically to one end wired from voltage applicator 133.

Cooling pin 134 has a large thermal capacity, 50 times or more to 1000 times or less, preferably 100 times or more to 500 times or less, as compared with atomizing electrode 135. For example, aluminum or copper, or other high heat conduction material is preferred, and in order to conduct the cold heat from one end to other end of cooling pin 134 at high thermal conduction efficiency, its periphery is desired to be covered with heat insulator 152.

Thus, the thermal capacity of cooling pin 134 is more than 50 times or preferably more than 100 times of the thermal capacity of atomizing electrode 135. As a result, direct effects of temperature changes of the cooling section on the atomizing electrode are lowered, and stable mist atomizing is realized at smaller load fluctuations.

As the upper limit of the thermal capacity, the thermal capacity of cooling pin 134 is 500 times or less or preferably 1000 times or less of the thermal capacity of atomizing electrode 135. If the thermal capacity is too large, a greater energy is needed for cooling of cooling pin 134, and cooling of cooling pin stably at low energy is difficult.

By keeping within such upper limit, if thermal load fluctuations from the cooling section are changed, direct effect on the atomizing electrode can be lessened, and the atomizing electrode can be cooled stably while saving energy. Further by controlling the thermal capacity within such upper limit, it is possible to control the time lag required for cooing of the atomizing electrode by way of cooling pin 134 within a proper range. As a result, delay in starting can be prevented when cooling atomizing electrode 135, that is, when supplying water into the mist maker, and the atomizing electrode can be cooled stably and appropriately.

Through-section 165 is provided at the back side of recess 111*a*, and protrusion 134*a* of cooling pin 134 of heat conduction material is provided in this through-section 165.

Since cooling pin 134 is provided with through-section 165, the rigidity of the heat insulating wall may be lowered when molding by foamed styrol or the like, and defects such as crack or hole may be formed due to lack of strength or defective molding.

In the preferred embodiment, accordingly, protrusion 162 projecting into discharging air dust 141 from freezer compartment and contacting with partition board 161 at the leading end is provided in heat insulator 152 near through-section 165. As a result, as compared with the flat plane of the cooling pin 134 side in outlet air-duct 141 for freezer compartment not provided with protrusion 162 in outlet air-duct 141 for freezer compartment, the rigidity is heightened in the periphery of through-section 165, and the wall thickness of heat insulator 152 is increased, and the rigidity is further enhanced. Moreover, by protrusion 162, cooling pin 134 can be cooled from both the lateral side and the back side.

At this time, if cooling pin 134 is directly installed in the air duct (outlet air-duct 141 for freezer compartment), cooling becomes excessive, and the dew condensation amount in atomizing electrode 135 at the tip of the department mist increases too much, or freezing may occur.

Accordingly, through-section 165 is provided in heat insulator 152 at the back side of atomizing electrode 135, and protrusion 162 projecting into discharging air dust 141 from freezer compartment and contacting with partition board 161 at the leading end is provided in heat insulator 152 near through-section 165. As a result, by inserting cooling pin 134 into through-section 165 and assuring heat insulation, cooling pin 134 does not contact directly with the cooling section, and contacts with heat insulator 152 of heat cushioning material by way of partition board 161.

At this time, the entire lateral side of cooling pin 134 of circular columnar shape is covered with heat insulator 152.

Opening 167 of through-section 165 is shielded from the air duct by means of partition board 161 isolating discharging air dust 141 from freezer compartment and cooling compartment 110, and the seating property is assured.

It is more effective by shutting off cold air by adhering a tape or the like, not shown, to opening 167 of through-section 165.

In refrigerator 100 of the preferred embodiment having such configuration, the operation and actions are explained below.

Cooling pin 134 of heat conduction material is cooled from the lateral side by way of protrusion 162 of heat insulator 152. Therefore, mist generation department 135 is cooled indirectly by way of cooling pin 134. It is also cooled indirectly in a dual structure by way of protrusion 162 of heat insulator 152. Accordingly, mist generation department 135 is not cooled extremely.

The surrounding of cooling pin 134 of circular columnar shape is enclosed conically by heat insulator 152, and the thinnest part of the heat insulation wall is the remotest side from atomizing electrode 135. Therefore, the portion positioned near opening 167 especially on the outer circumference of the lateral side of cooling pin 134 is cooled most strongly, and other parts are also cooled uniformly from the outer circumference of the side wall.

The end side of the air duct side (outlet air-duct 141 for freezer compartment) of cooling pin 134 is shut off from the air duct (outlet air-duct 141 for freezer compartment) by means of partition board 161. Further, a certain distance is provided at the end face of protrusion 162, and partition board 161 is pressed and fitted. As a result, a creeping distance is assured, and the cold air is prevented from hitting directly cooling pin 134 of heat conduction material. Moreover, the sealing property may be enhanced by adhering a tape or the like to the end face. Thus, by fixing opening 167 of through-section 165 to partition board 161, if temperature changes are significant in refrigerator 100 due to ambient temperature, compartment temperature, or defrosting control, cooling pin 135 and mist generation department 139 can be fixed securely if thermal distortion occurs.

Through-section 165 is formed only in part of the back side of cooling pin 134 of heat insulator 152, and thin-wall part is not formed, and the foamed styrol can be molded easily, and there is no problem of breakage in the assembling process.

There is no gap between cooling pin 134 and through-section 165, and opening 167 of through-section 165 is sealed with a tape or the like to shut off invasion of cold air. Therefore, there is no communicating part, and low-temperature air does not leak into the compartment, and dew condensation or low temperature abnormality will not occur in vegetable compartment 107 or peripheral parts.

As a result, rear partition 111 is reduced in thickness, and the storage capacity of the compartment is further increased.

Thus, when cooling by the cooling section, end portion 134*b* of the remotest side from atomizing electrode 135 of cooling pin 135 is cooled most strongly. Therefore, after cooling of cooling pin 134 of large thermal capacity, atomizing electrode 135 is cooled by cooling pin 134, and direct effects of temperature changes of the cooling section on atomizing electrode 135 can be further lessened, and a stable mist atomizing of smaller load fluctuations can be realized.

Since the mist maker is electrostatic atomizing device 131, the generated fine mist particles are very small, and the diffusion is strong, and the fine mist reaches all parts of vegetable compartment 107. The atomized fine mist is generated by high voltage discharge, and is charged negatively, while compartment 107 contains positively charged vegetables and fruit, and the atomized mist is likely to deposit on the surface of vegetables, and the freshness may be enhanced.

The nano-level mist sticking to the surface of vegetables contains OH radicals and traces of ozone, and it is effective for killing germs, resisting germs and removing germs, and still more, vegetables are encouraged to increase in nutrients such as vitamin C by removal of agricultural chemicals and anti-oxidation by oxidation and decomposition.

If there is no water in atomizing electrode 135, the discharge distance becomes longer, and the insulation layer of air cannot be broken, and discharge phenomenon does not take place. As a result, no current flows between atomizing electrode 135 and opposite electrode 136. This phenomenon is detected by controller 146 of refrigerator 100, and the high voltage of voltage applicator 133 can be turned on and off, so that the thermal load into the compartment is suppressed, while energy is saved.

Thus, in the preferred embodiment, through-section 165 is formed in heat insulator 152, and cooling pin 134 is inserted in this position, and the end face of cooling pin 134 is covered with partition board 161. As a result, cooling pin 134 is cooled by way of protrusion 162 of heat insulator 152 and partition board 161. Therefore, atomizing electrode 135 is cooled indirectly by cooling pin 134. Further, it can be cooled indirectly in a dual structure by way of protrusion 162 of heat insulator 152. It is hence effective to prevent extreme cooling of atomizing electrode 135 at the tip of the department mist. The end face of the air duct side (outlet air-duct 141 for freezer compartment) of cooling pin 134 is shut off from the air duct (outlet air-duct 141 for freezer compartment) by partition board 161. Further, a certain distance is provided at the end face of protrusion 162, and partition board 161 is pressed and fitted, and a creeping distance is assured, and the cold air is prevented from hitting directly cooling pin 134.

As a result, over-cooling of cooling pin 134 is prevented, and overcooling or dew condensation in storage compartment (vegetable compartment 107) due to leak of cold air or the like may be prevented.

In the preferred embodiment, protrusion 162 projecting into outlet air-duct 141 for freezer compartment is provided in heat insulator 152 of rear partition 111 near the back side of cooling pin 134. As a result, as compared with the flat plane of the cooling pin 134 side in outlet air-duct 141 for freezer compartment not provided with protrusion 162 in outlet air-duct 141 for freezer compartment, the rigidity is heightened in the periphery of cooling pin 134, and cooling pin 134 of heat conduction material can be cooled from the lateral side. Therefore the surface area for heat conduction can be increased, and the rigidity is heightened in the periphery of cooling pin 134 without lowering the cooling efficiency of cooling pin 134 of heat conduction material.

Besides, the outer circumference of protrusion 162 is formed in a conical slope becoming thinner as going toward the leading end, and the cold air flows while crawling along the outer circumference of protrusion 162 having a curved surface to the cold air flowing direction. Therefore, increase of air duct resistance in outlet air-duct 141 for freezer compartment is suppressed, and cooling pin 134 is cooled uniformly from the outer circumference of the lateral wall. Therefore, cooling pin 134 can be cooled uniformly, and atomizing electrode 135 can be cooled efficiently by way of cooling pin 134.

The shape of protrusion 162 may be a circular columnar form, and cooling pin 134 can be cooled uniformly from the lateral side of cooling pin 134, and more uniform cooling is realized.

In the preferred embodiment, by fixing (pressing) opening 167 of through-section 165 to partition board 161, if temperature changes are significant in refrigerator 100 due to ambient temperature, compartment temperature, or defrosting control, cooling pin 135 and mist generation department 139 can be fixed securely if thermal distortion occurs.

In the preferred embodiment, a buffer material may be provided in the periphery of cooling pin 134. As a result, cooling pin 134 and through-section 165 can be connected tightly, and escape of cold air can be prevented. In the preferred embodiment, opening 167 of through-section 165 is not closed with tape or other insulating material, but it may be also closed. As a result, escape of cold air can be prevented more securely.

In the preferred embodiment, buffer material is not used between outlet wall 137 of electrostatic atomizing device 131 and through-section 165 of heat insulator 152. However, to prevent invasion of humidity into cooling pin 134 or prevent loosening, it is possible to compose urethane foam or other cushioning material between outlet wall 137 of electrostatic atomizing device 131 and recess 111*a* of heat insulator 152 or through-section 165. Or, as shown in preferred embodiment 5 shown in FIG. 7, heat conducting pin cover may be provided. As a result, invasion of humidity into cooling pin 134 can be prevented, and dew condensation on heat insulator 152 can be prevented.

Preferred Embodiment 7

Figure 9:
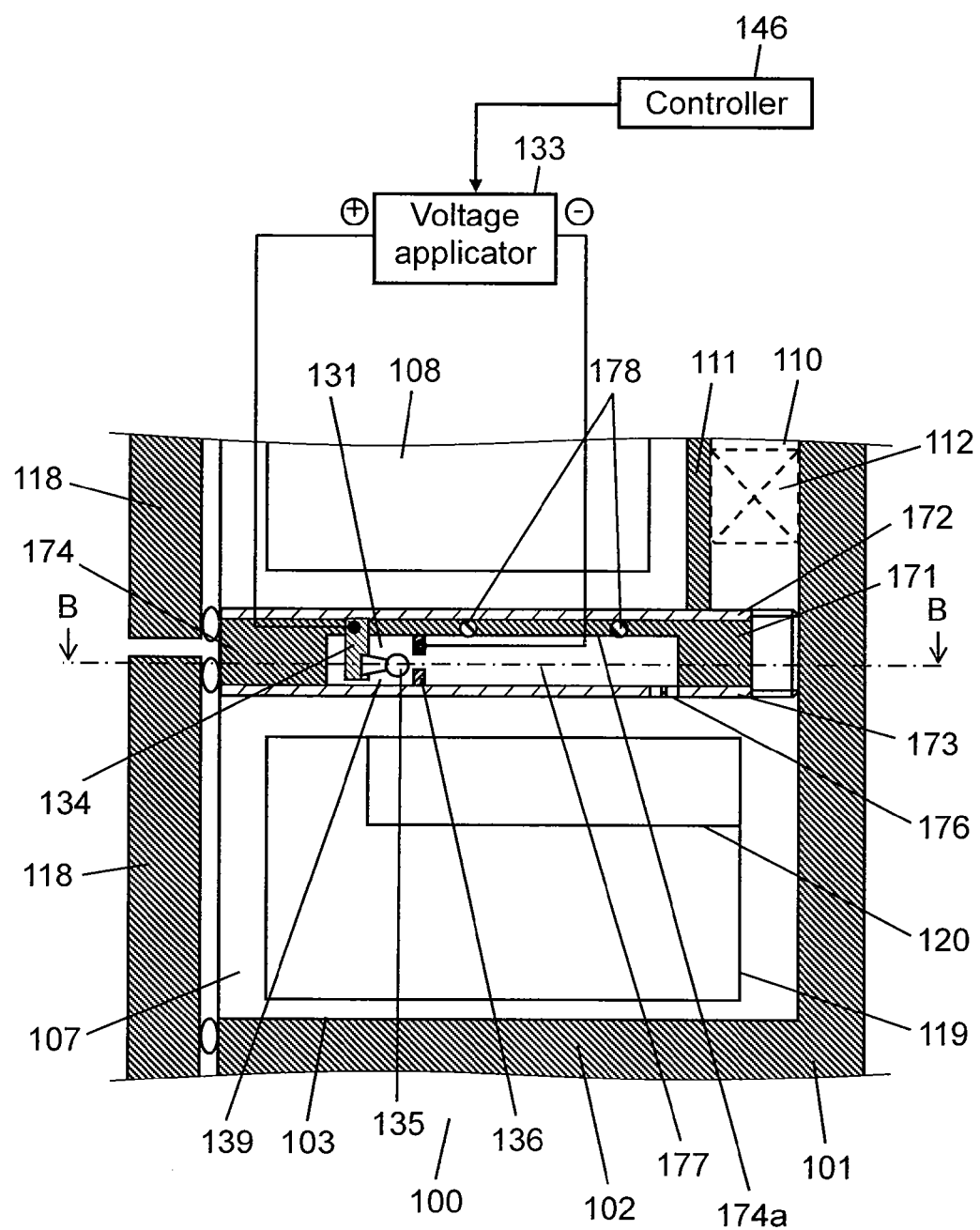
FIG. 9 shows a sectional view illustrating a periphery of a vegetable compartment and its upper partition of a refrigerator in accordance with a seventh embodiment of the present invention, where the vegetable compartment and its periphery are cut vertically and parted to right and left.
Figure 10:
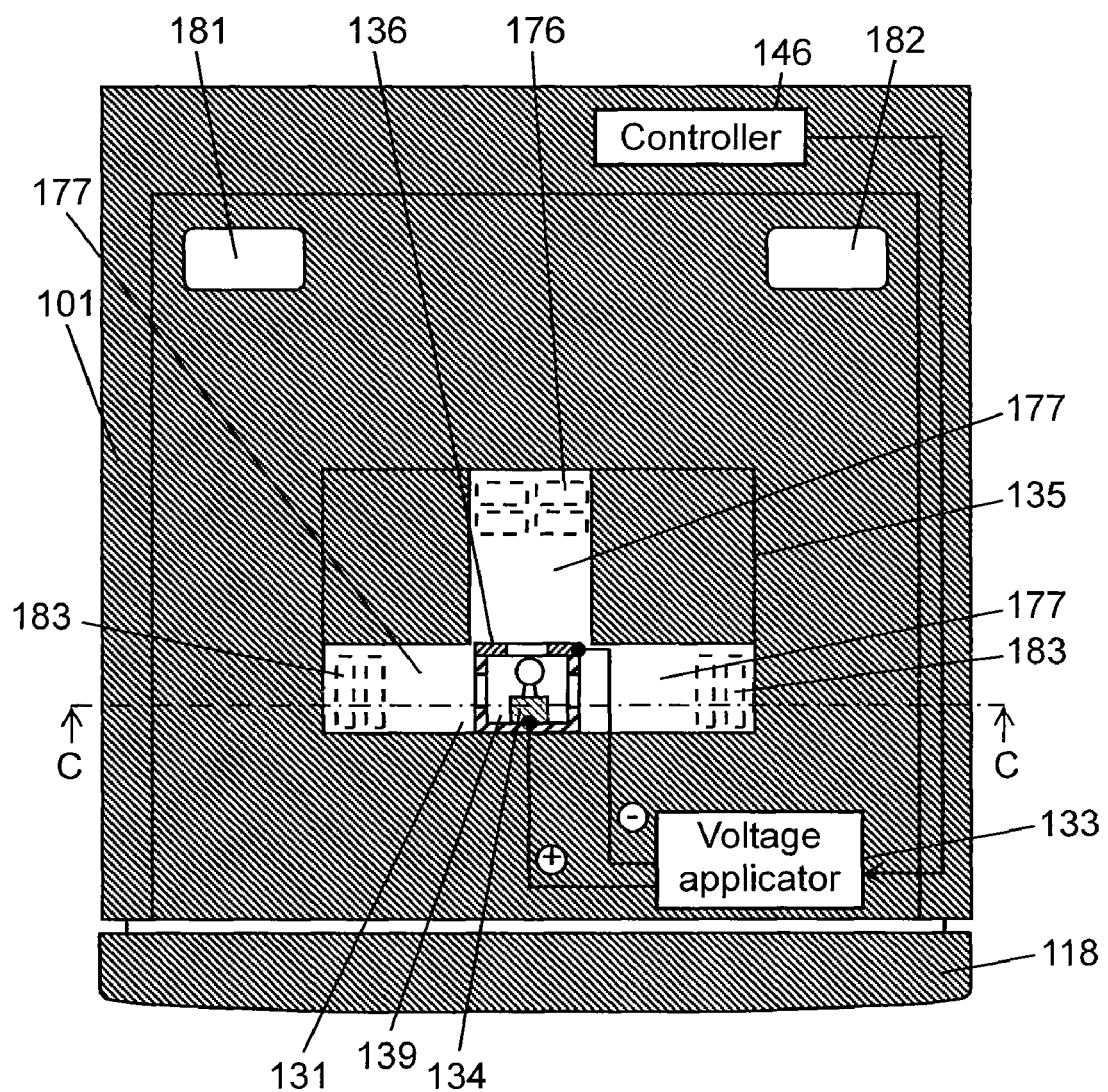
FIG. 10 shows a sectional view of a refrigerator cut along line B-B in FIG. 9 in accordance with the seventh embodiment.
Figure 11:
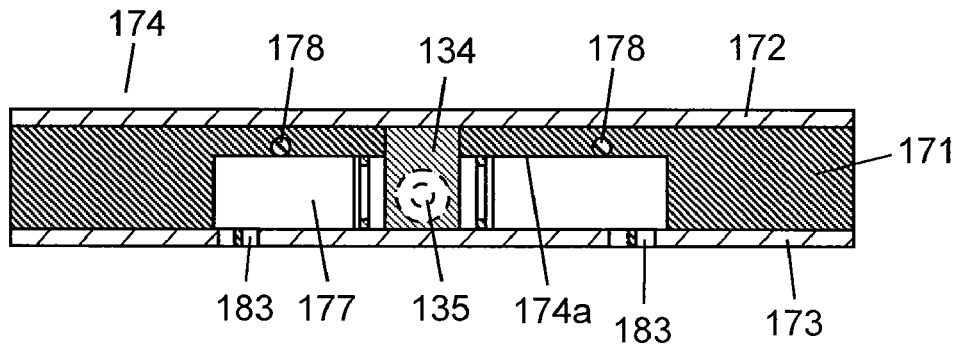
FIG. 11 shows a sectional view cut along line C-C in FIG. 10, and the sectional view illustrates an upper partition of a vegetable compartment of the refrigerator in accordance with the seventh embodiment, where the upper partition is cut vertically and parted to right and left.

FIG. 9 shows a sectional view of essential parts showing a section of a refrigerator in accordance with preferred embodiment 7 of the present invention, where the vegetable compartment and its periphery of the partition in its part are cut vertically and parted to right and left sections. FIG. 10 shows a sectional view of a refrigerator cut along line B-B in FIG. 9 as seen from the arrow direction of the cut-section in accordance with preferred embodiment 7 of the present invention. FIG. 11 shows a sectional view cut along line C-C in FIG. 10 as seen from the arrow direction of the cut-section, and the sectional view illustrates an upper partition of a vegetable compartment of the refrigerator in accordance with preferred embodiment 7 of the present invention.

In this preferred embodiment, only the portions different from the configuration specifically described in preferred embodiments 1 to 6 are explained, and the portions similar to the configuration specifically described in preferred embodiments 1 to 6 or applicable to the same technical concept are omitted in explanation.

In the drawing, thermally insulated cabinet 101 of the refrigerator main body of refrigerator 100 is composed of outer case 102 mainly made of steel plate, inner case 103 molded of ABS or other resin, and foamed heat insulating material such as rigid foamed urethane foamed and filled in a space between outer case 102 and inner case 103. Thermally insulted box 101 is divided into a plurality of storage compartments thermally insulated from the surrounding. In the preferred embodiment, vegetable compartment 107 is disposed in the lowest part of refrigerator 100, and freezer compartment 108 at a relatively low temperature setting of freezing temperature is disposed in the upper part, and the space is divided by partition 174 and sectioned as storage compartments.

At the back side of freezer compartment 108, cooling compartment 110 for generating cold air is provided, and the space between them includes cold air conveying air ducts to each thermally insulated compartment, and rear partition 111 composed for thermally insulating from each compartment.

The cold air generated in evaporator 112 of cooling compartment 110 is conveyed into each compartment by means of cooling fan 113. In vegetable compartment 107 of the preferred embodiment, the cold air generated in evaporator 112 flows into vegetable compartment 107 through outlet air-duct 182 for vegetable compartment, directly or by way of a returning air duct exchanged in heat in other compartment, and returns to evaporator 112 again from inlet air-duct 181 for vegetable compartment.

In the upper side of vegetable compartment 107, partition 174 is composed to be separated from freezer compartment 108.

Partition 174 is composed of partition on vegetable compartment 173 and partition on freezer side 172 made of ABS or other resin, and heat insulator 171 formed between them and made of foamed styrol or urethane for insulating thermally. Recess 174a is provided in a part of the wall of the vegetable compartment 107 side of partition 174 so as to be lower in temperature than in other parts, and electrostatic atomizing device 131 and mist air duct 177 are installed in this position.

Electrostatic atomizing device 131 is mainly composed of mist generation department 139 and voltage applicator 133. Atomizing electrode 135 is installed in mist generation department 139, and atomizing electrode 135 is fixed to cooling pin 134 of heat conduction material such as aluminum, stainless steel or brass, and is electrically connected including one end wired from voltage applicator 133.

The thermal capacity of cooling pin 134 of heat conduction material is more than 50 times or preferably more than 100 times of the thermal capacity of atomizing electrode 135. For example, aluminum or copper, or other high heat conduction material is preferred, and in order to conduct heat from one end to other end of cooling pin 134 efficiently, its surrounding is desired to be covered with a heat insulating material.

In a long range, it is also important to maintain the heat conduction between atomizing electrode 135 and cooling pin 134. Therefore, to prevent invasion of humidity or the like into the connection part, epoxy resin material or the like is poured in to suppress heat resistance, and atomizing electrode 135 and cooling pin 134 are fixed. Or to lower the heat resistance, atomizing electrode 135 may be press-fitted and fixed into cooling pin 134.

Cooling pin 134 is required to conduct the cold temperature within the heat insulating material for thermally insulating the storage compartment and evaporator 112 or the air duct. Therefore, its length is desired to be 5 mm or more, or preferably 10 mm or more. However, if the length is more than 30 mm, its effect is lowered, and partition 174 is increased in the wall thickness, and the storage capacity of the compartment is decreased.

Electrostatic atomizing device 131 installed in vegetable compartment 107 is exposed to high humidity environment, and the humidity may have effects on cooling pin 134, and cooling pin 134 is desired to be made of a corrosion resistive or rust preventive metal material, or the material surface is desired to be treated by alumite or coating.

Cooling pin 134 is fitted into recess 174a provided in a part of heat insulator 171, and fixed into heat insulator 171. Atomizing electrode 135 is fitted to cooling pin 134 in a form projecting in an L-shape. This is intended to contribute to reduction of wall thickness of partition 174 in order to increase the storage capacity of the refrigerator.

The opposite side end of atomizing electrode 135 of cooling pin 134 is press-fitted to partition on freezer side 172 formed by ABS or PP resin molding. From freezer compartment 108, atomizing electrode 135 is cooled by way of partition on freezer side 172, and dew is condensed on the leading end, and water is generated.

Thus, the cooling section can be formed in a simple structure, and mist generation department 139 of low trouble rate and high reliability is realized. Also by making use of the cooling source of the freezing cycle, cooling pin 134 of heat conduction material and atomizing electrode 135 at the tip of the department mist can be cooled, and mist-making is realized at low energy.

At an opposite position of atomizing electrode 135, circular doughnut-shaped opposite electrode 136 is provided at a certain distance from the leading end of atomizing electrode 135, and mist air-duct 177 is formed on its extension.

Mist air-duct 177 is provided in recess 174a of partition 174 separating between vegetable compartment 107 and freezer compartment 108.

The wall thickness of partition 174 is generally 25 mm to 45 mm in order to satisfy both heat insulation and storage capacity. Mist air-duct 177 is provided in this recess 174a.

Mist air-duct 177 includes mist sucking port 183 for supplying humidity from vegetable compartment 107, and mist discharge port 176 for atomizing mist into vegetable compartment 107. From this mist sucking port 183, air of high humidity flows into mist generation department 139, and since atomizing electrode 135 in mist generation department 139 is cooled by way of the cooling pin by heat conduction from the freezer compartment, so that dew is condensed on the leading end of atomizing electrode 135.

Mist is generated by applying a high voltage between the leading end of atomizing electrode 135 and opposite electrode 136.

The generated mist passes through mist air-duct 177, and is atomized into vegetable compartment 107 from mist discharge port 176.

Voltage applicator 133 is electrically connected to mist generation department 139, and the negative potential side of voltage applicator 133 for generating a high voltage is electrically wired and connected to atomizing electrode 135, and the positive potential side, to opposite electrode 136, respectively.

Near atomizing electrode 135, discharge is always occurring due to mist atomizing, and abrasion may be caused at the leading end of atomizing electrode 135. Since refrigerator 100 is usually operated for more than 10 years, the surface of atomizing electrode 135 requires a tough surface treatment, and, for example, nickel plating, gold plating or platinum plating is desired.

Opposite electrode 136 is made of stainless steel, for example, and its long-term reliability is demanded, and the surface is preferred to be treated by platinum plating or the like to prevent sticking of foreign mater or prevent contamination, in particular.

Voltage applicator 133 communicates with and is controlled by controller 146 of the refrigerator main body (thermally insulated cabinet 101), and the high voltage is turned on or off by the input signal from refrigerator 100 or electrostatic atomizing device 131.

Partition 174 for fixing electrostatic atomizing device 131 is provided with heater 178 or other heating device for preventing dew condensation in the air duct.

In the refrigerator having such configuration, the operation and actions are explained below. The thickness of heat insulator 171 of partition 174 having electrostatic atomizing device 131 requires enough cooling capacity for cooling of cooling pin 134 to which atomizing electrode 135 is fixed. The wall thickness of the position of location of electrostatic atomizing device 131 is thinner than in other parts. Accordingly, by heat conduction from the freezer compartment at a relatively low temperature, cooling pin 134 of heat conduction material is cooled, and atomizing electrode 135 at the tip of the department mist can be cooled. Herein, when the leading end temperature of atomizing electrode 135 is controlled under the dew point, the steam near atomizing electrode 135 is collected to condense dew on atomizing electrode 135, and water drops are formed securely.

Although not shown, by installing a compartment temperature sensor or a compartment humidity sensor in the refrigerator, the dew point can be calculated depending on the compartment environmental changes strictly according to a predetermined formula.

A high voltage (for example, 7.5 kV) is applied between two electrodes, that is, atomizing electrode 135 at negative voltage side, and opposite electrode 136 at positive electrode side, from voltage applicator 133. At this time, the air insulation layer is broken between the electrodes, and a corona discharge takes place, and water on atomizing electrode 135 is atomized from the leading end of the electrode, and electrically charged invisible nano-level fine mist of 1 micrometer or less is generated, together with accompanying ozone and OH radical.

The generated fine mist is atomized into the vegetable compartment (lower basket 119, upper basket 120) of vegetable compartment 107. The fine mist atomized from electrostatic atomizing device 131 is charged negatively. On the other hand, vegetable compartment 107 contains vegetables and fruit, including green and leafy plants or fruit. Some of the vegetables and fruit stored in the vegetable compartment may be already withered due to transpiration when returning from shop or during storage. These vegetables and fruit are usually positively charged, and the atomized fine mist charged negatively is likely to gather on the surface of vegetables. When the humidity in vegetable compartment 107 is raised again, the atomized fine mist deposits simultaneously on the surface of vegetables or fruit, and transpiration from vegetables and fruit is suppressed, and the keeping-fresh performance is enhanced. The moisture permeates into the tissues from gaps among cells in the vegetables and fruit, and transpires, and water is supplied again into the withered cells, and the cells are swollen, stretched and refreshed.

The generated fine mist holds ozone and OH radicals, and they have a strong oxidation power. Accordingly, the generated fine mist can deodorize inside of the vegetable compartment, and sterilize and bactericide the vegetable surface, and can also oxidize, decompose, and remove agricultural chemicals, wax, and other harmful substances sticking to the vegetable surface.

In the preferred embodiment, thermally insulated cabinet 101 has a plurality of storage compartments. The ceiling side of vegetable compartment 107 having mist generation department 139 is provided with freezer compartment 108 which is a low-temperature storage compartment kept at lower temperature than vegetable compartment 107. Mist generation department 139 is provided in partition 174 at the ceiling side of vegetable compartment 107.

If a storage compartment in freezing temperature zone such as refrigerator compartment 108 or icemaker 106 is provided in the upper part of vegetable compartment 107 having mist generation department 139, mist generation department 139 is installed in partition 174 on the ceiling for partitioning them. As a result, by the cold air from freezer compartment 108 in the upper part, cooling pin 134 in mist generation department 139 is cooled, and atomizing electrode 135 is cooled, and dew can be condensed. Therefore, any particular cooling device is not needed, and mist generation department 139 can be composed in a simple structure, and a mist generation department of low trouble rate and high reliability can be realized.

In the preferred embodiment, a partition for dividing the storage compartment is provided, and freezer compartment 108 is provided as a low temperature storage compartment at the ceiling side of vegetable compartment 107. Electrostatic atomizing device 131 is provided in partition 174 on the ceiling. Therefore, when the storage compartment of the freezing temperature zone such as freezer compartment 108 or icemaker 106 is installed in the upper part, atomizing electrode 135 is installed in partition 174 on the ceiling for partitioning them, and the upper storage compartment is used as cooling source, and atomizing electrode 135 is cooled, and dew can be condensed. Therefore, any particular cooling device is not needed, and the mist can be atomized from the ceiling, and the mist is likely to diffuse in all parts of the containers of vegetable compartment 107 (lower basket 119, upper basket 120).

Mist generation department 139 is provided at the inner sided of partition on vegetable compartment 173, not within the storing space in vegetable compartment 107, it is rarely touched by the user, and the safety is enhanced.

Mist generation department 139 of the preferred embodiment is designed to generate mist by an electrostatic mist making system, and water drops are broken and pulverized by high voltage or other electric energy, and a fine mist is generated. Since the generated mist is electrically charged, the mist is charged in opposite polarity to the desired object such as vegetables and fruit. For example, by atomizing a negatively charge mist to the positively charged vegetables and fruit, the bonding force on the vegetables and fruit is increased. The mist is deposited more uniformly on the vegetable surface, and as compared with the mist not charged electrically, the mist bonding rate is enhanced. The atomized fine mist is directly applied into the vegetable compartments (lower basket 119, upper basket 120), and the fine mist can be deposited on the vegetable surface by making use of the potential of the fine mist and the vegetables, and the freshness can be kept more efficiently.

Besides, the replenish water used in the preferred embodiment is not tap water supplied from outside, but is water from dew condensation. It is free from minerals and impurities, and deterioration of water due to clogging at the leading end of atomizing electrode 135 can be prevented.

The mist in the preferred embodiment contains radicals, and the agricultural chemicals and wax sticking to the vegetable surface can be decomposed and removed by a very small amount of water, and the water is saved, and a low input is realized.

Preferred Embodiment 8

Figure 12:
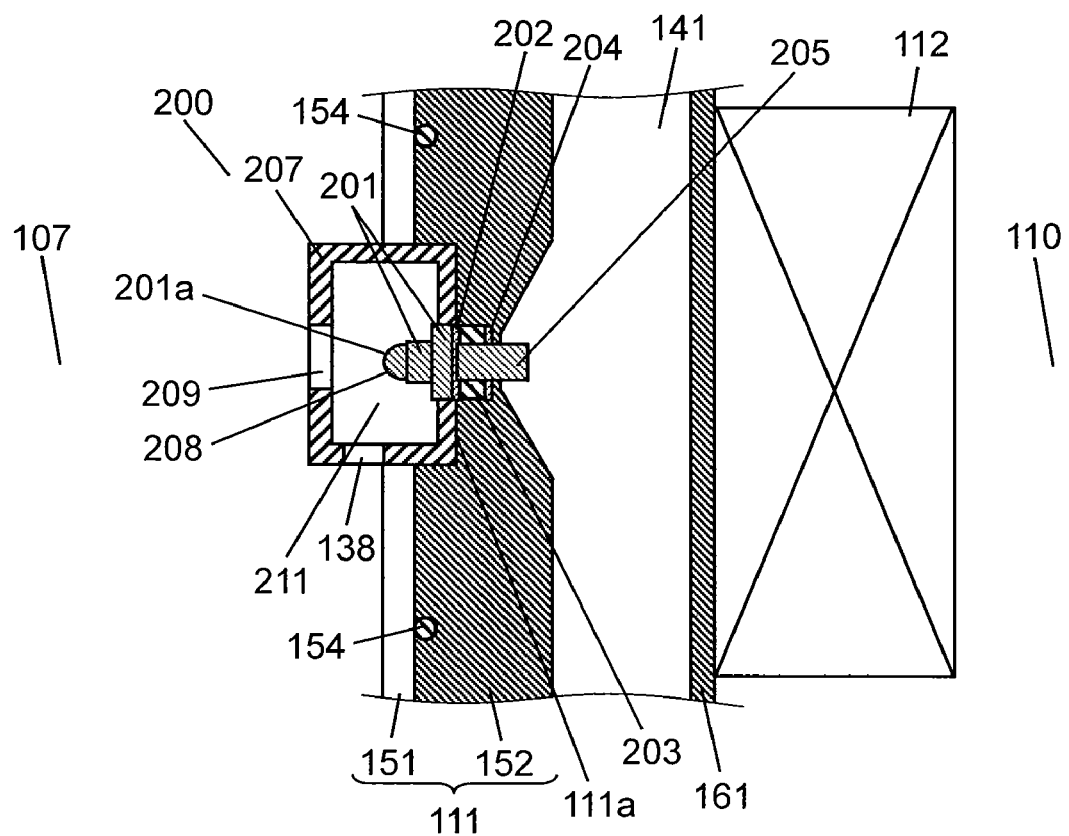
FIG. 12 shows a sectional view detailing an ultrasonic mist device and its periphery in accordance with an eighth embodiment of the present invention.

FIG. 12 a detailed sectional view of periphery of an ultrasonic mist device in a refrigerator of preferred embodiment 8 of the present invention.

In this preferred embodiment, only the portions different from the configuration specifically described in preferred embodiments 1 to 7 are explained, and the portions similar to the configuration specifically described in preferred embodiments 1 to 7 or applicable to the same technical concept are omitted in explanation.

In the drawing, rear partition 111 is composed of surface of rear-end partition 151 made of ABS or other resin, and heat insulator 152 made of foamed styrol or the like for thermally insulating the storage compartment. It also has partition 161 for dividing into outlet air-duct 141 for freezer compartment and cooling compartment 110. Between surface of rear-end partition 151 and heat insulator 152, heater 154 or other heating device is installed for regulating the temperature of the storage compartment, or preventing dew condensation on the surface.

Recess 111a is provided in a part of the wall surface of the inside of the storage compartment of rear partition 111, and a mist maker is installed in this position, that is, horn type ultrasonic mist device 200.

Ultrasonic mist device 200 of mist maker is provided in rear partition 111 having heater 154 in the side wall, and heater 154 is located at least at a lower side of ultrasonic mist device 200.

Ultrasonic mist device 200 has horn-shaped section 201 and cooling pin 205 (heat conduction material) for composing mist generation department 211. Ultrasonic mist device 200 includes horn-shaped ultrasonic oscillator 208 composed of mist generation department 211, electrodes 202, 204, and piezoelectric element 203, outer wall 207 for fixing and enclosing them, and atomizing port 209 for atomizing mist into the vegetable compartment having outer wall 207. Horn-shaped section 201, that is, the tip of the department mist formed in a convex shape from the bottom to the leading end by cutting process or sintering process. Leading end 201a of horn-shaped section 201 is processed in rectangular or circular shape, and its sectional surface ratio is about ⅕ or less, and the side sectional shape of horn-shaped section 201 depends on the oscillation frequency of piezoelectric element 203. Horn-shaped section 201, electrode 202, piezoelectric element 203, and electrode 204 are integrally formed in this order, and each component is adhered and fixed by an adhesive of epoxy or silicone compound, and the oscillation generated in piezoelectric element 203 is designed to reach the maximum amplitude at leading end 201a of horn-shaped section 201.

Piezoelectric element 203 and electrode 204 are formed in a cylindrical shape, not shown, and the central part is hollow. The cooling pin is formed in this hollow space, and is adhered and fixed to horn-shaped section 201.

The outer core of horn-shaped ultrasonic oscillator 208 is coated with silicone resin, epoxy resin, acrylic resin or the like (not shown).

Horn-shaped section 201 at the tip of the department mist is made of a material of high heat conduction, such as aluminum, titanium, stainless steel, or other metal. In particular, from the viewpoint of light weight, high heat conduction, and amplifying performance of amplitude in ultrasonic transmission, it is preferred to select a material mainly composed of aluminum. However, in consideration of the particular conditions of the refrigerator such as corrosion resistance and long service life, a material mainly composed of stainless steel such as SUS304 or SUS316L is desired because deterioration due to aging hardly occurs, and the reliability can be assured for a long period of time.

Atomizing port 209 has a rectangular or circular hole provided in a part of outer wall 207, and is provided in a mist-making direction of the liquid from mist generation department 211, that is, in outer wall 207 of the position opposite to leading end 201a of horn-shaped section 201.

Ultrasonic mist device 200 cools horn-shaped section 201 at the tip of the department mist provided in mist generation department 211 to lower than dew point temperature by the cooling unit. As a result, dew is condensed on horn-shaped section 201 from the moisture in the air in the mist generation department peripheral part, and the generated dew condensation water is atomized as mist from leading end 201a.

If a humid state continues due to frequent opening and closing of the door or the like, and dew condensation water is supplied into horn-shaped section 201 more than necessary, the water is discharged from humidity supplying port 138. This humidity supplying port 138 has a function of supplying humidity for feeding cold air into outer wall 207, and also has a function of drain hole for discharging the water collected in outer wall 207 to outside.

Thus, in the present invention, the both openings of atomizing port 209 and humidity supplying port 138 are provided in the surface other than the top surface of outer wall 207. Therefore, if the dew condensation water in the storage compartment collected in the upper part than outer wall 207 in the storage compartment in the refrigerator in the low temperature closed space drops into outer wall 207, since there is no opening in the top surface of outer wall 207, the water drop is prevented from falling into outer wall 207 from outside of outer wall 207, and a refrigerator of higher safety free from current leak or short-circuit can be presented.

Humidity supplying port 138 is provided in the lower part of outer wall 207, and the upper side of outer wall 207 is closed and not opened, and if dew is likely to condense in outer wall 207, the lower side of outer wall 207 is provided with a function of water draining hole, and is also provided with humidity supplying port 138 as an opening for flow of cold air, and formation of water scale or growth of bacteria or mold in outer wall 207 can be prevented.

The discharged dew condensation water flows along surface of rear-end partition 151 of rear partition 111, but the amount is very small, and the water is soon evaporated by convection in the vegetable compartment or the heater at the back side. At this time, since the wall is provided with heater 154 or the like, an ascending stream of air is likely to occur around rear partition 111 as compared with other side walls. Hence, mist generation department 211 is provided in this rear partition 111, and cold air of highest humidity flows in from humidity supplying port 138 provided at the lower side of outer wall 207 accommodating the mist generation department, and dew condensation may be promoted more effectively.

In the refrigerator having such configuration, the operation and actions are explained below.

The excessive steam in vegetable compartment 107 flows into cooling pin 205 in ultrasonic mist device 200 installed in a part of rear partition 111, and is cooled in the air duct from the freezer compartment in which the cold air of lower temperature than in the vegetable compartment is flowing. Since cooling pin 205 and horn-shaped section 201 are tightly bonded, horn-shaped section 201 at tip of the department mist is cooled by heat conduction, and the steam contained in the damp air in the vegetable compartment is lowered in temperature, and dew is condensed in horn-shaped section 201, and dew condensation water is generated, and deposits to leading end 201a.

In this state, power is supplied to the high voltage oscillating circuit, and a high voltage is oscillated at a specified frequency (for example, 80 kHz to 210 kHz), and is applied to electrode 202 and electrode 204. As a result, piezoelectric element 203 is oscillated, and capillary waves are generated on the surface of the supplied water depositing to leading end 210a of mist generation department 211. The water at the leading end is pulverized to fine particles of several micrometers to tens of micrometers, and atomized as mist in the oscillating direction. Fine particles of mist pass through atomizing port 209, and larger particles of mist generated from other parts than leading end 201a of horn-shaped section 201 collide against the outer peripheral wall of rectangular or circular atomizing port 209. That is, this mist is not atomized into the storage compartment, but remains in the case, and relatively small particles of mist are sorted, and only fine mist is atomized into the storage compartment, that is, vegetable compartment 107.

When ultrasonic mist device 200 is operated intermittently for a specific period, for example, at intervals of 1 minute of ON and 9 minutes of OFF, the mist generation amount is adjusted, and the mist is atomized into vegetable compartment 107, so that vegetable compartment 107 may be humidified quickly. As a result, vegetable compartment 107 heightened in humidity, and transpiration from vegetables can be suppressed. At the same time, the oscillation generated in piezoelectric element 203 is concentrated in energy so as to reach the maximum amplitude at leading end 201a of horn-shaped section 201, and piezoelectric element 203 is suppressed at low heat generation of about 1 W to 2 W, and temperature effects on vegetable compartment 107 can be lessened.

In the refrigerator designed to be operated continuously for an average period of about 10 years, it is needed to avoid deterioration of the coating material of piezoelectric element 203. It is hence preferred to select a coating material mainly composed of silicone resin which is less deteriorated by repeated oscillations because of excellent flexibility from the viewpoint of amplifying performance of oscillation in ultrasonic transmission. By preventing invasion of liquid and steam into coupling parts with horn-shaped section 201, electrode 202, piezoelectric element 203, and electrode 204, and by preventing deterioration of the adhesive, it contributes to enhancement of service life and reliability, and it is possible to withstand the actual load when incorporated into the refrigerator.

The gap between outer wall 207 and horn type ultrasonic oscillator may be filled with a packing material (not shown) for preventing water leak or preventing resonance. As a result, invasion of liquid or steam can be prevented more securely, and the noise can be also suppressed. Specifically, by using a packing material of fluorine compound, the service life and reliability will be enhanced.

Thus, the preferred embodiment includes the vegetable compartment which is thermally partition and exposed to a relatively high humidity environment, and the horn type ultrasonic mist device for atomizing liquid into the vegetable compartment, and a cooling pin is installed in a horn-shaped section for generated dew condensation water at the leading end of the horn, and dew is condensed at the leading end, and it is directly atomized, so that the quality may be maintained in the vegetable compartment.

In the preferred embodiment, the liquid to be atomized is not particularly specified, as far as containing metal ions having bactericidal power or deodorizing power, such as zinc ion water, silver ion water, or copper ion water. As a result, microorganisms formed in the storage compartment may be suppressed.

In the preferred embodiment, the shape of heat insulator 152 having cooling pin 205 is as shown in FIG. 12. However, similar effects are obtained if the shape of the portion of location of cooling pin 205 is as explained above in preferred embodiments 1 to 7.

In the preferred embodiment, the mist maker is ultrasonic mist device 200, but it may be also replaced by the electrostatic atomizing device explained in preferred embodiments 1 to 7, or other mist makers such as ejector type, and any other mist makers may be used as far as mist is atomized by using the water condensed from the moisture in the air, and the technical concept of the foregoing preferred embodiments may be similarly applied.

Preferred Embodiment 9

Figure 13:
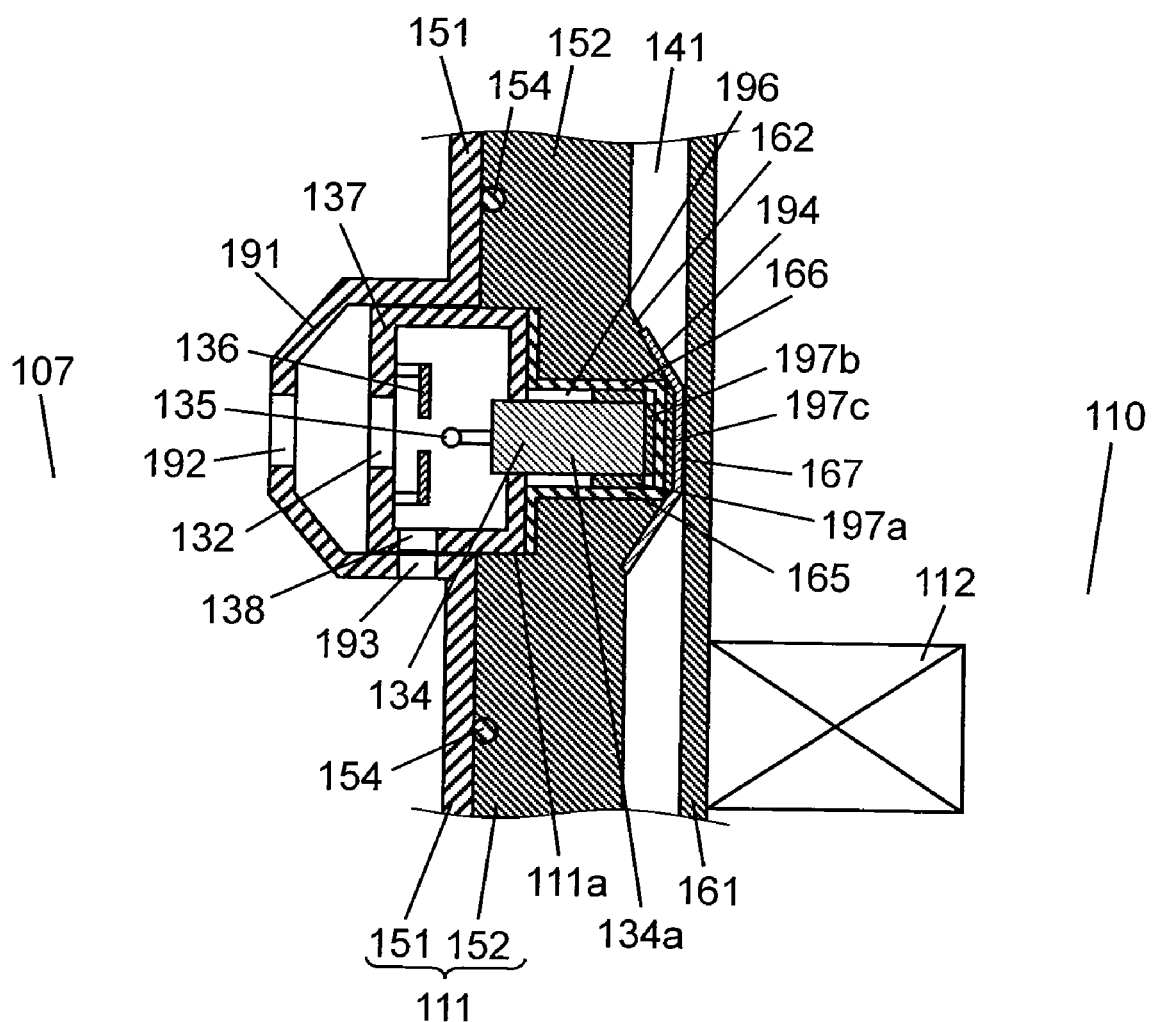
FIG. 13 shows a sectional view cut along line A-A in FIG. 2, and the sectional view illustrates an electrostatic atomizing device and its periphery provided to a vegetable compartment of a refrigerator in accordance with a ninth embodiment of the present invention.

A longitudinal sectional view showing a section where the refrigerator of preferred embodiment 9 of the present invention is divided and parted into right and left sections is nearly same as FIG. 1. A front view of essential parts showing the inner side of the vegetable compartment of the refrigerator in preferred embodiment 9 of the present invention is same as FIG. 2. FIG. 13 shows a sectional view cut along line A-A in FIG. 2 as seen from the arrow direction of the cut-section, illustrating an electrostatic atomizing device and its periphery provided in the vegetable compartment of the refrigerator in preferred embodiment 9 of the present invention.

In this preferred embodiment, only the portions different from the configuration specifically described in preferred embodiments 1 to 8 are explained, and the portions similar to the configuration specifically described in preferred embodiments 1 to 8 or applicable to the same technical concept are omitted in explanation.

In the drawing, a recess and through-section 165 are provided in a part of the wall at the inside of storage compartment (vegetable compartment 107) of rear partition 111, and electrostatic atomizing device 131 installed in this position.

Surface of rear-end partition 151 having electrostatic atomizing device 131 has protrusion 191, and electrostatic atomizing device 131 is enclosed between protrusion 191 of the surface of rear-end partition and heat insulator 152.

Protrusion 191 of the surface of rear-end partition is provided with atomizing port 192 on the extension from atomizing port 132 provided in electrostatic atomizing device 131. Similarly, humidity supplying port 193 is provided near humidity supplying port 138 formed in a part of outlet wall 137 of electrostatic atomizing device 131.

Through-section 165 having cooling pin 134, if a thin wall portion of about 2 mm is provided by molding of foamed styrol or the like, is lowered in the rigidity of the heat insulating wall, and defects such as crack or hole may be formed due to lack of strength or defective molding, and the quality may deteriorate.

In the preferred embodiment, therefore, heat insulator 152 of rear partition 111 near through-hole 165 having cooling pin 134 is provided with protrusion 162 projecting into outlet air-duct 141 for freezer compartment. As result, as compared with a flat plane at the side of cooling pin 134 in outlet air-duct 141 for freezer compartment without forming protrusion 162 on outlet air-duct 141 for freezer compartment, the rigidity is heightened around through-section 165, and the wall thickness of heat insulator 152 is assured, and the rigidity is further heightened. By protrusion 162, moreover, cooling pin 134 can be cooled from both the lateral side and the back side.

In order to suppress the increase of air duct resistance, the outer circumference of protrusion 162 is formed in a conical slope so as to be thinner as going toward the leading end At this time, if cooling pin 134 is directly placed in the air duct (outlet air-duct 141 for freezer compartment), cooling may be excessive, and the dew condensation amount of atomizing electrode 135 may be excessive, or even freezing may be caused.

Accordingly, through-section 165 is formed in the heat insulator near the back side of cooling pin 134, and cooling pin 134 is inserted into this position, and it is surrounded by heat conducting pin cover 166 made of PS, PP or other resin material having both heat insulating property and water-proof property, so that the heat insulation is assured. Heat conducting pin cover 166 may be also made of a heat-resistance insulation tape or the like.

Although not shown in the drawing, when a buffer material may be provided between through-section 165 and heat conducting pin cover 166, and the sealing property is assured, it is more effective to prevent invasion of cold air from outlet air-duct 141 for freezer compartment into the periphery of cooling pin 134, and the cold air does not flow into the storage compartment, and over-cooling or freezing in the storage compartment may be effectively prevented.

Cooling pin 134 is fixed in outlet wall 137, and cooling pin 134 itself has protrusion 134a projecting from the outside. This cooling pin 134 has protrusion 134a at the reverse side of atomizing electrode 135. Protrusion 134a is smaller than recess 111a of heat insulator 152 of rear partition 111, and is fitted into the recess formed in through-section 165. Opening 167 at the side of outlet air-duct 141 for freezer compartment of through-section 165 is closed with tape (cool air shutout member) 194 such as aluminum tape by adhering to heat insulator 152, and the cool air is shut off.

Tape 194 adhered to opening 167 may also contact with partition 161, so that tape 194 may not be peeled off easily. From cooling compartment 110, cold heat is transmitted through partition 161 from back side 134b of cooling pin 134.

However, due to some dimensional error, void 196 may be present somewhat between cooling pin 134 and heat conducting pin cover 166. Because of such void 196, this portion becomes an air layer, and is adiabatic, and cooling of cooling pin 134 may be impaired. Hence, void 196 is filled up with void burying members 197a, 197b, 197c of heat conduction holding member such as butyl or heat diffusion compound. That is, these void burying members 197a, 197b, 197c are buried between cooling pin 134 and heat conducting pin cover 166, or between heat conducting pin cover 166 and tape 184.

In refrigerator 100 of the preferred embodiment having such configuration, the operation and actions are explained below.

Cooling pin 134 is cooled by way of heat conducting pin cover 166, and atomizing electrode 135 is cooled indirectly by way of cooling pin 134, and it is also cooled indirectly in a dual structure by way of heat conducting pin cover 166 of heat cushioning material. At this time, voids 196 are filled with void burying members 197a, 197b, 197c such as butyl or heat diffusion compound between cooling pin 134 and heat conducting pin cover 166, or between heat conducting pin cover 166 and tape 194.

As a result, between cooling pin 134 and heat conducting pin cover 166, or between heat conducting pin cover 166 and tape 194, if there is possibility of forming of void 196 due to processing precision, heat conduction from tape 194 to heat conducting pin cover 166, and from heat conducting pin cover 166 to cooling pin 134 can be assured.

That is, if void 196 is formed, the heat conductivity is poor in this space, and cooling pin 134 may not be cooled sufficiently, and the temperature of cooling pin 134 or the temperature of atomizing electrode 135 may fluctuate, and dew condensation at the leading end of the atomizing electrode may be disturbed. However, according to the preferred embodiment, since void 196 is filled up with void burying members 197a, 197b, 197c such as butyl or heat diffusion compound, heat conduction from tape 194 to heat conducting pin cover 166, and from heat conducting pin cover 166 to cooling pin is maintained, and the cooling capacity of atomizing electrode 135 is assured.

Cooling pin 134 can be cooled both from the side of cooling pin 134 by using the cold air generated in cooling compartment 110 by way of heat insulator 152 from outlet air-duct 141 for freezer compartment, and from back side 134b of cooling pin 134 by heat conduction through partition 161 of cooling compartment 110 and tape 194.

Thus, in the preferred embodiment, heat insulator 152 near through-section 165 is provided with protrusion 162 projecting into outlet air-duct 141 for freezer compartment. Therefore, if the rigidity is heightened around through-section 165, cooling pin 134 can be cooled from both the lateral side and the back side. As a result, the surface area for heat conduction can be increased, and without lowering the cooling efficiency of cooling pin 134 of heat conduction material, the rigidity can be increased around cooling pin 134.

Besides, the outer circumference of protrusion 162 is formed in a conical slope becoming thinner as going toward the leading end. As a result, the cold air flows while crawling along the outer circumference of protrusion 162 having a curved surface to the cold air flowing direction, and increase of air duct resistance is suppressed. Further, cooling pin 134 can be cooled uniformly from the outer circumference of the side wall. Therefore, cooling pin 134 is cooled uniformly, and atomizing electrode 135 can be cooled efficiently by way of cooling pin 134.

As a penetration hole, through-section 165 is formed in only a part of the back side of cooling pin 134 of heat insulator 152, and thin wall portion is not provided, and the foamed styrol can be molded easily, and there is no problem of breakage in the assembling process.

There is no gap between heat conducting pin cover 166 and through-section 165, and opening 167 of through-section 165 is sealed with tape 195 to shut off invasion of cold air from the adjacent cooling air duct. Therefore low-temperature air does not leak into the compartment, and dew condensation or low temperature abnormality will not occur in storage compartment (vegetable compartment 107) or peripheral parts.

Heat conduction deterioration due to void formed between heat conducting pin cover 166 and cooling pin 134 inevitable owing to the processing precision or assembling precision can be avoided by filling void 196 with butyl or other heat conduction material, and the heat conductivity is maintained and the cooling capacity is assured. Void 196 formed between tape 194 and heat conducting pin cover 166 can be similarly filled up.

By dew condensation on atomizing electrode 135 by these cooling effects, high voltage discharge occurs between opposite electrode 136 and atomizing electrode 135, and the generated fine mist passes through atomizing port 132 formed in outlet wall 137 of electrostatic atomizing device 131, and is atomized into vegetable compartment 107 from atomizing port 192 provided in surface of rear-end partition 151. Since the atomized mist is very small in particle size, the diffusion is strong, and the fine mist reaches all parts of vegetable compartment 107. The atomized fine mist is generated by high voltage discharge, and is charged negatively. Vegetable compartment 107 contains positively charged vegetables and fruit. Therefore, the atomized mist is likely to deposit on the surface of vegetables, and the freshness may be enhanced.

In the event of abnormal dew condensation occurring in atomizing electrode 135, since humidity supplying port 138 is opened in a lower part of atomizing electrode 135, and humidity supplying port 193 is formed on its extension in surface of rear-end partition 151, water is collected in mist generation department 139, and abnormality will not occur.

Thus, in the preferred embodiment, in the configuration of cooling pin 134 at protrusion 134a of mist generation department 139, through-section 165 is formed in heat insulator 152, and cooling pin 134 is inserted in this position, and heat conducting pin cover 166 is provided in the periphery. Void 196 between heat conducting pin cover 166 and cooling pin 134, or void 196 between tape 194 adhered to opening 167 of through-section 165 and cooling pin 134 is filled up with void burying members. Hence, these voids 196 are eliminated, and heat conduction from cooling air duct or cooling compartment 110 can be assured.

Tape 194 adhered to opening 167 of through-section 165 is pressed by partition 161 for separating cooling compartment 110 and outlet air-duct 141 for freezer compartment, and its peeling is prevented, and the stability of quality is maintained. Cooling capacity by heat conduction to atomizing electrode 135 and cooling pin 134 can be also assured.

In the preferred embodiment, a buffer material may be provided in the periphery of cooling pin 134. As a result, the gap between through-section 165 and heat conducting pin cover 166 can be narrowed, and escape of cold air can be prevented.

In the preferred embodiment, the air duct for cooling of cooling pin 134 of heat conduction material is outlet air-duct 141 for freezer compartment, but the same role may be played by other low-temperature air passage such as discharging air duct of icemaker 106, or return air passage of freezer compartment 108. As a result, the possible location for installing electrostatic atomizing device 131 is extended.

In the preferred embodiment, the cooling section for cooling of cooling pin 134 of heat conduction material is the cold air cooled by using the cooling source generated in the freezing cycle of refrigerator 100. But it may be also possible to use the heat conduction from the cooling tube making use of cold air or low temperature from the cooling source of refrigerator 100. As a result, by adjusting the temperature of the cooling tube, cooling pin 134 of heat conduction material may be cooled to a desired temperature, and it is easy to manage the temperature when cooling atomizing electrode 135 of the tip of the department mist.

Preferred Embodiment 10

Figure 14:
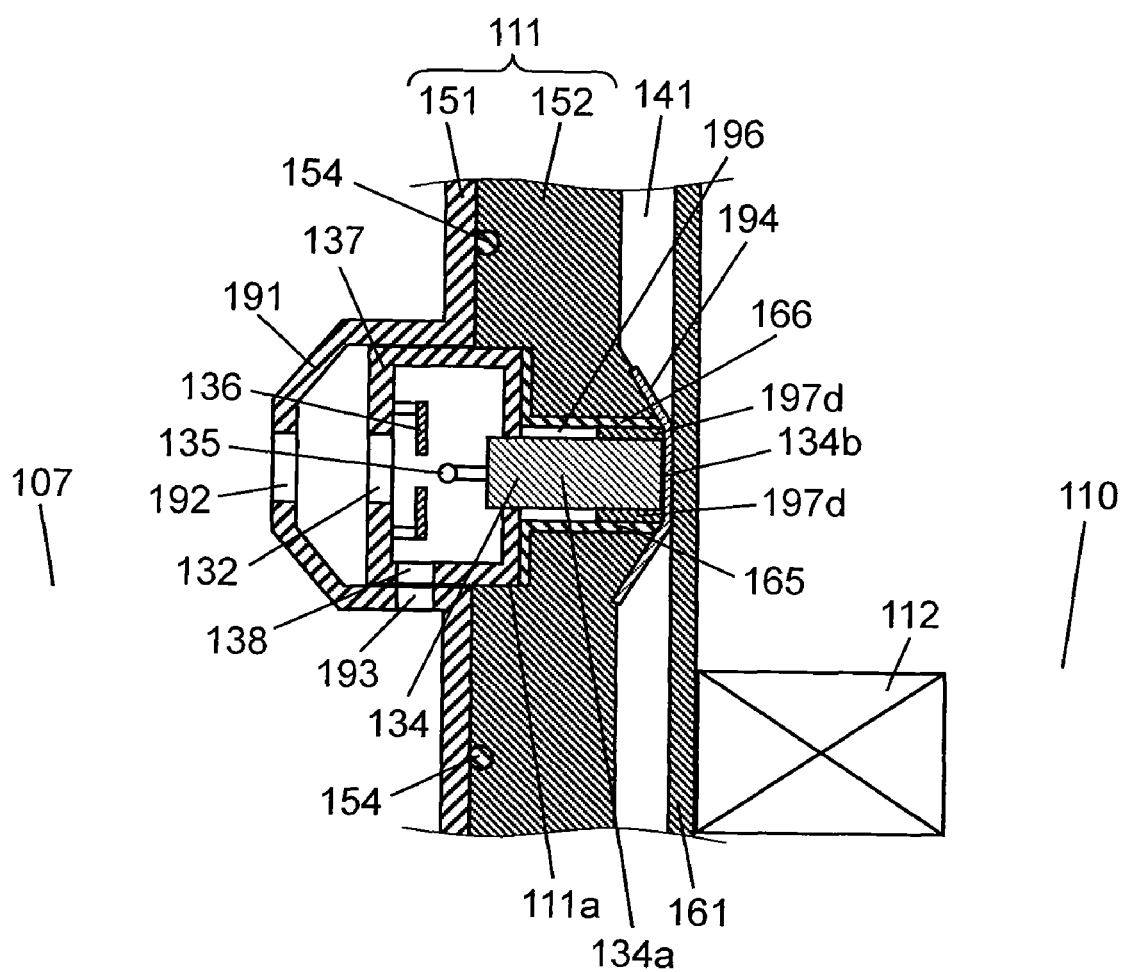
FIG. 14 shows a sectional view cut along line A-A in FIG. 2, and the sectional view illustrates an electrostatic atomizing device and its periphery provided to a vegetable compartment of a refrigerator in accordance with a tenth embodiment of the present invention.

A longitudinal sectional view showing a section where the refrigerator of preferred embodiment 10 of the present invention is divided and parted into right and left sections is nearly same as FIG. 1. A front view of essential parts showing the inner side of the vegetable compartment of the refrigerator in preferred embodiment 10 of the present invention is same as FIG. 2. FIG. 14 shows a sectional view cut along line A-A in FIG. 2 as seen from the arrow direction of the cut-section, illustrating an electrostatic atomizing device and its periphery provided in the vegetable compartment of the refrigerator in preferred embodiment 10 of the present invention.

In this preferred embodiment, only the portions different from the configuration specifically described in preferred embodiments 1 to 9 are explained, and the portions similar to the configuration specifically described in preferred embodiments 1 to 9 or applicable to the same technical concept are omitted in explanation.

In the drawing, through-section 165 is provided in a part of the wall at the inside of vegetable compartment 107 of rear partition 111, and electrostatic atomizing device 131 installed in this position.

Surface of rear-end partition 151 having electrostatic atomizing device 131 has protrusion 191, and electrostatic atomizing device 131 is enclosed between protrusion 191 of the surface of rear-end partition 151 and heat insulator 152.

Cooling pin 134 of electrostatic atomizing device 131 surrounded by heat conducting pin cover 166 made of PS, PP or other resin material having both heat insulating property and water-proof property, and is fitted into through-section 165 of heat insulator 152.

At this time, heat conducting pin cover 166 is fitted tightly to heat insulator 152 in the periphery, and when water deposits on cooling pin 134, the water is prevented from sticking to heat insulator 152, thereby avoiding permeation, freezing and breaking in the inside of the heat insulator.

However, end portion 134b of cooling pin 134 is formed in a cylindrical shape in heat conducting pin cover 166 to assure the cooling capacity from the back side, and only end portion 134b of cooling pin 134 is opened. Opening 167 of through-section 165 is sealed with tape 194 such as aluminum tape adhered to heat insulator 152, and cold air is shut off.

Herein, end portion 134b of cooling pin 134 is adhered to tape 194, and the heat conductivity is maintained.

Heat conducting pin cover 166 may be an insulating tape having heat insulation.

However, due to some dimensional error, void 196 may be present somewhat between cooling pin 134 and heat conducting pin cover 166. Hence, void 196 is filled up with void burying member 197d such as butyl or heat diffusion compound relatively excellent in heat conduction, and such heat conduction holding member is buried between cooling pin 134 and heat conducting pin cover 166.

In refrigerator 100 of the preferred embodiment having such configuration, the operation and actions are explained below.

Cooling pin 134 is cooled by way of a cooling air duct, or partition 161 for separating cooling compartment 110, tape 194, or void burying member 197d, or from the heat insulator at the side of cooling pin 134. When cooled indirectly in a dual structure by way of tape 194, between heat conducting pin cover 166 and tape 194, void 196 may be formed due to processing precision. If void 196 is formed, the heat conduction is very poor in this space, and cooling pin 134 may not be cooled sufficiently, and the temperature of cooling pin 134 or the temperature of atomizing electrode 135 may fluctuate, and dew condensation at the leading end of the atomizing electrode may be disturbed.

To prevent this, when assembling, tape 194 and cooling ping 134 must be connected tightly. Considering a possibility of forming void, it is required to fill up void 196 with heat conduction holding member such as butyl or heat diffusion compound as void burying member 197d. Thus, heat conduction from tape 194 to cooling pin 134 is maintained, and the cooling capacity of atomizing electrode 135 is assured.

There is no void between heat conducting pin cover 166 and through-section 165, and opening 167 of through-section 165 is sealed with tape 194, and invasion of cold air from the adjacent cooling air duct is shut off, and low-temperature air does not leak into the compartment. Hence, dew condensation or low temperature abnormality will not occur in vegetable compartment 107 or peripheral parts.

Heat conduction deterioration due to void formed between heat conducting pin cover 166 and cooling pin 134 inevitable owing to the processing precision or assembling precision can be avoided by filling void 196 with butyl or other heat conduction material. Hence, the heat conductivity is maintained and the cooling capacity is assured. Void 196 formed between tape 194 and cooling pin 134 can be similarly filled up with butyl or other heat conduction material applied in void 196.

Since heat conducting pin cover 166 and through-section 165 are formed without allowing gap, and the heat insulator made of foamed styrol is prevented from containing water. Therefore, heat insulator 152 is free from permeation of water, freezing of permeation area, or cracking or breaking of the area due to water volume expansion and stress, and hence the quality is assured.

Opening 167 of through-section 165 is sealed with tape 194 to shut off invasion of cold air from the adjacent cooling air duct, low-temperature air does not leak into the compartment. Therefore, vegetable compartment 107 and its peripheral parts are free from dew condensation or low-temperature abnormality.

By dew condensation on atomizing electrode 135 by these cooling effects, high voltage discharge occurs between opposite electrode 136 and atomizing electrode 135, and a fine mist is generated. The fine mist passes through atomizing port 132 formed in outlet wall 137 of electrostatic atomizing device 131, and is atomized into vegetable compartment 107 from atomizing port 192 provided in surface of rear-end partition 151. Since the atomized mist is very small in particle size, the diffusion is strong, and the fine mist reaches all parts in vegetable compartment 107. The atomized fine mist is generated by high voltage discharge, and is charged negatively. Vegetable compartment 107 contains positively charged vegetables and fruit, and the atomized mist is likely to deposit on the surface of vegetables, and the freshness may be enhanced.

In the event of abnormal dew condensation occurring in atomizing electrode 135, since humidity supplying port 138 is opened in a lower part of atomizing electrode 135, and humidity supplying port 193 is formed also on its extension in surface of rear-end partition, water is collected in mist generation department 139, and abnormality will not occur.

Thus, in the preferred embodiment, in the configuration of heat conducting pin cover 166 of cooling pin 134 at protrusion 134a of mist generation department 139, when through-section 165 of heat insulator 152 is inserted into cooling pin 134, heat conducting pin cover 166 is provided in the periphery of cooling pin 134, and it is very tightly into through-section 165. The end portion 134b side of cooling pin 134 of heat conducting pin cover 166 is opened, and the void between the tape adhered to opening 167 of through-section 165 and cooling pin 134 is filled up with a heat conducting pin. Hence, these voids are eliminated, and heat conduction from the cooling air duct or the cooling compartment can be assured.

Hence, the cooling capacity by heat conduction to the atomizing electrode and the cooling pin can be assured.

The tape adhered to opening 167 of through-section 165 is pressed by partition 161 for separating cooling compartment 110 and outlet air-duct 141 for freezer compartment, and its peeling is prevented, and the stability of quality is maintained.

Since heat conducting pin cover 166 is pressed and fixed in through-section 165, invasion of water into heat insulator 152 made of foamed styrol is prevented, and cracking and breaking of the heat insulator can be prevented.

A buffer material may be provided in the periphery of cooling pin 134. As a result, the gap between through-section 165 and heat conducting pin cover 166 can be narrowed, and escape of cold air can be prevented.

The foregoing explanation is about configuration of atomizing mist into the storage compartment from the mist generation department in a simple structure by cooling the mist generation department indirectly by the cooling section by way of the heat conduction material. In this configuration, however, the mist atomizing may not be supplied stably, and water sump may be formed in the compartment due to excessive atomizing. In particular, in a refrigerator having a narrow sealed space, the water may be collected or frozen by small temperature changes, and adjustment of atomizing amount may be required. Corresponding to the individual foregoing embodiments, the configuration for adjusting the atomizing amount stably is explained below.

Preferred Embodiment 11

Figure 15:
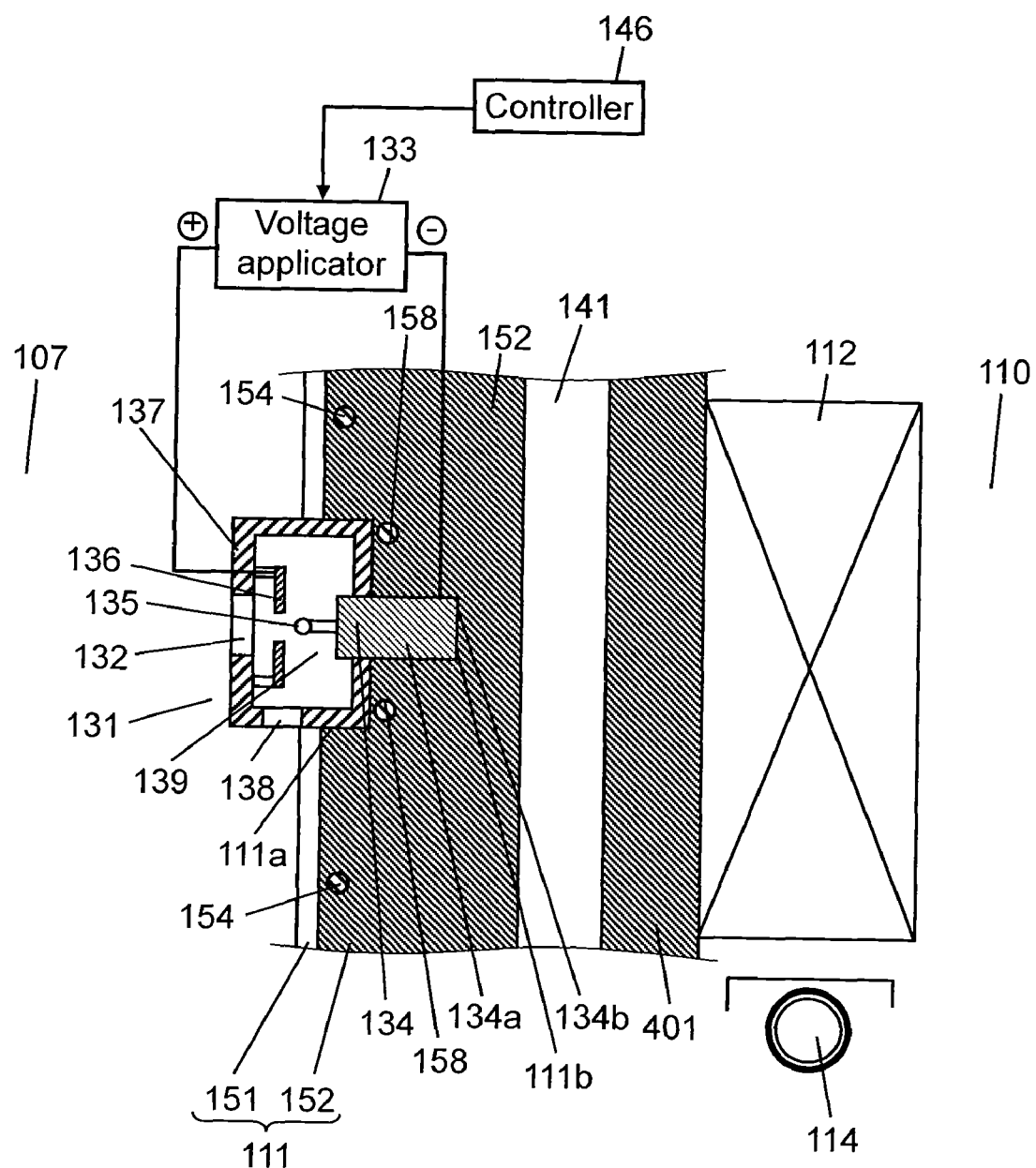
FIG. 15 shows a sectional view cut along line A-A in FIG. 2, and the sectional view details an electrostatic atomizing device and its periphery in accordance with an eleventh embodiment of the present invention.

FIG. 15 shows a sectional view cut along line A-A in FIG. 2 as seen from arrow direction of the cut-section, illustrating an electrostatic atomizing device and its periphery provided in the vegetable compartment of the refrigerator in preferred embodiment 11 of the present invention. In the preferred embodiment, in the refrigerator in preferred embodiment 1, instead of the electrostatic atomizing device shown in FIG. 3, the electrostatic atomizing device shown in FIG. 15 is used.

In this preferred embodiment, only the portions different from the configuration specifically described in preferred embodiments 1 to 10 are explained, and the portions similar to the configuration specifically described in preferred embodiments 1 to 10 or applicable to the same technical concept are omitted in explanation.

In the electrostatic atomizing device shown in FIG. 15, same as explained in preferred embodiment 1, heater 154 such as partition heater is provided between surface of rear-end partition 151 fixing electrostatic atomizing device 131 and heat insulator 152, as means for regulating the temperature in the storage compartment or preventing dew condensation on the surface. Further, as means for regulating the temperature of cooling pin 134 of heat conduction material provided in electrostatic atomizing device 131, and preventing excessive dew condensation in the peripheral parts including atomizing electrode 135 at the tip of the department mist, heat conducting pin heater 158 is provide near mist generation department 139.

The heat conduction material of the preferred embodiment, that is, cooling pin 134 has protrusion 134a at the opposite side of the atomizing electrode, and end portion 134b at the protrusion 134a side of the mist generation department is closest to the cooling section. Hence, cooling pin 134 is cooled from the end portion 134b side remotest from atomizing electrode 135 by the adjusting section.

As a heat cushioning material, heat insulator 152 covers at least the cooling section side of cooling pin 134, but preferably the entire surface of protrusion 134a of the cooling pin should be covered. In this case, heat invasion from a lateral direction orthogonal to the longitudinal direction of cooling pin 134 is decreased, and heat is conducted in the longitudinal direction from the end portion 134b side of the protrusion 134a side. Hence, cooling pin 134 is cooled from the end portion 134b side remotest from atomizing electrode 135 by the adjusting section.

Figure 16:
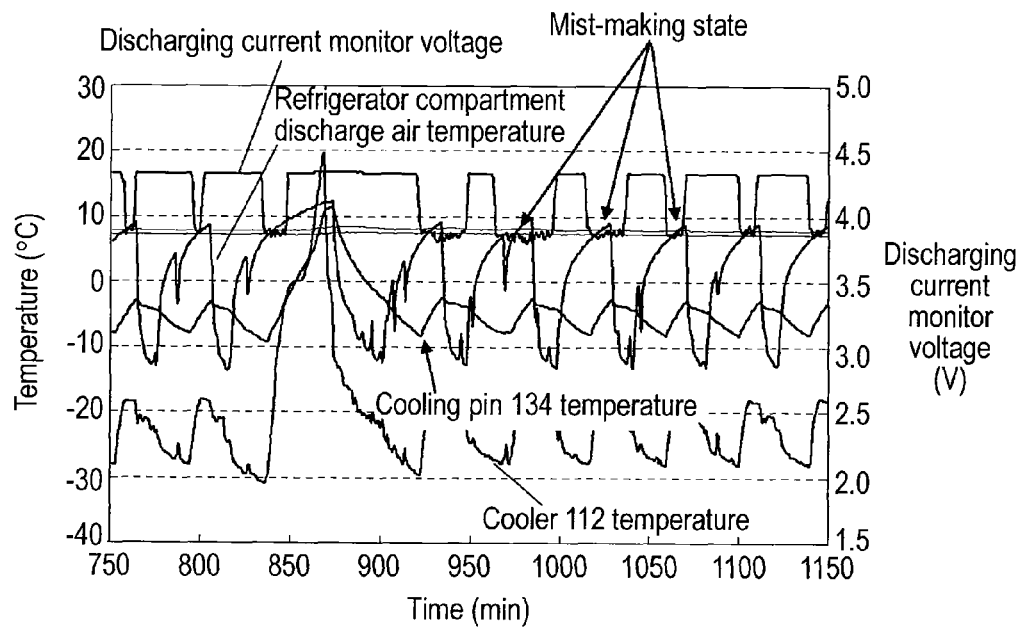
FIG. 16 shows the performance of an atomizing electrode depending on temperatures and voltage values which monitor a discharge current, where the voltage values indicate a misted status in accordance with the eleventh embodiment.
Figure 17:
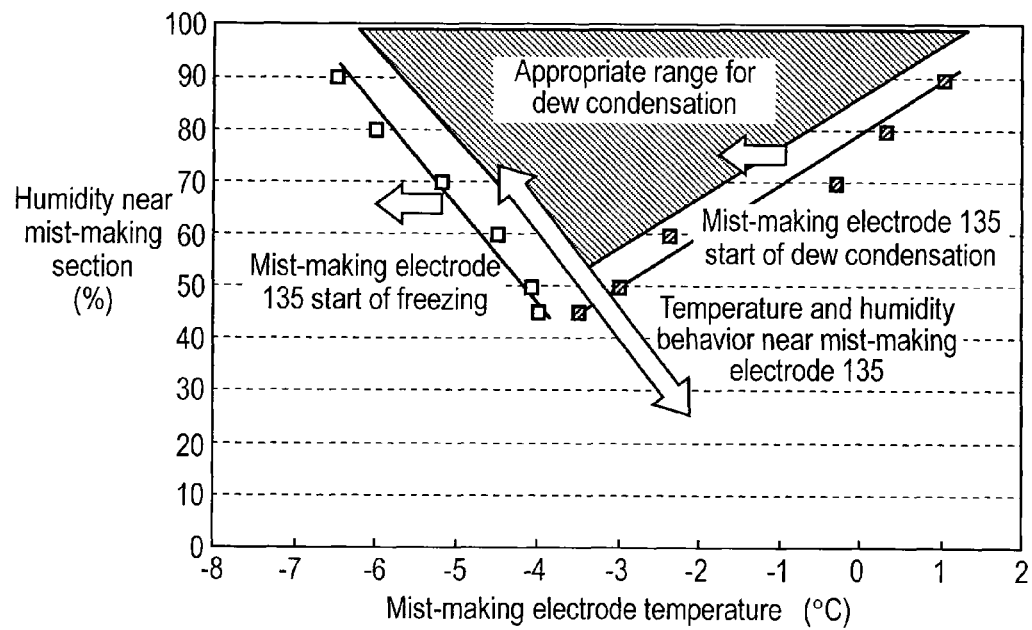
FIG. 17 shows an experiment result indicating a proper range of dew formation, where the proper range is found based on the correlation between the temperature of the atomizing electrode and the humidity around the atomizing electrode in accordance with the eleventh embodiment.
Figure 18:
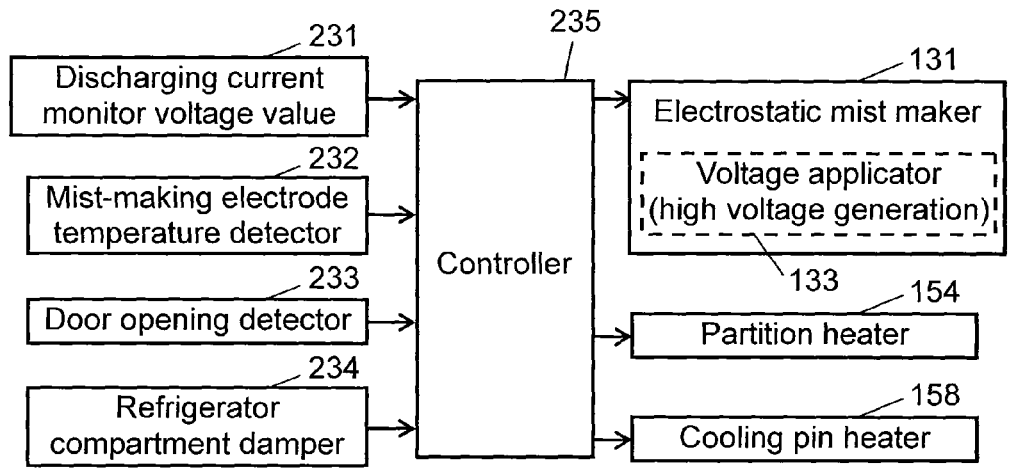
FIG. 18 shows an instance of a functional diagram in accordance with the eleventh embodiment.
Figure 19:
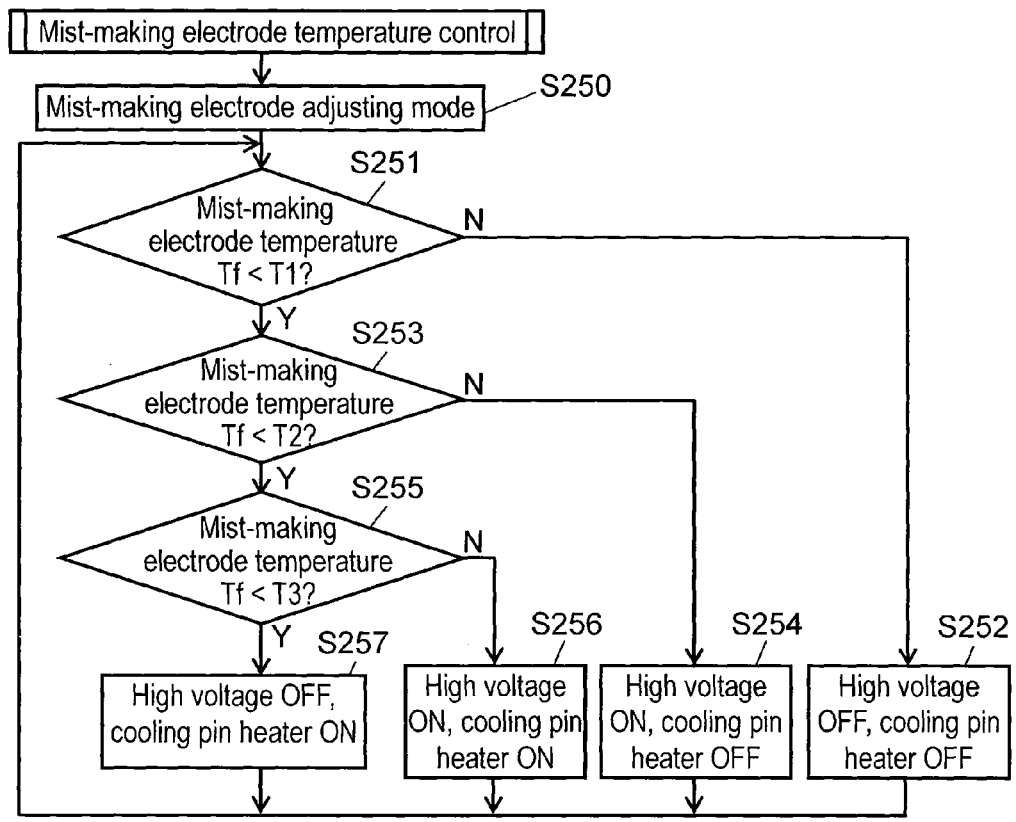
FIG. 19 shows an instance of a control flowchart in accordance with the eleventh embodiment.

In such configuration, the operation for adjusting the water quantity at the leading end of the atomizing electrode is explained by referring to FIG. 16 and FIG. 17.

In FIG. 16, the axis of abscissas denotes the time, and the axis of ordinates represents the discharge current monitor voltage value. The discharge current monitor voltage value is set and issued so that the voltage value may be lowered every time a current flows between the electrodes, that is, on every occasion of occurrence of discharge phenomenon and generation of fine mist.

In refrigerator 100, when the temperature of evaporator 112 begins to decline, that is, when the operation of the freezing cycle starts, cooling of vegetable compartment 107 is also started. As a result, a cold air begins to flow into vegetable compartment 107, and it is set in a dry state, and atomizing electrode 135 also tends to be dry.

Next, when the refrigerator compartment damper (not shown) is closed, the discharge air temperature in the refrigerator compartment rises, and the temperature and humidity in refrigerator compartment 104 and vegetable compartment 107 are elevated. At this time, the freezer compartment discharged cold air temperature is gradually lowered, and cooling pin 134 is further cooled, and atomizing electrode 135 of mist generation department 139 installed in vegetable compartment 107 changed to high humidity environment is more like to condense dew. Liquid drops are grown at the leading end of atomizing electrode 135, and when the distance between the liquid drop leading end and opposite electrode 136 reaches a specific distance, the air insulation layer is broken, and discharge phenomenon start, and a fine mist is atomized from the leading end of atomizing electrode 135. At this time, a small current flows between the electrodes, and the discharge current monitor voltage value declines as shown in the waveform in the diagram. Later, compressor 109 is stopped, and cooling fan 113 is stopped, and although the temperature of cooling pin 134 rises, the atmosphere of mist generation department 139 continues to be high in humidity, and mist-making continues.

However, when defrosting, that is, when melting and removing frost and ice depositing on evaporator 112, the temperature of evaporator 112 exceeds 0° C. At this time, the temperature of the discharging air duct from the freezer compartment at the back side of the electrostatic atomizing device is also elevated, and along with this temperature rise, cooling pin 134 is also raised in temperature, and the temperature of atomizing electrode 135 also hikes, and the dew condensation water depositing on the leading end is evaporated, and the atomizing electrode is dried.

The defrosting heater is designed to be turned off when the temperature of the evaporator rises to a certain extent. Accordingly, the temperature of the electrode or the heat conduction material is not raised excessively, and the temperature rise of the electrode or the heat conduction material is controlled within an appropriate range.

In the preferred embodiment, the heating section is provided with not only the defrosting heater but also with heat conducting pin heater 158, but without using heat conducting pin heater 158, the heating section of the adjusting section may be formed only of the defrosting heater. Hence, if excessive dew condensation occurs, by adjusting with the timing of defrosting of the evaporator in this manner, the atomizing electrode at the tip of the department mist can be heated by way of the heat conduction material. Therefore, without requiring any particular configuration, excessive water drops may be removed easily. Without using any particular motor as the adjusting section, by using the defrosting heater provided in the freezing cycle, any particular device or power supply is not needed. Thus, mist atomizing is realized while saving material and saving energy. Also applicable to defrosting of the evaporator, the reliability is further enhanced.

Considering a state of practical use of refrigerator 100, depending on the operating environment, frequency of opening and closing of door, or food storage state, the humidity state or humidifying amount of vegetable compartment 107 varies, and the amount of dew condensation on atomizing electrode 135 at the tip of the department mist may become excessive. In a worst case, liquid drops may increase so much as to cover the entire surface of atomizing electrode 135, the electrostatic power by discharge may not overcome the surface tension, and mist may not be formed. Therefore, when the refrigerator compartment damper is opened, in addition to dehumidifying effect by cold air, by supplying power to heat conducting pin heater 158 in the heating section, the atomizing electrode 135 is heated. As a result, evaporation of depositing water drops is promoted, and excessive defrosting is prevented, and the mist can be made continuously and stably. Due to excessive dew condensation, it is possible to prevent growth of liquid drops or deterioration of quality due to water dripping from rear partition 111 or the like.

In this manner, atomizing electrode 135 utilizes the freezing cycle of refrigerator 100, and repeats dew condensation and drying as shown in FIG. 17, and atomizes mist continuously. As a result, by adjusting the amount of water at the tip of the department mist, continuous mist-making is realized while preventing excessive dew condensation.

Thus, without cooling or heating atomizing electrode 135 directly, the temperature of atomizing electrode 135 can be regulated indirectly by cooling or heating cooling pin 134 of heat conduction material. Since heat conduction material 134 has a larger thermal capacity than atomizing electrode 135, direct effects of temperature changes of the regulating section on the atomizing electrode can be lessened, and the temperature of the atomizing electrode can be regulated. Therefore, suppressing load fluctuations of the atomizing electrode, mist atomizing of a stable atomizing amount is realized.

Opposite electrode 136 is provided at a position opposite to atomizing electrode 135, and voltage applicator 133 for generating a high voltage potential difference between atomizing electrode 135 and opposite electrode 136 is provided, and a stable electric field can be built near atomizing electrode 135, and the pulverizing phenomenon and the atomizing direction are determined, and the precision of fine mist to be atomized into the storage container is enhanced, and the precision of mist generation department 139 is improved, and electrostatic atomizing device 131 of high reliability is presented.

Cooling pin 134 of heat conduction material is cooled or heated by way of a heat cushioning material, and atomizing electrode 135 is indirectly changed in temperature by cooling pin 134, and also changed in temperature indirectly in a dual structure by way of heat insulator 152 of heat cushioning material, and hence extreme cooling of heating of atomizing electrode 135 may be avoided. If atomizing electrode 135 is cooled extremely, the dew condensation amount increases, and due to increase in the load to mist generation department 139, increase of input to electrostatic atomizing device 131 or defective mist making in mist generation department 139 may be feared, but such defects due to increase of load to mist generation department 139 may be prevented, and an appropriate dew condensation amount may be assured, and a stable mist atomizing at low input may be realized.

Or if atomizing electrode 135 is heated extremely, the temperature of the voltage applicator or storage compartment around the mist generation department may elevate suddenly, and troubles due to breakage of electrical parts or cooling failure due to temperature rise of the contained vegetables may occur. However, such defects due to temperature rise of mist generation department 139 can be prevented, and an appropriate dew condensation amount may be assured, and a stable mist atomizing at low input may be realized.

Moreover, by regulating temperature of atomizing electrode 135 indirectly in a dual structure by way of heat conduction material and heat cushioning material, direct effects of temperature changes of the regulating section on the atomizing electrode can be further lessened, and load fluctuations of the atomizing electrode can be suppressed, and mist atomizing of a stable atomizing amount is realized.

For temperature regulation of cooling pin 134 of heat conduction material, cold air generated in cooling compartment 110 is used, and since cooling pin 134 is formed of a metal piece of excellent heat conduction, the temperature regulating section is capable of cooling as required only by heat conduction from the air duct of flow of cold air generated in evaporator 112.

At this time, cooling pin 134 of heat conduction material of the preferred embodiment is formed in a shape having protrusion 134*a* at the opposite side of the atomizing electrode, and in the mist generation department, end portion 134*b* at the protrusion 134*a* side is close to the cooling section, and cooling pin 134 is cooled from end portion 134*b* remotest from atomizing electrode 135 by the cold air from the cooling section.

For cooling of cooling pin 134 of heat conduction material, cold air generated in cooling compartment 110 is used, and since cooling pin 134 is formed of a metal piece of excellent heat conduction, the cooling section is capable of cooling as required only by heat conduction from the air duct of flow of cold air generated in evaporator 112.

Since the cooling section can be composed in such simple structure, a mist generation department of low trouble rate and high reliability can be realized. Further, by making use of the cooling source of the freezing cycle, cooling pin 134 of heat conduction material, and atomizing electrode 135 at the tip of the department mist can be cooled, and mist making at low energy is realized.

At this time, in the mist generation department of the preferred embodiment, cooling pin 134 of heat conduction material is formed in a shape having protrusion 134*a* at the opposite side of atomizing electrode 135, and in the mist generation department, end portion 134*b* at the protrusion 134*a* side is close to the cooling section, and cooling pin 134 is cooled from end portion 134*b* remotest from atomizing electrode 135 by the cold air from the cooling section.

Thus, the cooling section or the regulating section is disposed at the end portion 134*b* remotest from atomizing electrode 135 of cooling pin 134, and direct effects of temperature changes of the cooling section or the regulating section on atomizing electrode 135 can be further lessened, and stable mist atomizing of smaller load fluctuations can be realize, and the temperature of the atomizing electrode can be regulated more stably.

Rear partition 111 having the mist generation department is provided in protrusion 111*a* in a part of the storage compartment side, and the mist generation department having protrusion 134*a* is inserted into deepest recess 111*b* deeper than this recess 111*a*, and heat insulator 152 composing the partition of the storage chamber can be used as heat cushioning material, and the thickness of the heat insulator can be adjusted without using any particular heat cushioning material, and the heat cushioning material capable of cooling the atomizing electrode properly may be obtained, and mist generation department 139 can be realized in a simpler structure.

By inserting mist generation department 139 into recess 111*a*, and cooling pin 134 having protrusion 134*a* into deepest recess 111*b* the mist generation department can be installed in the partition securely without allowing looseness in two-step structure, projection toward the storage compartment, that is, vegetable compartment 107 can be suppressed, and it is hardly touched by the hand of the user, and the safety is enhanced.

Since mist generation department 139 does not project into the outside enclosing rear partition 111 of storage compartment of vegetable compartment 107, and there is no effect on the air duct area, and lowering of cooling capacity by increase of air duct resistance can be avoided.

A recess is formed in a part of vegetable compartment 107, and mist generation department 139 is inserted in this place, and the storage capacity for storing vegetables, fruit and food is not changed, and the heat conduction material can be cooled securely, and other parts are sufficient in wall thickness for assuring heat resistance, and dew condensation in the shell is prevented, and the reliability can be enhanced.

Cooling pin 134 of heat conduction material maintains a certain thermal capacity, and can lessen the response of heat conduction from the cooling air duct, and can suppress temperature fluctuations of the atomizing electrode, and also has a function of cold reserve member, and the occurrence time of dew condensation of the atomizing electrode is assured, and freezing can be prevented. When cooling pin 134 of heat conduction material is combined with the heat insulator, the cold heat can be transmitted without loss. Since heat resistance is suppressed at the junction of cooling pin 134 and atomizing electrode 135, the temperature fluctuations of atomizing electrode 135 and cooling pin 134 follow up smoothly. Since humidity cannot invade into the junction, a thermal bond can be maintained for a long period.

Since the storage compartment is in high humidity environment, and its humidity may have effects on cooling pin 134, cooling pin 134 is made of corrosion-resistant and rust-preventive metal material, or coated with alumite or other surface treatment, it is free from rusting, and the increase of surface heat resistance is suppressed, and a stable heat conduction is assured.

Moreover, the surface of atomizing electrode 135 is plated with nickel, plated with gold, or plated with platinum, and abrasion of the atomizing electrode leading end due to discharge can be suppressed, and the leading end shape of atomizing electrode 135 is maintained, and atomizing for a long period is guaranteed, and the liquid drop shape at the leading end is stable.

When a fine mist is atomized from atomizing electrode 135, an ion wind is generated. At this time, a fresh air of high humidity flows into mist generation department 139 from humidity supplying port 138, and therefore the mist can be atomized continuously.

Herein, if there is no water in atomizing electrode 135, the discharge distance is long, and the insulation layer of air cannot be broken, and discharge phenomenon does not take place. As a result, current does not flow between the atomizing electrode and the opposite electrode. When this phenomenon is detected by controller 146 in refrigerator 100, and the high voltage of voltage applicator 133 may be turned on or off.

FIG. 18 is a function block diagram showing an example of this preferred embodiment.

Discharge current monitor voltage value 231 issued from electrostatic atomizing device 131, and signals from atomizing electrode temperature detector 232 and door closing detector 233 are applied into controller 235 in the refrigerator main body, and the operation of voltage applicator 133 for applying a high voltage of electrostatic atomizing device 131, heater (partition heater) 154, and heat conducting pin heater 158 is determined. For example, if the atomizing electrode temperature is judged to be lower than the dew point by atomizing electrode temperature detector 232 in controller 235, a high voltage of the voltage applicator of electrostatic atomizing device 131 is generated. If assuming a temperature having possibility of freezing of atomizing electrode 135, a very high humidity in vegetable compartment 107 due to frequent opening and closing of door, or an excessive dew condensation state of atomizing electrode 135, power is supplied into heater (partition heater) 154, or heat conducting pin heater 158 to start heating, and the dew condensation water depositing on the surface of atomizing electrode 135 is thawed and evaporation, and the water quantity in atomizing electrode 135 is adjusted.

Although atomizing electrode temperature detector 232 is used, this temperature detector may not be required if the temperature behavior can be estimated easily from the freezing cycle of refrigerator 100. Besides, since the humidity in the storage compartment fluctuates due to behavior of refrigerator compartment damper 234, voltage applicator 133 may be turned or off in cooperation with refrigerator compartment damper 234.

Refrigerator compartment damper 234 in the preferred embodiment may be replaced by a vegetable compartment damper.

FIG. 19 explains a control flow in an example of the preferred embodiment.

To control the temperature of atomizing electrode 135, the temperature of the atomizing electrode is judged. At step S250, when getting into the atomizing electrode temperature regulating mode, at step S251, if atomizing electrode temperature Tf is higher than preliminarily programmed first value T1 (for example, T1=6° C.), atomizing electrode 135 is high in temperature, and dew is not condensed. Or if the compartment temperature is judged to be high, going to step S252, the high voltage generation of electrostatic atomizing device 131 is stopped, and cooling pin 134 is heated by, for example, stopping power feeding to heat conducting pin heater 158. If atomizing electrode temperature Tf is lower than preliminarily programmed first value T1, the process goes to step S253. At step S253, if atomizing electrode temperature Tf is higher than preliminarily programmed second value T2 (for example, T2=−6° C.), atomizing electrode 135 is judged to be at an appropriate temperature, and going to step S254, the high voltage generation of electrostatic atomizing device 131 is generated. However, the operation for heating section of cooling pin 134 is not started. If atomizing electrode temperature Tf is lower than preliminarily programmed second value T2, the process goes to step S255. At step S255, if atomizing electrode temperature Tf is higher than preliminarily programmed third value T3 (for example, T2=−10° C.), atomizing electrode 135 is judged to be in overcooled state, and the process goes to step S256. At step S256. discharge of atomizing electrode 135 is maintained, but in order to prevent freezing, the heaters are operated, such as heat conducting pin heater 158, and heater (partition heater) 154. At step 255, if atomizing electrode temperature Tf is judged to be lower than T3, it is judged that the atomizing electrode is frozen, and the discharge is stopped, and the heaters such as heat conducting pin heater 158 and heater (partition heater) 154 are operated, and atomizing electrode 135 is heated and raised in temperature, and the frost or ice depositing on atomizing electrode 135 is thawed by priority.

After step S252, step S254, step S256, and step S257, by lapse of a certain time, the process returns to initial step S251, and the control is continued, and the water quantity in atomizing electrode 135 is regulated.

In this manner, the preferred embodiment includes the storage compartments thermally isolated by partitions, and the mist generation department for atomizing mist into the storage compartment, and the mist generation department is composed of a tip of the department mist for atomizing mist into the storage compartment, a voltage applicator for applying a voltage to the tip of the department mist, and a heat conduction material coupled to the tip of the department mist, and by cooling the tip of the department mist lower than the dew point by the evaporator, moisture in the air cooled to condense dew on the tip of the department mist, and mist is atomized into the storage compartment, and the atomizing amount is adjusted by the regulating section for regulating the water quantity depositing on the tip of the department mist.

In such configuration, dew can be condensed securely on the atomizing electrode easily from the excessive steam in the storage compartment, and by regulating the water quantity at the leading end of the atomizing electrode, corona discharge occurs between the atomizing electrode and the opposite electrode stably and continuously. As a result, fine mist of nano level is generated, and the atomized fine mist uniformly deposits on the surface of vegetables and fruit, and transpiration from vegetables and fruit can be suppressed, and the freshness is enhanced. From the cell gaps and pores on the surface of vegetables and fruit, moisture permeates into cells and is supplied into withered cells, and the vegetables may be returned to a fresh state.

Moreover, since discharge occurs between the atomizing electrode and the opposite electrode, an electric field is built up stably, and the atomizing direction is determined, and a fine mist can be atomized more precisely into the storage container.

Ozone and OH radicals generated simultaneously with the mist are also useful for enhancing the effects of deodorizing, removing of harmful substances on the food surface, and preventing contamination.

The atomized mist can be directly applied to the foods in the storage container, and the mist can be adhered to the surface of vegetables by making use of the potential of the mist and vegetables, and the efficiency of keeping-fresh performance is enhanced, and the effects of deodorizing, removing of harmful substances on the food surface, and preventing contamination are further enhanced.

Besides, dew is condensed on the atomizing electrode from the excessive steam in the storage compartment, and water drops are collected, and a mist is atomized, and it requires no extra components, such as defrosting hose for supplying water for mist atomizing, purifying filter, water supply route to be coupled directly to water service, or water storage tank. Any pump, capillary or water supplying part is not used, and a fine mist can be supplied into the storage compartment in a simple structure without requiring complicated mechanism.

In this way, and in such a simple structure, a fine mist can be supplied stably into the storage compartment, and the risk of troubles of the refrigerator can be substantially lowered, and the reliability is enhanced, and the quality of the refrigerator is improved.

Instead of tap water, water from dew condensation is used, and it is free from minerals and impurities, and it is effective to prevent deterioration when a water retaining material is used or deterioration of water retaining material due to clogging.

Further, since mist is not atomized by ultrasonic waves by ultrasonic vibration, no consideration is necessary about breakage of piezoelectric element due to lack of water, or deformation of peripheral parts, and water tank is not needed, and the input is small, and temperature effects are small in the compartment.

The portion accommodating the voltage applicator is buried in rear partition 111, and is cooled, and the temperature rise of the circuit board can be suppressed. As a result, temperature effects in the storage compartment can be lowered, and the reliability of the circuit board is enhanced at the same time.

In the preferred embodiment, a partition is provided for thermally insulating the storage compartment, and the electrostatic atomizing device is built in the partition, and since it is installed in the gap in the storage compartment, the storage volume is not decreased, and since it is installed at the inner side, it is not easily touched by the hand of the user, and the safety is enhanced.

In the preferred embodiment, the regulating unit for cooling and heating of the atomizing electrode of the electrostatic atomizing device, or regulating the dew condensation amount at the atomizing electrode leading end is a cooling pin made of heat conductive metal pin, and the heating unit for cooling and heating the metal piece is a heating section of heater and heat conduction from air duct of flow of cold air generated in the evaporator, and only by adjusting the wall thickness of the heat insulator and the heater input value, the temperature of the cooling pin and the atomizing electrode can be determined easily. By enclosing the heat insulator, the cold air does not leak, and the heater and other heating units are provided, and frosting or dew condensation on the outlet wall can be prevented, and lowering of reliability can be prevented.

In the preferred embodiment, rear partition 111 having the electrostatic atomizing device has a recess formed in a part of the storage compartment, and a metal piece as water volume regulating part of the electrostatic atomizing device is inserted in this place, and without changing the storage capacity for storing vegetables, fruit and food, an enough wall thickness for keeping heat insulation is assured in other parts than mounting the electrostatic atomizing device, and dew condensation in the outlet wall can be prevented, and the reliability is enhanced.

In the preferred embodiment, the partition for thermally separating the evaporator and the storage compartment is provided at least with an air duct for conveying cold air into the storage compartment or the evaporator, and a heater insulator insulated from heat effects from the storage compartment or other air duct, and the portion for varying the temperature of the atomizing electrode in the electrostatic atomizing device is a metal piece of heat conduction material, and the portion for regulating the temperature of this metal piece is cold air generated in the evaporator and a heater or other heating unit, so that the temperature of the atomizing electrode can be regulated securely.

Further, to prevent excessive dew condensation on the leading end of the atomizing electrode, as a part of water quantity regulating means, heater or other heating unit is provided, and the size and amount of leading end liquid drops can be adjusted by the temperature control of the leading end temperature, and mist can be atomized stably, and the antibacterial capacity is further enhanced.

When generating a fine mist, traces of ozone are generated, but since the discharge current value is extremely small, and moreover since the reference potential is 0 V, and the opposite electrode is discharge at a plus side of +7 kV, the concentration is far less than felt by the human body. By on/of operation of the electrostatic atomizing device, the ozone concentration in the storage compartment can be adjusted, and the concentration can be appropriately adjusted, and yellowing or deterioration of vegetables by excessive ozone can be prevented, and the bactericidal and antibacterial action on the vegetable surface can be enhanced.

In the preferred embodiment, in the atomizing electrode, a high voltage potential difference is generated between the reference potential side (0 V) and the opposite electrode (+7 kV), but a high voltage potential difference may be generated by applying −7 kV to the atomizing electrode with the opposite electrode at reference potential side (0 V). In this case, the opposite electrode closer to the storage compartment is at the reference potential side, and electric shock does not occur if the user comes closer to the opposite electrode. When the atomizing electrode is set at −7 kV, the opposite electrode may not be particularly necessary if the storage compartment side is at the reference potential side.

In the preferred embodiment, the air duct for cooling the cooling pin is the discharging air duct from the freezer compartment, but it may be also replaced by the discharging air duct from icemaker, returning air duct from the freezer compartment, or other cooling air duct. As a result, the possible location for installing the electrostatic atomizing device may be extended.

In the preferred embodiment, the cooling section for cooling the cooling pin of heat conduction material is the cold air cooled by using the cooling source generated in the freezing cycle of the refrigerator, but it is also possible to make use of heat conduction from the cold air from the cooling source of the refrigerator, or from the cooling tube of low temperature. Hence, by regulating the temperature of this cooling tube, the electrode cooling unit can be cooled to a desired temperature, and it is easy to manage the temperature when cooling the atomizing electrode.

In the preferred embodiment, water retaining material is not provided around the atomizing electrode of the electrostatic atomizing device, but water retaining material may be also provided. As a result, the dew condensation water generated near the atomizing electrode can be maintained around the atomizing electrode, and can be appropriately supplied into the atomizing electrode.

In the preferred embodiment, the storage compartment of the refrigerator is the vegetable compartment, but it may be also replaced by the refrigerator compartment or the switchable temperature compartment in other temperature zone, and various applications may be possible.

In the preferred embodiment, the cooling pin is used, but it is not limited as far as it is a heat conduction material, and for example a high polymer material of high heat conduction property may be used. In this case, the weight is reduced, and the processability is improved, and the configuration is inexpensive.

Preferred Embodiment 12

Figure 4:
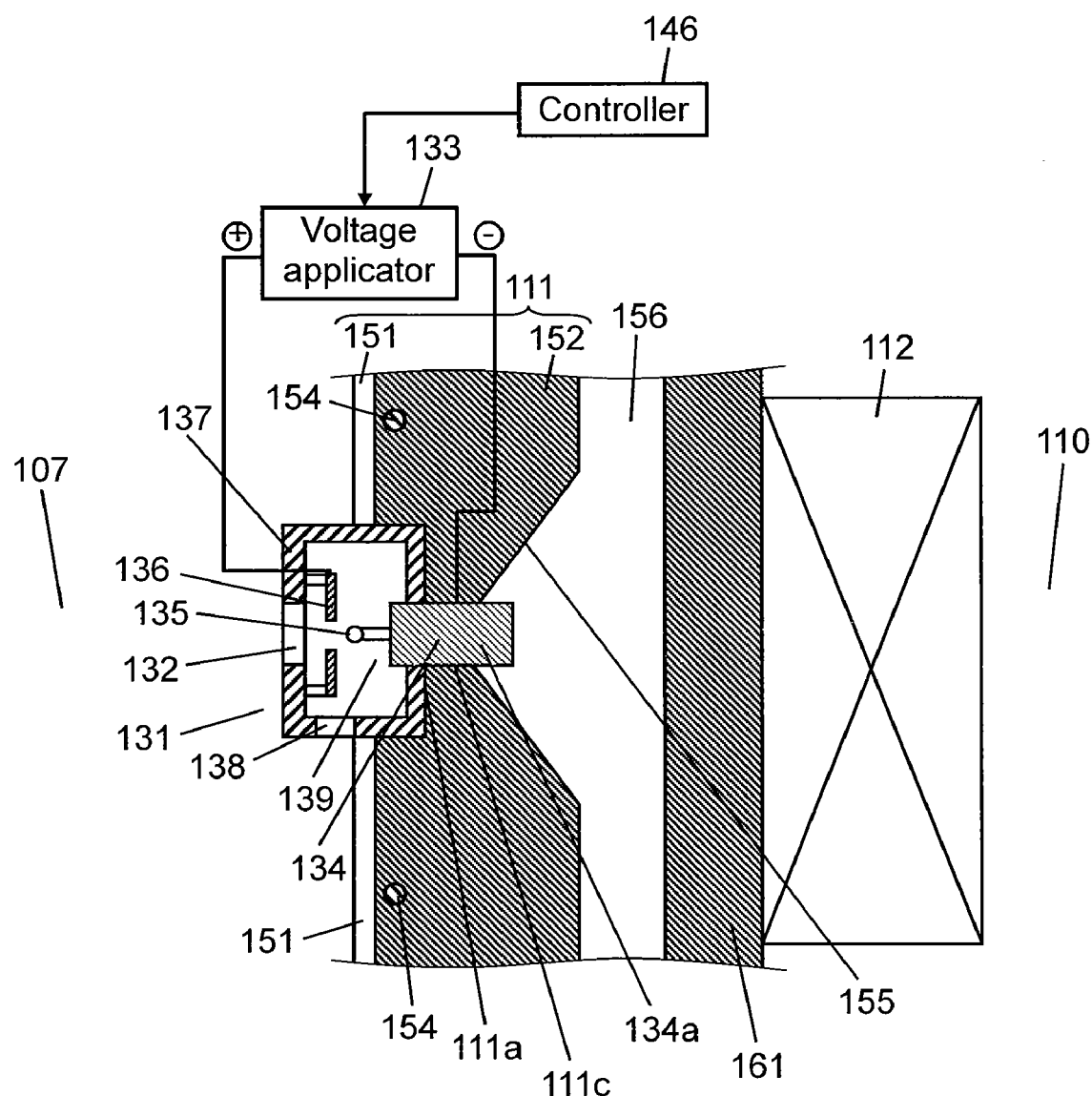
FIG. 4 shows a sectional view cut along line A-A in FIG. 2, and the sectional view illustrates an electrostatic atomizing device and its periphery provided to a vegetable compartment of a refrigerator in accordance with a second embodiment of the present invention.
Figure 20:
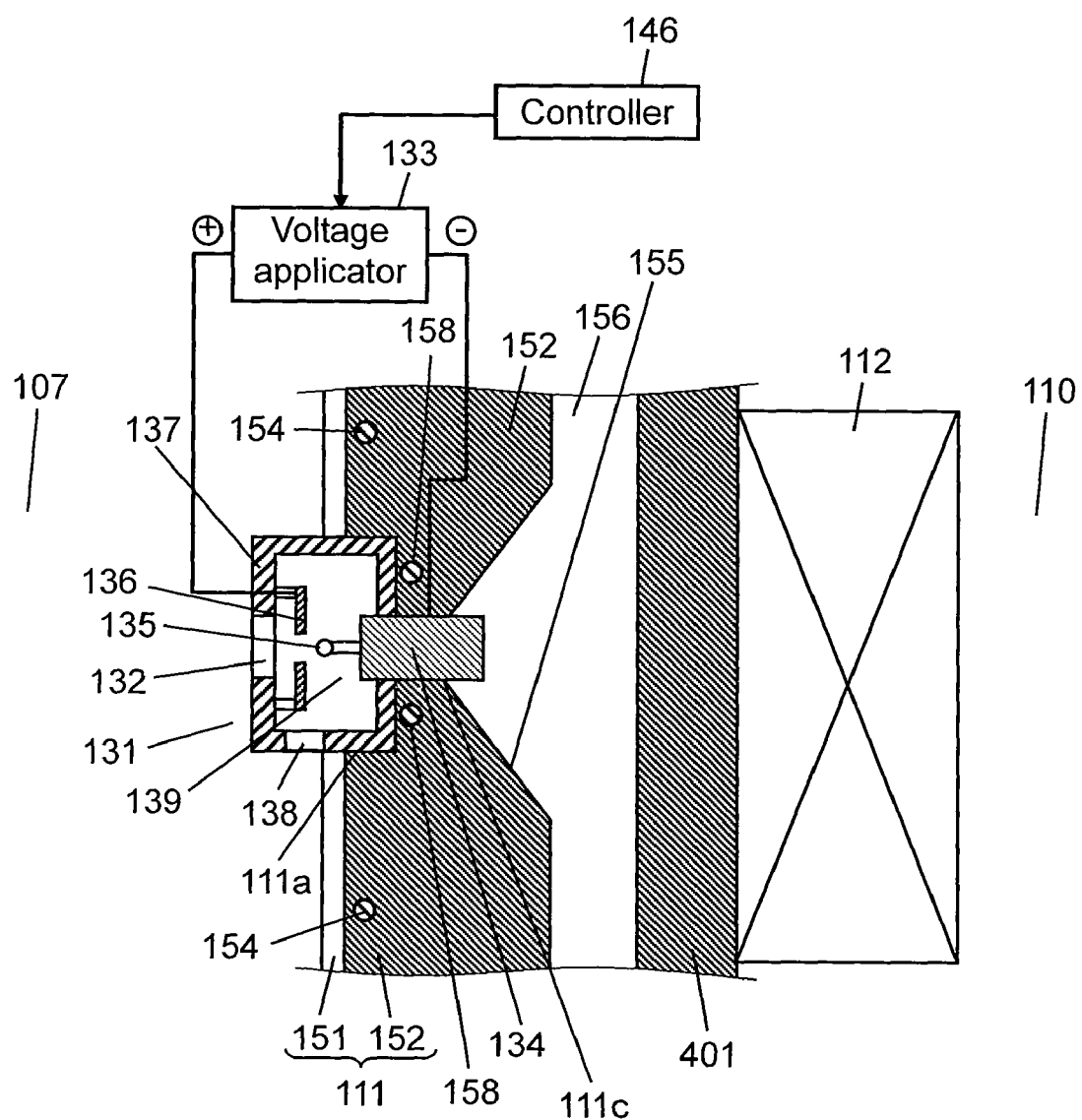
FIG. 20 shows a sectional view cut along line A-A in FIG. 2, and the sectional view details an electrostatic atomizing device and its periphery in accordance with a twelfth embodiment of the present invention.

FIG. 20 shows a sectional view cut along line A-A in FIG. 2 as seen from arrow direction of the cut-section, illustrating an electrostatic atomizing device and its periphery provided in the vegetable compartment of the refrigerator in preferred embodiment 12 of the present invention. In the preferred embodiment, in the refrigerator in preferred embodiment 2, instead of the electrostatic atomizing device shown in FIG. 4, the electrostatic atomizing device shown in FIG. 20 is used.

In this preferred embodiment, only the portions different from the configuration specifically described in preferred embodiments 1 to 11 are explained, and the portions similar to the configuration specifically described in preferred embodiments 1 to 11 or applicable to the same technical concept are omitted in explanation.

In the electrostatic atomizing device of the preferred embodiment shown in FIG. 20, in addition to the configuration explained in preferred embodiment 2, near mist generation department 139 of electrostatic atomizing device 131, atomizing electrode 135 at the tip of the department mist, and heat conducting pin heater 158 as the heating unit for regulating the temperature of cooling pin 134 are composed.

Preferably, cooling pin 134 is made of corrosion-resistant and rust-preventive metal material, or coated material with alumite or other surface treatment.

Cooling pin 134 is partially exposed to low-temperature air duct 156 at its back side. By the operation of the freezing cycle, cooling pin 134 is cooled to about 0 to −6° C. by the cold air at low temperature generated in evaporator 112 and from the vegetable compartment by cooling fan 113, and heating unit such as heat conducting pin heater 158 or heater (partition heater) 154. At this time, since cooling pin 134 is a heat conduction material, cold heat is transmitted smoothly, and atomizing electrode 135 is regulated to about 0 to −6° C.

Thus, in the preferred embodiment, a heat insulator is provided in the partition for thermally separating the evaporator and the storage compartment, and the section for regulating the temperature of atomizing electrode 135 of the electrostatic atomizing device to less than the dew point is cooling pin 134 of heat conduction material made of metal piece of high heat conductivity, and the regulating section for regulating the temperature of cooling pin 134 is the evaporator by cold air generated in the evaporator and the heater provided near the cooling pin, so that the temperature of the atomizing electrode can be regulated securely.

In the preferred embodiment, the partition having the electrostatic atomizing device has a recess in a part of the storage compartment side, and a metal piece of the cooling section of the electrostatic atomizing device is inserted in this place, and the metal piece can be cooled securely. As the air duct area is widened gradually, the air duct resistance is decreased, or becomes equivalent, and lowering of cooling capacity is prevented. Moreover, the temperature of the atomizing electrode can be adjusted easily by the exposed surface area of the cooling pin into the air duct and the heater input capacity.

In the preferred embodiment, the cooling pin is installed in the recess in the air duct, but the recess may not be provided at the air duct side as far as an appropriate temperature of the cooling pin can be maintained. In this case, the air duct may be processed easily.

Preferred Embodiment 13

Figure 21:
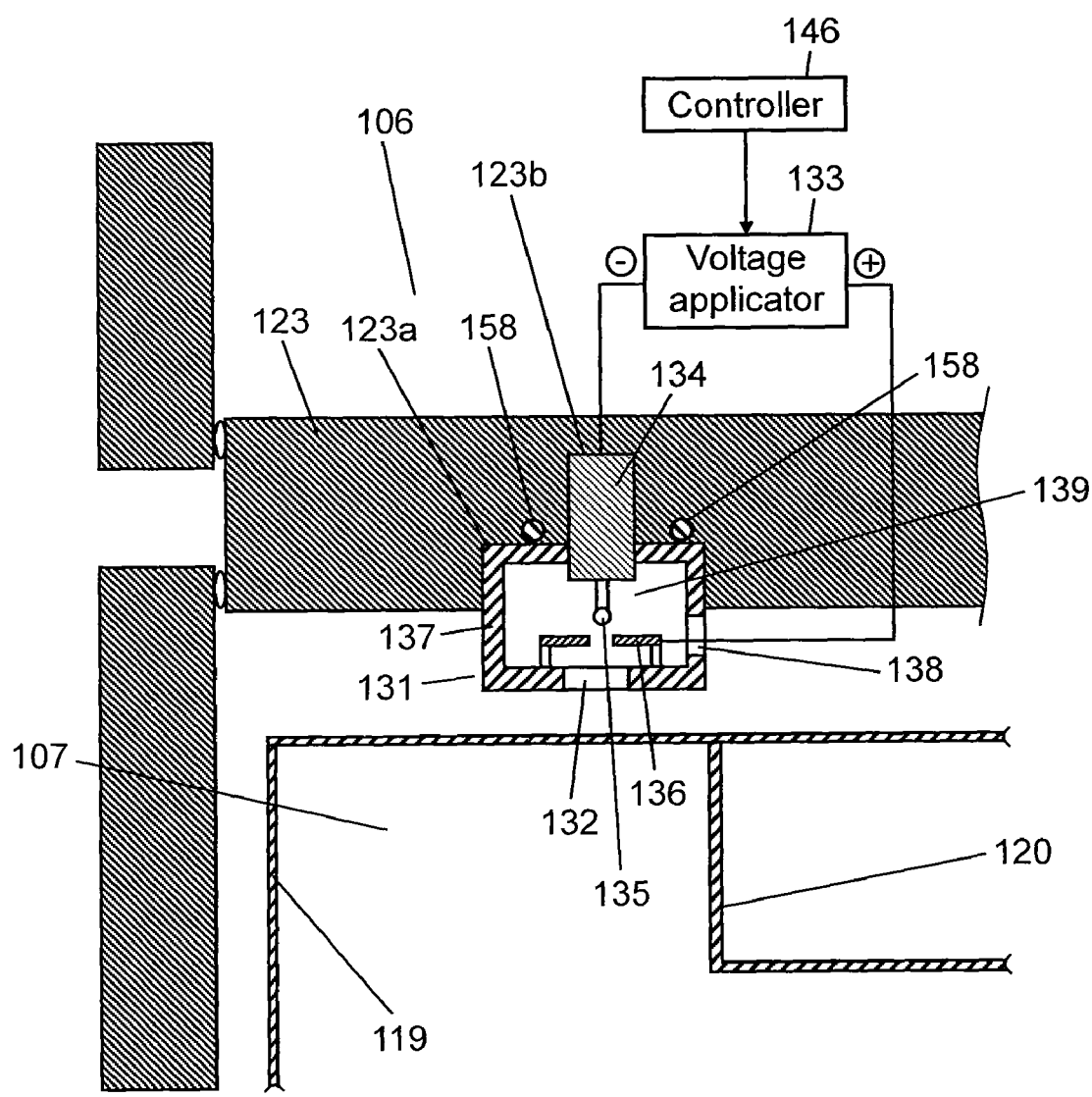
FIG. 21 shows a sectional view cut along line A-A in FIG. 2, and the sectional view details an electrostatic atomizing device and its periphery in accordance with a thirteenth embodiment of the present invention.

FIG. 21 shows a sectional view cut along line A-A in FIG. 2 as seen from arrow direction of the cut-section, illustrating an electrostatic atomizing device and its periphery provided in the vegetable compartment of the refrigerator in preferred embodiment 13 of the present invention. In the preferred embodiment, in the refrigerator in preferred embodiment 3, instead of the electrostatic atomizing device shown in FIG. 5, the electrostatic atomizing device shown in FIG. 21 is used.

In this preferred embodiment, only the portions different from the configuration specifically described in preferred embodiments 1 to 12 are explained, and the portions similar to the configuration specifically described in preferred embodiments 1 to 12 or applicable to the same technical concept are omitted in explanation.

In the electrostatic atomizing device shown in FIG. 21, same explained in preferred embodiment 3, electrostatic atomizing device 131 as a mist maker is assembled in first partition 123 for thermally insulating for separating the temperature zone between vegetable compartment 107 and ice-maker 106. Also in this preferred embodiment, in cooling pin section 134 of heat conduction material of mist generation department 139, in particular, a recess is formed in the heat insulator, and heat conducting pin heater 158 is formed in its vicinity.

The basic operation is same as in preferred embodiment 3. In this preferred embodiment, however, the temperature control of icemaker 106 may vary and atomizing electrode 135 may be overcooled due to ambient temperature fluctuations or icing, the temperature of atomizing electrode 135 is regulated by heat conducting pin heater 158 installed near atomizing electrode 135, and the water quantity at the leading end of atomizing electrode 135 may be kept appropriately.

Preferred Embodiment 14

Figure 22:
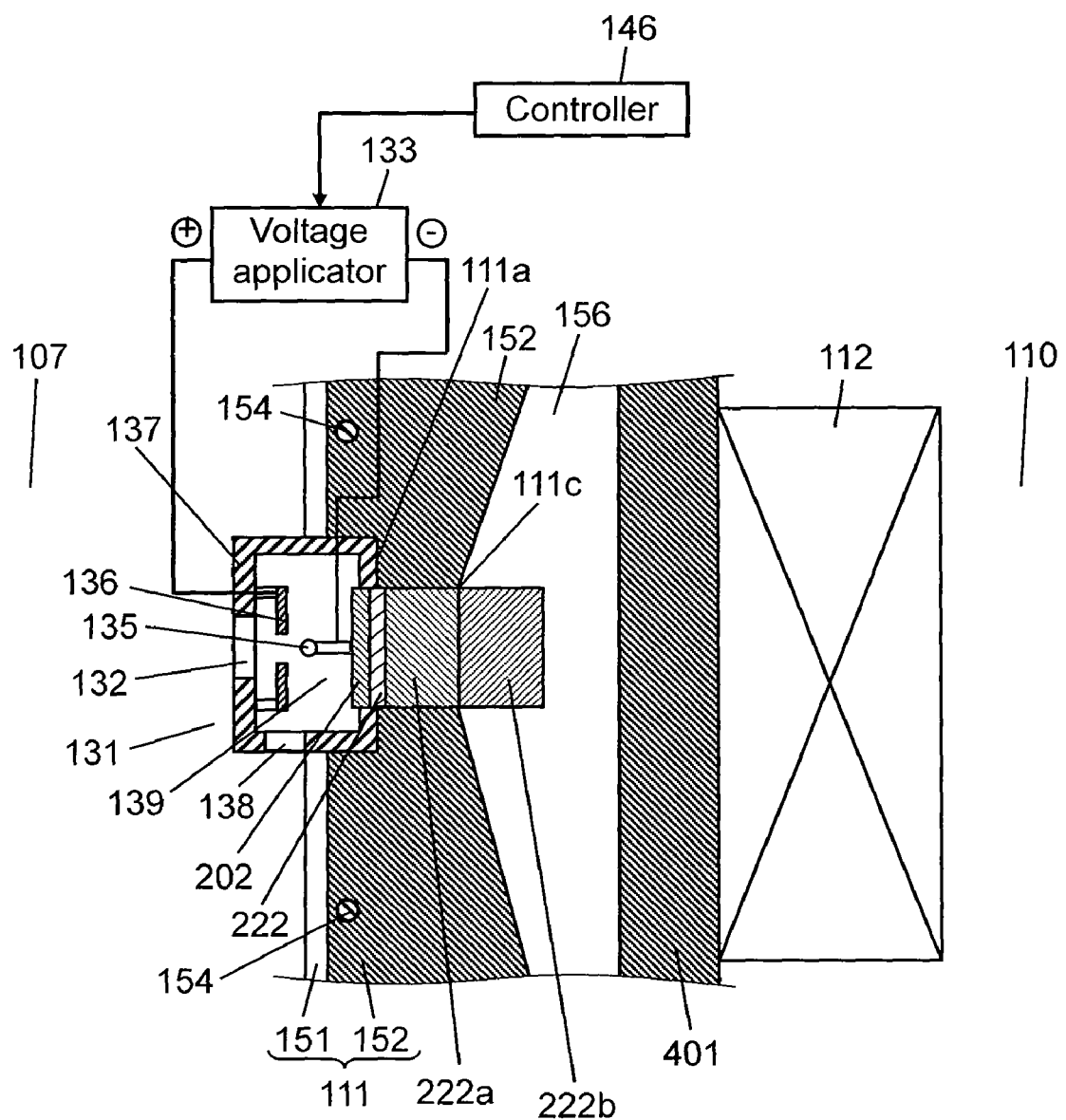
FIG. 22 shows a sectional view cut along line A-A in FIG. 2, and the sectional view details an electrostatic atomizing device and its periphery in accordance with a fourteenth embodiment of the present invention.
Figure 23:
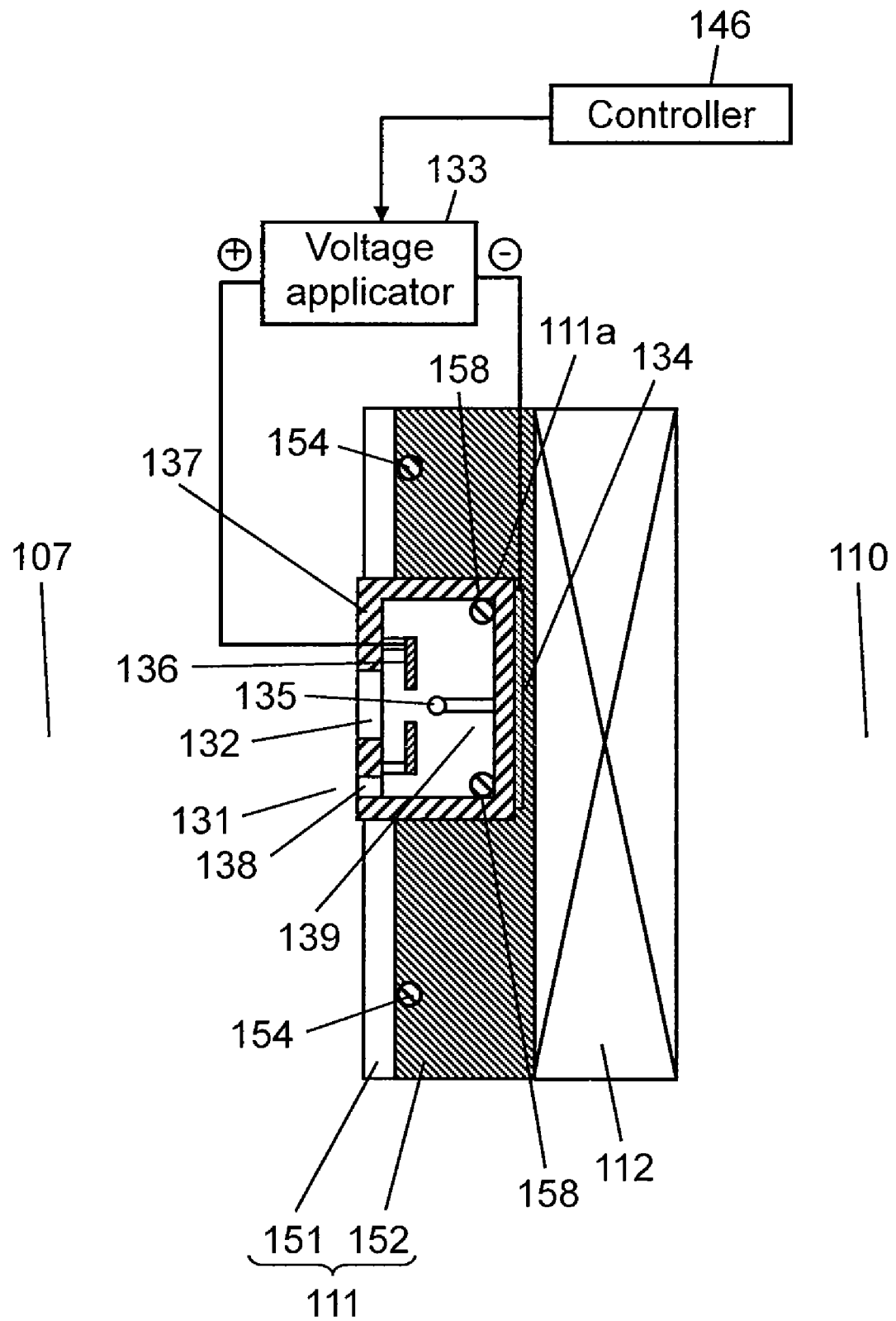
FIG. 23 shows a sectional view detailing an electrostatic atomizing device and its periphery in accordance with a fifteenth embodiment of the present invention.
Figure 24:
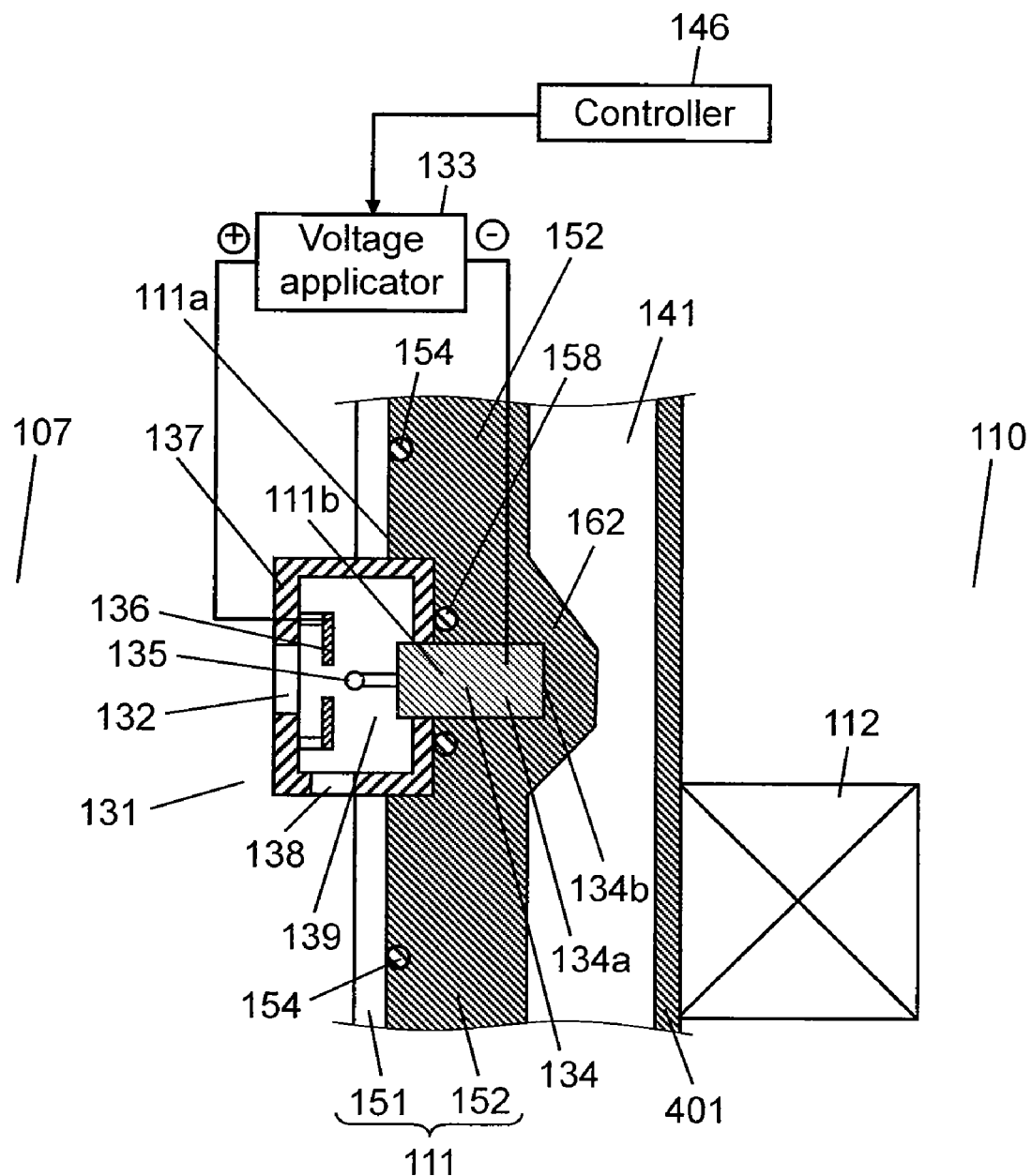
FIG. 24 shows a sectional view cut along line A-A in FIG. 2, and the sectional view details an electrostatic atomizing device and its periphery in accordance with a sixteenth embodiment of the present invention.

FIG. 22 shows a sectional view cut along line A-A in FIG. 2 as seen from arrow direction of the cut-section, illustrating an electrostatic atomizing device and its periphery provided in the vegetable compartment of the refrigerator in preferred embodiment 14 of the present invention.

In the preferred embodiment, only the portions different from the configuration specifically described in preferred embodiments 1 to 13 are explained, and the portions similar to the configuration specifically described in preferred embodiments 1 to 13 or applicable to the same technical concept are omitted in explanation.

In the drawing, rear partition 111 is composed of rear-end partition 151 composed of ABS or other resin, and heat insulator 152 composed of foamed styrol or the like for thermally isolating. Partition 401 is provided for isolating low-temperature air duct 156 and cooling compartment 110. Recess 111a is provided in a part of the wall of the inside of the storage compartment of rear partition 111 so as to be lower in temperature than in other parts, and electrostatic atomizing device 131 is placed as mist maker.

Electrostatic atomizing device 131 is mainly composed of mist generation department 139, voltage applicator 133, and outlet wall 137, and atomizing port 132 and humidity supplying port 138 are formed in a part of outlet wall 137. Mist generation department 139 is provided with atomizing electrode 135 as the tip of the department mist, and atomizing electrode 135 is fixed by fixing part on mist-making electrode side 202a made of heat conduction material.

At the back side of fixing part on mist-making electrode side 202a, through-section 111c is provided, and is close to one side of Peltier module 222 including a Peltier element for regulating the temperature of atomizing electrode 135. Other side of Peltier module 222 is adjacent to heat conduction part on air-duct side 222a made of heat conduction material, and heat exchanging part 222b is composed on heat conduction part on air-duct side 222a, and is provided in through-section 111c.

In the refrigerator having such configuration, the operation and actions are described below. Low-temperature air duct 156 at the back side of atomizing electrode 135 generates a cold air in evaporator 112 by operation of the refrigerating cycle, and the cold air is conveyed into the low-temperature air duct. At this time, when a voltage is applied to Peltier module 222 including a Peltier element, the atomizing electrode can be related below the dew point depending on the direction of application and the applied voltage value. For example, when cooling of atomizing electrode 135 is needed, the heat absorbing surface of Peltier module 222 is set at the atomizing electrode side, and the discharge surface is set at the air duct side, and a voltage is applied. To the contrary, when heating is needed in atomizing electrode 135, the heat absorbing surface of Peltier module 222 is set at the air duct side, and the discharge surface is set at the atomizing electrode 135 side, and a voltage is applied. As a result, water may be appropriately maintained at the leading end of atomizing electrode 135, and a stable mist atomizing is realized.

Thus, in the preferred embodiment, the section for regulating the quantity of water depositing on the atomizing electrode of the electrostatic atomizing device is capable of regulating the temperature of the atomizing electrode only by applying a voltage to the Peltier element by using the Peltier element, and by inverting the voltage, both cooling and heating can be realized, and any additional heater or the like is not necessary.

In the preferred embodiment, by fine adjustment of applied voltage to Peltier module 222, the temperature can be controlled delicately, and the water quantity at the leading end of the atomizing electrode can be controlled delicately.

In the preferred embodiment, Peltier module 222 plays the both part of heater and evaporator, and any particular heater is not needed, and the number of components may be saved.

In the preferred embodiment, temperature sensor or humidity sensor are not provided near the mist generation department, but when provided, stricter control is possible, and stable atomizing may be realized.

Heat conduction part on air-duct side 222*a* and heat exchanging part 222*b* may be formed integrally. As a result, the contact heat resistance between the two members is eliminated, and the heat conduction is smooth, and the response is improved.

Further, atomizing electrode 135 and the fixing part on mist-making electrode side may be formed integrally. As a result, the contact heat resistance between the two members is eliminated, and the heat conduction is smooth, and the response is improved.

Thus, only by the applied voltage to the Peltier element, the temperature of the atomizing electrode can be regulated, and an arbitrary temperature can be adjusted in the atomizing electrode alone.

Only by inverting the voltage, both cooling and heating can be realized, and without adding extra device for cooling or heating, both cooling and heating can be realized in a simple structure, and the temperature response is fast, and the response of water quantity regulating section is enhance, and an arbitrary temperature can be regulated, and the precision of the mist generation department may be further enhanced.

Preferred Embodiment 15

FIG. 21 shows a detailed sectional view near the electrostatic atomizing device in preferred embodiment 15 of the present invention.

In this preferred embodiment, only the portions different from the configuration specifically described in preferred embodiments 1 to 14 are explained, and the portions similar to the configuration specifically described in preferred embodiments 1 to 14 or applicable to the same technical concept are omitted in explanation.

In the drawing, the mist maker or electrostatic atomizing device 131 is mainly composed of mist generation department 139, voltage applicator 133, and outlet wall 137, and atomizing port 132 and humidity supplying port 138 are formed in a part of outlet wall 137. Mist generation department 139 has atomizing electrode 135 as tip of the department mist fixed in outlet wall 137, and atomizing electrode 135 is provided with cooling pin 134 as heat conduction material. In the vicinity, heat conducting pin heater 158 is composed as a heating unit for regulating the temperature of atomizing electrode 135. At a position opposite to atomizing electrode 135, opposite electrode 136 of circular doughnut shape is provided at the storage compartment side at a specific distance from the leading end of atomizing electrode 135, and atomizing port 132 is provided on its extension.

At the back side of electrostatic atomizing device 131, evaporator 112 is provided adjacently for cooling the storage compartment, and electrostatic atomizing device 131 is fixed in recess 111*a* of rear partition 111.

Thus, in this preferred embodiment, the regulating unit of water quantity for condensing dew in atomizing electrode 135 at the tip of the department mist of the electrostatic atomizing device as the mist maker makes use of evaporator 112 for cooling the storage compartment as cooling unit, and the heat exchanger as a heating unit. Therefore, the tip of the department mist (atomizing electrode 135) can be directly cooled by evaporator 112 as cooling source of the refrigerator, and the temperature response is faster.

In this way, the temperature regulating unit is used in the freezing cycle, and the temperature of the heat conduction material and the atomizing electrode can be regulated, and the temperature of the atomizing electrode can be regulated at a lower energy.

Since the heat exchanger is used as the heating unit of the regulating section, the energy generated in the freezing cycle can be collected and utilized effectively, and the thermal efficiency of the freezing cycle is enhanced, and an energy-saving refrigerator can be presented.

Also in the preferred embodiment, in the freezing cycle, an expansion valve may be used for regulating the temperature of the evaporator. As a result, the temperature of the evaporator can be regulated by its throttling amount.

Preferred Embodiment 16

FIG. 24 shows a detailed sectional view near the electrostatic atomizing device cut along line A-A in FIG. 2 in preferred embodiment 16 of the present invention. In the preferred embodiment, in the refrigerator in preferred embodiment 4, instead of the electrostatic atomizing device shown in FIG. 5, the electrostatic atomizing device shown in FIG. 24 is used.

In this preferred embodiment, the configuration is same as in preferred embodiment 4, and similar effects are obtained. Further as shown in FIG. 24, near cooling pin 134, heat conducting pin heater 158 is provided for regulating the temperature of cooling pin 134.

In the preferred embodiment, since cooling pin 134 is cooled by way of a heat insulator of heat cushioning material, atomizing electrode 135 is cooled indirectly by cooling pin 134 of heat conduction material. It is further cooled indirectly in a dual structure by way of heat insulator 152 of heat cushioning material. Extreme cooling can be prevented by regulating the temperature of atomizing electrode 135 at the tip of the department mist by means of heat conducting pin heater 158. If atomizing electrode 135 is cooled extremely, the dew condensation amount increases, and the input to electrostatic atomizing device 131 is increased due to increase of load to mist generation department 139, and mist-making failure due to freezing of mist generation department 139 may be feared. However, such troubles due to increase of load to mist generation department 139 can be avoided, and an appropriate dew condensation amount is assured, and a stable mist atomizing is realized at low input.

When cooling by such cooling unit, by cooling from the side of end portion 134*b* remotest from atomizing electrode 135 of cooling pin 134 of heat conduction material, the large thermal capacity of cooling pin 134 is first cooled, and then atomizing electrode 135 is cooled by cooling pin 134, and direct effects of temperature changes in the cooling unit on atomizing electrode 135 can be further lessened, and load fluctuations are small, and a stable mist atomizing is realized.

Preferred Embodiment 17

Figure 25:
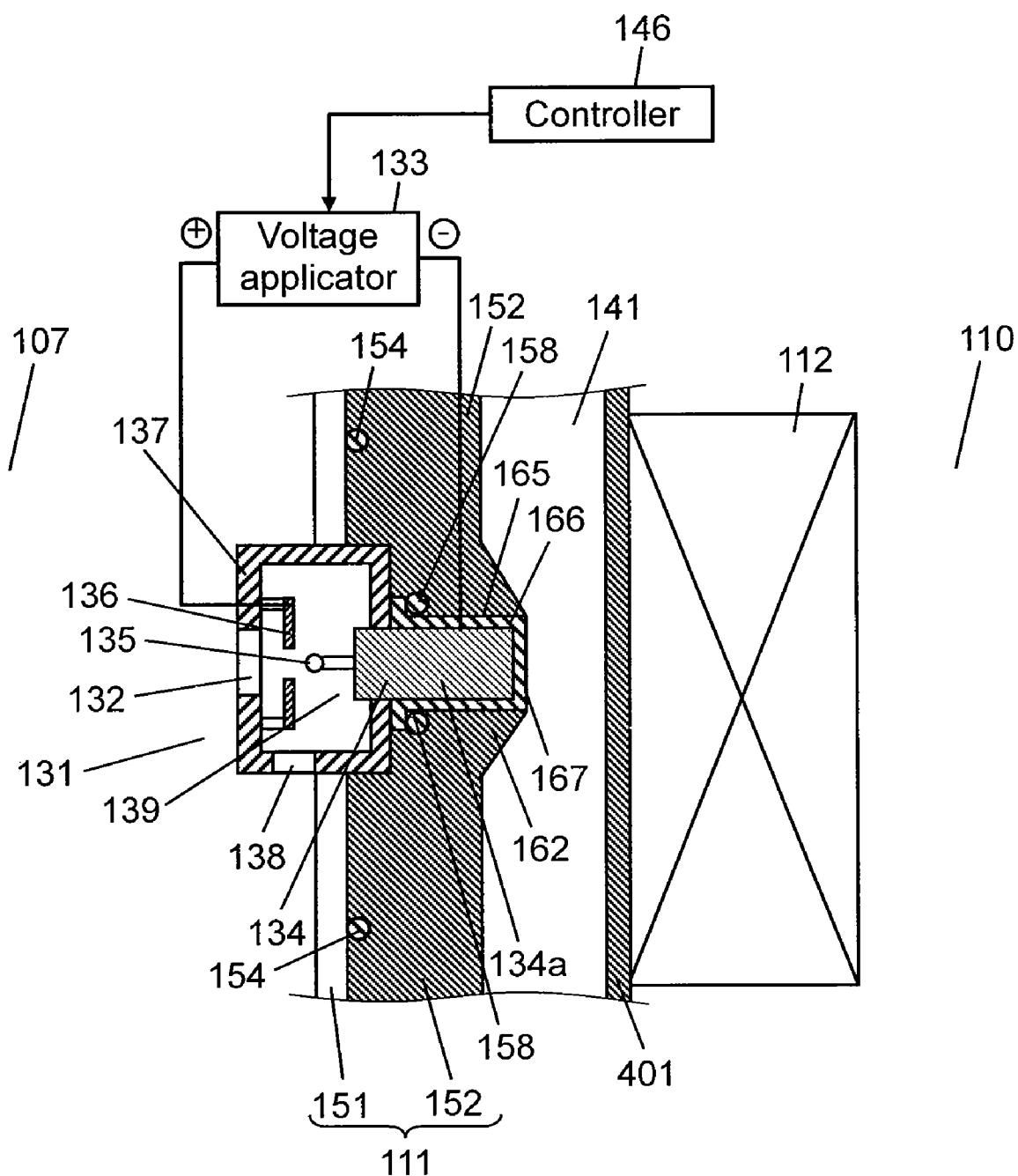
FIG. 25 shows a sectional view cut along line A-A in FIG. 2, and the sectional view details an electrostatic atomizing device and its periphery in accordance with a seventeenth embodiment of the present invention.
Figure 26:
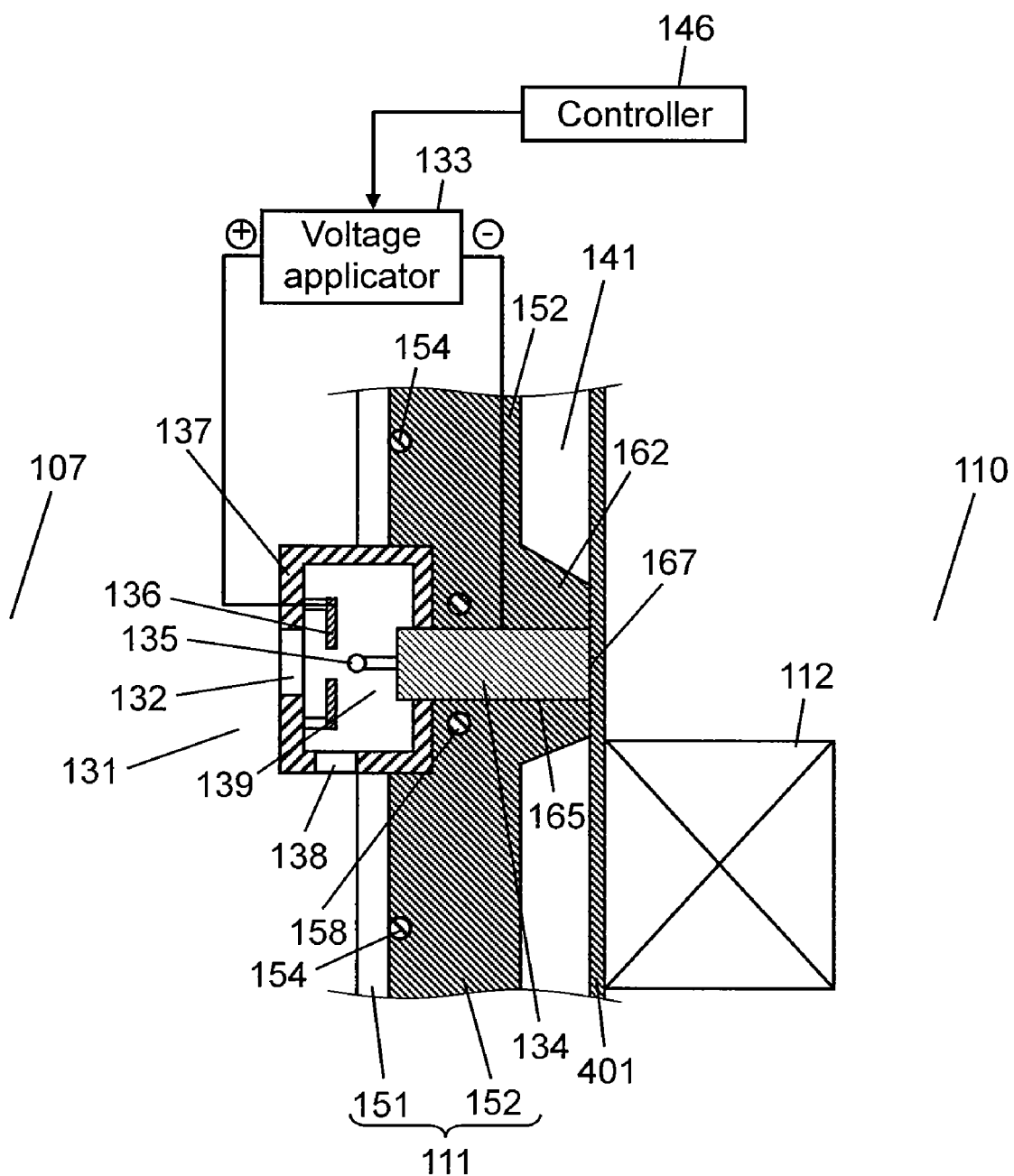
FIG. 26 shows a sectional view cut along line A-A in FIG. 2, and the sectional view details an electrostatic atomizing device and its periphery in accordance with a eighteenth embodiment of the present invention.
Figure 27:
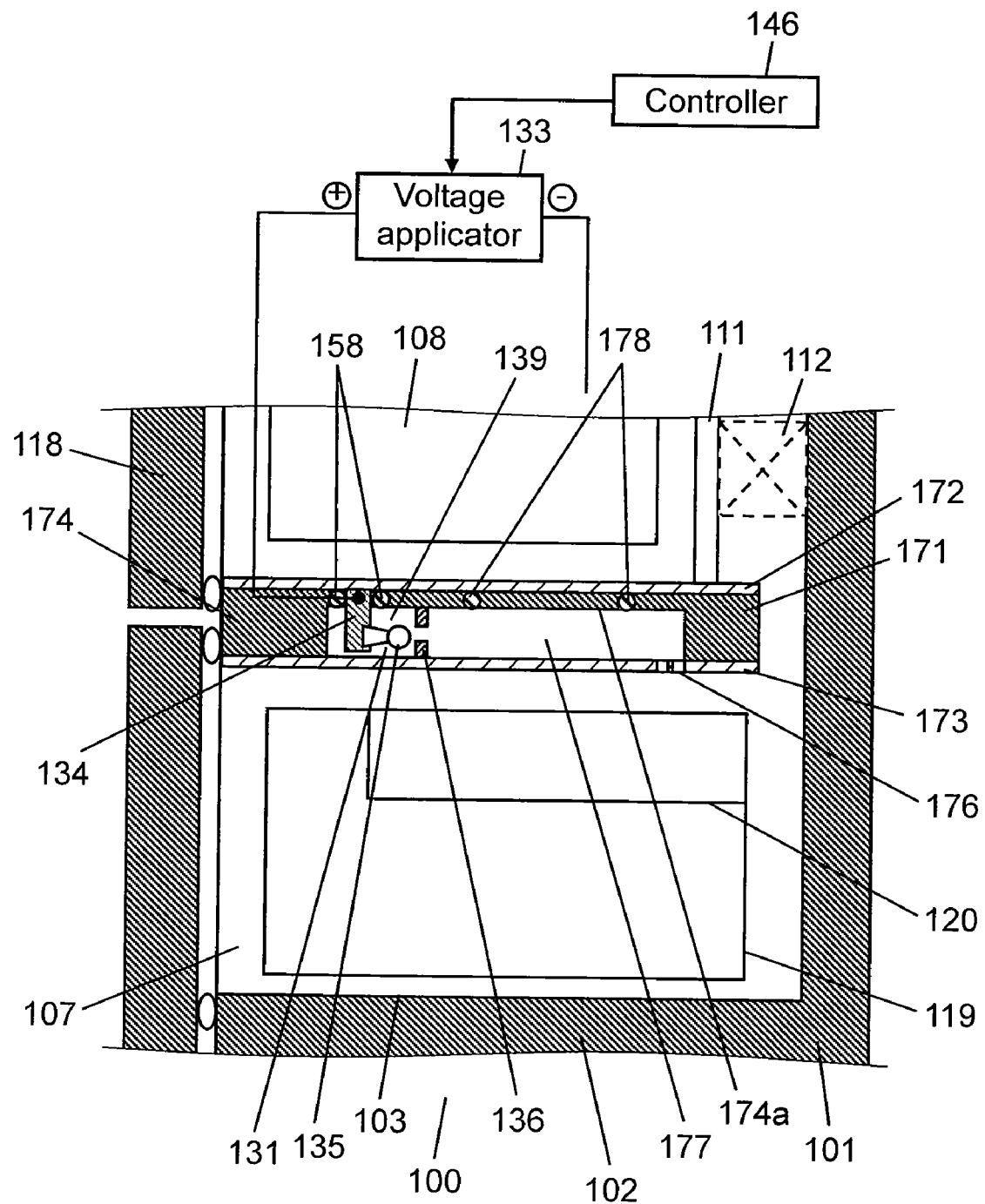
FIG. 27 shows a sectional view of a vegetable compartment and its periphery of a refrigerator in accordance with a nineteenth embodiment of the present invention.
Figure 28:
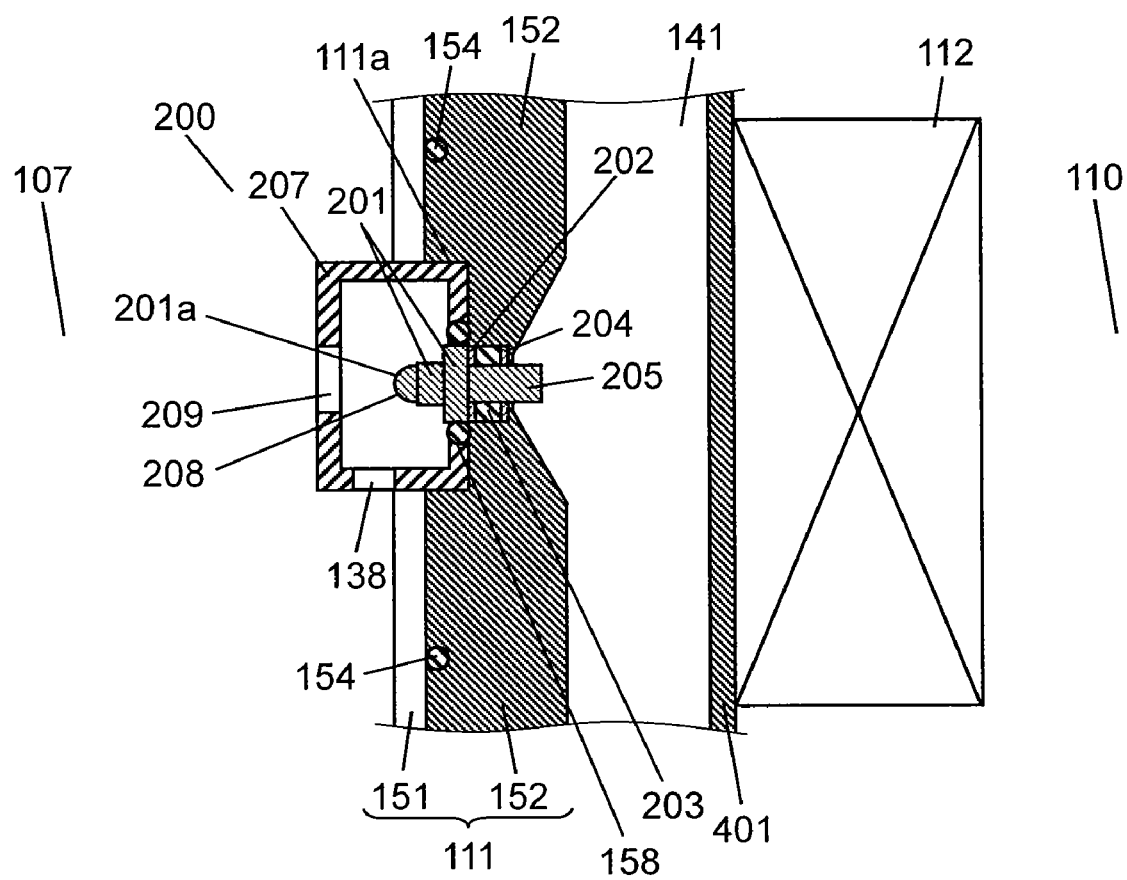
FIG. 28 shows a sectional view cut along line A-A in FIG. 2, and the sectional view details an ultrasonic mist device and its periphery in accordance with a 20th embodiment of the present invention.

FIG. 25 shows a detailed sectional view near the electrostatic atomizing device cut along line A-A in FIG. 2 in preferred embodiment 17 of the present invention.

Figure 7:
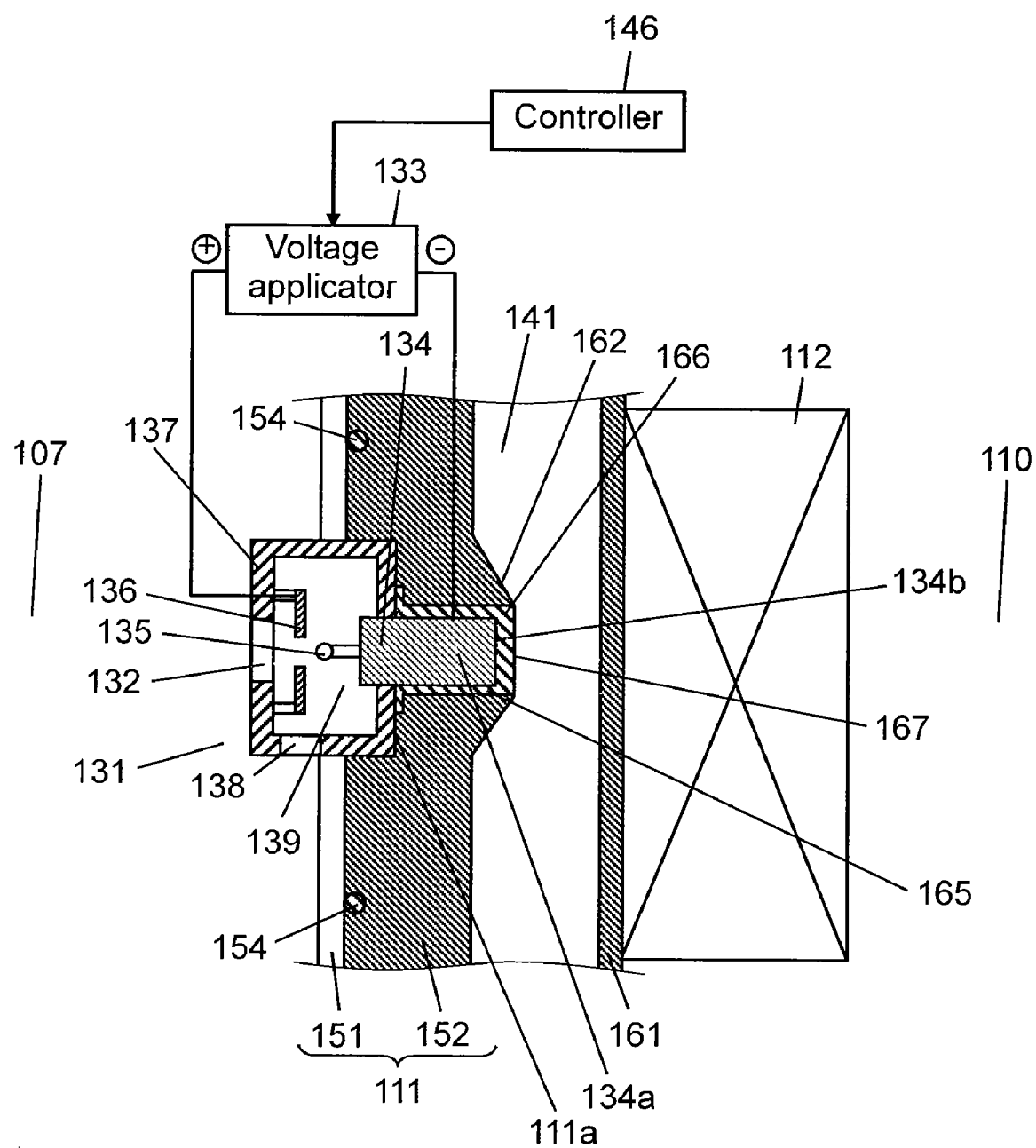
FIG. 7 shows a sectional view cut along line A-A in FIG. 2, and the sectional view illustrates an electrostatic atomizing device and its periphery provided to a vegetable compartment of a refrigerator in accordance with a fifth embodiment of the present invention.
Figure 8:
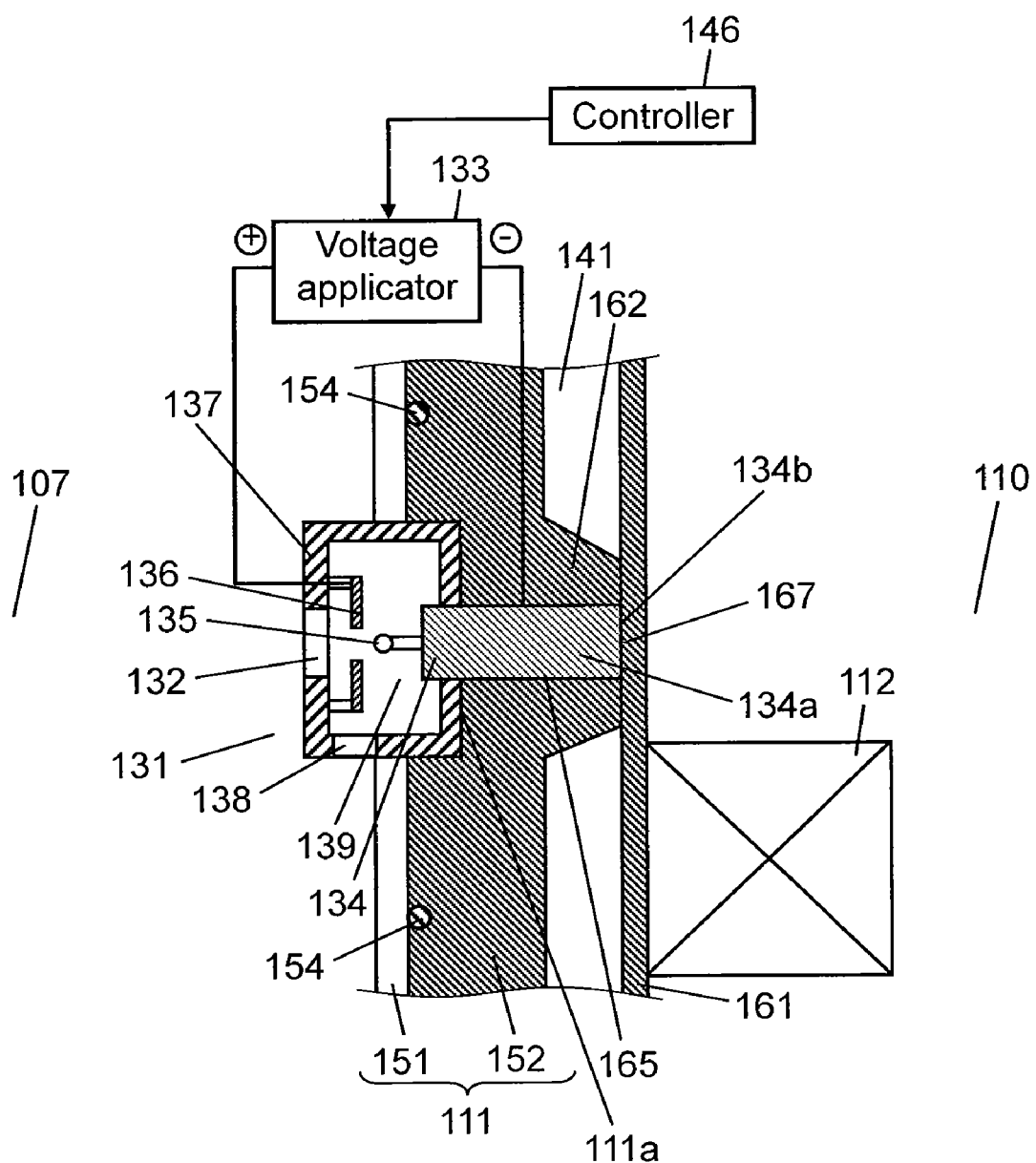
FIG. 8 shows a sectional view cut along line A-A in FIG. 2, and the sectional view illustrates an electrostatic atomizing device and its periphery provided to a vegetable compartment of a refrigerator in accordance with a sixth embodiment of the present invention.

In this preferred embodiment, in the refrigerator in preferred embodiment 5, instead of the electrostatic atomizing device shown in FIG. 7, the electrostatic atomizing device shown in FIG. 25 is used. In the preferred embodiment, the configuration is same as in preferred embodiment 5 shown in FIG. 7, and similar effects are obtained. Further as shown in FIG. 25, near cooling pin 134, heat conducting pin heater 158 is provided for regulating the temperature of cooling pin 134.

In the preferred embodiment, too, since cooling pin 134 is cooled by way of a heat insulator of heat cushioning material, atomizing electrode 135 is cooled indirectly by cooling pin 134 of heat conduction material. It is further cooled indirectly in a dual structure by way of heat insulator 152 of heat cushioning material. Extreme cooling can be prevented by regulating the temperature of atomizing electrode 135 at the tip of the department mist by means of heat conducting pin heater 158. If atomizing electrode 135 is cooled extremely, the dew condensation amount increases, and the input to electrostatic atomizing device 131 is increased due to increase of load to mist generation department 139, and mist-making failure due to freezing of mist generation department 139 may be feared. However, such troubles due to increase of load to mist generation department 139 can be avoided, and an appropriate dew condensation amount is assured, and a stable mist atomizing is realized at low input.

Preferred Embodiment 18

FIG. 26 shows a detailed sectional view near the electrostatic atomizing device cut along line A-A in FIG. 2 in preferred embodiment 18 of the present invention.

In this preferred embodiment, in the refrigerator in preferred embodiment 6, instead of the electrostatic atomizing device shown in FIG. 8, the electrostatic atomizing device shown in FIG. 26 is used. In the preferred embodiment, the configuration is same as in preferred embodiment 6 shown in FIG. 8, and similar effects are obtained. Further as shown in FIG. 26, near cooling pin 134, heat conducting pin heater 158 is provided for regulating the temperature of cooling pin 134.

Cooling pin 134 of heat conduction material in the preferred embodiment has protrusion 134*a* at the opposite side of the atomizing electrode, and end portion 134*b* at the protrusion 134*a* side is closest to the cooling unit in the mist generation department. Hence the end portion 134*b* side remotest from atomizing electrode 135 in cooling pin 134 is cooled by the cold air from the cooling unit.

In the preferred embodiment, too, since cooling pin 134 is cooled by way of a heat insulator of heat cushioning material, atomizing electrode 135 is cooled indirectly by cooling pin 134 of heat conduction material. It is further cooled indirectly in a dual structure by way of heat insulator 152 of heat cushioning material. Extreme cooling can be prevented by regulating the temperature of atomizing electrode 135 at the tip of the department mist by means of heat conducting pin heater 158. If atomizing electrode 135 is cooled extremely, the dew condensation amount increases, and the input to electrostatic atomizing device 131 is increased due to increase of load to mist generation department 139, and mist-making failure due to freezing of mist generation department 139 may be feared. However, such troubles due to increase of load to mist generation department 139 can be avoided, and an appropriate dew condensation amount is assured, and a stable mist atomizing is realized at low input.

Preferred Embodiment 19

FIG. 27 shows a detailed sectional view near the electrostatic atomizing device cut along line A-A in FIG. 2 in preferred embodiment 19 of the present invention.

In this preferred embodiment, in the refrigerator in preferred embodiment 7, instead of the electrostatic atomizing device shown in FIG. 9, the electrostatic atomizing device shown in FIG. 27 is used. In the preferred embodiment, the configuration is same as in preferred embodiment 7 shown in FIG. 9, and similar effects are obtained. Further as shown in FIG. 27, near cooling pin 134, heat conducting pin heater 158 is provided for regulating the temperature of cooling pin 134.

In the preferred embodiment, too, since cooling pin 134 is cooled by way of a heat insulator of heat cushioning material, atomizing electrode 135 is cooled indirectly by cooling pin 134 of heat conduction material. It is further cooled indirectly in a dual structure by way of heat insulator 152 of heat cushioning material. Extreme cooling can be prevented by regulating the temperature of atomizing electrode 135 at the tip of the department mist by means of heat conducting pin heater 158. If atomizing electrode 135 is cooled extremely, the dew condensation amount increases, and the input to electrostatic atomizing device 131 is increased due to increase of load to mist generation department 139, and mist-making failure due to freezing of mist generation department 139 may be feared. However, such troubles due to increase of load to mist generation department 139 can be avoided, and an appropriate dew condensation amount is assured, and a stable mist atomizing is realized at low input.

Preferred Embodiment 20

FIG. 28 shows a detailed sectional view near the electrostatic atomizing device cut along line A-A in FIG. 2 in preferred embodiment 20 of the present invention.

In this preferred embodiment, in the refrigerator in preferred embodiment 8, instead of the electrostatic atomizing device shown in FIG. 12, the electrostatic atomizing device shown in FIG. 28 is used. In the preferred embodiment, the configuration is same as in preferred embodiment 8 shown in FIG. 12, and similar effects are obtained. Further as shown in FIG. 28, near cooling pin 134, heat conducting pin heater 158 is provided for regulating the temperature of cooling pin 134.

In the preferred embodiment, too, since cooling pin 134 is cooled by way of a heat insulator of heat cushioning material, atomizing electrode 135 is cooled indirectly by cooling pin 134 of heat conduction material. It is further cooled indirectly in a dual structure by way of heat insulator 152 of heat cushioning material. Extreme cooling can be prevented by regulating the temperature of atomizing electrode 135 at the tip of the department mist by means of heat conducting pin heater 158. If atomizing electrode 135 is cooled extremely, the dew condensation amount increases, and the input to electrostatic atomizing device 131 is increased due to increase of load to mist generation department 139, and mist-making failure due to freezing of mist generation department 139 may be feared. However, such troubles due to increase of load to mist generation department 139 can be avoided, and an appropriate dew condensation amount is assured, and a stable mist atomizing is realized at low input.

Preferred Embodiment 21

Figure 29:
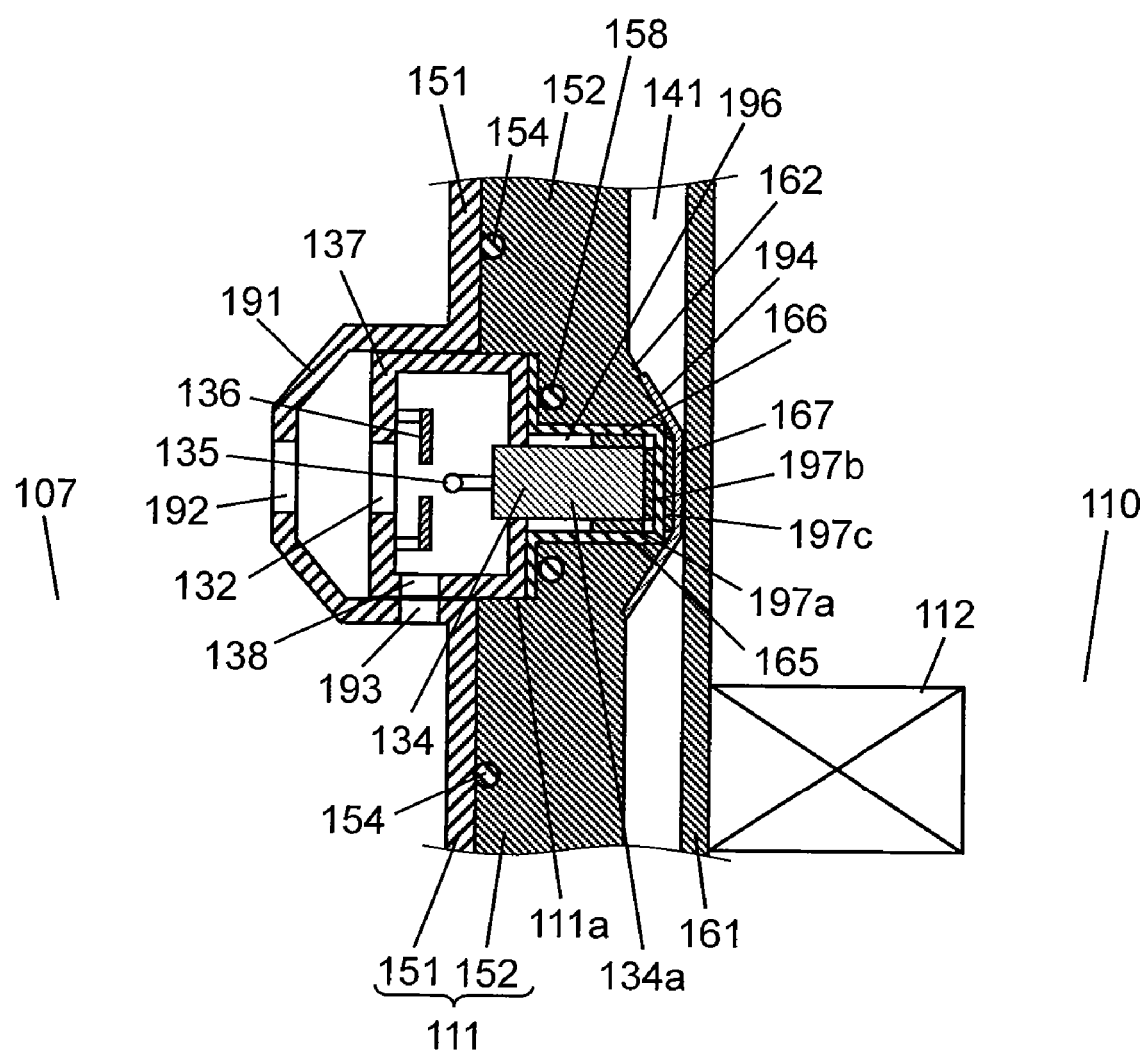
FIG. 29 shows a sectional view cut along line A-A in FIG. 2, and the sectional view details an electrostatic atomizing device and its periphery in accordance with a 21st embodiment of the present invention.

FIG. 29 shows a detailed sectional view near the electrostatic atomizing device cut along line A-A in FIG. 2 in preferred embodiment 21 of the present invention.

In this preferred embodiment, in the refrigerator in preferred embodiment 9, instead of the electrostatic atomizing device shown in FIG. 13, the electrostatic atomizing device shown in FIG. 29 is used. In the preferred embodiment, the configuration is same as in preferred embodiment 9 shown in FIG. 13, and similar effects are obtained. Further as shown in FIG. 29, near cooling pin 134, heat conducting pin heater 158 is provided for regulating the temperature of cooling pin 134.

By referring to the time charts shown in FIG. 30 to FIG. 33, the operations of electrostatic atomizing device 131 and heat conducting pin heater 158 in the preferred embodiment are explained below, including the operations of the refrigerator.

Figure 30:
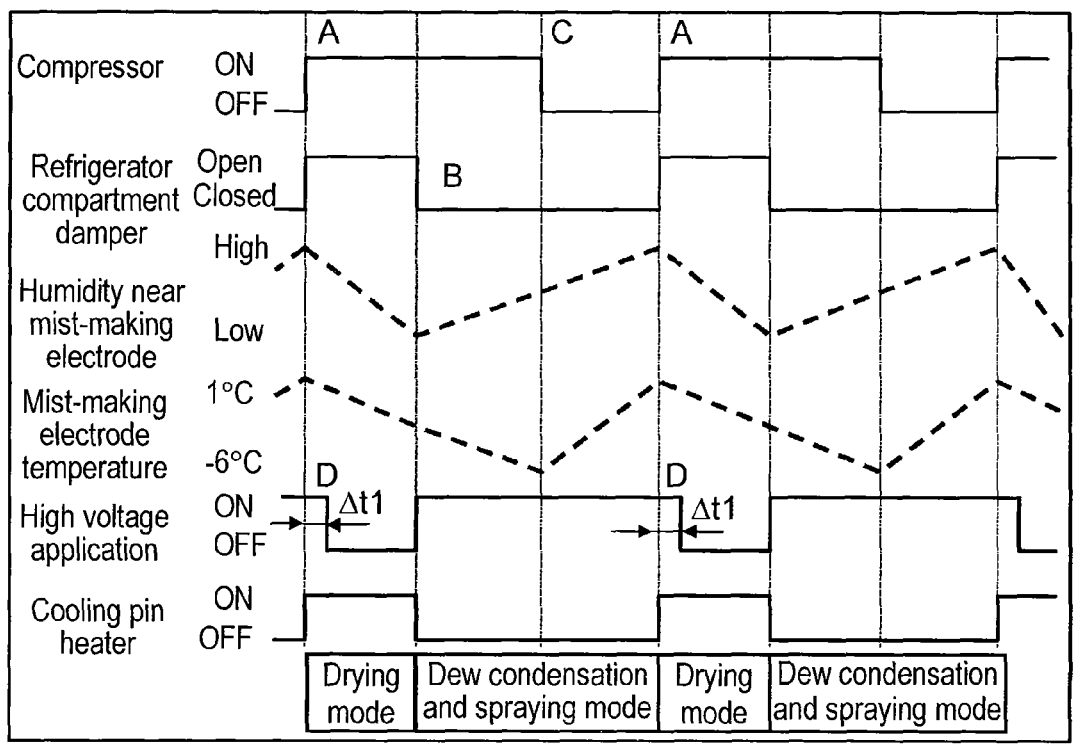
FIG. 30 shows a timing chart in accordance with the 21st embodiment.
Figure 31:
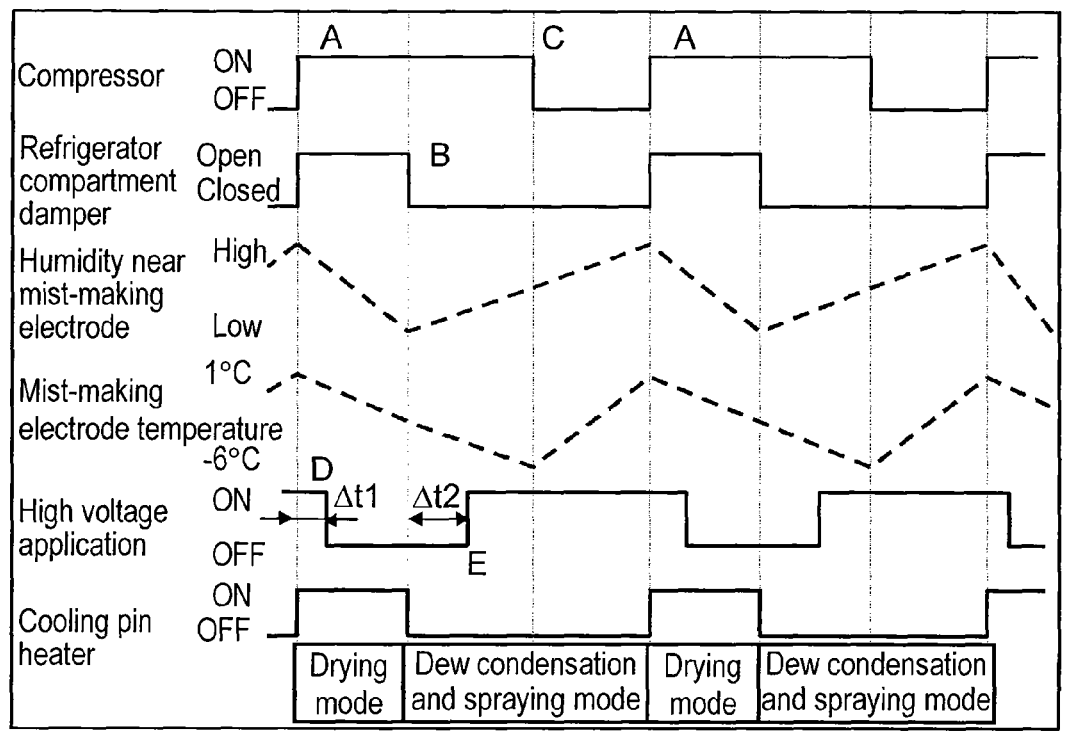
FIG. 31 shows a timing chart in accordance with the 21st embodiment.
Figure 32:
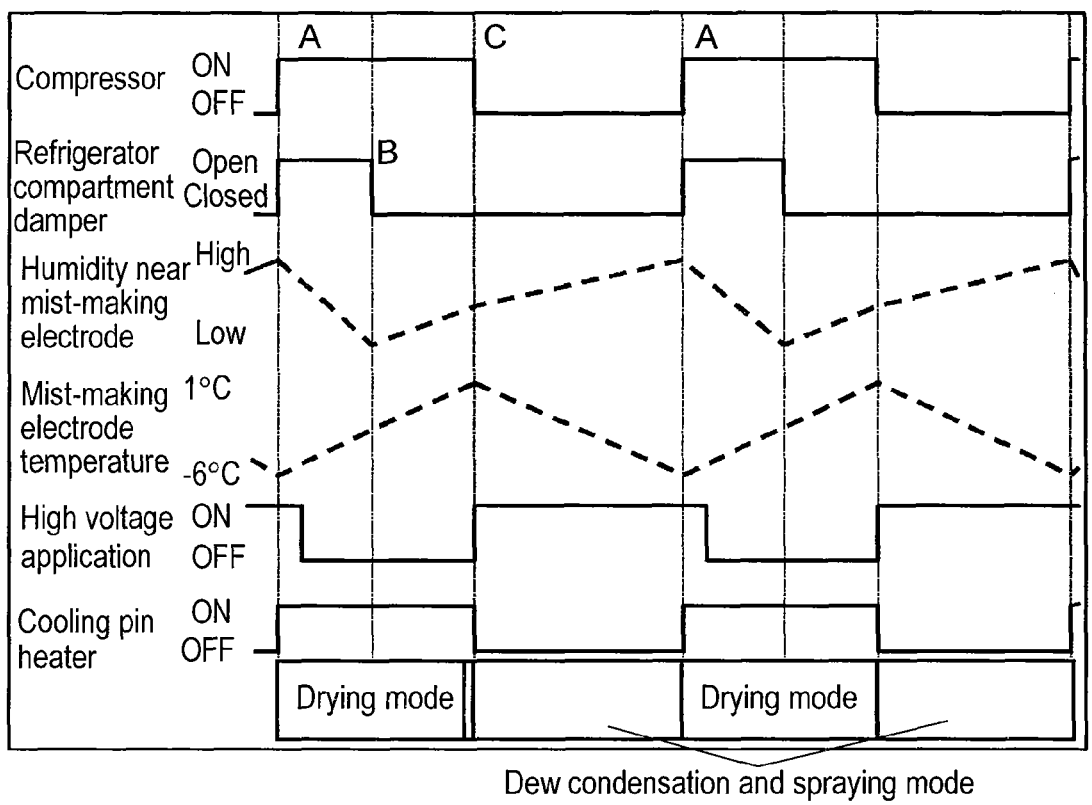
FIG. 32 shows a timing chart in accordance with the 21st embodiment.
Figure 33:
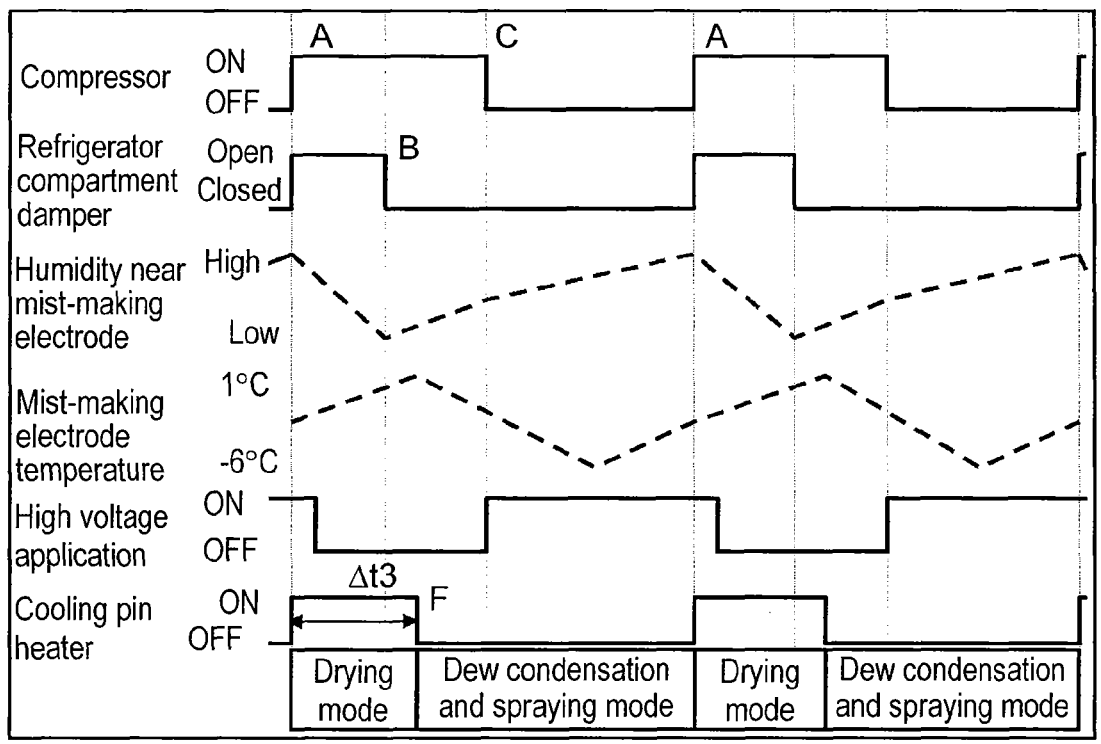
FIG. 33 shows a timing chart in accordance with the 21st embodiment.
Figure 34:
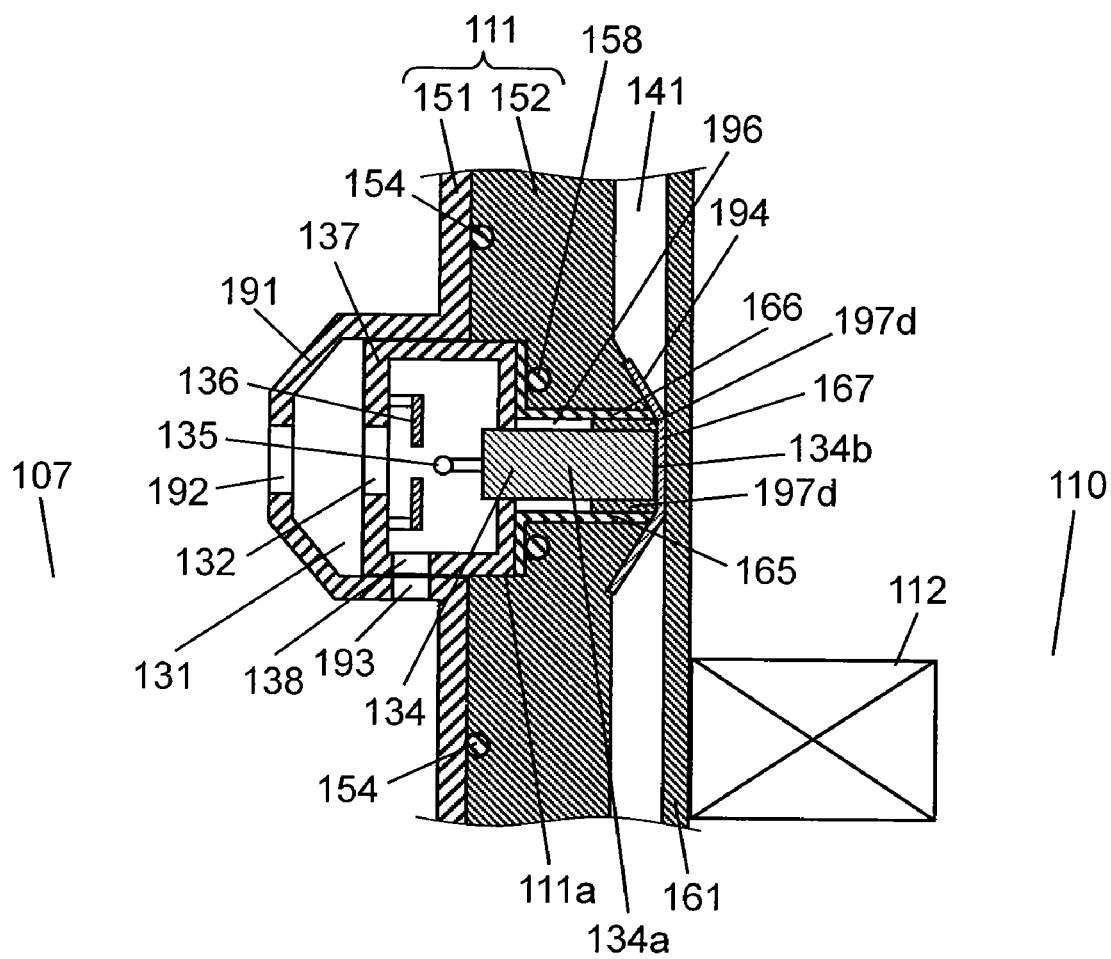
FIG. 34 shows a sectional view cut along line A-A in FIG. 2, and the sectional view details an electrostatic atomizing device and its periphery in accordance with a 22nd embodiment of the present invention.
Figure 35:
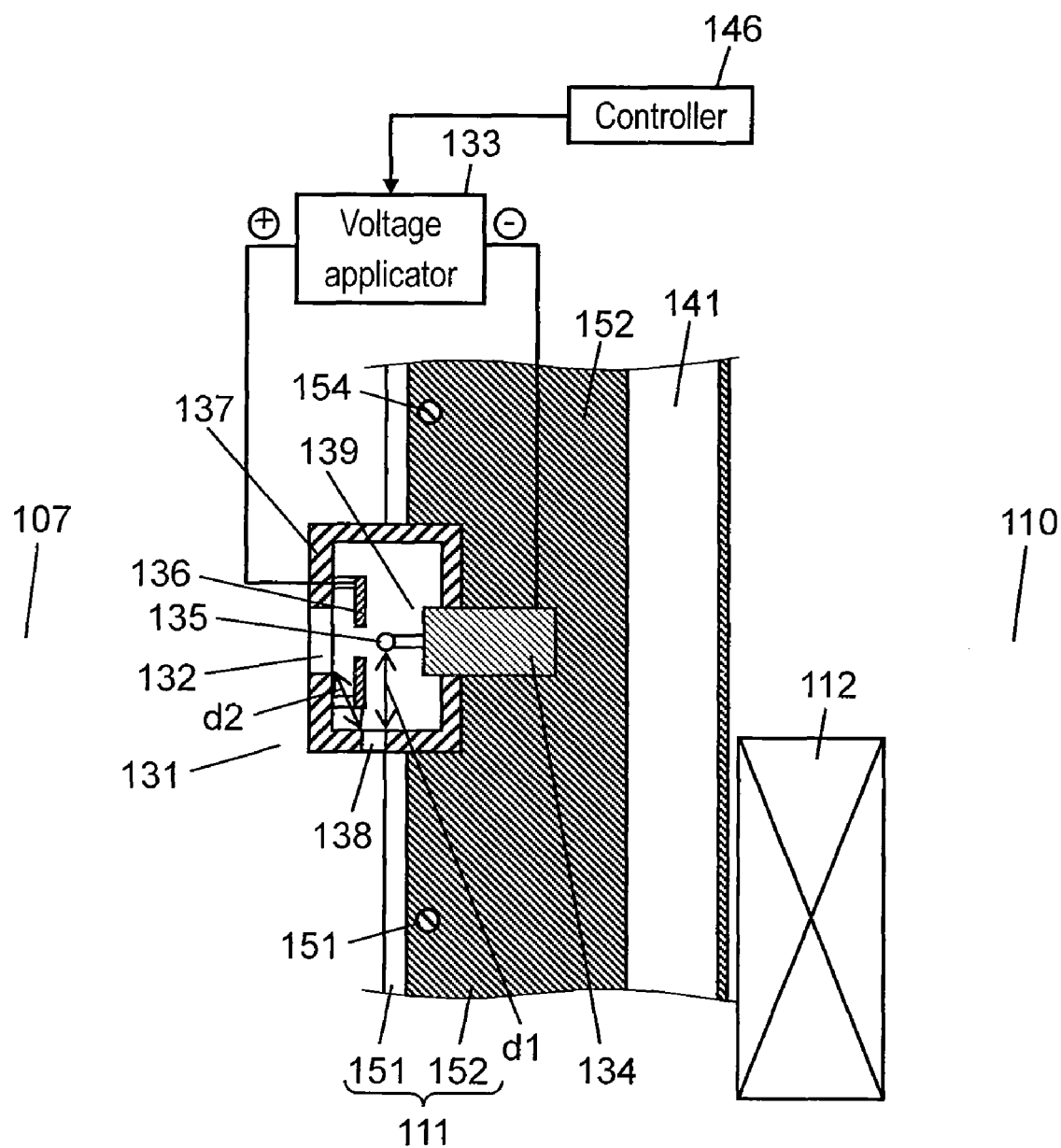
FIG. 35 shows a sectional view cut along line A-A in FIG. 2, and the sectional view details an electrostatic atomizing device and its periphery of a refrigerator in accordance with a 23rd embodiment of the present invention.

Usually, in refrigerator 100, when the compartment temperature in freezer compartment 108 or refrigerator compartment 104 rises higher than a specified temperature, the operation of compressor 109 is started for cooling each compartment (point A in FIG. 30). At this time, for cooling and temperature regulation of refrigerator compartment 104, the closed refrigerator compartment damper is opened, and cooling is started in refrigerator compartment 104 and in vegetable compartment 107 at the downstream side of its air ducts. A cold air flows into the storage compartments by way of these air ducts, and the storage compartments are relatively controlled at a low humidity. Herein, to prevent freezing and to promote drying of atomizing electrode 135 of electrostatic atomizing device 131, a heater input is applied to heat conducting pin heater 158 while the refrigerator compartment damper is being opened. That is, while a cold air is flowing into the vegetable compartment, it is controlled to promote drying.

Consequently, when refrigerator compartment 104 is cooled to a specified temperature, the refrigerator compartment damper is closed, and cold air no longer flows into vegetable compartment 107. As a result, the storage compartment humidity in vegetable compartment 107 begins to rise, and the input to heat conducting pin heater 158 is stopped, and the operation is changed to the dew condensation and atomizing mode of atomizing electrode 135 (point B in FIG. 30). At this time, to generate a fine mist, voltage applicator 133 of electrostatic atomizing device 131 is turned on to apply a high voltage. In consequence, atomizing electrode 135 is cooled, and the humidity elevates around atomizing electrode 135, and then dew begins to condense on the leading end of the atomizing electrode. When dew condensation grows to a certain extent, fine mist of nano level is generated by high voltage discharge between opposite electrode 136 and atomizing electrode 135, and is atomized into the storage compartment. That is, while flow of cold air into the vegetable compartment is being stopped, it is controlled to condense dew by the atomizing electrode.

Afterwards, when freezer compartment 108 is cooled to a specified temperature, compressor 109 is stopped (point C in FIG. 30), and cooling is stopped, and the temperature of evaporator 112 begins to rise. As a result, the humidity in the vegetable compartment is elevated, and the environment is more likely to make mist. At this time, since cooling pin 134 has a certain thermal capacity, the temperature does not hike sharply, but a cooled state is maintained. Therefore, atomizing electrode 135 is successively cooled, and dew is condensed at the leading end of the atomizing electrode, and the mist can be atomized.

Again, freezer compartment 108 and refrigerator compartment 104 become higher than a specified temperature, the operation of compressor 109 is started again (point A in FIG. 30). At this time, right after start of operation of compressor 109, the dew condensation water is still present at the leading end of the atomizing electrode, and is not dried quickly, and for a portion of time Δt1 from point A, for example, 3 minutes to 10 minutes, application of high voltage by voltage applicator 133 is continued. As a result, the atomizing time can be extended, and the freshness is enhanced.

As shown in FIG. 31, right after transfer from drying mode to dew condensation and atomizing mode, water is rarely present at the leading end of the atomizing electrode, by delaying the start of application of high voltage by a portion of time Δt2 from point B, for example, about 5 minutes to 10 minutes (point E), the mist can be atomized after sufficient dew condensation, so that the mist can be atomized efficiently, and the energy is saved at the same time.

However, if the ambient temperature of the refrigerator is low, by opening the refrigerator compartment damper, the cooling time of the refrigerator compartment is very short.

Accordingly, if the ambient temperature is lower than a specific temperature, or if the load of refrigerator compartment 104 is relatively small, it is hard to dry atomizing electrode 135 only by interlocking with the damper. However, the operation of heat conducting pin heater 158 is not interlocked with the refrigerator compartment damper as shown in FIG. 30, but is interlocked with compressor 109 as shown in FIG. 32, so that the heating time of heat conducting pin heater 158 is assured, thereby preventing freezing and promoting drying of atomizing electrode 135. Accordingly, for application of high voltage by voltage applicator 133 for condensing dew on the electrode and atomizing mist, the power is supplied while compressor 109 is stopped, and a high voltage is applied between atomizing electrode 135 and opposite electrode 136. However, as explained in FIG. 30, application of high voltage is continued from point A to point D. As a result, a stable mist can be atomized even in low temperature environment.

Further, as shown in FIG. 33, if there is a sufficient allowance for the input of heat conducting pin heater 158, in order to assure the cooling time of the atomizing electrode, the heating capacity of the heater is increased more than usual for a period of Δt3 time (from point A to point F) after start of operation of compressor 109, and prevention of freezing and promotion of drying can be executed powerfully. As a result, the drying time can be shortened. Hence, the entire time after stopping of the heater can be utilized for cooling, and dew is likely to deposit on the atomizing electrode leading end, and the mist atomizing time is longer, and the amount of mist deposit on the vegetable is increased, and the freshness is improved.

Further, although not described specifically herein, when defrosting the evaporator or right after defrosting, cold air at high humidity is more likely to be entered, and atomizing electrode 135 is in an environment likely to atomize mist. It is therefore preferred to transfer to the dew condensation and atomizing mode by applying a high voltage. Besides, the atomizing electrode right after defrosting is relatively at high temperature, and after stopping heat conducting pin heater 158 for a specific time, it is desired to apply a high voltage to atomize mist.

Thus, the dew condensation and atomizing mode and the drying mode are repeated to control appropriately the state of atomizing electrode 135 of electrostatic atomizing device 131 of the mist maker, and the mist atomizing efficiency can be enhanced. As a result, the mist can be atomized while the energy is saved, and it is easy to manage the temperature when cooling atomizing electrode 135 at the tip of the department mist, and the atomizing amount can be controlled at a higher precision.

In the preferred embodiment, in order to avoid an air layer between cooling pin 134 of heat conduction material for cooling of mist generation department and the cooling section, voids 196 between cooling pin 134 and the cooling section are filled up with void burying members 197a, 197b, 197c of a high heat conduction material than the air layer, such as butyl or heat diffusion compound. Such filing is not required, however, if there is no air layer between cooling pin 134 of heat conduction material and the cooling section. For example, by eliminating the air layer by fixing cooling pin 134 tightly to the wall of partition 161, heat conduction to cooling pin 134 is assured, and the temperature may be managed appropriately when cooling atomizing electrode 135 at the tip of the department mist in a simpler configuration.

Preferred Embodiment 22

FIG. 34 shows a detailed sectional view near the electrostatic atomizing device cut along line A-A in FIG. 2 in preferred embodiment 22 of the present invention.

In this preferred embodiment, in the refrigerator in preferred embodiment 10, instead of the electrostatic atomizing device shown in FIG. 14, the electrostatic atomizing device shown in FIG. 34 is used. In the preferred embodiment, the configuration is same as in preferred embodiment 10 shown in FIG. 14, and similar effects are obtained. Further as shown in FIG. 34, near cooling pin 134, heat conducting pin heater 158 is provided for regulating the temperature of cooling pin 134.

In the preferred embodiment, too, since cooling pin 134 is cooled by way of a heat insulator of heat cushioning material, atomizing electrode 135 is cooled indirectly by cooling pin 134 of heat conduction material. It is further cooled indirectly in a dual structure by way of heat insulator 152 of heat cushioning material. Extreme cooling can be prevented by regulating the temperature of atomizing electrode 135 at the tip of the department mist by means of heat conducting pin heater 158. If atomizing electrode 135 is cooled extremely, the dew condensation amount increases, and the input to electrostatic atomizing device 131 is increased due to increase of load to mist generation department 139, and mist-making failure due to freezing of mist generation department 139 may be feared. However, such troubles due to increase of load to mist generation department 139 can be avoided, and an appropriate dew condensation amount is assured, and a stable mist atomizing is realized at low input.

As explained so far, in the cooling section, the mist generation department is cooled indirectly by way of a heat conduction material, and the water volume in the mist generation department is regulated, and the configuration of atomizing the mist by regulating the atomizing amount of mist from the mist generation department into the storage compartments in a simple structure is explained in the foregoing preferred embodiments.

Referring now to the drawings for explaining the preferred embodiments, the atomizing port and the humidity supplying port are specifically described below. In particular, it is explained that the humidity supplying port functions also as a cold air supplying port for supplying a cold air.

Preferred Embodiment 23

FIG. 35 is a front view near the vegetable compartment in the refrigerator in preferred embodiment 23 of the present invention, and the configuration is same as in FIG. 3 showing preferred embodiment 1. Therefore, same as in FIG. 3, FIG. 35 shows a detailed sectional view near the electrostatic atomizing device cut along line A-A in FIG. 2. Referring to FIG. 35, the atomizing port and the humidity supplying port having a function of cold air supplying port of the present invention are specifically described below.

The mist maker or electrostatic atomizing device 131 is mainly composed of mist generation department 139, voltage applicator 133, and outlet wall 137, and atomizing port 132 is provided in outlet wall 137, together with humidity supplying port 138 as cold air supplying port into outlet wall 137 in the lower side of outlet wall 137 orthogonal to the surface forming other atomizing port 132, and mist generation department 139 and voltage applicator 133 are accommodated inside. Mist generation department 139 includes atomizing electrode 135 having a tip of the department mist for atomizing mist, and atomizing electrode 135 is fixed to cooling pin 134 of heat conduction material such as aluminum or stainless steel.

This cold air supplying port, that is, humidity supplying port 138 is installed so that shortest distance d2 between humidity supplying port 138 and atomizing port 132 may be shorter than shortest distance d1 between humidity supplying port 138 and atomizing electrode 135 as a tip of the department mist for condensing dew.

In other words, humidity supplying port 138 is provided in outlet wall 137 at a lower side from atomizing electrode 135 having the tip of the department mist of mist generation department 139.

Cooling pin 134 is fixed on outlet wall 137, and cooling pin 134 itself is projecting from the outlet wall. At a position opposite to atomizing electrode 135, opposite electrode 136 of circular doughnut shape is disposed at the storage compartment side, at a specific distance from the leading end of atomizing electrode 135, and atomizing port 132 is composed on its extension.

Near mist generation department 139, voltage applicator 133 is formed, and the negative potential side of voltage applicator 133 for generating a high voltage is electrically connected to atomizing electrode 135, and the positive potential side, to opposite electrode 136 respectively.

Voltage applicator 133 communicates with and is controlled by controller 146 of the refrigerator main body, and turns on or off the high voltage by an input signal from refrigerator 100 or electrostatic atomizing device 131.

Surface of rear-end partition 151 fixing the mist maker, that is, electrostatic atomizing device 131 is provided with heater 154 or other heating means for regulating the temperature in the storage compartment or preventing dew condensation on the surface, installed between surface of rear-end partition 151 and heat insulator 152.

Thus, the mist-maker is installed in the partition having heater 154 or other heating means on the side wall, and heater 154 is also provided at least at the lower side of the mist maker.

In the refrigerator having such configuration, the operation and effects are explained below. First, the operation of the freezing cycle is described. Depending on the preset temperature in the compartment, the freezing cycle is started by a signal from a control circuit board (not shown), and the cooling operation is executed. The refrigerant of high temperature and high humidity discharged from the operation of compressor 109 is somewhat condensed and liquefied in a condenser (not shown), and flows through the side or back of the refrigerator main body, passes through a refrigerant piping (not shown) disposed at the front opening of the refrigerator main body, and is condensed and liquefied while preventing dew condensation in the refrigerator main body, and reaches up to a capillary tube (not shown). In the capillary tube, thereafter, while exchanging in heat with suction tube (not shown) into compressor 109, it is decompressed to become a liquid refrigerant of low temperature and low pressure, and reaches up to evaporator 112. Herein, the liquid refrigerant of low temperature and low pressure is exchanged in heat with the air in the storage compartments such as outlet air-duct 141 for freezer compartment conveyed by the operation of cooling fan 113, and the refrigerant in evaporator 112 is evaporated and vaporized. At this time, cold air for cooling each storage compartment is generated in the cooling compartment. The cold air at low temperature is distributed from cooling fan 113 into refrigerator compartment 104, switchable temperature compartment 105, icemaker 106, vegetable compartment 107, and freezer compartment 108 by way of air duct and damper, and each compartment is cooled to a desired temperature zone. In particular, vegetable compartment 107 is regulated to be 2° C. to 7° C. by on/off operation of distribution of cold air or heating unit (not shown), and generally compartment temperature detecting means is not provided.

Vegetable compartment 107 cools refrigerator compartment 104, and this air is discharged into vegetable compartment 107 from outlet 124 for vegetable compartment disposed in the midst of air duct 140 returning from refrigerator compartment for circulating into evaporator 112, and passed into the outer circumference of upper basket 120 or lower basket 119 to cool indirectly, and returns again to evaporator 112 from inlet 126 for vegetable compartment.

In a certain part at position of relatively high humidity environment in rear partition 111, heat insulator 152 is thinner in wall thickness than in other parts, and the heat insulator is formed in a thickness of about 2 mm to 10 mm, for example, behind cooling pin 134 in particular. As a result, a recess is formed in rear partition 111, and electrostatic atomizing device 131 is provided in this place, so that the atomizing direction may be toward space in the storage compartment.

Outlet air-duct 141 for freezer compartment provided at the back side of the cooling pin is a flow passage of cold air of about −15 to −25° C. generated in evaporator 112 by operation of the cooling system and blown by cooling fan 113, and by heat conduction from the air duct surface, cooling pin 134 is cooled, for example, to about 0 to −6° C. At this time, since cooling pin 134 is a heat conduction material, the cold heat is transmitted quickly, and the atomizing electrode is also cooled to about 0 to −6° C.

Herein, since the vegetable compartment is at 2° C. to 7° C., and is at a relatively high humidity due to transpiration from vegetables, and atomizing electrode 135 is below the dew point.

Moisture in the air entering from humidity supplying port 138 as cold air supplying port provided in outlet wall 137 condenses dew, and this dew condensation water is turned into a mist in mist generation department 139, and is atomized from atomizing port 132, and thereby an air inlet or outlet is formed in outlet wall 137, and due to effects of air convection in the storage compartment, an air flow is generated including the area of atomizing electrode 135, and air of relatively high humidity due to transpiration from vegetables is supplied efficiently and stably into atomizing electrode 135 from humidity supplying port 138, and water drops are formed and applied to atomizing electrode 135 including the leading end.

This cold air supplying port, that is, humidity supplying port 138 is installed so that shortest distance d2 between humidity supplying port 138 and atomizing port 132 may be shorter than shortest distance d1 between humidity supplying port 138 and atomizing electrode 135 as a tip of the department mist for condensing dew, and a part of the cold air flowing into outlet wall 137 from humidity supplying port 138 flows into the periphery of atomizing electrode 135 in order to promote dew condensation, and also a part passes through the air duct of smallest ventilation resistance as a short cut to atomizing port 132 from humidity supplying port 138 without passing through atomizing electrode 135, and by the cold air passing through the short-cut air duct, a flow of air may be generated more positively in outlet wall 137, and the moisture does not stay in outlet wall 137, and circulates together with the flowing cold air.

Thus, humidity supplying port 138 introduces humidity into outlet wall 137, and also has a function as cold air supplying port for generating a flow of cold air in outlet wall 137.

When forming a short-cut air flow of smallest ventilation resistance from humidity supplying port 138 to atomizing port 132 without passing through atomizing electrode 135 at the tip of the department mist, shortest distance d2 between humidity supplying port 138 and atomizing port 132 is set shorter than shortest distance d1 between humidity supplying port 138 and atomizing electrode 135 as a tip of the department mist for condensing dew, but an air duct of smallest ventilation resistance may be formed in other parts, and similar effects are obtained.

At this time, humidity supplying port 138 is provided at the lower side of outlet wall 137 at the bottom side of the storage compartment, and if the dew condensation water by dew condensation in mist generation department 139 is collected at the lower side of outlet wall 137, the dew condensation water can be discharged out of the outlet wall from this opening. That is, this opening functions not only as a humidity supplying port or a cold air supplying port, but also as a water drain port of dropping dew condensation water, and generation of water scale or invasion of dew condensation water into the voltage applicator due to collection of dropping dew condensation water can be prevented, and the safety of electrostatic atomizing device 131 is enhanced.

Thus, in the present invention, these openings such as atomizing port 132 and humidity supplying port 138 are provided in other surface than the upper surface of outlet wall 137, and if the dew condensation water in the storage compartment collected at a higher position than outlet wall 137 in the storage compartment drops into outlet wall 137 in the storage compartment of the refrigerator in a cold and closed space, since there is no opening in the upper side of outlet wall 137, dropping of water drops from outside of outlet wall 137 into the inside of outlet wall 137 can be prevented, and a refrigerator of higher safety free from electric leak or short circuit can be presented.

Since humidity supplying port 138 is provided at the lower side of outlet wall 137, the upper surface of outlet wall 137 is closed and not opened, and if dew condensation is generated in outlet wall 137, the lower side of outlet wall 137 has humidity supplying port 138 functioning as water drain port and as an opening for flow of cold air, generation of water scale or growth of bacteria or mold in outlet wall 137 can be prevented.

The mist maker and outlet wall 137 have humidity supplying port 138 provided at a position immediately above the upper end of lower basket 119 in the storage compartment mainly for atomizing mist as shown in FIG. 1, so that the cold air of high humidity may be taken in from humidity supplying port 138, and the cold air of high humidity is likely to flow into humidity supplying port 138 from the storage compartment, and the dew condensation water is generated more efficiently, and can be atomized as mist.

The mist maker is provided in the partition having heater 154 or other heating means in the side wall, and as compared with other side wall, in the partition likely to generate an ascending air stream by heater 154, outlet wall 137 containing the mist generation department of the mist maker is provided, and the lower side is opened as a humidity supplying port, and by riding on the ascending air stream, the cold air smoothly flows into the outlet wall, and an air stream is positively generated in outlet wall 137, and moisture is not collected in outlet wall 137, but is circulated together with the flowing cold air, or circulated as mist by condensing dew in the mist generation department.

Heater 154 is formed also at least at the lower side of the mist maker, and an ascending air stream to humidity supplying port 138 is generated more securely, and the cold air is likely to flow into outlet wall 137, and the air stream is more positively generated in outlet wall 137, and humidity supplying port 138 more effectively plays the role of cold air supplying port for generating a stream of cold air into outlet wall 137.

The mist maker and outlet wall 137 have the mist maker disposed as the side of inlet 126 for vegetable compartment as an outlet of cold air, from the center in the lateral direction of the storage compartment as shown in FIG. 2, so that the cold air of high humidity can be taken in from humidity supplying port 138. As a result, the cold air of high humidity from the storage compartment flows abundantly to the side of inlet 126 for vegetable compartment as an outlet of cold air, and in the lateral direction in the storage compartment, at the outlet of cold air, the humidity is higher at the side of inlet 126 for vegetable compartment as an outlet of cold air, and the cold air of high humidity from the storage compartment is more likely to flow into humidity supplying port 138, and the condensation water is generated more efficiently, and the mist can be atomized.

The vicinity of the mist maker is high in humidity due to atomizing of mist, and especially in outlet wall 137, generation of water scale or electric leak by way of moisture are likely to occur, but since humidity supplying port 138 functioning as cold air supplying port is provided in the preferred embodiment, an access of air is formed, and an air stream is positively generated in outlet wall 137, and moisture is not collected in outlet wall 137, but can be circulated together with the flowing cold air.

In outlet wall 137, in particular, at the lower side than the mist generation department of atomizing electrode 135, relatively large and heavy particles among the atomized mist collide against the outlet wall, and the mist not atomized into the storage compartment may deposit, and generation of water scale or electric leak by way of moisture may be likely to occur, but in the preferred embodiment, since the humidity supplying port is provided at the lower side of the mist generation department of outlet wall 137 where moisture is likely to deposit, the cold air at the lower side of high humidity is passed into the mist generation department, and dew is condensed positively in the mist generation department, and moisture does not stay in outlet wall 137, and a cold air having a sufficient humidity is supplied into the mist generation department, and the air of relatively high humidity is supplied efficiently and stably from humidity supplying port 138 into atomizing electrode 135, and water drops are generated and applied to atomizing electrode 135 including the leading end of the mist generation department.

Further, in the preferred embodiment, since electrostatic atomizing device 131 is used, the particle size of generated mist is as small as several unit of nm or tens of units of nm, and the atomizing electrode is sterilized by application of high voltage, and the generated fine mist deposits near the atomizing port, not forming a water sump, and since the fine mist contains OH radicals and ozone of high oxidation power, growth of bacteria near the atomizing port can be prevented, and water scale is not formed.

If dew condensation water depositing on rear partition 111 directly drops as liquid drops, or drops along outlet wall 137, the water is discharged outside of outlet wall 137 from humidity supplying port 138, and invasion into voltage applicator 133 can be prevented.

Thus, from the steam in vegetable compartment 107, dew can be condensed on atomizing electrode 135 easily and securely, and water supply device or other complicated device is not needed, and mist can be atomized in a simple structure.

By atomizing mist by the electrostatic atomizing device, a fine mist is generated, and the atomized fine mist uniformly deposits on the surface of vegetables and fruit, and transpiration from vegetables and fruit can be suppressed, and the freshness is enhanced.

Since atomizing electrode 135 and voltage applicator 133 are contained in outlet wall 137, accidental touch of user's hand with atomizing electrode 135 and voltage applicator 133 can be prevented, and if a high voltage is applied in the storage compartment, fine mist can be atomized while assuring the safety of the user.

A high voltage (for example, 4 to 10 kV) is applied between two electrodes, that is, atomizing electrode 135 at negative voltage side, and opposite electrode 136 at positive electrode side, from voltage applicator 133. At this time, a corona discharge takes place between the two electrodes, and water drops at the leading end of atomizing electrode 135 are pulverized by an electrostatic energy, and since the liquid drops are electrically charged, by Rayleigh scattering, electrically charged invisible nano-level fine mist of several nm units, and ozone and OH radical are generated at the same time. The voltage applied between the electrodes is very high, about 4 to 10 kV, but the discharge current value at this time is several μA levels, and the input is very low, about 0.5 to 1.5 W.

When a fine mist is atomized from atomizing electrode 135, an ion wind is generated. At this time, also, by humidity supplying port 138 formed separately from atomizing port 132, an air of high humidity freshly flows into atomizing electrode 135, and the mist can be atomized continuously.

The generated fine mist is atomized into lower basket 119, and is very fine in particle size, and is hence strong in diffusion, and the fine mist easily reaches up to upper basket 120. Since the atomized mist is generated by high voltage discharge, it is charged negatively. On the other hand, vegetable compartment 107 contains green and leafy plants among vegetables and fruit, and these vegetables and fruit are likely to transpire or wither due to transpiration during storage. Some of the vegetables and fruit stored in the vegetable compartment may be already withered due to transpiration when returning from shop or during storage, and are positively charged. Hence, the atomized mist is likely to gather on the surface of vegetables, and hence the keeping-fresh performance is enhanced.

The nano-level fine mist sticking to the vegetable surface contains OH radicals and traces of ozone, and is effective for killing germs, resisting germs and removing germs, and still more, vegetables are encouraged to increase in nutrients such as vitamin C by removal of agricultural chemicals and antioxidation by oxidation and decomposition.

If there is no water in atomizing electrode 135, the discharge distance becomes longer, and the insulation layer of air cannot be broken, and discharge phenomenon does not take place. As a result, no current flows between the atomizing electrode and the opposite electrode. This phenomenon is detected by controller 146 of refrigerator 100, and the high voltage of voltage applicator 133 can be turned on and off.

Thus, in the preferred embodiment, electrostatic atomizing device 131 is provided for atomizing mist into thermally insulated storage compartment (vegetable compartment 107) and storage compartment (vegetable compartment 107), and mist generation department 139 includes atomizing electrode 135 electrically connected to voltage applicator 133 for generating a high voltage, opposite electrode 136 disposed at a position opposite to atomizing electrode 135, and a cooling section for cooling atomizing electrode 135 below the dew point, and the moisture in the is cooled to condense dew on atomizing electrode 135, and is atomized as mist into storage compartment (vegetable compartment 107), and from the excessive steam in storage compartment (vegetable compartment 107), dew can be easily condensed on atomizing electrode 135, and fine mist of nano level is generated by corona discharge of high voltage with opposite electrode 136, and the atomized fine mist uniformly deposits on the surface of vegetables and fruit, and transpiration from vegetables and fruit can be suppressed, and the freshness is enhanced. Besides, moisture can be supplied into withered cells from gaps and pores between cells in the surface of vegetables and fruit by permeating through tissues, and the vegetables are returned to a fresh state.

Ozone and OH radicals generated at the same time with the mist are effective for deodorizing, removing harmful substances from the food surface, and preventing contamination.

The atomized mist is directly applied to the food in the vegetable compartments (upper basket 120 and lower basket 119), and by making use of the potential between the mist and vegetables, the mist can be applied on the surface of vegetables, and the efficiency of preservation is enhanced.

From the excessive steam in the storage compartment (vegetable compartment 107), dew is condensed on atomizing electrode 135, and water drops are applied, and mist is atomized, and water tank is not needed, or the pump, capillary or other water supplying parts are not used, and the structure is built up inexpensively.

Besides, instead of tap water, water from dew condensation is used, and it is free from minerals and impurities, and deterioration when water retaining material is used, or deterioration of water retaining properly due to clogging can be prevented.

This is not ultrasonic mist making by ultrasonic vibration, water tank is not needed, and the input is small, and temperature effects in the compartment are low.

The portion containing voltage applicator 133 is buried in rear partition 111, and is cooled, so that the temperature rise of the circuit board can be suppressed. As a result, temperature effects in the storage compartment (vegetable compartment 107) are kept low.

The preferred embodiment presents a refrigerator including storage compartments thermally insulated by the partition, and the mist generation department for atomizing mist into the storage compartment, and the mist generation department includes a tip of the department mist for atomizing mist into the storage compartment, a voltage applicable for applying a voltage to the tip of the department mist, and a heat conduction material coupled to the tip of the department mist, and also an outlet wall for accommodating the tip of the department mist, and the outlet wall includes a atomizing port for passing the mist, and a humidity supplying port for passing the humidity, aside from the atomizing port, and the mist-making leading end is cooled by the cooling section to a temperature lower than the dew point, and the moisture in the air is cooled to condense dew on the tip of the department mist, and atomized into the storage compartment.

By such configuration, since an air access is formed, due to effects of air convection in the storage compartment (vegetable compartment 107), an air stream is also generated in atomizing electrode 135, and the moisture (humidity) in the air in the storage compartment (vegetable compartment 107) can be efficiently and stably supplied into atomizing electrode 135, and dew condensation is promoted.

Humidity supplying port 138 is provided at the bottom side of outlet wall 137, and of the dew condensation water depositing on rear partition 111 drops, invasion into voltage applicator 133 from humidity supplying port 138 can be prevented, and the safety is enhanced.

When a fine mist is atomized from atomizing electrode 135, an ion wind is generated, and at this time, a fresh air flows into atomizing electrode 135 from humidity supplying port 138 functioning also as a cold air supplying port, and circulation flow (short circuit) is not formed near atomizing port 132, and the mist can be atomized continuously and stably.

By installing the gap in the storage compartment (vegetable compartment 107), the storage volume is not decreased, and since it is provided at the inner side, and is not accessible by the user's hand, and the safety is enhanced.

Ozone is also generated when a fine mist is generated. By on/off operation of electrostatic atomizing device 131, the ozone concentration in the storage compartment (vegetable compartment 107) can be adjusted. By adjusting the ozone concentration appropriately, deterioration such as yellowing of vegetables can be prevented, and the bactericidal action and antibacterial action of the vegetable surface can be enhanced.

In the preferred embodiment, the air duct for cooling of cooling pin 134 is outlet air-duct 141 for freezer compartment, but other low temperature air duct may be used, such as discharging air duct from icemaker 106, or returning air duct from freezer compartment. As a result, the possible location for installation of electrostatic atomizing device 131 may be expanded.

In the preferred embodiment, water retaining material is not provided around atomizing electrode 135 of electrostatic atomizing device 131, but water retaining material may be provided. As a result, the dew condensation water generated near atomizing electrode 135 can be held around atomizing electrode 135, and may be appropriately supplied to atomizing electrode 135.

In the preferred embodiment, the storage compartment of refrigerator 100 for comprising electrostatic atomizing device 131 is vegetable compartment 107, but it may be installed in freezer compartment 104 or switchable temperature compartment 105 or storage compartment in other temperature zone, and various applications may be developed.

In the preferred embodiment, the cooling unit of atomizing electrode 135 is the heat conduction from the surface of outlet air-duct 141 for freezer compartment by flow of cold air generated in evaporator 112, but it may be realized by a Peltier element making use of Peltier effect disposed directly on cooling pin 134. In this case, by adjusting the supply voltage to the Peltier element, the temperature can be controlled very delicately, and the optimum temperature may be adjusted at the tip.

In the preferred embodiment, aside from atomizing port 132, humidity supplying port 138 is provided at the lower (bottom) side of outlet wall 137 perpendicular to the side of atomizing port 132, and as this humidity supplying port 138, the nearly entire area of the lower side portion of outlet wall 137 may be opened. In this case, a large volume of air can be supplied into outlet wall 137 form the lower side of lower shell 137, and the air resistance in outlet wall 137 can be decreased, and hence the flow of cold air in outlet wall 137 is encouraged, and the dew condensation in the mist generation department can be promoted more efficiently.

Besides, since the lower side portion is opened almost entirely, gathering of dew condensation water in outlet wall 137 can be prevented, and if the dew condensation water directly drops, or drops along outlet wall 137, the water is smoothly discharged outside of outlet wall 137 through humidity supplying port 138, and invasion into voltage applicator 133 is prevented, and the safety of electrostatic atomizing device 131 is further enhanced.

In this manner, when humidity supplying port 138 provided in the bottom of outlet wall 137 is also provided with a function as a water drain port, preferably humidity supplying port 138 is disposed at the lowest side in the bottom of outlet wall 137, so that the water is not collected in outlet wall 137, but is discharged quickly by gravity.

For more smooth discharge of water, the bottom of outlet wall 137 is inclined downward, and humidity supplying port 138 as water drain port is disposed at the lowest side in the bottom.

In particular, when the door is closed, the storage compartment is cold and closed, and the dew condensation water formed on the wall may drop in such refrigerator. In the preferred embodiment, however, the upper side of outlet wall 137 is close, having no opening, and the dew condensation water in upper parts of outlet wall 137 will not drop and flow into outlet wall 137. It is therefore free from troubles such as electric leak or defective mist making due to invasion of dew condensation water outside of outlet wall 137 into atomizing electrode 135 or voltage applicator 133.

Further, since the upper side of outlet wall 137 is closed, depending on the high humidity environment in outlet wall 137, dew condensation water may be generated inside of outlet wall 137 at the upper side. In such a case, too, since a humidity supplying port is provided at the lower side, if the dropping dew condensation water is likely to be collected due to closing of the upper side, the dropping dew condensation water is smoothly discharged from humidity supplying port 138 to outside of outlet wall 137. Therefore, invasion of the dropping dew condensation water into voltage applicator 133 is prevented, and the safety of electrostatic atomizing device 131 is further enhanced In the preferred embodiment, the mist maker is represented by electrostatic atomizing device 131, but the mist maker is not limited to electrostatic atomizing device 131 alone, and it may be realized by, for example, ultrasonic mist device or ejector mist maker, and the same technology can be applied to outlet wall 137 containing the tip of the department mist for atomizing mist in the mist maker. In particular, when water is replenished to the mist maker by making use of dew condensation water obtained from the moisture in the air in the storage compartment by dew condensation in mist generation department 138, in order to condense dew effectively, the same technology can be applied to humidity supplying port 138 for taking the cold air at high humidity into outlet wall 137.

In the preferred embodiment, humidity supplying port 138 functions also as cold air supplying port. Humidity supplying port 138 mainly for taking in the cold air at high humidity is effective because of the following reasons. That is, as explained in the preferred embodiment, the moisture in the air in the storage compartment (vegetable compartment 107) is condensed in mist generation department 139, and this dew condensation water is utilized for atomizing mist. In a similar configuration, it is also effective, for example, when the water collected in a water tank is supplied into electrostatic atomizing device 131, and mist is atomized. In the latter case, as explained in the preferred embodiment, the humidity tends to be higher around electrostatic atomizing device 131 due to atomizing of mist, and especially in outlet wall 137, same problems may occur such as generation of water scale, or electric leak through moisture. Therefore the water replenish method in electrostatic atomizing device 131 is not limited to dew condensation method, but the same technology can be effectively applied in other water replenish method such as the method of using a water tank and supplying the collected water into electrostatic atomizing device 131.

Preferred Embodiment 24

Figure 36:
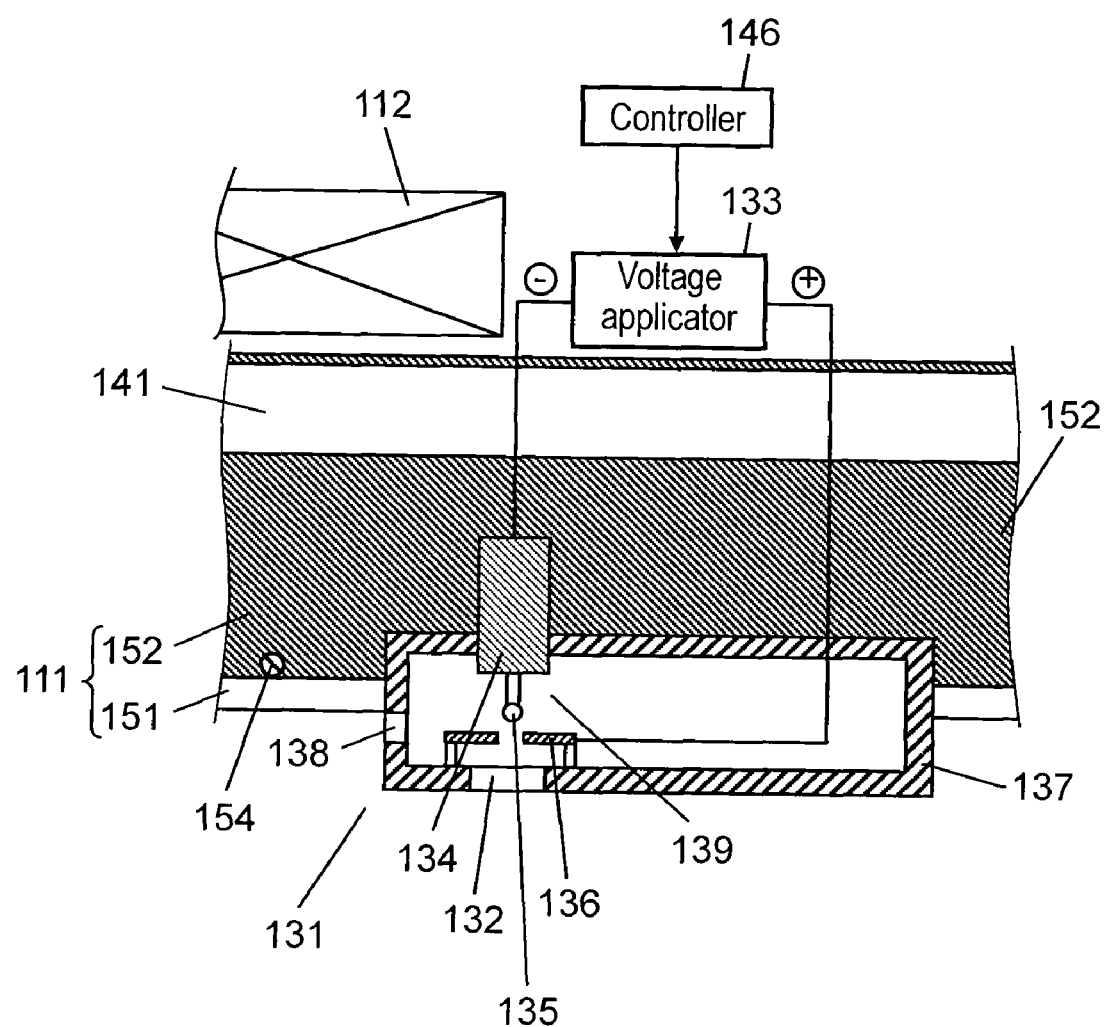
FIG. 36 shows a sectional view cut along line D-D in FIG. 2, and the sectional view details an electrostatic atomizing device and its periphery of a refrigerator in accordance with a 24th embodiment of the present invention.

FIG. 36 is a sectional view near the vegetable compartment in the refrigerator in preferred embodiment 24 of the present invention, showing a detailed sectional view near E of the electrostatic atomizing device cut along line D-D in FIG. 2.

In this preferred embodiment, only the portions different from the configuration specifically described in preferred embodiments 1 to 23 are explained, and the portions similar to the configuration specifically described in preferred embodiments 1 to 23 are omitted in explanation. In particular, the technical concept of preferred embodiment 23 for generating a flow of cold air by cold air supplying port into the outlet wall is similarly applied to the configuration of this preferred embodiment.

As shown in FIG. 36, outlet wall 137 of electrostatic atomizing device 131 is provided with atomizing port 132, and additionally humidity supplying port 138 as cold air supplying port positioned in the space between lower basket 119 and upper basket 120 not having obstacle between the side having atomizing port 132 and the perpendicular side of the storage compartment of outlet wall 137.

In the refrigerator having such configuration, the operation and its effects are described below. The cooling section of cooling pin 134 and the operation and actions of mist atomizing are same as in preferred embodiment 1, and the explanation is omitted.

The air entering from humidity supplying port 138 provided in outlet wall 137 is formed into a mist in mist generation department 139, and is atomized from atomizing port 132, and an air access is formed, and due to effects by air convection in the storage compartment, an air flow is generated in outlet wall 137 including atomizing electrode 135, and the air of relatively high humidity by transpiration from vegetables is supplied efficiently and stably from humidity supplying port 138 into atomizing electrode 135, and water drops are generated and applied to atomizing electrode 135 including its leading end.

Thus, the preferred embodiment includes evaporator 112 for cooling of each storage compartment (vegetable compartment 107), and rear partition 111 for thermally insulating evaporator 112 and the storage compartment, electrostatic atomizing device 131 is provided in rear partition 111, and outlet wall 137 of electrostatic atomizing device 131 is provided with humidity supplying port 138 to atomizing electrode 135 aside from supply port 132, in a space between lower basket 119 and upper basket 120 not having obstacle between the side having atomizing port 132 and the perpendicular side of outlet wall 137.

Hence, an air access is formed, and due to effects by air convection in the storage compartment (vegetable compartment 107), an air flow is generated also in atomizing electrode section 135, and the moisture (humidity) in the air in the storage compartment (vegetable compartment 107) is supplied efficiently and stably into atomizing electrode 135, and dew condensation is promoted.

In particular, since mist is atomized, the environment in outlet wall 137 is likely to form water scale or cause electric leak through moisture, but since the humidity supplying port is provided in the preferred embodiment, an air access is formed, and an air flow is generated positively in outlet wall 137, and the moisture does not stay within outlet wall 137, but is circulated together with the flowing cold air.

In the preferred embodiment, as cold air supplying port, humidity supplying port 138 is provided aside from atomizing port 132, in the side portion of outlet wall 137 perpendicular to the side of forming atomizing port 132, and more preferably, as the humidity supplying port, the bottom portion of the lateral side of outlet wall 137 may be opened. In this case, a large volume of air can be supplied into outlet wall 137 form the lower side of lower shell 137, and the air resistance in outlet wall 137 can be decreased, and hence the dew condensation in mist generation department 139 can be promoted more efficiently.

Besides, since the bottom portion of the lateral side is opened, gathering of dew condensation water in outlet wall 137 can be prevented by the function of water drain port, and if the dew condensation water directly drops, or drops along outlet wall 137, the water is smoothly discharged outside of outlet wall 137 through humidity supplying port 138, and invasion into voltage applicator 133 is prevented, and the safety of the electrostatic atomizing device is further enhanced.

In this manner, when the humidity supplying port provided at the lateral side of outlet wall 137 also functions as a water drain port, preferably the humidity supplying port is disposed on the extension at the lowest side in the bottom of outlet wall 137, so that the water is not collected in outlet wall 137, but is discharged quickly by gravity.

In particular, when the door is closed, the storage compartment is cold and closed, and the dew condensation water formed on the wall may drop in such refrigerator. In the preferred embodiment, however, the upper side of outlet wall 137 is closed, having no opening, and the dew condensation water in upper parts of outlet wall 137 will not drop and flow into outlet wall 137, and it is therefore free from troubles such as electric leak or defective mist making due to invasion of dew condensation water outside of outlet wall 137 into the atomizing electrode or the voltage applicator.

Further, since the upper side of outlet wall 137 is closed, depending on the high humidity environment in outlet wall 137, dew condensation water may be generated inside of outlet wall 137 at the upper side, but in such a case, too, since a humidity supplying port is provided at the lateral side bottom portion, if the dropping dew condensation water is likely to be collected due to closing of the upper side, the dropping dew condensation water is smoothly discharged from humidity supplying port 138 to outside of outlet wall 137, and invasion of the dropping dew condensation water into voltage applicator 133 is prevented, and the safety of electrostatic atomizing device 131 is further enhanced Preferred Embodiment 25

Figure 37:
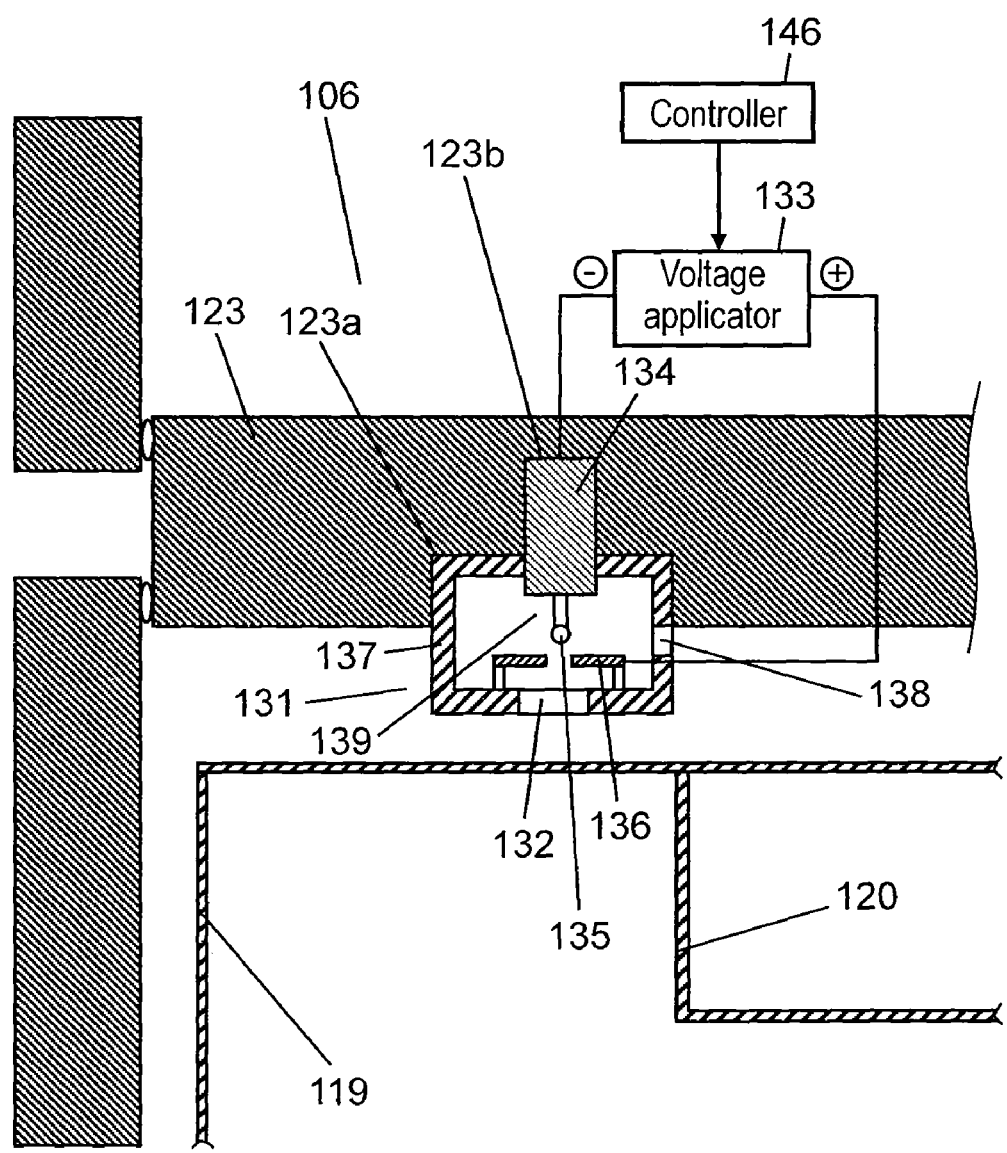
FIG. 37 shows a vertical sectional view of a vegetable compartment and its periphery of a refrigerator in accordance with a 25th embodiment of the present invention.

FIG. 37 is a longitudinal sectional view near the vegetable compartment in the refrigerator in preferred embodiment 25 of the present invention.

In this preferred embodiment, only the portions different from the configuration specifically described in preferred embodiments 1 to 24 are explained, and the portions similar to the configuration specifically described in preferred embodiments 1 to 24 are omitted in explanation.

As shown in FIG. 37, electrostatic atomizing device 131 is assembled in first partition 123 for thermally insulating the temperature zones of vegetable compartment 107 and icemaker 106 so that the atomizing direction may be toward the storage compartment space, and its heat insulator has a recess in the portion of cooling pin 134 of mist generation department.

Outlet wall 137 of electrostatic atomizing device 131 is provided with atomizing port 132 and other humidity supplying port 138 at the side of the inner side of the storage compartment of outer case 137 perpendicular to the side of forming atomizing port 132.

In the refrigerator having such configuration, the operation and its effects are explained. The thickness of the first partition 123 on which electrostatic atomizing device 131 is installed must be large enough to having a cooling capacity for cooling of cooling pin 134 to which atomizing electrode 135 is fixed, and the wall thickness of the location of which electrostatic atomizing device 131 is smaller than in other parts. Hence, by heat conduction from the icemaker at a relatively low temperature, cooling pin 134 can be cooled, and atomizing electrode 135 can be cooled, and the leading end temperature of atomizing electrode 135 is lower than the dew point.

Although not shown, by installing compartment temperature sensor or compartment humidity sensor in the compartment, the dew point can be calculated strictly depending on the compartment environmental changes according to a predetermined formula.

Since atomizing port 132 and humidity supplying port 138 formed in outlet wall 137 form an air access, due to effects of air convection in the storage compartment, an air flow is generated including the area of atomizing electrode 135, and the air of relatively high humidity due to transpiration from vegetables is supplied efficiently and stably from humidity supplying port 138 into atomizing electrode 135, and water drops are generated and applied on atomizing electrode 135 including its leading end.

A high voltage (for example, 7.5 kV) is applied between two electrodes, that is, atomizing electrode 135 at negative voltage side, and opposite electrode 136 at positive electrode side, from voltage applicator 133. At this time, an air insulation layer is broken between the electrodes, and a corona discharge takes place, and the water of atomizing electrode 135 is atomized from the electrode leading end, and invisible nano level fine mist of less than 1 μm having an electric charge is generated together with the accompanying ozone and OH radicals.

The generated fine mist is atomized into the vegetable compartment. The fine mist spayed from electrostatic atomizing device 131 is negatively charged. On the other hand, the vegetable compartment contains vegetables and fruit, including green and leafy plants. These vegetables and fruit are often stored in somewhat withered state due to transpiration when returning from shop or transpiration during storage. These vegetables and fruit are usually positively charged, and hence the atomized fine mist of negative charge is likely to gather on the surface of vegetables. When the vegetable compartment is set to high humidity again, the atomized fine mist deposits on the surface of vegetables and fruit, and transpiration from vegetables and fruit is suppresses, and the freshness is enhanced. The moisture permeates into the tissues from the gaps in cells of vegetables and fruit, and is transpired, and the moisture is supplied again into the withered cells, and withering is canceled by expansion of cells, and the vegetables are refreshed.

The generated fine mist contains ozone and OH radicals, and they have a strong oxidizing power. Accordingly, the generated fine mist deodorizes the vegetable compartment, or sterilizes or bactericides the vegetable surface, and oxidizes, decomposes and removes the agricultural chemicals, wax and other harmful substances sticking to the vegetable surface.

At the present, in the freezing cycle, isobutane of low global warming factor is mainly used as the refrigerant from the viewpoint of the environmental protection of the earth. This isobutane is a hydrocarbon, and as compared with air, its specific gravity is about 2 times at ordinary temperature and atmospheric pressure (300 K, 2.04).

If isobutane leaks from the freezing system while the compressor is stopped, since it is heavier than air, it leaks downward. At this time, the refrigerant may leak into the compartment by way of rear partition 111. In particular, when leaking from evaporator 112 large in the staying amount of the refrigerant, the leak amount may be large, but vegetable compartment 107 incorporating electrostatic atomizing device 131 is disposed above evaporator 112, the leaking refrigerant will not get into vegetable compartment 107.

If isobutane leaks into vegetable compartment 107, since refrigerant is heavier than air, it is collected in the lower part of the storage compartment. Hence, since electrostatic atomizing device 131 is installed in the ceiling of the storage compartment, the possibility of staying near electrostatic atomizing device 131 is very low.

Thus, in the preferred embodiment, first partition 123 for separating the storage compartment (vegetable compartment 107) is provided, and at the ceiling side of the storage compartment (vegetable compartment 107), a low temperature storage compartment (icemaker 106) is provided, and if storage compartments in freezing temperature zone such as freezer compartment 108 or icemaker 106 are provided in upper parts, by installing electrostatic atomizing device 131 in first partition 123 in the ceiling for separating them, any particular cooling device is not needed, and only by atomizing from the ceiling side, the mist can be easily diffused into the entire storage compartment (lower basket 119, upper basket 120).

In the preferred embodiment, in outlet wall 137 of electrostatic atomizing device 131, aside from atomizing port 132, humidity supplying port 138 into atomizing electrode 135 is provided at the inner side of outlet wall 137 perpendicular to the side of forming of atomizing port 132. As a result, an air access is formed, and due to effects of air convection in the storage compartment (vegetable compartment 107), an air flow is generated also in atomizing electrode 135, and moisture (humidity) in the air in the storage compartment (vegetable compartment 107) can be supplied efficiently and stably into atomizing electrode 135, and the dew condensation is promoted. At the same time, since humidity supplying port 138 is provided at the inner side of outlet wall 137, touching of voltage applicator 133 by the user's hand from humidity supplying port 138 is prevented, and the safety is enhanced.

In particular, since mist is atomized, the environment in outlet wall 137 is likely to form water scale or cause electric leak through moisture, but since the humidity supplying port is provided as a cold air supplying port in the preferred embodiment, an air access is formed, an air flow is generated positively in outlet wall 137, and the moisture does not stay within outlet wall 137, but is circulated together with the flowing cold air.

Thus, humidity supplying port 138 introduces humidity into outlet wall 137, and also functions as cold air supplying port for generating a flow of cold air in outlet wall 137.

In the preferred embodiment, since the bottom portion is opened as atomizing port 132, this atomizing port 132 functions as a water drain port for preventing gathering of dew condensation water in outlet wall 137. Therefore, if the dew condensation water directly drops, or drops along outlet wall 137, the water is smoothly discharged outside of outlet wall 137 through atomizing port 132, and invasion into voltage applicator 133 is prevented, and the safety of the electrostatic atomizing device is further enhanced. In this manner, when atomizing port 132 provided at the bottom side of outlet wall 137 functions as a water drain port, preferably atomizing port 132 is disposed at the lowest side in the bottom of outlet wall 137, so that the water is not collected in outlet wall 137, but is discharged quickly by gravity.

Thus, in the present invention, the both openings of atomizing port 132 and humidity supplying port 138 are provided in the surface other than the top surface of outlet wall 137, and if the dew condensation water in the storage compartment collected in the upper part than outlet wall 137 in the storage compartment in the storage compartment in the refrigerator in the low temperature closed space drops into outlet wall 137, since there is no opening in the top surface of outlet wall 137, the water drop is prevented from falling into outlet wall 137 from outside of outlet wall 137, and a refrigerator of higher safety free from current leak or short-circuit can be presented.

Atomizing port 132 is provided in the lower part of outlet wall 137, and the upper side of outlet wall 137 is closed and not opened, and if dew is likely to condense in outlet wall 137, the lower side of outlet wall 137 is provided with atomizing port 132 having a function of water draining port, and formation of water scale or growth of bacteria or mold in outlet wall 137 can be prevented.

In particular, when the door is closed, the storage compartment is cold and closed, and the dew condensation water formed on the wall may drop in such refrigerator. In the preferred embodiment, however, the upper side of outlet wall 137 is closed, having no opening, and the dew condensation water in upper parts of outlet wall 137 will not drop and flow into outlet wall 137, and it is therefore free from troubles such as electric leak or defective mist making due to invasion of dew condensation water outside of outlet wall 137 into the atomizing electrode or the voltage applicator.

Further, since the upper side of outlet wall 137 is closed, depending on the high humidity environment in outlet wall 137, dew condensation water may be generated inside of outlet wall 137 at the upper side, but in such a case, too, since atomizing port 132 is provided at the bottom portion, if the dropping dew condensation water is likely to be collected due to closing of the upper side, the dropping dew condensation water is smoothly discharged from atomizing port 132 having a function of water drain port to outside of outlet wall 137, and invasion into voltage applicator 133 is prevented, and the safety of electrostatic atomizing device 131 is further enhanced Further, since atomizing electrode 135 and voltage applicator 133 are contained in outlet wall 137, the user's hand is prevented from touching atomizing electrode 135 and voltage applicator 133, and if a high voltage is applied in the storage compartment (vegetable compartment 107), a fine mist can be atomized while guaranteeing the safety of the user.

Mist generation department 139 and cooling pin 134 is provided in the recess, not projecting into the storage compartment (vegetable compartment 107), and the user's hand hardly touches atomizing electrode 135 and voltage applicator 133. Therefore, if a high voltage is applied in the storage compartment (vegetable compartment 107), the safety of the user can be further enhanced. Moreover, since outlet wall 137 is provided at the inner side of the ceiling side, the safety is much more enhanced.

Since the mist can be atomized from the ceiling, the mist can be diffused in the entire storage compartment (lower basket 119, upper basket 120).

Mist generation department 139 of the preferred embodiment is intended to generate mist by an electrostatic mist-making system, and water drops are broken and pulverized by using an electric energy of high voltage, and a fine mist is generated. Since the generated mist is electrically charged, when the mist is charged in an opposite polarity of the desired vegetables and fruit, for example, by atomizing a negatively charged mist to the positively charged vegetables, the bonding strength on the vegetables and fruit is increased, and the mist is applied more uniformly on the vegetable surface, and the mist bonding rate is improved as compared with the non-charged mist. The atomized fine mist is directly applied on the food in the vegetable compartment (lower basket 119, upper basket 120), and the fine mist can be boded to the vegetable surface by making use of the potential of the fine mist and the vegetables, and the freshness may be enhanced efficiency.

The replenish water in the preferred embodiment is dew condensation water, not tap water. It is free from minerals and impurities, and it is free from deterioration at the leading end of atomizing electrode 135 or deterioration of water retaining property due to clogging.

Since the mist in the preferred embodiment contains radicals, and the agricultural chemicals and wax sticking to the vegetable surface can be decomposed and removed by an extremely small amount of water, and the water is saved, and the input is low.

Since electrostatic atomizing device 131 is disposed at a higher position than the evaporator (evaporator 112), if the freezing cycle is composed by using refrigerant such as isobutane or propane, and if the refrigerant leaks, since it is heavier than air, and it is not collected in vegetable compartment 107, and it is very safe.

In vegetable compartment 107, too, since electrostatic mist generation department 139 is installed above the storage compartment (vegetable compartment 107), if the refrigerant leaks out from the refrigerant piping in the refrigerator main body, it does not stay in the lower parts of vegetable compartment 107, and there is no problem.

Since vegetable compartment 107 has no part directly facing or contacting the refrigerant piping, the refrigerant will not leak out directly from the refrigerant piping or the like.

Preferred Embodiment 26

Figure 38:
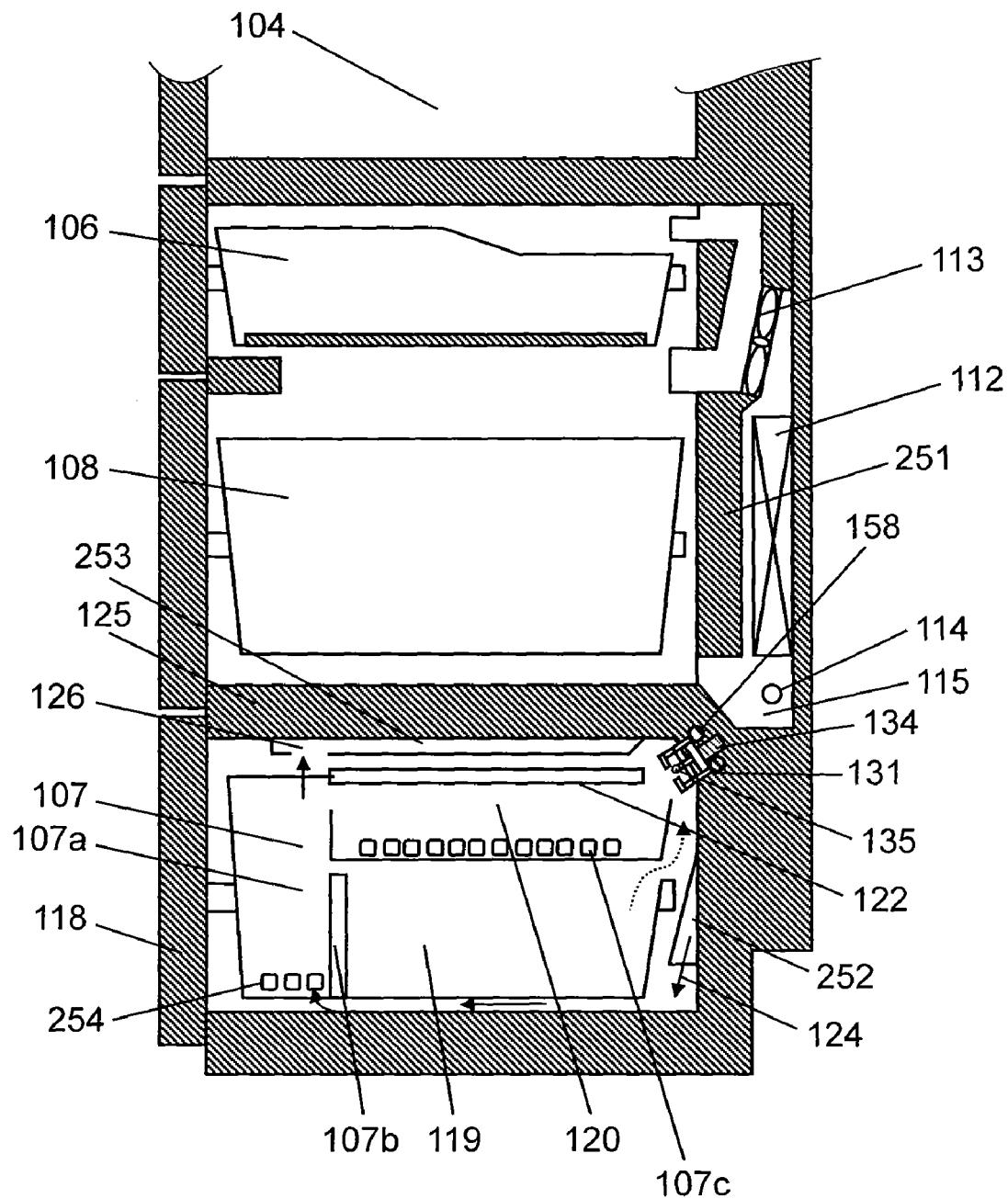
FIG. 38 shows a sectional view of a vegetable compartment and its periphery of a refrigerator in accordance with a 26th embodiment of the present invention.
Figure 39:
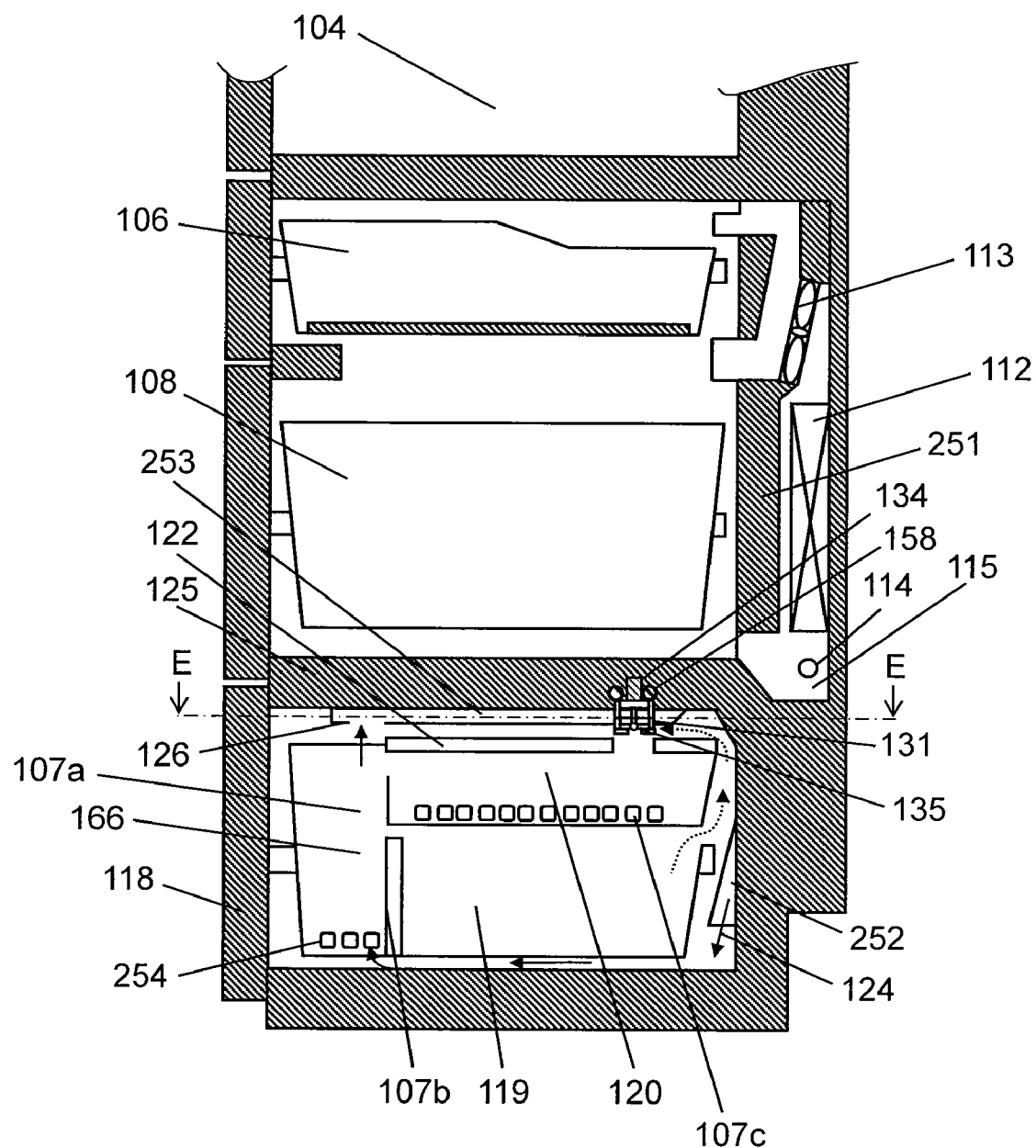
FIG. 39 shows a vertical sectional view of another vegetable compartment and its periphery of a refrigerator in accordance with the 26th embodiment of the present invention.
Figure 40:
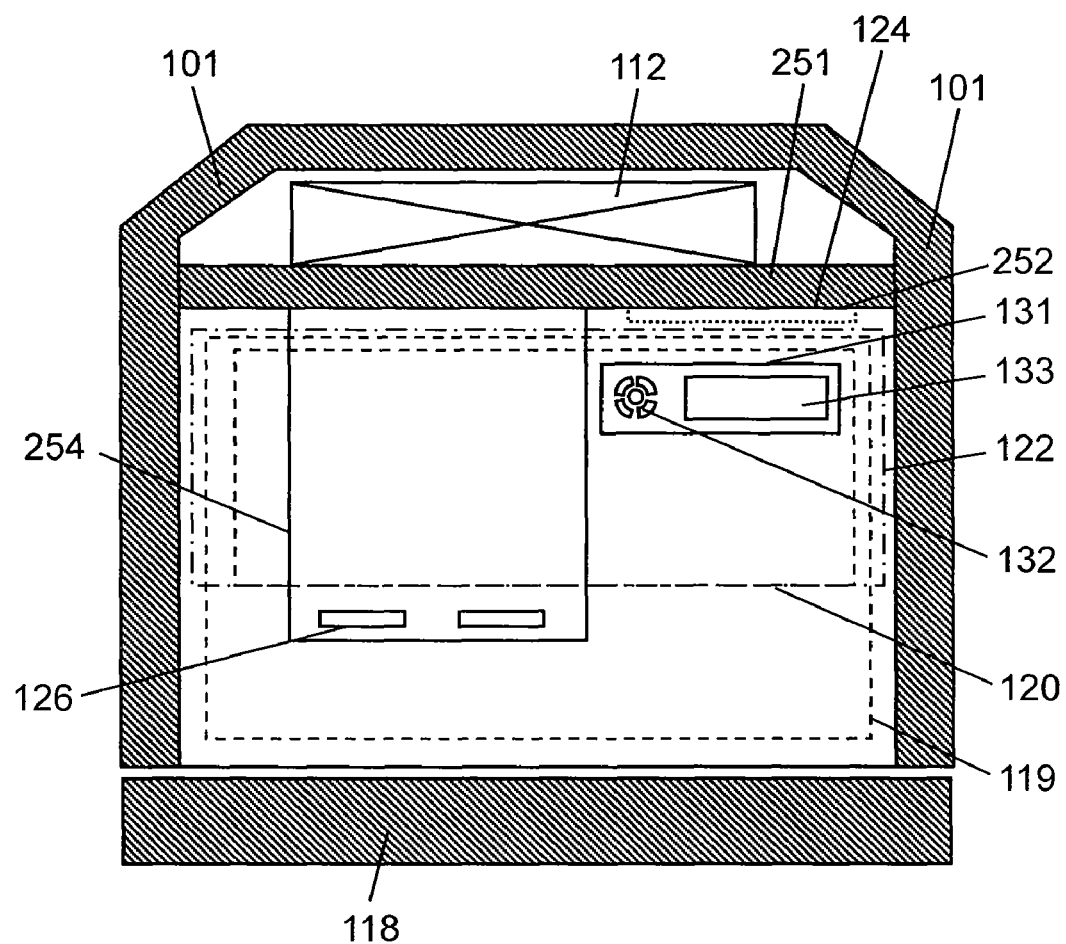
FIG. 40 shows a plan view, cut along line E-E in FIG. 39. The plan view details the vegetable compartment and its periphery of the refrigerator in accordance with the 26th embodiment of the present invention.

FIG. 38 is a sectional view near the vegetable compartment in the refrigerator in preferred embodiment 26 of the present invention. FIG. 39 is a sectional view near the vegetable compartment in the refrigerator in other mode of preferred embodiment 26 of the present invention. FIG. 40 is a detailed plan view near the electrostatic atomizing device cut along line E-E in FIG. 39.

In this preferred embodiment, only the portions different from the configuration specifically described in the foregoing preferred embodiments are explained, and the portions similar to the configuration specifically described in the foregoing preferred embodiments or applicable to the same technical concept are omitted in explanation.

As shown in the drawing, in the preferred embodiment, in the highest part of refrigerator 100, refrigerator compartment 104 is composed as a first storage compartment, and in the lower part of refrigerator compartment 104, switchable temperature compartment 105 as a fourth storage compartment and icemaker 106 as a fifth storage compartment are disposed side by side, freezer compartment 108 is formed in the lower part of switchable temperature compartment 105 and icemaker 106, and vegetable compartment 107 is formed in the further lower part of freezer compartment 108.

Second partition 125 of heat insulating property is provided for separating the temperature zones of vegetable compartment 107 and freezer compartment 108, and partition 251 is formed at the inner side of second partition 125 and at the inner side of freezer compartment 108. Between partition 251 and thermally insulated cabinet 101 of the refrigerator, evaporator 112 is installed, and in its lower part, radiant heater 114 for thawing the frost depositing on the evaporator is provided together with drain pan 115 for receiving the defrosted water. Cooling compartment 110 is composed together with them including cooling fan 113 for conveying cold air into the individual compartments.

In second partition 125 for separating cooling compartment 110 and the vegetable compartment, electrostatic atomizing device 131 is provided as a mist maker so as to utilize the cooling source of cooling compartment 110 as shown in FIG. 38, and in particular cooling pin 134 of heat conduction material of mist generation department 139 is formed in a recess in the heat insulator of second partition 125, and heat conducting pin heater 158 is formed in this vicinity.

The air duct for cooling vegetable compartment 107 is formed as shown in FIG. 38, in which at the inner side of vegetable compartment 107, an air duct from the refrigerator compartment, or outlet air-duct 252 for vegetable compartment making use of the air duct from the freezer compartment is composed, and the air of slightly lower temperature than in vegetable compartment 107 passes through outlet air-duct 252 for vegetable compartment, and flows out to the bottom from the inner side of lower basket 119 of vegetable compartment 107 from outlet 124 for vegetable compartment. The stream of the cold air flows from the bottom of lower basket 119 to the front side, and flows into beverage container 107a in the front part of the storage container, and further flows into inlet 126 for vegetable compartment installed at the lower side of second partition 125, and circulates into evaporator 112 by way of inlet air-duct 253 for vegetable compartment.

Upper basket 120 has a part at its bottom side disposed in lower basket 119, and a plurality of air passage holes 107c are provided in upper basket 120 disposed in lower basket 119.

The bottom of upper basket 120 is formed in a corrugated shape made of convex and concave shapes.

Second partition 125 is mainly made of ABS or other resin in its outlet wall, and the inside is made of foamed urethane or foamed styrol, and vegetable compartment 107, freezer compartment 108, and cooling compartment 110 are thermally insulated, and recess 111a is provided in a part of the wall at the inside of the storage compartment so as to be lower in temperature than in other parts, and electrostatic atomizing device 131 is installed in this place as mist maker.

Second partition 125 fixing electrostatic atomizing device 131 is provided with heat conducting pin heater 158 near mist generation department 139 for the purposes of regulating the temperature of cooling pin 134 of heat conduction material provided in electrostatic atomizing device 131, and preventing excessive dew condensation in the peripheral area including atomizing electrode 135 at the tip of the department mist.

Cooling pin 134 of heat conduction material is fixed to outlet wall 137, and cooling pin 134 itself has protrusion 134a projecting from the outlet wall. This cooling pin 134 has protrusion 134a at the reverse side of atomizing electrode 135, and protrusion 134a is fitted into a corner of second partition 125 and partition 251 at the rear side of the storage compartment.

Outlet wall 137 of electrostatic atomizing device 131 is provided with atomizing port 132, and humidity supplying port 138 formed at a lower side of the inner side of the storage compartment of outlet wall 137 perpendicular to the side forming atomizing port 132.

As a result, electrostatic atomizing device 131 including cooling pin 134 is disposed in the thicket portion of the heat insulation wall at the corner, and since the heat insulation wall is thicker than in other parts, electrostatic atomizing device 131 can be buried deeper into the heat insulation wall, and loss of inner volume of storage compartment due to installation of the mist maker is suppressed. Therefore, the storage compartment of a large capacity having the mist maker is realized, and at the same time since the heat insulation is assured sufficiently, overcooling of electrostatic atomizing device 131 and its vicinity can be prevented, and decline of quality due to dew condensation in peripheral parts can be avoided.

Hence, the back side of cooling pin 134 of heat conduction material is set closer to the side of cooling compartment 110.

Herein, cooling pin 134 of heat conduction material is cooled by using the cold air generated in cooling compartment 110, and since cooling pin 134 is formed of a metal piece of excellent heat conduction property, it can be cooled sufficiently only by heat conduction from the cold air generated in evaporator 112.

Mist generation department 139 of electrostatic atomizing device 131 is installed in a gap between lid 122 and upper basket 120, and the tip of the atomizing electrode is disposed toward upper basket 120.

Depending on the case, as shown in FIG. 39 and FIG. 40, atomizing electrode 135 may be installed in second partition 125 in the perpendicular direction.

In this case, the cooling pin can be cooled by heat conduction from freezer compartment 108, and a hole is formed in a part of lid 122 so that the mist from electrostatic atomizing device 131 may be atomized into the upper basket.

In the refrigerator having such configuration, the operation and its effects are explained. The thickness of second partition 125 on which electrostatic atomizing device 131 is installed must be large enough for thermally insulating freezer compartment 108, cooling compartment 110, and the vegetable compartment, and is also required have enough cooling capacity for cooling of cooling pin 134 to which atomizing electrode 135 at the tip of the department mist is fixed, and the wall thickness of the location of which electrostatic atomizing device 131 is smaller than in other parts. The wall thickness of the deepest recess holding cooling pin 134 is formed in a further small thickness. Hence, by heat conduction from cooling compartment 110 at low temperature, cooling pin 134 can be cooled, and atomizing electrode 135 can be cooled. When the tip temperature of atomizing electrode 135 is set lower than the dew point, the steam near atomizing electrode 135 condenses dew on atomizing electrode 135, and water drops are generated securely.

Due to ambient temperature fluctuations, the temperature regulation in freezer compartment 108 may vary, and atomizing electrode 135 may be overcooled, and the temperature of atomizing electrode 135 is regulated by heat conducting pin heater 158 disposed near atomizing electrode 135, and the amount of water at the tip of atomizing electrode 135 may be appropriately controlled. Or radiant heater 114 may be used for regulating the temperature of atomizing electrode 135.

Since atomizing port 132 and humidity supplying port 138 formed in outlet wall 137 form an air access, due to effects of air convection in the storage compartment, an air flow is generated including the area of atomizing electrode 135, and the air of relatively high humidity due to transpiration from vegetables is supplied efficiently and stably from humidity supplying port 138 into atomizing electrode 135, and water drops are generated and applied on atomizing electrode 135 including its tip.

At this time, as the flow of cold air from vegetable compartment 107, cold air at lower temperature than in the vegetable compartment from outlet air-duct 252 for vegetable compartment is discharged from outlet 124 for vegetable compartment, and flows into the air duct formed between the storage container in the bottom of lower basket 119 and the thermally insulated cabinet, and further flows to the front door side. It further flows into the storage container from vent hole 254 formed in a part of lower basket 119, and thereby cools the beverage in the beverage container. At this time, the inner side section of lower basket 119 is cooled indirectly. The cold air further flows into inlet 126 for vegetable compartment provided at the lower side of second partition 125, and circulates into evaporator 112 by way of inlet air-duct 253 for vegetable compartment. Thus, effects of cold air are also smaller in the upper basket, and the freshness is maintained.

In the preferred embodiment, therefore, the flow of cold air in the vegetable compartment is controlled and utilized cleverly. First, dry cold air at low temperature is abundantly supplied into beverage container 107a in the front part of beverage partition 107b containing PET bottles and beverage cans, and by direct contact with cold air at low temperature, the cooling speed is enhance, and the cold air entering from the front side of the vegetable compartment flows to the rear side and is gradually raised in humidity, and by setting the humidity substantially higher at the rear side than at the door side, the periphery of electrostatic atomizing device 131 installed at the rear side is in the atmosphere of high humidity, and a favorable environment for condensing dew from the moisture in the air is formed around electrostatic atomizing device 131. Further, the mist atomized by electrostatic atomizing device 131 by using the water drops from dew condensation of moisture in the storage compartment is a very fine mist of nano level particle size and is strong in diffusion, and fills upper basket 120, and flows down into lower basket 110, and the humidity is maintained.

By thus controlling the flow of cold air, objects desired to be cooled quickly are put in beverage container 107a in the front part, and general vegetables and fruit relative resistant to low temperature troubles are put in lower basket 119, and vegetables and fruit relative less resistant to low temperature troubles are put in upper basket 120, and cooling suited to the nature of the objects is realized, and the vegetable compartment higher in quality and higher in freshness can be presented.

In the preferred embodiment, in principle, mist is atomized, but the cold air from outlet 124 for vegetable compartment may be directly released to the PET bottle container, and the PET bottles may be cooled quickly, and if mist atomizing device is not installed, the cooling speed of PET bottles is enhanced, while the humidity in upper basket 120 may be enhanced.

Therefore, if mist atomizing device is not installed, as in the preferred embodiment, dry air at low temperature is used, and by forming an air duct, so that dry cold air is first entered into beverage container 107a in the door side portion of lower basket 119, and flows into upper basket 120 by way of lower basket 119 containing vegetables, the upper basket is kept humid and kept at high temperature. In addition to this configuration, by further atomizing mist, low temperature troubles can be suppressed by synergistic effects.

Although not shown, by installing compartment temperature sensor or compartment humidity sensor in the compartment, the dew point can be calculated strictly depending on the compartment environmental changes according to a predetermined formula.

A high voltage (for example, 7.5 kV) is applied between two electrodes, that is, atomizing electrode 135 at negative voltage side, and opposite electrode 136 at positive electrode side, from voltage applicator 133. At this time, an air insulation layer is broken between the electrodes, and a corona discharge takes place, and the water of atomizing electrode 135 is atomized from the electrode tip, and invisible nano level fine mist of less than 1 μm having an electric charge is generated together with the accompanying ozone and OH radicals.

The generated fine mist is atomized into upper basket 120. The fine mist spayed from electrostatic atomizing device 131 is negatively charged. On the other hand, the vegetable compartment contains vegetables and fruit, and in particular the upper basket often contains fruits and vegetable not resistant to low temperature. These vegetables and fruit are often stored in somewhat withered state due to transpiration when returning from shop or transpiration during storage. These vegetables and fruit are usually positively charged, and hence the atomized fine mist of negative charge is likely to gather on the surface of vegetables. When the vegetable compartment is set to high humidity again, the atomized fine mist deposits on the surface of vegetables and fruit, and transpiration from vegetables and fruit is suppressed, and the freshness is enhanced. The moisture permeates into the tissues from the gaps in cells of vegetables and fruit, and is transpired, and the moisture is supplied again into the withered cells, and withering is canceled by expansion of cells, and the vegetables are refreshed, and at the same time, by the radicals contained in the mist, the mist sterilizes, suppresses low temperature troubles, increases nutrients, decomposes the agricultural chemicals by the strong oxidizing power, and removes the agricultural chemicals easily from the vegetable surface.

In the operation of the refrigerator, in the defrosting operation of cooling compartment 110 executed at specific intervals, the heat by radiant heater 114 heat the bottom of the cooing chamber both by radiation and convection, and hence cooling pin 134 is disposed near the cooling compartment, and atomizing electrode 135 including cooling pin 134 is heated at specific intervals. Hence, mist generation department 139 including atomizing electrode 135 can be dried, if failure in mist-making occurs due to abnormal dew condensation at the tip of the department mist, a dry state is restored after a certain time, and a normal mist-making state is recovered.

In outlet wall 137 of electrostatic atomizing device 131, aside from atomizing port 132, humidity supplying port 138 into atomizing electrode 135 is provided, at the inner side of outlet wall 137 perpendicular to the side of forming atomizing port 132, and an air access is formed, and due to effects of air convection in storage compartment (vegetable compartment 107), an air flow is also generated in atomizing electrode 135, and the moisture (humidity) in the air in the storage compartment (vegetable compartment 107) can be supplied into atomizing electrode 135 efficiently and stably, and dew condensation can be promoted, and at the same time since humidity supplying port 138 is provided at the inner side of outlet wall 137, and touch of user's hand to voltage applicator 133 from humidity supplying port 138 is prevented, and the safety is enhanced.

In particular, because of mist atomizing, in outlet wall 137, the environment is likely to cause generation of water scale or electric leak through moisture, but since the humidity supplying port is provided in the preferred embodiment, an air access is formed, and an air flow is positively formed in outlet wall 137, and moisture does not stay in outlet wall 137, but can be circulated together with the flowing cold air.

As described herein, in the preferred embodiment, a partition is provided for separating storage compartments, and a low temperature storage compartment is provided at the ceiling side of the storage compartment, and the electrostatic atomizing device is provided in the partition of the ceiling, and therefore storage compartments in freezing temperature zones such as cooling compartment, freezer compartment and icemaker are installed in upper parts, they are installed in the partition in the ceiling for separating them, and the atomizing electrode of the electrostatic atomizing device can be cooled by the cooling source, and dew can be condensed, and any particular cooling device is not needed, and the mist can be atomized from the ceiling, and it is easily diffused in the entire storage container, and it is rarely touched by the user's hand, and the safety is enhanced.

The mist generation department of the preferred embodiment is intended to generate mist by electrostatic mist-making system, and water drops are broken and pulverized by using electric energy such as high voltage, and a fine mist is generated. Since the generated mist is charged electrically, by charging the mist in reverse polarity of the desired vegetables or fruit, for example, by atomizing a negatively charged mist to positively charged vegetables, the bonding force on vegetables and fruit is increased, and the mist is more uniformly applied to the vegetable surface, and as compared with the type of mist not charged, the mist bonding rate is much improved. The fine mist can be directly atomized to the food in the vegetable compartment, and by making use of the potential between the fine mist and the vegetables, a fine mist can be adhered to the vegetable surface, and the freshness can be enhanced efficiently.

Moreover, since cooling pin 134 is fitted into a corner of second partition 125 and partition 251 at the rear side of the storage compartment, electrostatic atomizing device 131 including cooling pin 134 is disposed in the thickest portion of the heat insulation wall at the corner, and since the heat insulation wall is thicker than in other parts, electrostatic atomizing device 131 can be buried deeper into the heat insulation wall. Therefore, the loss of inner volume of storage compartment due to installation of the mist maker is suppressed, and the storage compartment of a large capacity having the mist maker is realized, and at the same time since the heat insulation is assured sufficiently, overcooling of electrostatic atomizing device 131 and its vicinity can be prevented, and decline of quality due to dew condensation in peripheral parts can be avoided.

Further, cooling pin 134 is fitted into a corner of adjoining parts of second partition 125 and partition 251 at the rear side of the storage compartment, and the cooling section for cooing of the cooling pin is the bottom side of cooling compartment 110, and the warm air climbs up, and the cold air descends, and by such characteristic, the portion of the lowest temperature in cooling compartment 110 can be utilized as the cooling source, and cooling pin 134 can be cooled more efficiently.

Moreover, since the bottom side of cooling compartment 110 is used as the cooling section for cooling of the cooling pin, the bottom side of the cooling compartment of small temperature fluctuation in the low-temperature air duct is used as the cooling source, and the cooling pin can be cooled more stably.

At the time of defrosting of cooling compartment 110, the heat by radiant heat 114 can be received in the vicinity, and atomizing electrode 135 can be heated and dried at specific intervals, and in the event of mist-making failure due to abnormal dew condensation a the tip of the department mist, a dry state is recovered in a certain time, and normal mist-making state can be easily returned.

The replenish water in the preferred embodiment is dew condensation water, not tap water supplied from outside. It is free from minerals and impurities, and deterioration of the tip of the atomizing electrode or deterioration of water retaining property due to clogging can be prevented.

Since the mist of the preferred embodiment contains radicals, and the agricultural chemicals and wax sticking to the surface of vegetables can be decomposed and removed by an extremely small amount of water, and the water is saved and the input is lowered.

Preferred Embodiment 27

Figure 41:
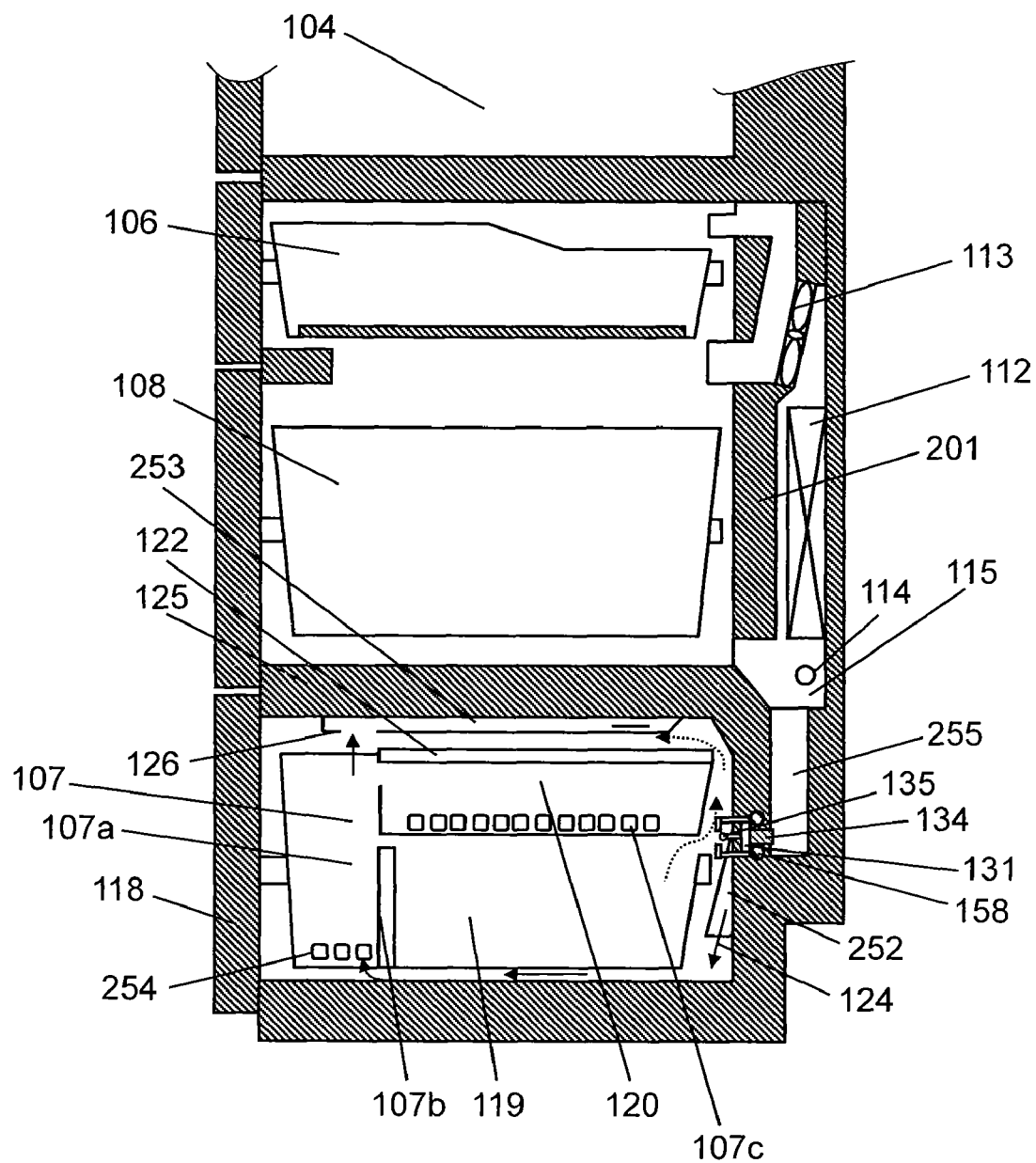
FIG. 41 shows a sectional view of a vegetable compartment and its periphery of a refrigerator in accordance with a 27th embodiment of the present invention.

FIG. 41 is a sectional view near the vegetable compartment in the refrigerator in preferred embodiment 27 of the present invention.

In this preferred embodiment, only the portions different from the configuration specifically described in preferred embodiments 1 to 26 are explained, and the portions similar to the configuration specifically described in preferred embodiments 1 to 26 or applicable to the same technical concept are omitted in explanation.

As shown in the drawing, in the preferred embodiment, in the highest part of refrigerator 100, refrigerator compartment 104 is composed as a first storage compartment, and in the lower part of refrigerator compartment 104, switchable temperature compartment 105 as a fourth storage compartment and icemaker 106 as a fifth storage compartment are disposed side by side, freezer compartment 108 is formed in the lower part of switchable temperature compartment 105 and icemaker 106, and vegetable compartment 107 is formed in the further lower part of freezer compartment 108.

Second partition 125 of heat insulating property is provided for separating the temperature zones of vegetable compartment 107 and freezer compartment 108, and partition 251 is formed at the inner side of second partition 125 and at the inner side of freezer compartment 108. Between partition 251 and thermally insulated cabinet 101 of the refrigerator, evaporator 112 is installed, and in its lower part, radiant heater 114 for thawing the frost depositing on the evaporator is provided together with drain pan 115 for receiving the defrosted water. Cooling compartment 110 is composed together with them including cooling fan 113 for conveying cold air into the individual compartments. In the lower part of cooling compartment 110, a cooling air-duct for mist device is provided, and electrostatic atomizing device 131 is disposed in a part of this air duct as shown in FIG. 41. In particular, cooling pin 134 of heat conduction material of mist generation department 139 is very close to this air duct, and heat conducting pin heater 158 is formed in this periphery.

Upper basket 120 has a part at its bottom side disposed in lower basket 119, and a plurality of air passage holes 107c are provided in upper basket 120 disposed in lower basket 119.

The bottom of upper basket 120 is formed in a corrugated shape made of convex and concave shapes.

Cooling air-duct 255 for mist device is mainly made of ABS, PP or other resin and heat insulator such as foamed styrol, and the cold air flowing through air duct 255 is relatively at low temperature, about −15 to −25° C., and at the inner side of vegetable compartment 107, electrostatic atomizing device 131 including cooling pin 134 is installed in the partition opposite to the cooling air-duct for mist device near the gap between the upper basket and the lower basket. As a result, the configuration of the vegetable compartment is nearly same as the configuration in preferred embodiment 1.

In the refrigerator having such configuration, the operation and its effects are explained. When cooling air-duct 255 for mist device formed at the side of partition 251 on which electrostatic atomizing device 131 is installed has enough cooling capacity for cooling of cooling pin 134 to which atomizing electrode 135 at the tip of the department mist is fixed, by transpiration from contained vegetables, a high humidity state is established near electrostatic atomizing device 131, and water drops are formed securely at the tip of the department mist. The amount of water drops can be adjusted by making use of heat conducting pin heater 158 and radiant heater 114.

In this state, a high voltage (for example, 7.5 kV) is applied between two electrodes, that is, atomizing electrode 135 at negative voltage side, and opposite electrode 136 at positive electrode side, from voltage applicator 133. At this time, an air insulation layer is broken between the electrodes, and a corona discharge takes place, and the water of atomizing electrode 135 is atomized from the electrode tip, and invisible nano level fine mist of less than 1 μm having an electric charge is generated together with the accompanying ozone and OH radicals.

The generated fine mist is atomized between upper basket 120 and lower basket 119. The fine mist spayed from electrostatic atomizing device 131 is negatively charged. On the other hand, the vegetable compartment contains vegetables and fruit, and in particular the upper basket often contains fruits and vegetable not resistant to low temperature. These vegetables and fruit are often stored in somewhat withered state due to transpiration when returning from shop or transpiration during storage. These vegetables and fruit are usually positively charged, and hence the atomized fine mist of negative charge is likely to gather on the surface of vegetables. When the vegetable compartment is set to high humidity again, the atomized fine mist deposits on the surface of vegetables and fruit, and transpiration from vegetables and fruit is suppressed, and the freshness is enhanced. The moisture permeates into the tissues from the gaps in cells of vegetables and fruit, and is transpired, and the moisture is supplied again into the withered cells, and withering is canceled by expansion of cells, and the vegetables are refreshed, and at the same time, by the radicals contained in the mist, the mist sterilizes, suppresses low temperature troubles, increases nutrients, decomposes the agricultural chemicals by the strong oxidizing power, and removes the agricultural chemicals easily from the vegetable surface.

As described herein, the preferred embodiment includes partitions for separating the storage compartments, and a cooling air-duct for mist device for cooling of atomizing electrode, and the electrostatic atomizing device is installed in this air duct, and if the sections of freezing temperature zones such as cooling compartment, freezer compartment and icemaker are disposed in upper parts, these cold heat sources may be conveyed to the back side of vegetable compartment by way of the air ducts, and the atomizing electrode of the electrostatic atomizing device may be cooled by these cooling sources to deposit dew, and stable mist atomizing is realized, and by installing at the inner side, these parts are hardly accessed by the user's hand, and the safety is enhanced.

The mist generation department of the preferred embodiment is intended to generate mist by electrostatic mist-making system, and water drops are broken and pulverized by using electric energy such as high voltage, and a fine mist is generated. Since the generated mist is charged electrically, by charging the mist in reverse polarity of the desired vegetables or fruit, for example, by atomizing a negatively charged mist to positively charged vegetables, the bonding force on vegetables and fruit is increased, and the mist is more uniformly applied to the vegetable surface, and as compared with the type of mist not charged, the mist bonding rate is much improved. The fine mist can be directly atomized to the food in the vegetable compartment, and by making use of the potential between the fine mist and the vegetables, a fine mist can be adhered to the vegetable surface, and the freshness can be enhanced efficiently.

Moreover, as the cooling section for cooling of cooling pin 134, a cooling air-duct for mist device independent from the cooling air duct for cooling the ordinary storage compartment is provided, and temperature fluctuations from the state of cooling air duct can be suppressed more effectively, and by utilizing the bottom side of the cooling compartment of smallest temperature changes among the cold air passage as the cooling source, the cooling pin can be cooled more stably.

The replenish water in the preferred embodiment is dew condensation water, not tap water supplied from outside. It is free from minerals and impurities, and deterioration of the tip of the atomizing electrode or deterioration of water retaining property due to clogging can be prevented.

Since the mist of the preferred embodiment contains radicals, the agricultural chemicals and wax sticking to the surface of vegetables can be decomposed and removed by an extremely small amount of water, and the water is saved and the input is lowered.

In the preferred embodiment, the air duct for mist maker is used as cold heat source conveying means, but heat conduction of aluminum, copper or other solid matter may be used, or heat transfer part such as heat pipe or heat lane may be utilized. As a result, air duct area is not required, and effects on compartment volume may be reduced.

Preferred Embodiment 28

Figure 42:
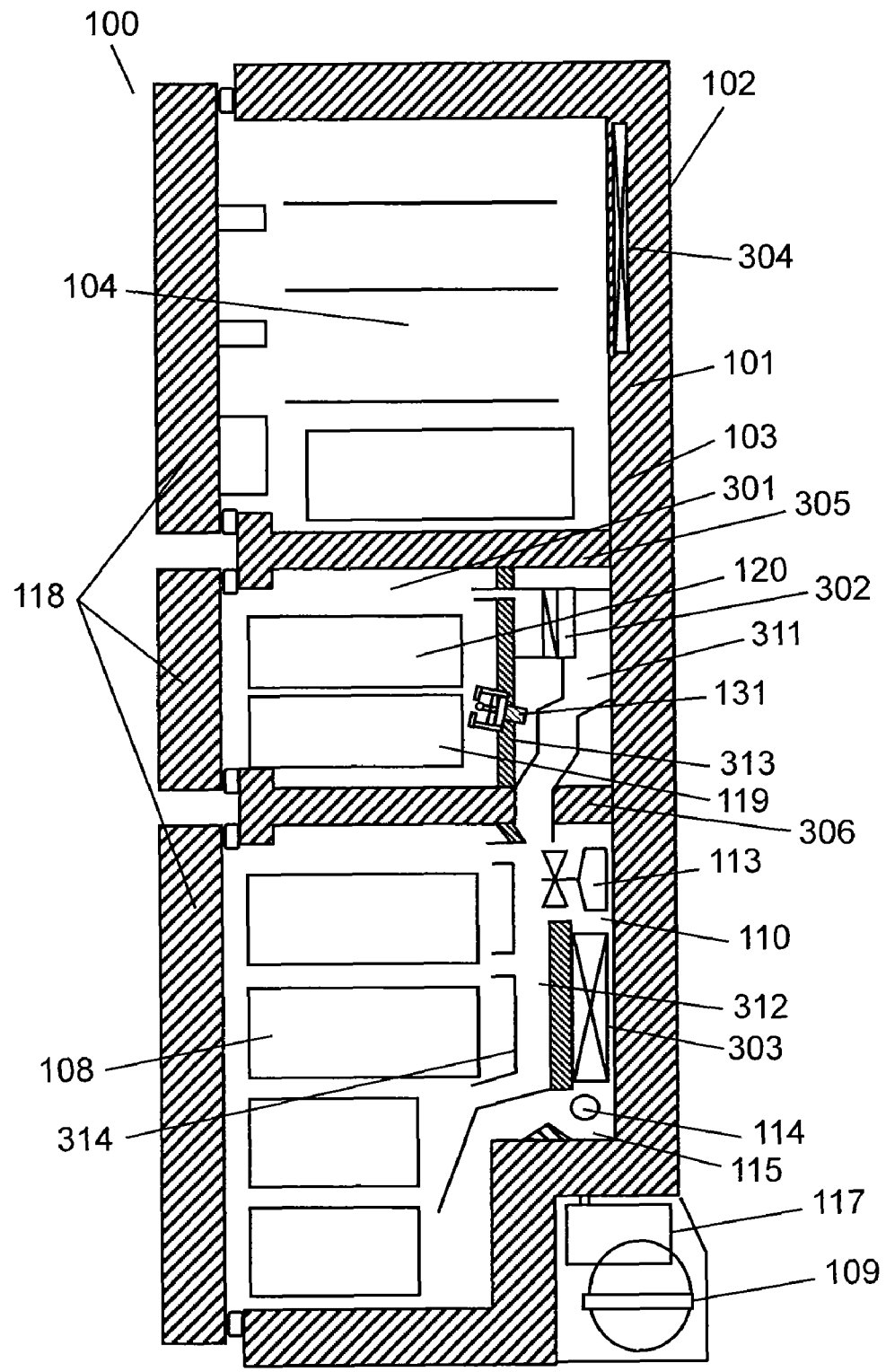
FIG. 42 shows a sectional view of a refrigerator in accordance with a 28th embodiment of the present invention, where the refrigerator is cut vertically and parted to right and left.
Figure 43:
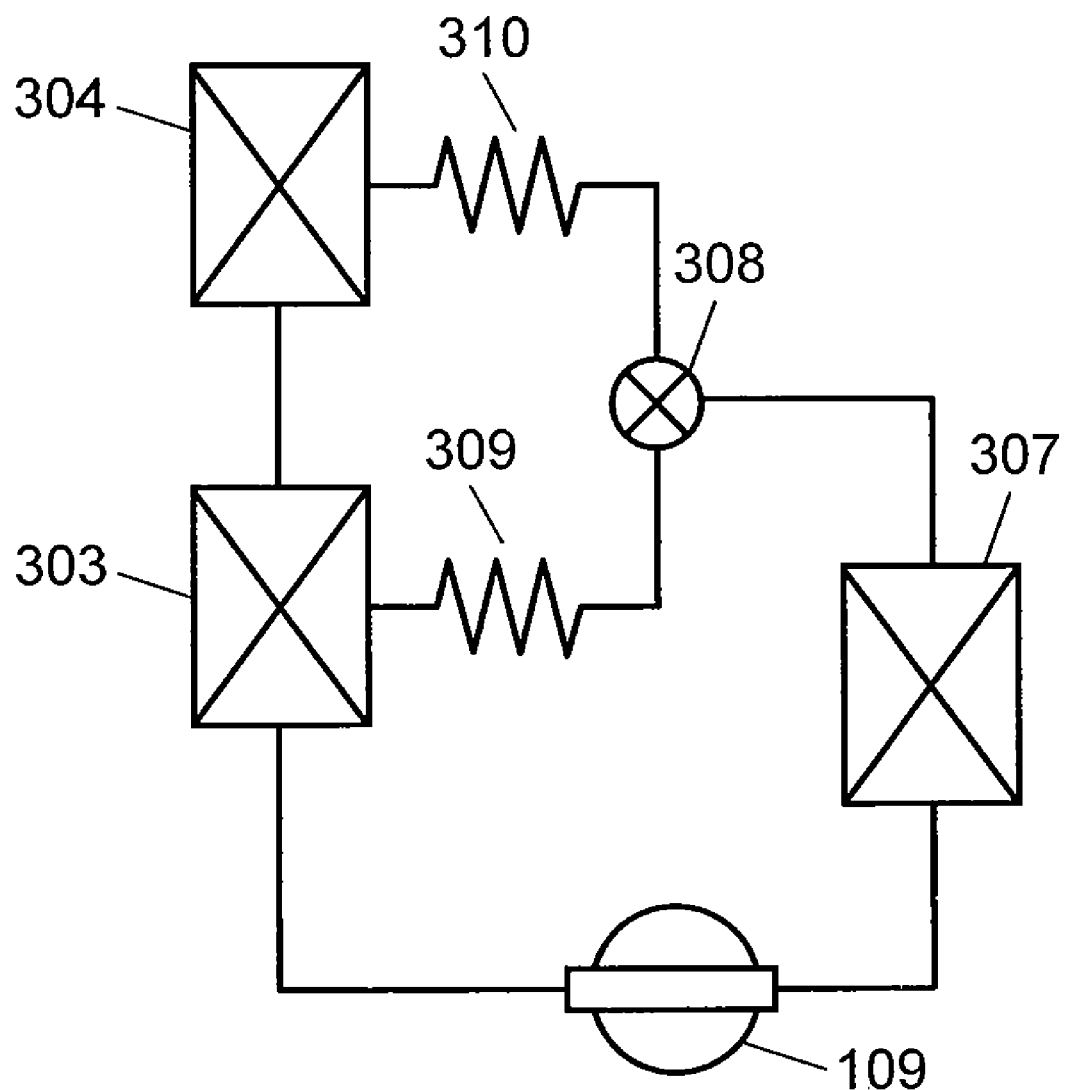
FIG. 43 shows schematically a cooling cycle of the refrigerator in accordance with the 28th embodiment.
Figure 44:
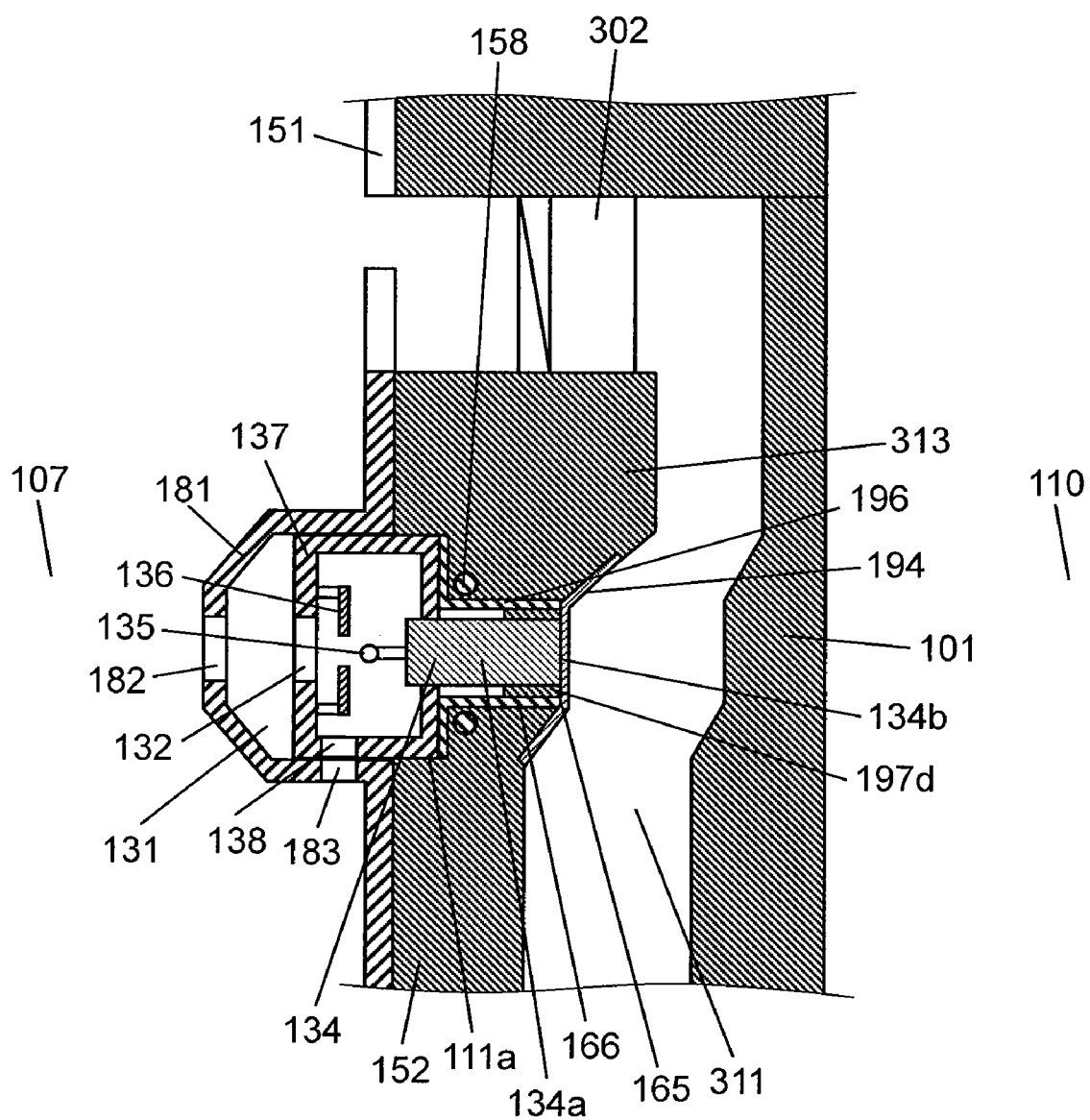
FIG. 44 shows a sectional view of an electrostatic atomizing device and its periphery provided to a vegetable compartment of the refrigerator in accordance with the 28th embodiment.
Figure 45:
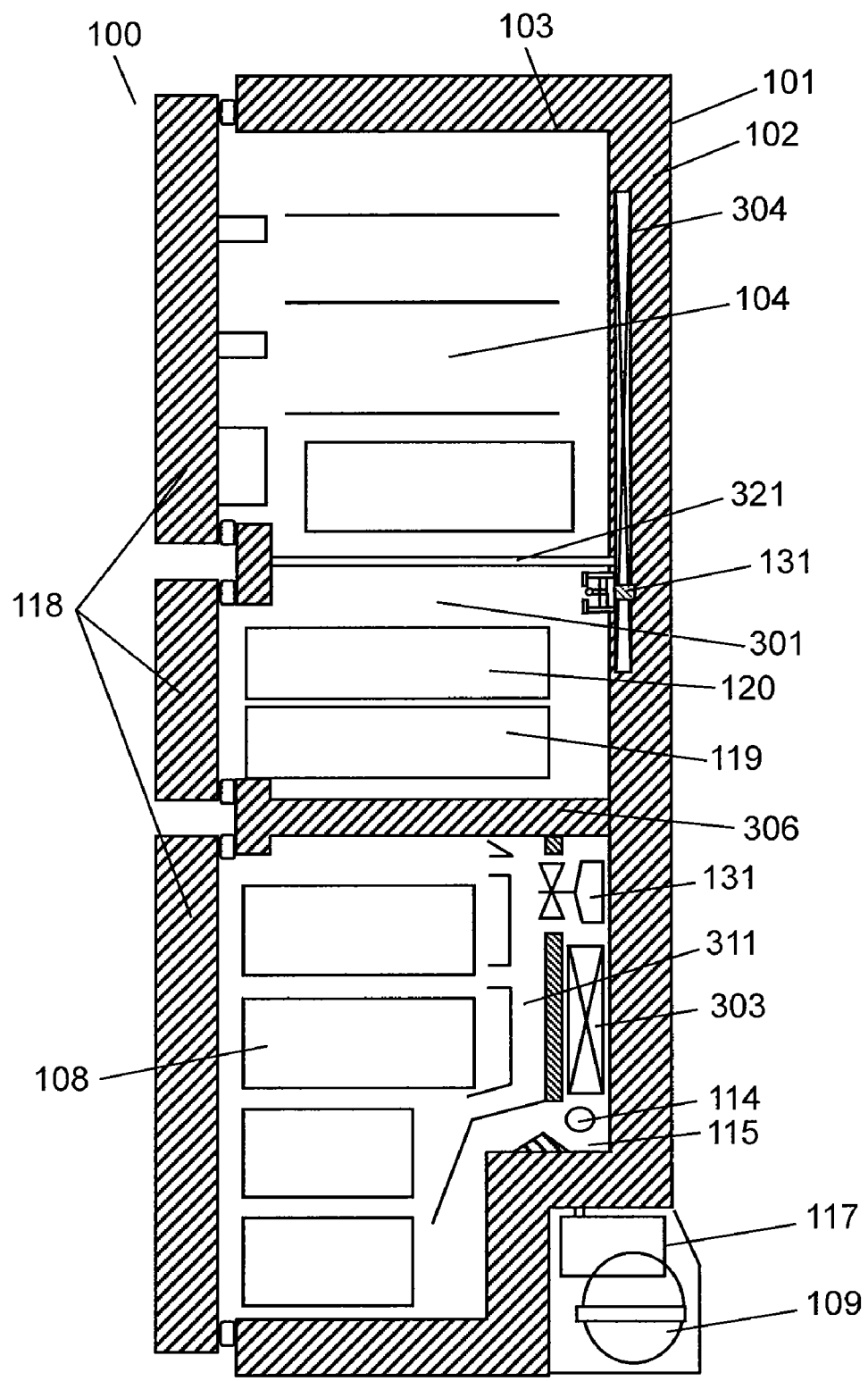
FIG. 45 shows a sectional view of a vegetable compartment and its periphery of a refrigerator in accordance with a 29th embodiment.
Figure 46:
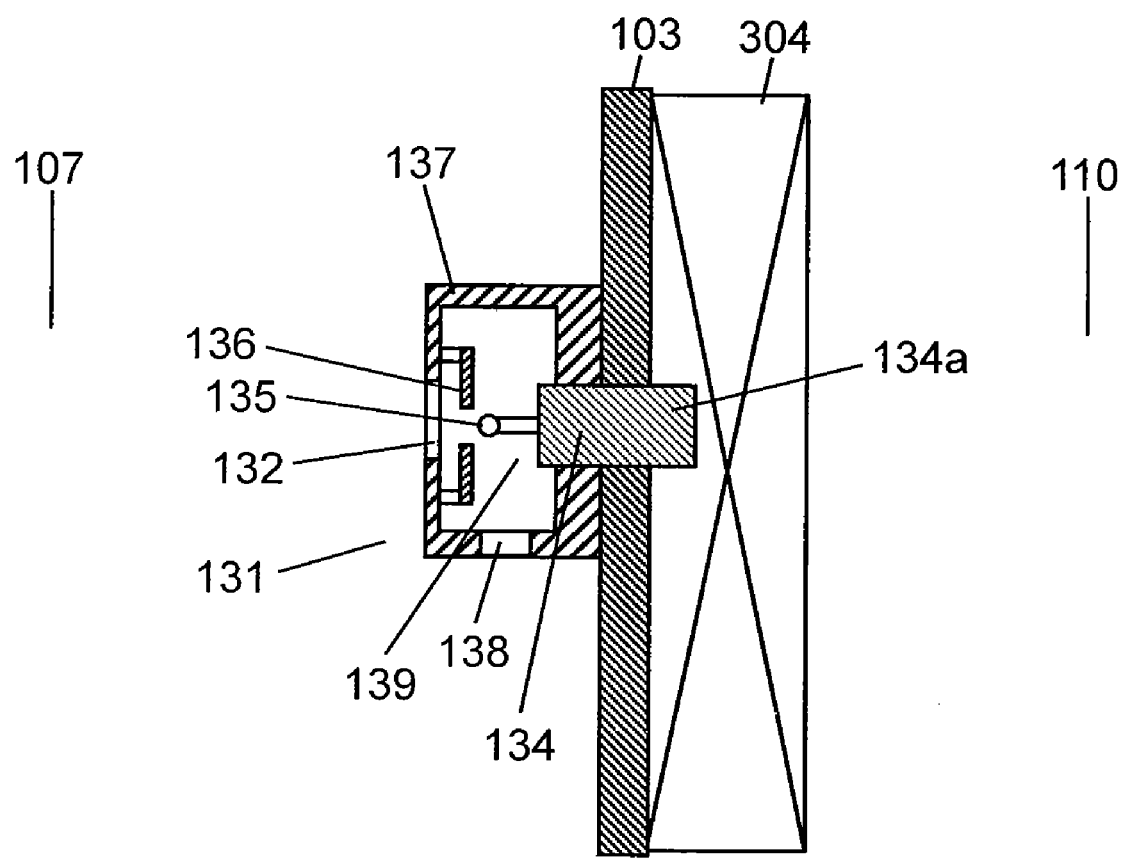
FIG. 46 shows a sectional view of an electrostatic atomizing device and its periphery provided to the vegetable compartment of the refrigerator in accordance with the 29th embodiment.

FIG. 42 is a sectional view of the refrigerator in preferred embodiment 28 of the present invention. FIG. 43 is a simplified cooling cycle diagram of the refrigerator in preferred embodiment 28 of the present invention. FIG. 44 is a detailed sectional view near the electrostatic atomizing device.

In this preferred embodiment, only the portions different from the configuration specifically described in preferred embodiments 1 to 27 are explained, and the portions similar to the configuration specifically described in preferred embodiments 1 to 27 or applicable to the same technical concept are omitted in explanation.

As shown in the drawing, in the preferred embodiment, in the highest part of refrigerator 100, refrigerator compartment 104 is composed as a first storage compartment, and in the lower part of refrigerator compartment 104, temperature changing chamber 301 changeable to vegetable compartment temperature of about 5° C. is composed, and freezer compartment 108 is formed in the lower of temperature changing chamber 301. Temperature changing chamber 301 is composed of first partition 305 for thermally insulating between the temperature zones of refrigerator compartment 104 and temperature changing chamber 301, a second partition for thermally insulating the temperature zone of temperature changing chamber 301, rear-end partition 313 of temperature changing chamber 301, and door 118.

Refrigerator compartment 104 has higher temperature side evaporator 304 contained in the inner wall of the rear-end of refrigerator compartment as the cooling source, and temperature changing chamber 301 and freezer compartment 108 are installed at the inner side of freezer compartment 108, and lower temperature side evaporator 303 installed in cooling compartment 110 is utilized as the cooling source, and cooling fan 113 is disposed above lower temperature side evaporator 303 in order to blow the cold air generated in lower temperature side evaporator 303.

At the inner side of temperature changing chamber 301, cooling air duct 311 on temperature changing chamber is provided, and damper 302 is disposed in this air duct, and the temperature of temperature changing chamber 301 is regulated, and electrostatic atomizing device 131 is provided in rear end partition 313 of temperature changing chamber for atomizing the mist into temperature changing chamber 301.

The cooling cycle of the present invention discharges the refrigerant from compressor 109, condenses in condenser 307, and changes over a plurality of passages by three-way valve 308. A part of the refrigerant is decompressed by capillary on higher temperature side 310, is exchanged in heat in higher temperature side evaporator 304, and passes through lower temperature side evaporator 303 and an accumulator, and returns to compressor 109, and the simultaneous cooling cycle of refrigerator compartment and freezer compartment is formed, and other part is decompressed capillary on lower temperature side 309, is exchanged in heat in lower temperature side evaporator 303, and passes through an accumulator, and returns to compressor 109, and the independent cooling cycle of freezer compartment is formed.

Therefore, temperature changing chamber 301 makes use of the cold air of lower temperature side evaporator 303, and the temperature is properly regulated by the operation of cooling fan 113 and damper 302, compressor 109, and operation of three-way valve 308.

The rear-end partition of temperature changing chamber 301 is mainly made of ABS or other resin in the outlet wall, and the inside is composed of foamed styrol or the like, and temperature changing chamber 301 and cooling air duct 311 on temperature changing chamber 311 are thermally insulated, a recess is formed in a part of the wall at the inside of the temperature changing chamber so that the temperature may be lower than in other parts, and electrostatic atomizing device 131 as the mist maker is installed in this place.

Rear end partition 313 of temperature changing chamber for fixing electrostatic atomizing device 131 is provided with heat conducting pin heater 158 near mist generation department 139 for the purposes of regulating the temperature of cooling pin 134 of heat conduction material provided in electrostatic atomizing device 131, and preventing excessive dew condensation in the peripheral parts including atomizing electrode 135 at the tip of the department mist.

Cooling pin 134 of heat conduction material is fixed to outlet wall 137, and cooling pin 134 has protrusion 134a projecting from the outlet wall. Cooling pin 134 as protrusion 134a at the reverse side of atomizing electrode 135, and protrusion 134a is fitted into rear end partition 313 of temperature changing chamber.

As a result, the back side of cooling pin 134 of heat conduction material is at temperature of freezing temperature zone disposed close to cooling air duct 311 on temperature changing chamber.

Cooling pin 134 of heat conduction material is cooled by using the cold air generated in cooling compartment 110 and blown by cooling fan 113, and since cooling pin 134 is made of a metal piece of excellent heat conduction, the cooling section is cooled sufficiently only by heat conduction from the cold air generated in lower temperature side evaporator 303. Damper 302 is installed at the downstream side.

Mist generation department 139 of electrostatic atomizing device 131 is installed in a gap between lower basket 119 and upper basket 120, and the atomizing electrode tip is disposed toward this gap.

Rear end partition 313 of temperature changing chamber in which electrostatic atomizing device 131 is installed has a recess, and electrostatic atomizing device 131 is disposed in this place.

Cooling pin 134 of electrostatic atomizing device 131 is covered with heat conducting pin cover 166 of heat resistant and waterproof material such as PS, PP other resin so as to surround the outer circumference, and is fitted into through-section 165 of heat insulator 152 in this state.

At this time, heat conducting pin cover 166 fitted tightly with heat insulator 152 in the surrounding, and when water deposits on cooling pin 134, heat insulator 152 sticks, and invasion of water into the inside of the heat insulator, and freezing and breaking can be prevented.

End portion 134*b* of cooling pin 134 is formed in a cylindrical shape in heat conducting pin cover 166 to assure the cooling capacity from the back side, and only end portion 134*b* of cooling pin 134 is opened, and opening 167 of through-section 165 is sealed with aluminum tape or other tape 194 adhered to heat insulator 152 to shut off cold air.

End portion 134*b* of cooling pin 134 is adhered with tape 194, and the heat conduction is guaranteed.

Heat conducting pin cover 166 may be an adiabatic insulation tape. However, considering a certain dimensional error, certain void 196 is present between cooling pin 134 and heat conducting pin cover 166, and this void 196 is filled up with void burying member 197*d* such as butyl, heat diffusion compound or heat conduction holding material relatively excellent in heat conductivity and capable of filling the void, and such material is buried between cooling pin 134 and heat conducting pin cover 166.

Temperature changing chamber 301 can be changed from the freezing temperature to wine storage temperature, and if necessary, for example, a heater (not shown) for temperature regulation may be installed in the peripheral area.

In the refrigerator having such configuration, the operation ad its effects are described. First, the operation of the freezing cycle is explained. Depending on a preset compartment temperature, a signal is sent from the control circuit board (not shown), and the freezing cycle is operated, and the cooling operation is started. By the operation of compressor 109, the refrigerant of high temperature and high pressure is discharged, and is somewhat condensed and liquefied in condenser 307, and passes through a refrigerant piping (not shown) laid down in the lateral side and back side of the refrigerator main body (thermally insulated cabinet 101), or the front opening of the refrigerator main body (thermally insulated cabinet 101), and is further condensed and liquefied while preventing dew condensation on the refrigerator main body (thermally insulated cabinet 101), and reaches up to three-way valve 308. Herein, the path of three-way valve 308 is determined by the operation signal from the control circuit board of refrigerator 100, and the refrigerant is passed into either capillary on lower temperature side 309 or capillary on higher temperature side, or into both. When the path of three-way valve 308 is opened to the capillary on higher temperature side, a liquid refrigerant of low temperature and low pressure is formed in capillary on higher temperature side 310, and flows into higher temperature side evaporator 304.

Herein, the liquid refrigerant of low temperature and low pressure in higher temperature side evaporator 304 is at a temperature of about −10° C. to −20° C., and it is directly or indirectly exchanged in heat with the air in refrigerator compartment 104, and a part of the refrigerant in higher temperature side evaporator 304 is evaporated. Further, it flows through the refrigerant piping, and reaches lower temperature side evaporator 303.

It further flows through the accumulator (not shown) and returns to compressor 109 in the cooling cycle operation.

On the hand, when the path of three-way valve 308 is opened to the capillary on lower temperature side 309, a liquid refrigerant of low temperature and low pressure is formed in capillary on lower temperature side 309, and flows into lower temperature side evaporator 303.

Herein, the liquid refrigerant of low temperature and low pressure is at a temperature of about −20° C. to −30° C., and the air in the cooling compartment is exchanged in heat by convection by cooling fan 113, and almost all refrigerant in lower temperature side evaporator 303 is evaporated. This cold air is blown into freezer compartment 108 or temperature changing chamber 301 by cooling fan 113. The heat-exchanged refrigerant flows through the accumulator and returns to compressor 109.

On the other hand, in lower temperature side evaporator 303 in cooling compartment 110, a cold air is discharged by cooling fan 113, and passes through cooling air duct 312 on freezer compartment in rear en partition 314 of freezer compartment, and is discharged into freezer compartment 108 from a discharging port. The discharged cold air exchanges in heat with the freezer compartment case, and is sucked into the lower part of rear end partition 314 of freezer compartment, and returns to cooing chamber 110 having lower temperature side evaporator 303.

A part of the cold air discharged by cooling fan 113 flows into cooling air duct 311 on temperature changing chamber in rear end partition 313 of temperature changing chamber. The cold air flowing into cooling air duct 311 on temperature changing chamber passes through damper 302, and is discharged into temperature changing chamber 301 from a discharging port, and is exchanged in heat in temperature changing chamber 301, and sucked into a duct at the back side, and is returned to cooling compartment 110. At this time, by the temperature detector installed in temperature changing chamber 301, damper 302 is determined in its opening or closing operation, and the volume of cold air passing through the damper is controlled, so that the temperature is controlled constantly in temperature changing chamber 301.

Herein, temperature changing chamber 301 is a chamber in which an arbitrary temperature can be set, practically from freezing temperature zone of about −20° C. to about 5° C. of vegetable compartment, or about 12° C. of wine cellar. Hence it may be also used as vegetable compartment for storing vegetables and fruit.

Accordingly, when the temperature setting of temperature changing chamber 301 is about vegetable storing temperature, for example, 2° C. or higher, electrostatic atomizing device 131 is put in operation, and the freshness of the contents is enhanced.

Herein, in temperature changing chamber 301, in a part of the location of relatively high humidity environment of rear end partition 313 of temperature changing chamber, the heat insulator is thinner in wall thickness than in other parts, and deepest recess 111b is formed behind cooling pin 134 in particular. Hence, recess 111a is formed in rear end partition 313 of temperature changing chamber, and in deepest recess 111b at the rearmost side of recess 111a, electrostatic atomizing device 131 in a shape having projecting protrusion 134a of cooling pin 134 is fitted and fixed.

In cooling air duct 311 on temperature changing chamber at the back side of cooling pin 134, a cold air of about −15° C. to −25° C. generated at the side of evaporation tray 303 on lower temperature side by operation of cooling system, and blown by cooling fan 113 is flowing, and by heat conduction from air duct surface, cooling pin 134 of heat conduction material is cooled to, for example, about 0 to −10° C. At this time, since cooling pin 134 is a heat conduction material, the cold heat is conveyed quickly, and atomizing electrode 135 at the tip of the department mist is cooled indirectly to about 0 to −10° C. by way of cooling pin 134.

In this case, when damper 302 is opened, the cold air directly flows into temperature changing chamber 301, and the temperature changing chamber is set in low humidity state. When damper 302 is closed, dry air does not flow into the temperature changing chamber, and the temperature changing chamber is relatively at high humidity, and the temperature in the cooling air duct in the temperature changing chamber at the back side of cooling pin 134 is maintained at a relatively low temperature.

Herein, when the temperature setting of temperature changing chamber 301 is the setting of vegetable compartment, the temperature is 2° C. to 7° C., and the humidity is relatively high due to transpiration from vegetables, and if atomizing electrode 135 at the tip of the department mist of electrostatic atomizing device 131 becomes lower than the temperature of dew point, water is generated and water drops deposit on atomizing electrode 135 including its peripheral parts.

A negative voltage is applied to atomizing electrode 135 of a tip of the department mist having water drops, and a positive voltage to opposite electrode 136, and a high voltage (for example, 4 to 10 kV) is applied between these electrodes from voltage applicator 133. At this time, a corona discharge occurs between these electrodes, and water drops at the tip of atomizing electrode 135 are pulverized by an electrostatic energy, and since the water drops are charged electrically, by Rayleigh scattering, a very fine mist of changed nano level having an invisible particle size at the level of several nanometers is generated, accompanying ozone and OH radicals. The voltage applied between the electrodes is very high, about 4 to 10 kV, but the discharge current value at this time is several μA levels, and the input is very low, about 0.5 to 1.5 W.

More specifically, supposing atomizing electrode 135 at reference potential side (0 V) and opposite electrode 136 at high voltage side (+7 kV), the dew condensation water deposits on the leading end of atomizing electrode 135, and an air insulation layer between atomizing electrode 135 and opposite electrode 136 is destroyed, and discharge is caused by an electrostatic force. At this time, the dew condensation water is electrically charged, and fine particles are formed. Further, since opposite electrode 136 is at a positive side, the charged fine mist is attracted, and liquid drops are further pulverized, and a fine mist of invisible nano level having an electric charge of several nm level containing radicals is attracted to opposite electrode 136, and its inertial force causes the fine mist to be atomized toward the storage compartment (temperature changing chamber 301).

Herein, cooling pin 134 is cooled from cooing air duct 311 on temperature changing chamber by way of tape 194 or void burying member 197*d*, or cooled from the heat insulator at the cooling pin lateral side. When cooled indirectly by a dual structure by way of tape 194, void 196 may be formed between heat conducting pin cover 166 and tape 194 due to processing precision, and if void 196 is formed, the heat conductivity becomes poor in this space, and cooling pin 134 may not be cooled sufficiently, and the temperature of cooling pin 134 or the temperature of atomizing electrode 135 may fluctuate, and dew condensation may be disturbed at the atomizing electrode tip depending on the circumstance.

To prevent these troubles, at the time of assembling, tight contacting of tape 194 and cooling pin 134 should be checked, or if possibility of forming of void is suspected, void 196 is filled with void burying member 197*d* such as butyl, heat diffusion compound or heat conduction holding material, and the heat conduction from tape 194 to cooling pin 134 is assured, and the cooling capacity on atomizing electrode 135 is guaranteed.

Further, there is no gap between heat conducting pin cover 166 and through-section 165, and opening 167 of through-section 165 shuts off invasion of cold air from the cooling air duct adjacent from tape 194, and low temperature cold air does not leak into the compartment, and dew condensation or low temperature troubles will not occur in storage compartment (temperature changing chamber 301) or its peripheral parts.

To prevent heat conduction deterioration by forming of voids between heat conducting pin cover 166 and cooling pin 134 due to inevitable error in processing precision or assembling precision, voids 196 can be filled up with butyl or other heat conduction material, and the heat conductivity is assured, and the cooling capacity is guaranteed. Voids 196 formed between tape 194 and cooling pin 134 can be filled up by filling voids 196 with butyl or other heat conduction material, and the heat conductivity can be assured.

Since there is no gap between heat conducting pin cover 166 and through-section 165, invasion of water into the heat insulator formed of foamed styrol can be prevented, and it is effective to prevent permeation of water into the heat insulator, freezing of the permeation area, and application of stress in the area by expansion of volume of water, and accompanying cracking and breaking, and the quality is assured more securely.

Besides, opening 167 of through-section 165 shuts off invasion of cold air from the cooling air duct adjacent from tape 194, and cold air does not leak into the compartment, and dew condensation or low temperature troubles will not occur in storage compartment (temperature changing chamber 301) or its peripheral parts.

By these cooling effects, dew condensate on atomizing electrode 135, and a high voltage discharge occurs between opposite electrode 136 and atomizing electrode 135, and the generated fine mist passes through atomizing port 132 formed in outlet wall 137 of electrostatic atomizing device 131, and is atomized into temperature changing chamber 301, but since the particle size is very small, the diffusion power is strong, and the fine mist reaches all parts of temperature changing chamber 301. Since the atomized fine mist is generated by high voltage discharge, it is charged negatively, while temperature changing chamber 301 contains positively charged vegetables and fruit, and the atomized mist is likely to gather on the surface of vegetables and the freshness is enhanced.

As far as possible to atomize, the temperature is not particularly specified. For example, if the temperature changing chamber is set at partial temperature of about −2° C., freezing temperature of about 0° C., or chilled temperature zone of about 1° C., as far as it is judged that the mist can be atomized from electrostatic atomizing device 131, only by atomizing, a fine mist deposits on the surface of fresh food, and the bactericidal property is enhanced, and storage for a long period may be realized.

If temperature changing chamber 301 is set at wine storing temperature, damper 302 is almost closed, and the humidity is relatively high in the storage compartment, and growth of mold may be possible, but it can be prevented by atomizing a mist having strong oxidizing radicals.

If temperature changing chamber 301 is set in temperature zone judged to be impossible to atomize such as freezing setting, or if the operation of electrostatic atomizing device 131 can be freely stopped by manual button or the like, the electrostatic atomizing device can be stopped.

By judging the operation of electrostatic atomizing device 131 by the damper opening and closing operation, electrostatic atomizing device 131 can be operated efficiently.

Further, by disposing a heater for regulating the temperature near cooling pin 134 of electrostatic atomizing device 131, the temperature of the atomizing electrode can be regulated, and the water volume at the atomizing electrode tip can be regulated, and a more stable mist making state can be realized.

Thus, in the preferred embodiment, the refrigerator having a plurality of evaporators is provided with a partition for separating a temperature changing chamber for varying the temperature and its storage compartment, and has a cooling air duct on temperature changing chamber for cooling the temperature changing chamber, and the electrostatic atomizing device is installed on the rear partition for separating the air duct and the storage compartment. Hence, when the temperature setting in the temperature changing chamber is the temperature setting in the vegetable compartment, the atomizing electrode can be cooled by heat conduction from the air duct flowing into the temperature changing chamber, and the dew can be condensed, and stable atomizing is realized. Since it is installed at the inner side, it is hardly accessed by the user's hand, and the safety is enhanced.

In the preferred embodiment, if the damper is closed, the temperature of the air duct at the back side of the temperature changing chamber is at the upstream side of the damper, and a relatively low temperature is maintained, and the atomizing electrode can be cooled sufficiently, and dew can be condensed at the tip of the atomizing electrode, and the mist can be generated.

The mist generation department of the preferred embodiment is designed to generate mist by electrostatic mist-making system, and water drops are broken and pulverized by using an electric energy of high voltage, and a fine mist is generated. Since the generated mist is charged electrically, by charging the mist in reverse polarity of the desired vegetables and fruit, for example, by atomizing a mist of negative charge to the vegetables of positive charge, the bonding force on the vegetables and fruit is enhanced, and the mist can be more uniformly bonded on the vegetable surface, and as compared with the mist of the type not charged, the mist bonding rate is substantially improved. The atomized mist can be directly applied on the food in the vegetable crisper, and a fine mist can be applied on the vegetable surface by making use of the potential of the fine mist and the vegetables, and the freshness may be further enhanced.

The damper of the preferred embodiment is a motor-driven damper, and there is no limitation of the temperature setting (operating temperature) due to limitation of the mechanical damper, and the temperature changing chamber can be controlled at a desired temperature, and the temperature suited to various foods can be determined.

Although impossible in mechanical damper, force closing is possible, and when the temperature changing chamber is not used, it is not required to circulate the cold air in the temperature changing chamber, and by closing the motor-driven damper by force, useless cooling is prevented, and the power consumption can be suppressed. When defrosting the lower temperature side evaporator in the cooling compartment, by closing the motor-driven damper by force, invasion of warm humidity into the temperature changing chamber can be prevented, and the frosting is prevented and defrosting efficiency is enhanced, and the power consumption can be suppressed, and the atomizing electrode can be heated at the same time, and it serves as a drying unit of the atomizing electrode, and the reliability is enhanced.

Moreover, the damper of the preferred embodiment is a temperature controlling chamber fan capable of varying the rotating speed, and the cold air volume to the temperature changing chamber can be adjusted, and it is free from restriction of the temperature setting (operating temperature) required in the mechanical damper, and temperature changing chamber 301 can be controlled at a desired temperature, and the temperature suited to each food can be created. In addition, cooling speed can be controlled, such as quick cooling or slow cooling and the freshness of the food is further enhanced.

In the preferred embodiment, the temperature changing chamber is the storage compartment having the electrostatic atomizing device, but it may be realized by a vegetable compartment limited in the temperature zone more strictly. As a result, the temperature fluctuation range is smaller, and a simpler control specification is realized.

Preferred Embodiment 29

FIG. 45 is a sectional view of the refrigerator in preferred embodiment 29 of the present invention. FIG. 46 is a sectional view near the electrostatic atomizing device in preferred embodiment 29 of the present invention.

In this preferred embodiment, only the portions different from the configuration specifically described in the foregoing preferred embodiments are explained, and the portions similar to the configuration specifically described in the foregoing preferred embodiments or applicable to the same technical concept are omitted in explanation.

As shown in the drawing, in the preferred embodiment, in the highest part of refrigerator 100, refrigerator compartment 104 is composed as a first storage compartment, and in the lower part of refrigerator compartment 104, temperature changing chamber 301 changeable to vegetable compartment temperature of about 5° C. is composed, and freezer compartment 108 is formed in the lower of temperature changing chamber 301. Temperature changing chamber 301 is composed of partition 321 for thermally insulating between the temperature zones of refrigerator compartment 104 and temperature changing chamber 301, a second partition for thermally insulating the temperature zone of temperature changing chamber 301, inner case 103 at the inner side of temperature changing chamber 301, and door 118.

Refrigerator compartment 104 and temperature changing chamber 301 utilize higher temperature side evaporator 304 disposed in the inner wall at the inner side of the refrigerator compartment and at the inner side of the temperature changing chamber as the cooling source, and freezer compartment 108 utilizes lower temperature side evaporator 303 provided in cooling compartment disposed at the inner side of freezer compartment 108 as the cooling source, and cooling fan 113 is provided in the upper part of lower temperature side evaporator 303 for blowing the cold air generated in lower temperature side evaporator 303.

At the inner side of temperature changing chamber 301, electrostatic atomizing device 131 is composed for atomizing a mist into temperature changing chamber 301.

The cooling cycle of the present invention discharges the refrigerant from compressor 109, condenses in condenser 307, and changes over a plurality of channels by three-way valve 308. A part of the refrigerant is decompressed by capillary on higher temperature side 310, is exchanged in heat in higher temperature side evaporator 304, and passes through lower temperature side evaporator 303 and an accumulator, and returns to compressor 109, and the simultaneous cooling cycle of refrigerator compartment and freezer compartment is formed, and other part is decompressed in capillary on lower temperature side 309, is exchanged in heat in lower temperature side evaporator 303, and passes through an accumulator, and returns to compressor 109, and the independent cooling cycle of freezer compartment is formed.

Therefore, temperature changing chamber 301 makes use of higher temperature side evaporator 304, and the temperature is properly regulated by a refrigerator compartment temperature detector (not shown) or a temperature changing compartment temperature detector (not shown), compressor 109, and three-way valve 308.

Inner case 103 at the rear side of temperature changing chamber 301 is mainly made of ABS or other resin, and electrostatic atomizing device 131 as the mist maker is installed in a part of this inner case.

Inner case 103 for fixing electrostatic atomizing device 131 is provided with heat conducting pin heater 158 near mist generation department 139 for the purposes of regulating the temperature of cooling pin 134 of heat conduction material provided in electrostatic atomizing device 131, and preventing excessive dew condensation in the peripheral parts including atomizing electrode 135 at the tip of the department mist.

Cooling pin 134 of heat conduction material is fixed to outlet wall 137, and cooling pin 134 has protrusion 134a projecting from the outlet wall. Cooling pin 134 has protrusion 134a at the reverse side of atomizing electrode 135, and protrusion 134a is fitted into a recess formed in a part of inner case 103.

It is hence disposed closer to higher temperature side evaporator 304 at the back side of cooling pin 134 of heat conduction material.

In the refrigerator having such configuration, the operation ad its effects are described. First, the operation of the freezing cycle is explained.

Depending on a preset compartment temperature, a signal is sent from the control circuit board (not shown), and the freezing cycle is operated, and the cooling operation is started. By the operation of compressor 109, the refrigerant of high temperature and high pressure is discharged, and is somewhat condensed and liquefied in condenser 307, and passes through a refrigerant piping (not shown) laid down in the lateral side and back side of the refrigerator main body (thermally insulated cabinet 101), or the front opening of the refrigerator main body (thermally insulated cabinet 101), and is further condensed and liquefied while preventing dew condensation on the refrigerator main body (thermally insulated cabinet 101), and reaches up to three-way valve 308. Herein, the channel of three-way valve 308 is determined by the operation signal from the control circuit board of refrigerator 100, and the refrigerant is passed into either capillary on lower temperature side 309 or capillary on higher temperature side, or into both. When the channel of three-way valve 308 is opened to the capillary on higher temperature side, a liquid refrigerant of low temperature and low pressure is formed in capillary on higher temperature side 310, and flows into higher temperature side evaporator 304.

Herein, the liquid refrigerant of low temperature and low pressure in higher temperature side evaporator 304 is at a temperature of about −10° C. to −20° C., and it is directly or indirectly exchanged in heat with the air in refrigerator compartment 104 or temperature changing chamber, and a part of the refrigerant in higher temperature side evaporator 304 is evaporated. Further, it flows through the refrigerant piping, and reaches lower temperature side evaporator 303.

Further the refrigerant flows through the accumulator (not shown) and returns to compressor 109 in the cooling cycle operation.

On the hand, when the channel of three-way valve 308 is opened to the capillary on lower temperature side 309, a liquid refrigerant of low temperature and low pressure is formed in capillary on lower temperature side 309, and flows into lower temperature side evaporator 303.

Herein, the liquid refrigerant of low temperature and low pressure is at a temperature of about −20° C. to −30° C., and the air in the cooling compartment is exchanged in heat by convection by cooling fan 113, and almost all refrigerant in lower temperature side evaporator 303 is evaporated. This cold air is blown into freezer compartment 108 by way of cooling fan 113. The heat-exchanged refrigerant flows through the accumulator and returns to compressor 109.

On the other hand, in lower temperature side evaporator 303 in cooling compartment 110, a cold air is discharged by cooling fan 113, and passes through cooling air duct 312 on freezer compartment in rear end partition 314 of freezer compartment, and is discharged into freezer compartment 108 from a discharging port. The discharged cold air exchanges in heat with the freezer compartment case, and is sucked into the lower part of rear end partition 314 of freezer compartment, and returns to cooing chamber 110 having lower temperature side evaporator 303.

The channel to capillary on higher temperature side 310 is opened by the three-way valve, and refrigerator compartment 104 and temperature changing chamber 301 are cooled. At this time, by the temperature detector installed in refrigerator compartment 104 or temperature changing chamber 301, opening or closing of the three-way valve is determined, so that the temperature is controlled constantly in refrigerator compartment 104 or temperature changing chamber 301.

Herein, temperature changing chamber 301 is a chamber in which an arbitrary temperature can be set, practically from about −2° C. in partial chilling temperature zone, or about 5° C. of vegetable compartment, to about 12° C. of wine cellar. Hence it may be also used as vegetable compartment for storing vegetables and fruit.

Accordingly, when the temperature setting of temperature changing chamber 301 is about vegetable storing temperature, for example, 2° C. or higher, electrostatic atomizing device 131 is put in operation, and the freshness of the contents is enhanced.

Herein, in temperature changing chamber 301, in a part of the location of relatively high humidity environment of inner case 103 at the inner side, electrostatic atomizing device 131 is disposed, and the rear part of cooling pin 134 is close to higher temperature side evaporator 304.

In higher temperature side evaporator 304 at the back side of cooling pin 134, by the operation of the cooling system, the refrigerant tube or fin or heat transfer material is cooled to a temperature of about −15 to −25° C., and by the heat conduction from them, cooling pin 134 of heat conduction material is cooled to about 0 to −10° C. At this time, since cooling pin 134 is a heat conduction material, the cold heat is conveyed quickly, and atomizing electrode 135 at the tip of the department mist is cooled indirectly to about 0 to −10° C. by way of cooling pin 134.

In this way, cooling pin 134 is cooled by direct heat conduction from the evaporation tray.

Therefore, the cooling section for cooling of cooling pin 134 is not low temperature air from the air duct, but is the direct heat conduction from the evaporation tray kept at nearly constant evaporation temperature, and the cooling pin can be cooled more stably, and the thermal capacity is increased by the evaporation tray and the refrigerant, and a stable temperature is realized.

Herein, when three-way valve 308 is set to open the channel for the capillary on higher temperature side, refrigerator compartment 104 and temperature changing chamber 301 are set in the cooling mode, and the temperature changing chamber is in low humidity state. On the other hand, three-way valve 308 is set to close the channel for the capillary on higher temperature side, the temperature changing chamber 301 is in a relatively high humidity state, and a certain low temperature is maintained in higher temperature side evaporator 304 at the back side of cooling pin 134.

If the temperature setting in temperature changing chamber 301 is the vegetable compartment setting, the temperature is 2° to 7° C., and the humidity is relatively high due to transpiration from vegetables, and atomizing electrode 135 at the tip of the department mist of electrostatic atomizing device 131 is below the temperature of dew point, water is generated in atomizing electrode 135 including its tip, and water drops deposit, and a fine mist having radicals is generated by application of high voltage.

This fine mist passes through atomizing port 132 formed outlet wall 137 of electrostatic atomizing device 131, and is atomized into temperature changing chamber 301, and since the particle size is very small, the diffusion is very strong, and the fine mist reaches all parts in temperature changing chamber 301. Since the fine mist being atomized is generated by high voltage discharge, and is negatively charged, while temperature charging chamber 301 contains vegetables and fruit being charged positively, and the atomized mist is likely to gather on the surface of vegetables and the freshness is enhanced.

As far as atomizing is possible, the temperature is not specified. For example, if the temperature changing chamber is set at about −2° C. of partial temperature, about 0° C. of icing, or about 1° C. of chilling, as far as it is judged possible to atomize from electrostatic atomizing device 131, by atomizing, fine mist deposits on the surface of fresh food, and the sterilizing effect is enhanced, and the food can be stored for a long period.

A more efficient mist atomizing is realizing by interlocking the operation of three-way valve 308 and the operation of electrostatic atomizing device 131.

Near cooling pin 134 of electrostatic atomizing device 131, a heater may be disposed for the purpose of regulating the temperature, and the temperature control of the atomizing electrode and the water volume adjustment at the tip of the department mist may be enabled, and a further stable mist-making state is realized.

Thus, in the preferred embodiment, the refrigerator having a plurality of evaporator trays, a temperature changing chamber for varying the temperature, and an evaporation tray for cooling the temperature changing chamber are provided, are the temperature changing chamber is cooled by utilizing the evaporation tray for cooling the refrigerator compartment, and the electrostatic atomizing device is provided in a part of the inner case at the inner side of the temperature changing chamber, and when the temperature setting in the temperature changing chamber is the temperature setting in the vegetable compartment, the atomizing electrode can be cooled by heat conduction from the higher temperature side evaporator, and dew can be condensed, and stable atomizing is possible, and since it is installed at the inner side, it is hardly accessed by the user's hand, and safety is enhanced, and moreover the number of parts can be saved, and the structure is more inexpensive.

In the preferred embodiment, the cooling pin is cooled direct heat conductor from the evaporation tray, but as far as the temperature of the mist generation department is appropriate, it may be cooled indirectly by disposing a resin or a heat insulator. As a result, the electrostatic atomizing device can be assembled near the evaporation tray, and the number of processes and the management for guarantee heat conduction can be saved.

Preferred Embodiment 30

Figure 47:
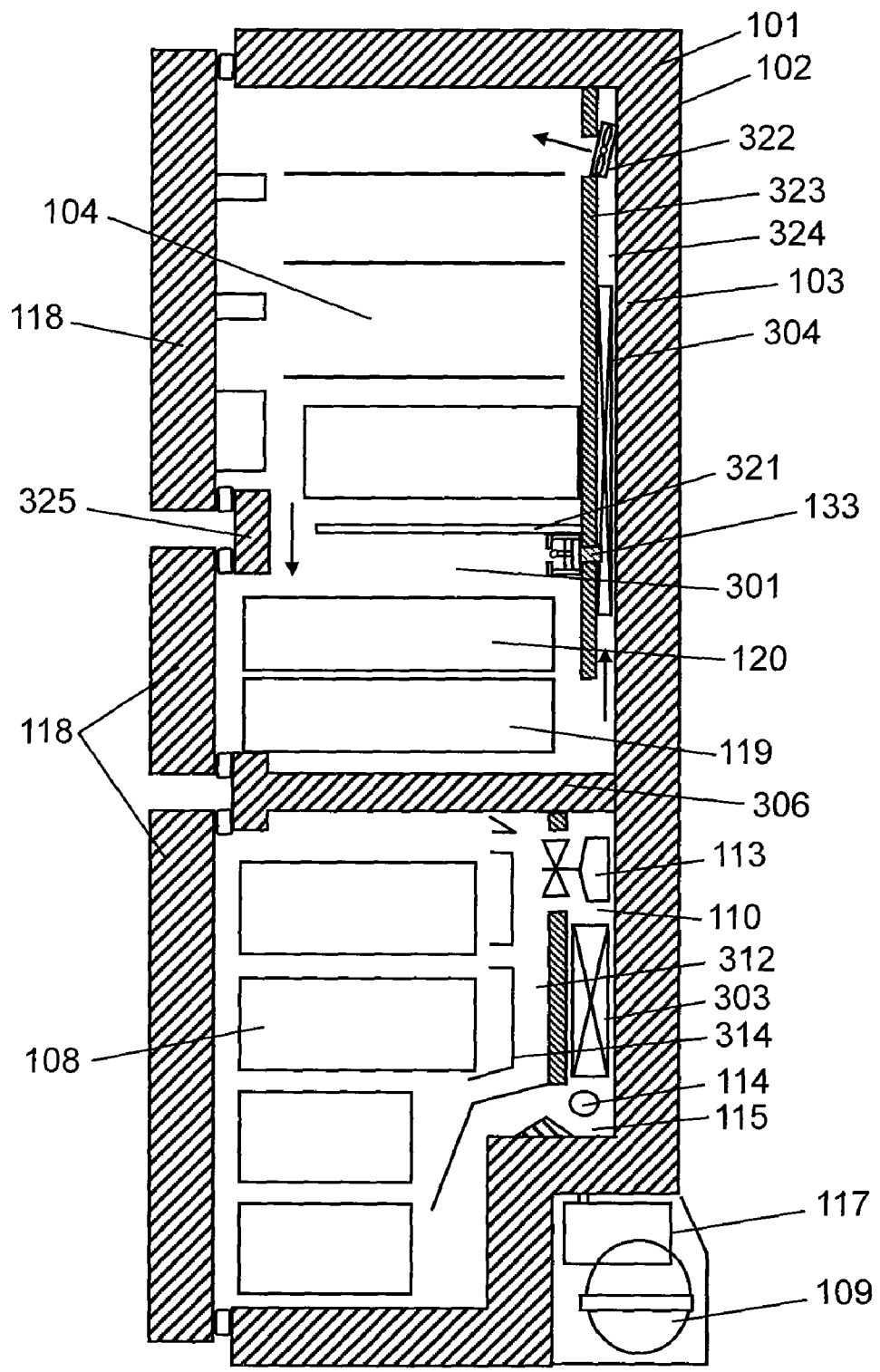
FIG. 47 shows a sectional view of a vegetable compartment and its periphery of a refrigerator in accordance with a 30th embodiment.

FIG. 47 is a sectional view of the refrigerator in preferred embodiment 30 of the present invention. In this preferred embodiment, only the portions different from the configuration specifically described in preferred embodiments 1 to 29 are explained, and the portions similar to the configuration specifically described in preferred embodiments 1 to 29 or applicable to the same technical concept are omitted in explanation.

As shown in the drawing, in the preferred embodiment, in the highest part of refrigerator 100, refrigerator compartment 104 is composed as a first storage compartment, and in the lower part of refrigerator compartment 104, temperature changing chamber 301 changeable to vegetable compartment temperature of about 5° C. is composed, and freezer compartment 108 is formed in the lower of temperature changing chamber 301.

Temperature changing chamber 301 is composed of partition board 321 for partitioning between the temperature zones of refrigerator compartment 104 and temperature changing chamber 301, a second partition for thermally insulating the temperature zone of temperature changing chamber 301, partition board 321 at inner side of temperature changing chamber 301, and door 118, and discharge port 325 from temperature changing chamber is provided in a part of partition board 321.

Partition 323 in refrigerator compartment is provided at the inner side of refrigerator compartment 104 and temperature changing chamber 301, and this partition is formed up to the inner side of temperature changing chamber 301, and air duct 324 in refrigerator compartment is disposed across a spacing, and sucking port 326 to temperature changing chamber is composed at one end thereof. Higher temperature side evaporator 304 is formed in the inside, and fan 322 for refrigerator compartment is installed in the upper part of higher temperature side evaporator 304, and a cold air is blown into the refrigerator compartment.

In a part of partition board 321 at the inner side of temperature changing chamber 301, electrostatic atomizing device 131 for atomizing a mist into temperature changing chamber 301 is composed.

Partition board 321 at the back side of temperature changing chamber 301 is composed mainly of ABS or other resin and foamed styrol or other heat insulator, and electrostatic atomizing device 131 as mist maker is disposed in a part of its inner case.

Partition board 321 for fixing electrostatic atomizing device 131 is provided with heat conducting pin heater 158 disposed near mist generation department 139, for the purposes of regulating the temperature of cooling pin 134 of heat conduction material disposed in electrostatic atomizing device 131, and preventing excessive dew condensation in the peripheral parts including atomizing electrode 135 at the tip of the department mist.

Cooling pin 134 of heat conduction material is fixed to outlet wall 137, and cooling pin 134 has protrusion 134a projecting from the outlet wall. Cooling pin 134 has protrusion 134a at the reverse side of atomizing electrode 135, and protrusion 134a is fitted into a recess formed in a part of partition board 321.

The back side of cooling pin 134 of heat conduction material is hence disposed closer to higher temperature side evaporator 304.

In the refrigerator having such configuration, the operation ad its effects are described. When the channel of three-way valve 308 is opened to capillary on higher temperature side 310, refrigerator compartment 104 and temperature changing chamber 301 are cooled. At this time, by the temperature detector installed in refrigerator compartment 104 or temperature changing chamber 301, the opening or closing of the three-way valve and the operation of fan 322 for refrigerator compartment are determined, and the temperature of refrigerator compartment 104 and temperature changing chamber 301 is kept constant.

Herein, temperature changing chamber 301 is a chamber in which an arbitrary temperature can be set, practically from about −2° C. in partial temperature zone, or about 5° C. of vegetable compartment, to about 12° C. of wine cellar. Hence it may be also used as vegetable compartment for storing vegetables and fruit.

Accordingly, when the temperature setting of temperature changing chamber 301 is about vegetable storing temperature, for example, 2° C. or higher, electrostatic atomizing device 131 is put in operation, and the freshness of the contents is enhanced.

Herein, in temperature changing chamber 301, in a part of the location of relatively high humidity environment of partition board 321 at the inner side, electrostatic atomizing device 131 is disposed, and the rear part of cooling pin 134 is close to higher temperature side evaporator 304.

In higher temperature side evaporator 304 at the back side of cooling pin 134, by the operation of the cooling system, the refrigerant tube or fin or heat transfer material is cooled to a temperature of about −15 to −25° C., and by the heat conduction from them, cooling pin 134 of heat conduction material is cooled to about 0 to −10° C. At this time, since cooling pin 134 is a heat conduction material, the cold heat is conveyed quickly, and atomizing electrode 135 at the tip of the department mist is cooled indirectly to about 0 to −10° C. by way of cooling pin 134.

Herein, when three-way valve 308 is set to open the channel for the capillary on higher temperature side, refrigerator compartment 104 and temperature changing chamber 301 are set in the cooling mode, and the temperature changing chamber is in low humidity state. On the other hand, three-way valve 308 is set to close the channel for the capillary on higher temperature side, the temperature changing chamber is in a relatively high humidity state, and fan 322 for refrigerator compartment is put in operation, and the frost deposited on the higher temperature side evaporator is thawed and removed, and at this time, temperature changing chamber 301 is in a relatively high humidity space. Therefore, mist-making is realized if the temperature elevated in higher temperature side evaporator 304 at the back side of cooling pin 134.

If the temperature setting in temperature changing chamber 301 is the vegetable compartment setting, the temperature is 2° to 7° C., and the humidity is relatively high due to transpiration from vegetables, and atomizing electrode 135 at the tip of the department mist of electrostatic atomizing device 131 is below the temperature of dew point, water is generated in atomizing electrode 135 including its tip, and water drops deposit, and a fine mist having radicals is generated by application of high voltage.

This fine mist passes through atomizing port 132 formed in outlet wall 137 of electrostatic atomizing device 131, and is atomized into temperature changing chamber 301, and since the particle size is very small, the diffusion is very strong, and the fine mist reaches all parts in temperature changing chamber 301. Since the fine mist being atomized is generated by high voltage discharge, and is negatively charged, while temperature changing chamber 301 contains vegetables and fruit being charged positively, the atomized mist is likely to gather on the surface of vegetables and the freshness is enhanced.

As far as spaying is possible, the temperature is not specified. For example, if the temperature changing chamber is set at about −2° C. of partial temperature, about 0° C. of icing, or about 1° C. of chilling, as far as it is judged possible to atomize from electrostatic atomizing device 131, by atomizing, a fine mist deposits on the surface of fresh food, and the sterilizing effect is enhanced, and the food can be stored for a long period.

A more efficient mist atomizing is realizing by interlocking the operation of fan 322 for refrigerator compartment and the operation of electrostatic atomizing device 131.

Near cooling pin 134 of electrostatic atomizing device 131, a heater may be disposed for the purpose of regulating the temperature, and the temperature control of the atomizing electrode and the water volume adjustment at the tip of the department mist may be enabled, and a further stable mist-making state is realized.

Thus, in the preferred embodiment, the refrigerator having a plurality of evaporator trays, a temperature changing chamber for varying the temperature, and an evaporation tray for cooling the temperature changing chamber are provided, and the temperature changing chamber is cooled by utilizing the evaporation tray for cooling the refrigerator compartment, and when composed to convey the cold heat generated herein by the fan for refrigerator chamber, and the electrostatic atomizing device is provided in a part of the partition at the inner side of the temperature changing chamber, and when the temperature setting in the temperature changing chamber is the temperature setting in the vegetable compartment, the atomizing electrode can be cooled by heat conduction from the higher temperature side evaporator, and dew can be condensed, and stable atomizing is possible, and since it is installed at the inner side, it is hardly accessed by the user's hand, and the safety is enhanced, and moreover the number of parts can be saved, and the structure is more inexpensive.

Preferred Embodiment 31

Figure 48:
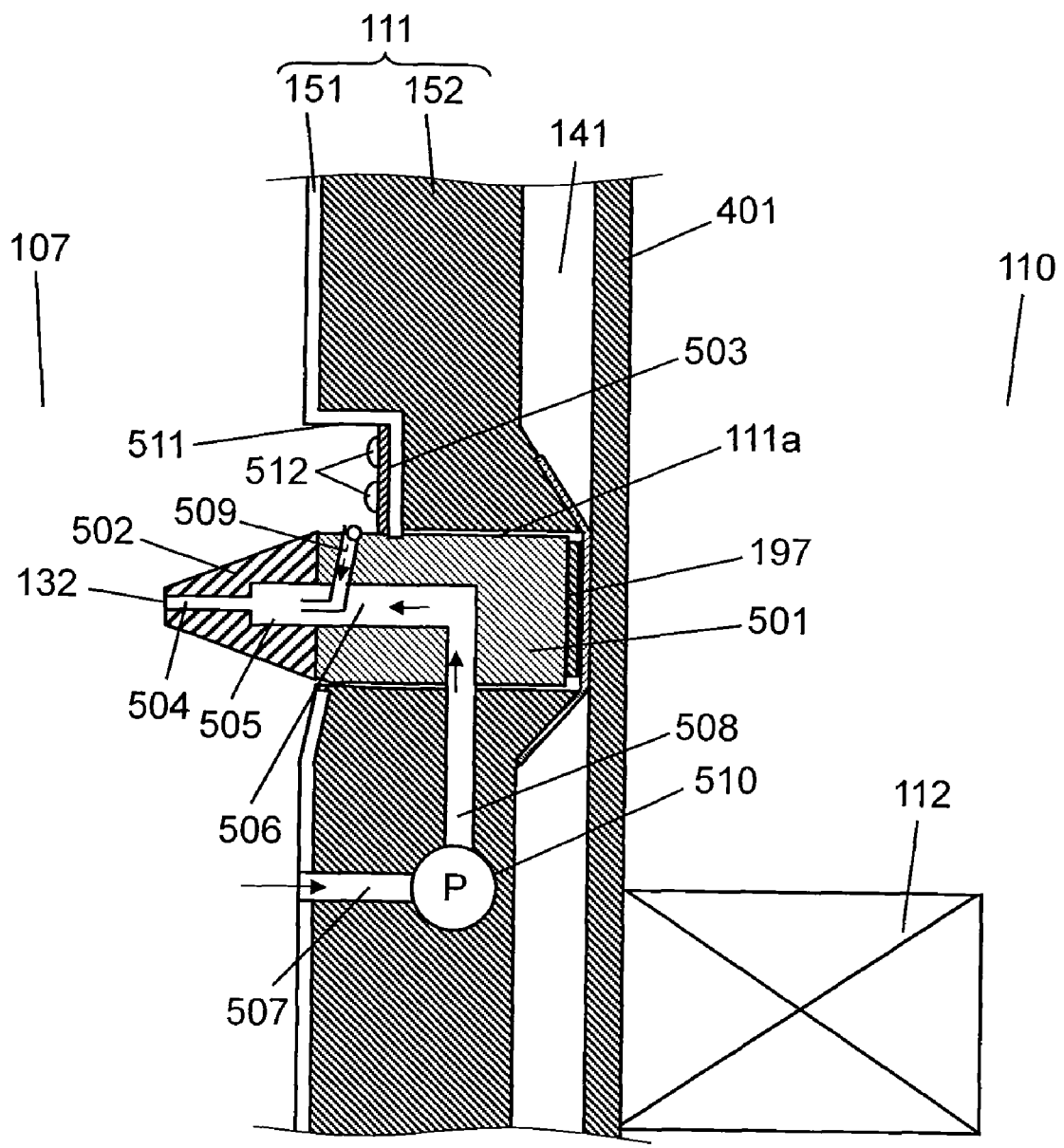
FIG. 48 shows a sectional view cut along line A-A in FIG. 2, and the sectional view details an electrostatic atomizing device and its periphery of a refrigerator in accordance with a 31st embodiment of the present invention.

FIG. 48 is a sectional view near the vegetable compartment of the refrigerator in preferred embodiment 31 of the present invention, illustrating a detailed sectional view near the electrostatic atomizing device cut alone line A-A in FIG. 2.

In this preferred embodiment, only the portions different from the configuration specifically described in preferred embodiments 1 to 30 are explained, and the portions similar to the configuration specifically described in preferred embodiments 1 to 30 or applicable to the same technical concept are omitted in explanation.

In the drawing, rear partition 111 is composed of surface of rear end portion 151 made of ABS or other resin, and heat insulator 152 made of foamed styrol or the like for thermally insulating between vegetable compartment 107 and outlet air-duct 141 for freezer compartment.

Recess 111a is formed in a part of the vegetable compartment 107 side in rear partition 111 so as to be at lower temperature than in other parts, and cooling pin 509 of heat conduction material is disposed in this place.

Cooling pin 509 is cooled mainly by heat conduction from outlet air-duct 141 for freezer compartment at the back side, and tip of the department mist 502 is composed of a resin. Channels 504, 505, 506, 507, 508 are formed in cooling pin 501 and tip of the department mist 502. That is, tip of the department mist 502 provided with channel 504 of a narrow diameter formed at the atomizing port 132 side, and channel 505 of a wider diameter communicating with channel 504. Insulator 152 has pump 510 of a small size disposed in the lower part of cooling pin 501, and channel 507 is formed having one end thereof being opened to the vegetable compartment 107 side, and other end being connected to pump 510. Upward from pump 510, channel 508 is formed to communicate between heat insulator 152 and cooling pin 501. Cooling pin 501 also has channel 506 for communicating between the end portion in cooling pin 501 of channel 508 and channel 505 of tip of the department mist 502. As a result, a passage is formed from vegetable compartment 107 by way of channel 507, pump 510, channel 508, channel 506, channel 505, and channel 504 of a narrower diameter.

In the upper part of the vegetable compartment 107 side of cooling pin 501, water collector 503 for collecting water in vegetable compartment 107 is formed. Water collector 503 is composed of a metal plate formed on the perpendicular plane in recess 511 formed in the upper part of the vegetable compartment 107 side of cooling pin 501 of heat insulator 152, and the metal plate of water collector 503 is thermally connected to cooling pin 509.

From the upper part surface of the vegetable compartment 107 side of cooling pin 501 exposed through recess 511, waterway 509 communicating with channel 506 is formed in cooling pin 501.

The cooling compartment 110 side end portion of cooling pin 509 is coupled with partition 161 by way of tape 194 as cool air shutout member same as in preferred embodiment 10 shown in FIG. 14. The surrounding of cooling pin 501 is enclosed by heat insulator 152, and the void between recess 111a and cooling pin 501 is filled up with void burying member (not shown).

In the refrigerator having such configuration, the operation and its effects are described. Cooling pin 501 of heat conduction material is cooled by way of heat insulator 152 of buffer material, and high humidity air in vegetable compartment 107 condenses dew on water collector 503 thermally connected to cooling pin 501, and water 512 is generated. This water 512 is guided into waterway 509, and flows into channel 505.

On the other hand, when pump 510 is put in operation, air from vegetable compartment 107 is sucked in, and flows from channel 505 to channel 504 at a relatively high speed by way of channels 507, 508, 506. In channel 505, as mentioned above, since water 512 is supplied from waterway 509, it is mixed with a fast air flow from channel 506, and a mist of fluid is atomized from atomizing port 132 of tip of the department mist 502.

The generated mist is atomized into vegetable compartment 107, and the contained food is moistened, and the freshness is enhanced.

Thus, in the preferred embodiment, cooling pin 501 of heat conduction material is cooled in outlet air-duct 141 for freezer compartment, and water is generated in water collector 503. The generated water is poured into channel 505 formed inside of cooling pin 501, and air is passed in by the pump from other channels 506, 507, 508, and is mixed with water to generate a mist. By the generated mist, vegetable compartment 107 can be humidified, and the freshness of vegetables may be enhanced.

Preferred Embodiment 32

In the foregoing preferred embodiments, the electrostatic atomizing device is applied in the refrigerator. However, the electrostatic atomizing device for atomizing a mist explained in the foregoing preferred embodiments may be applied not only in the refrigerator, but also in other apparatuses such as the air conditioner as the cooling device having a cooling source. Not limited to the cooling device, it may be similarly applied in other electric appliances having a large temperature difference between a space for atomizing a mist, and a space having a cooling pin, including, for example, dish washer, washing machine, rice cooker, vacuum cleaner, and other electric appliances.

This preferred embodiment relates to an example of using an electrostatic atomizing device in an air conditioner. The air conditioner is generally composed of an outdoor unit and an indoor unit mutually connected by a refrigerant piping, and in this preferred embodiment, the indoor unit of the air conditioner is mainly explained.

Figure 49:
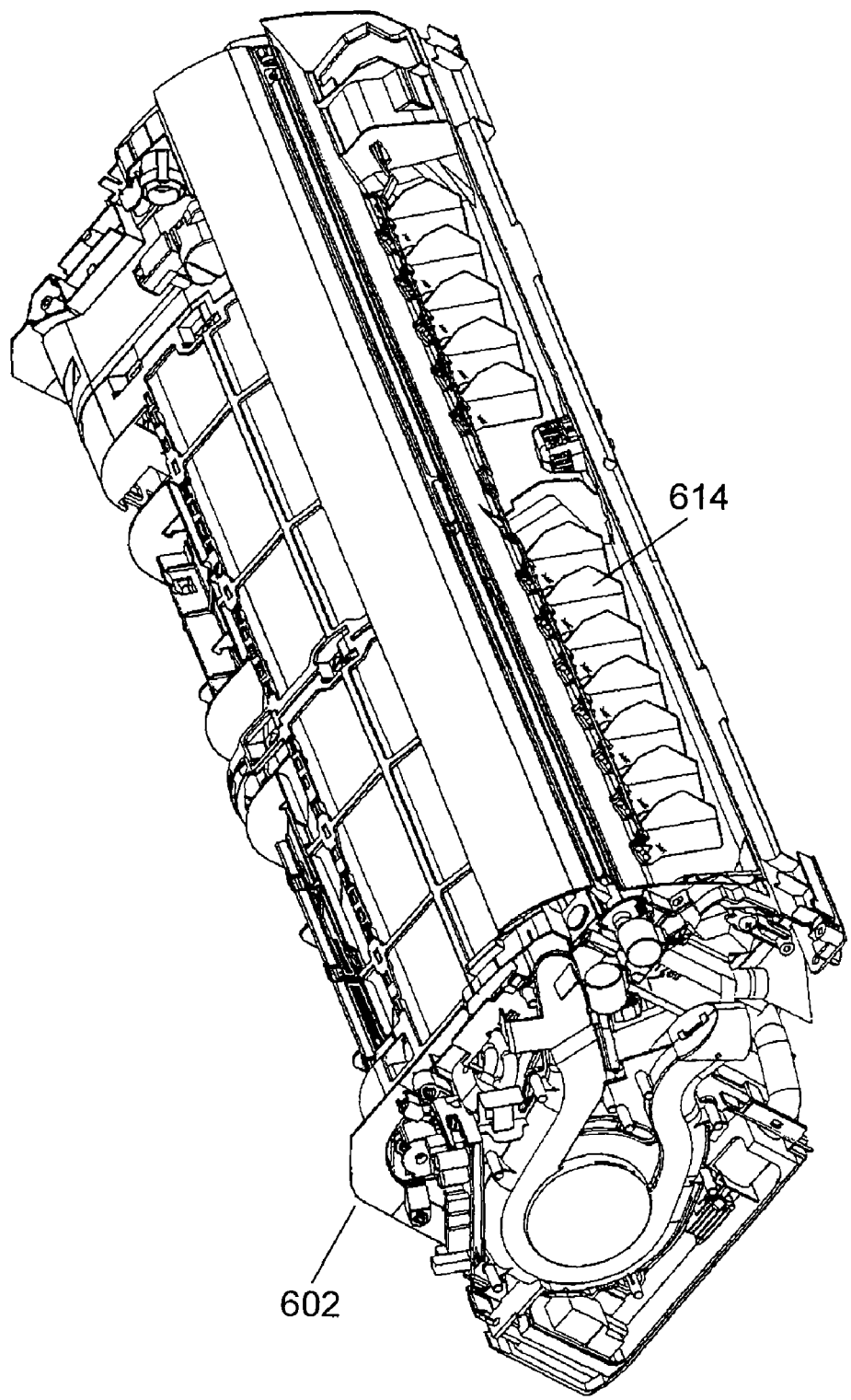
FIG. 49 shows a perspective view of which part is cut away, and the perspective view illustrates an indoor unit of an air-conditioner employing an electrostatic atomizing device in accordance with a 32nd embodiment of the present invention.
Figure 50:
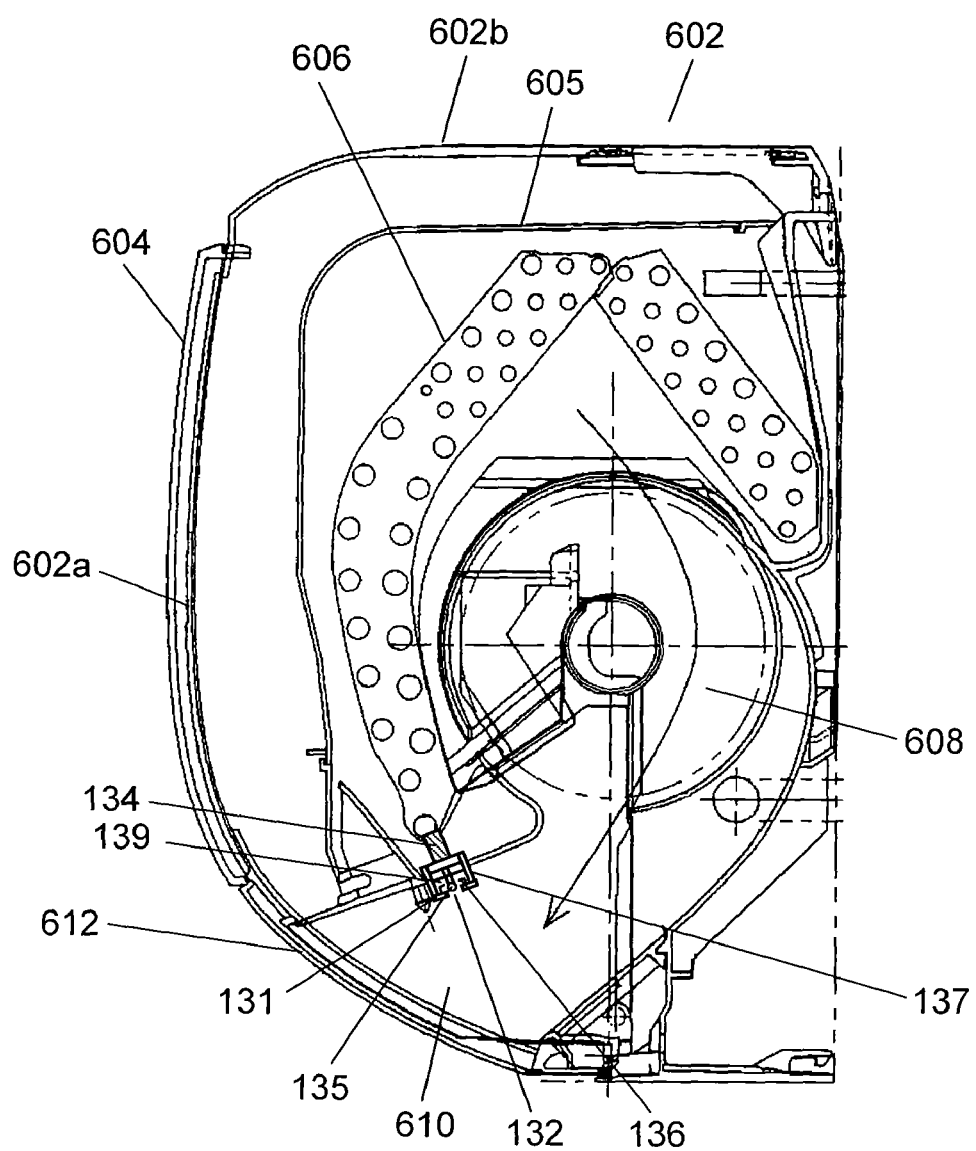
FIG. 50 shows a sectional view illustrating a structure of the air conditioner shown in FIG. 49.
Figure 51:
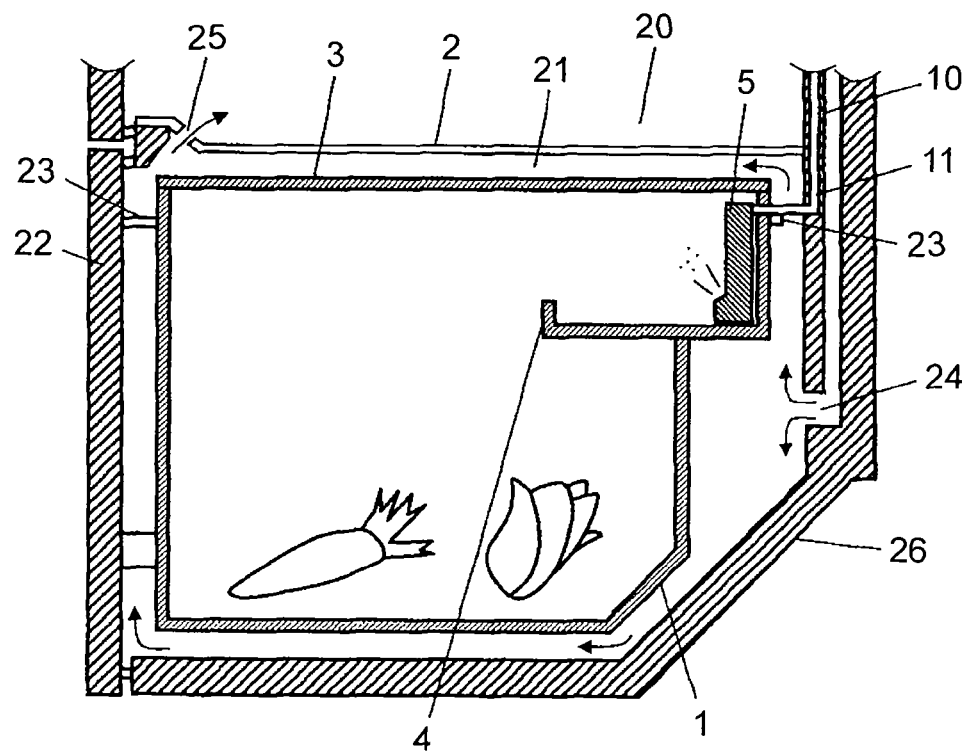
FIG. 51 shows a vertical sectional view of a vegetable compartment of a conventional refrigerator.
Figure 52:
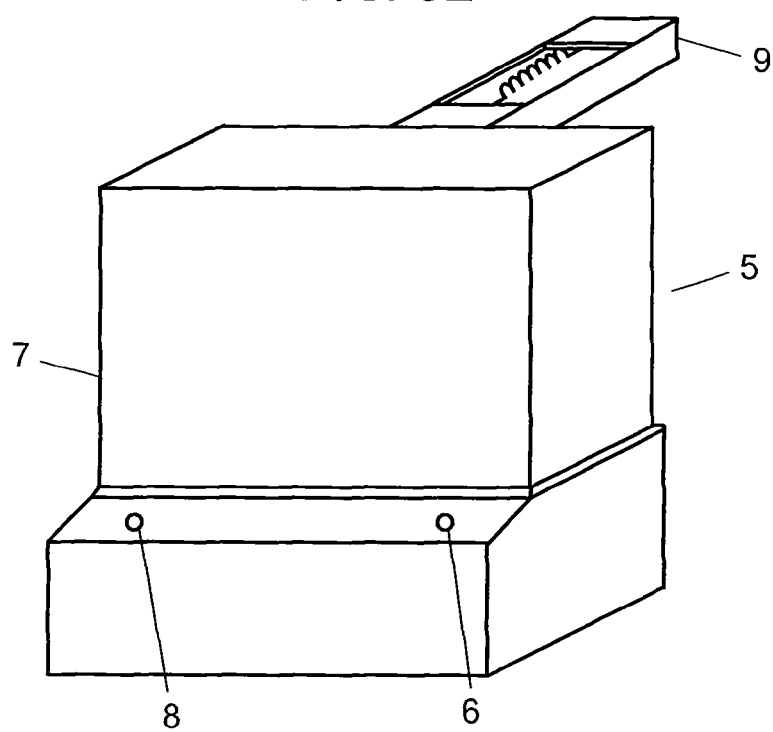
FIG. 52 shows a perspective view enlarging an essential part of an ultrasonic mist device provided to a vegetable compartment of a conventional refrigerator.

FIG. 49 is a partially cut-away perspective view showing the indoor unit of the air conditioner using the electrostatic atomizing device in preferred embodiment 32 of the present invention. FIG. 50 is a sectional view configuration of the air conditioner shown in FIG. 49.

In this preferred embodiment, only the portions different from the configuration specifically described in preferred embodiments 1 to 31 are explained, and the portions similar to the configuration specifically described in preferred embodiments 1 to 31 or applicable to the same technical concept are omitted in explanation.

The indoor unit has sucking ports for sucking the indoor air into main body 602, that is, front sucking port 602a and top sucking port 602b, and front sucking port 602a has a front movable panel to be freely opened and closed (called front panel) 604, and when the air conditioner is stopped, front panel 604 is contacting with main body 602 to close front sucking port 602a, but when the air conditioner is operating, front panel 604 moves in a direction to depart from main body 602, and front sucking panel 602a is opened.

The inside of main body 602 includes pre-filter 605 for removing dust contained in the air provided at the downstream side of front sucking port 602a and top sucking port 602b, heat exchanger 606 for exchanging heat with the indoor air sucked in from front sucking port 602a and top sucking port 602b provided at the downstream side of this pre-filter 605, indoor fan 608 for conveying the air exchanged in heat in heat exchanger 606, vertical blade 612 for opening and closing blowout port 610 for blowing out the air sent from indoor fan 608 into the room and changing the air blowout direction vertically, and lateral blade 614 for changing the air blowout direction laterally. The upper part of front panel 604 is coupled to the upper part of main body 602 by way of a plurality of arms (not shown) provided at its both end portions, and by driving and controlling a drive motor (not shown) coupled to one of the plurality of arms, during operation of the air conditioner, front panel 604 moves forward from the position when the air conditioner is stopped (the closed position of front sucking port 602a). Vertical blade 612 is similarly coupled to the lower part of main body 602 by way of a plurality of arms (not shown) provided at its both end portions.

A part of heat exchanger 606 is provided with electrostatic atomizing device 131 having an air purifying function of purifying the indoor air by generating an electrostatic mist.

In this way, FIG. 49 shows a removed state of main body cover (not shown) for covering front panel 604 and main body 602, and FIG. 50 shows the connection position of indoor unit main body 602 and electrostatic atomizing device 131.

As shown in FIG. 50, electrostatic atomizing device 131 is installed at the downstream side of heat exchanged with the suction air by heat exchanger 606.

Electrostatic atomizing device 131 is mainly composed of mist generation department 139, and outlet wall 137 molded by ABS or other resin. Outlet wall 137 is provided with atomizing port 132 and a humidity supplying port (not shown). Mist generation department 139 is composed of atomizing electrode 135 as the tip of the department mist, cooling pin 134 for fixing atomizing electrode 135 nearly in the center of one end portion, and a voltage applicator (not shown) for applying a voltage to atomizing electrode 135. Cooling pin 134 is made of an electrode connection member of heat conduction material such as aluminum, stainless steel, or brass.

Cooling pin 134 of heat conduction material is preferably covered with a heat insulator (not shown) in its surrounding in order to transmit the cold heat from one end to other end efficiently by heat conduction.

From a viewpoint of a long range, it is important to maintain the heat conduction between atomizing electrode 135 and cooling pin 134, and to prevent invasion of humidity or the like into the connection part, an epoxy material or the like is poured in, and the heat resistance is suppressed, and atomizing electrode 135 and cooling pin 134 are fixed. To lower the heat resistance, atomizing electrode 135 may be fixed by press-fitting into cooling pin 134.

Cooling pin 134 of heat conduction material is fixed in outlet wall 137, and cooling pin 134 has a protrusion projecting from the outlet wall. This cooling pin 134 has a protrusion at the reverse side of atomizing electrode 135, and the protrusion is fitted or fixed into a part of piping of flow of refrigerant inside of heat exchanger 606.

Cooling pin 134 is cooled by utilizing the cooling amount generated in heat exchanger 606. Since cooling pin 134 is made of a metal piece of excellent heat conduction, and the cooling section is capable of cooling by a sufficient capacity necessary for dew condensation in atomizing electrode 135 only by the heat conduction from the piping from heat exchanger 606, and the dew condensation can be formed at the tip of the department mist.

Since the cooling section can be formed in such a simple structure, mist making of low trouble rate and high reliability is realized. Moreover, by utilizing the cooling source of the freezing cycle, cooling pin 134 of heat conduction material or atomizing electrode 135 at the tip of the department mist can be cooled, and mist-making at low energy is realized.

The voltage applicator is formed near mist generation department 139, and the negative potential side of the voltage applicator for generating a high voltage is connected to atomizing electrode 135, and the positive potential side is connected electrically to opposite electrode 136, respectively.

Near atomizing electrode 135, discharge is always occurring for atomizing the mist, and abrasion may occur at the leading end of atomizing electrode 135. Like the refrigerator, the air conditioner is also operated for a long period of more than 10 years. Therefore, the surface of atomizing electrode 135 requires a tough surface treatment, and, for example, nickel plating, gold plating, or platinum plating may be preferred.

Opposite electrode 136 is composed of, for example, stainless steel, and its long-term reliability is required, and surface treatment by platinum plating or the like is desired for the purpose of preventing sticking of foreign matter or preventing contamination.

The voltage applicator communicates with and is controlled by the controller of the air conditioner main body, and turns on or off the high voltage by the input signal from the air conditioner main body or electrostatic atomizing device 131.

In the preferred embodiment having such configuration, the operation and its effects are explained. In heat exchanger 606, electrostatic atomizing device 131 is fixed, and cooling pin 134 is cooled by heat conduction or heat transfer from its cooling source, and thermally connected atomizing electrode 135 is also cooled, and water drops are generated on the tip. By applying a high voltage to the water drops at the leading end of atomizing electrode 135, a fine mist is generated. The mist generated in electrostatic atomizing device 131 has an electrical charge, and so as not to be attracted to heat exchanger 606, after generation of mist, it is released into the room to be air-conditioned by way of an exclusive air duct functioning also as a silencer formed of ABS or other resin.

The released fine mist flows and diffuses by convection in the room to be air-conditioned. The diffusing mist deposits on the clothes and furniture in the room to be air-conditioned. At this time, by the radicals contained in the mist, the room can be deodorized and sterilized, and a comfortable space is created in the room.

In the case of the air conditioner, in cooling operation, the air of low temperature passing through heat exchanger 606 of the indoor unit is high in relative humidity, and atomizing electrode 135 of electrostatic atomizing device 131 requires a very small amount of electric power for mist making because dew condenses on atomizing electrode 135 only when the temperature is slightly lower than the ambient temperature.

A heating unit may be installed near electrostatic atomizing device 131, and the temperature of atomizing electrode 135 can be regulated, and stable mist-making is possible.

Without using such heating unit, by stopping the cooling operation for a while and operating only the fan, the atomizing electrode can be dried by a dry air in the room to be air-conditioned, and excessive dew condensation can be prevented, and the reliability is heightened, and further stable mist-making is realized.

Thus, according to the preferred embodiment, by installing electrostatic atomizing device 131 in heat exchanger 606 of the air conditioner, the mist can be securely applied on the clothes and furniture in the room to be air-conditioned. At this time, by the radicals contained in the mist, the room can be deodorized and sterilized, and a comfortable space is created in the room.

In this manner, the electrostatic atomizing device can be applied in the dish washer, washing machine, rice cooker, vacuum cleaner, and other electric appliances, and the sterilizing, bactericidal, and deodorant effects are obtained by mist atomizing in a simple structure and at low energy.

INDUSTRIAL APPLICABILITY

The present invention is characterized by supplying fine mist stably in a simple structure, and is widely applicable in household and professional refrigerators, vegetable stock, washing machine, dish washer, and other machines where sterilizing and deodorizing effects are expected.

What is claimed is:

1. A refrigerator comprising:
    a storage compartment defined to be thermally insulated;
    a mist making section that sprays mist in the storage compartment;
    a mist-making tip provided to the mist making section to spray mist;
    a heat conduction cooling member coupled to the mist-making tip; and
    a cooling section for cooling the heat conduction cooling member, wherein the mist-making tip is rigidly mounted and connected to a first end of the heat conduction cooling member, and the cooling section cools the heat conduction cooling member for indirectly cooling the mist-making tip not higher than a dew point, so that the mist-making tip has dew formed thereon from ambient air and creates the mist for spraying solely from the dew formed thereon.

2. The refrigerator of claim 1, wherein the heat conduction cooling member is cooled by the cooling section via a heat relaxation member.

3. The refrigerator of claim 1, wherein a refrigerating unit includes multiple storage compartments and a cooling chamber that accommodates a cooler for cooling the storage compartments, and the mist-making section is disposed on a partition of the storage compartments at the cooling chamber side.

4. The refrigerator of claim 1, wherein the refrigerating unit includes multiple storage compartments and a first storage compartment of the storage compartments is equipped with the mist-making section,
    wherein a second storage compartment disposed above the first storage compartment is kept at a temperature lower than that of the first storage compartment, and
    wherein the mist-making section is mounted to a partition of the first storage compartment.

5. The refrigerator of claim 4, wherein the partition on which the mist-making section is disposed has a recess on a side of the first storage compartment, and the heat conduction cooling member is inserted into the recess.

6. The refrigerator of claim 4, wherein the partition on which the mist-making section is disposed has a through section and the heat conduction cooling member is inserted into the through section.

7. The refrigerator of claim 6, wherein the cooling section uses cool air produced in the cooling chamber for cooling the heat conduction cooling member.

8. The refrigerator of claim 6, wherein the cooling section uses heat conduction of an air duct, through which cool air produced by a cooler flows and cools the heat conduction cooling member.

9. The refrigerator of 6, wherein the cooling section uses heat transmitted from a cooling pipe, which is cooled by using a cooling source produced in a freezing cycle of the refrigerator and cools the heat conduction cooling member.

10. The refrigerator of claim 6, wherein the heat conduction cooling member includes a protrusion on an opposite side to the mist-making section, and an end of the mist-making section on the protrusion side is disposed closest to the cooling section.

* * * * *